(12) United States Patent
Tabibnia

(10) Patent No.: US 10,415,191 B2
(45) Date of Patent: Sep. 17, 2019

(54) PLANT TRAY

(71) Applicant: Ramin Tabibnia, Los Angeles, CA (US)

(72) Inventor: Ramin Tabibnia, Los Angeles, CA (US)

( * ) Notice: Subject to any disclaimer, the term of this patent is extended or adjusted under 35 U.S.C. 154(b) by 97 days.

(21) Appl. No.: 15/472,098

(22) Filed: Mar. 28, 2017

(65) Prior Publication Data
US 2017/0260699 A1 Sep. 14, 2017

Related U.S. Application Data

(63) Continuation of application No. 15/230,829, filed on Aug. 8, 2016, now Pat. No. 9,879,385, which is a continuation-in-part of application No. 14/657,977, filed on Mar. 13, 2015, now Pat. No. 9,410,296, which is a continuation of application No. 14/253,818, filed on Apr. 15, 2014, now Pat. No.
(Continued)

(51) Int. Cl.
| E01C 5/00 | (2006.01) |
| E01C 5/22 | (2006.01) |
| E04F 15/024 | (2006.01) |
| F24D 3/12 | (2006.01) |
| F24D 3/14 | (2006.01) |
| E04D 11/00 | (2006.01) |
| E01C 11/26 | (2006.01) |

(52) U.S. Cl.
CPC ............... *E01C 5/001* (2013.01); *E01C 5/00* (2013.01); *E01C 5/005* (2013.01); *E01C 5/223* (2013.01); *E01C 11/26* (2013.01); *E04D 11/007* (2013.01); *E04F 15/02447* (2013.01); *E04F 15/02452* (2013.01); *E04F 15/02464* (2013.01); *E04F 15/02476* (2013.01); *E04F 15/02482* (2013.01); *F24D 3/12* (2013.01); *F24D 3/122* (2013.01); *F24D 3/127* (2013.01); *F24D 3/142* (2013.01); *F24D 3/146* (2013.01); *F24D 3/149* (2013.01); *Y02B 30/24* (2013.01)

(58) Field of Classification Search
CPC ........ A01K 9/00; A01K 9/033; A01K 9/0295; A01K 9/028
See application file for complete search history.

(56) References Cited

U.S. PATENT DOCUMENTS

| RE957 E | 5/1860 | Titus |
| 133,766 A | 12/1872 | Easterly |

(Continued)

FOREIGN PATENT DOCUMENTS

| CA | 2740822 A1 * | 11/2011 | ............. A01G 9/025 |
| CA | 2809383 A1 * | 9/2013 | ............. A01G 9/033 |

(Continued)

*Primary Examiner* — Kristen C Hayes
(74) *Attorney, Agent, or Firm* — Cislo & Thomas, LLP; Kelly W. Cunningham, Esq.

(57) ABSTRACT

A planting system having a plurality of potting trays that can be interconnected in a modular fashion to create a multitude of different configurations. Each potting tray has a plurality of holes operatively connected with a conduit through which plumbing can be incorporated into the planting system to water plants in the potting trays via the plurality of holes. A plurality of pedestals may be used to elevate the planting system. Lateral braces may be used to interconnect the plurality of pedestals.

11 Claims, 122 Drawing Sheets

Related U.S. Application Data 9,284,693, which is a continuation-in-part of application No. 13/564,628, filed on Aug. 1, 2012, now Pat. No. 8,850,753, which is a continuation-in-part of application No. 12/732,755, filed on Mar. 26, 2010, now Pat. No. 8,453,391.

(60) Provisional application No. 62/344,920, filed on Jun. 2, 2016.

(56) References Cited

U.S. PATENT DOCUMENTS

| | | |
|---|---|---|
| 223,835 A | 1/1880 | Boyle |
| 1,265,516 A | 5/1918 | Reck |
| 1,402,998 A | 1/1922 | Anderson |
| 1,534,630 A | 4/1925 | Avery |
| 1,639,495 A | 8/1927 | Frame |
| 2,141,139 A | 12/1938 | Howe et al. |
| 2,247,356 A | 7/1941 | Browne, Jr. |
| 3,037,512 A | 6/1962 | Aruar |
| 3,037,746 A | 6/1962 | Williams |
| 3,040,637 A | 6/1962 | Bremshey |
| 3,040,902 A | 6/1962 | Dunn |
| 3,065,506 A | 11/1962 | Tremer |
| 3,195,848 A | 7/1965 | Miller et al. |
| 3,222,030 A | 12/1965 | Thorpe |
| 3,224,795 A | 12/1965 | Conley |
| 3,279,134 A | 10/1966 | William |
| 3,381,635 A | 5/1968 | Pforr |
| 3,388,620 A | 6/1968 | Rudolph |
| 3,470,663 A | 10/1969 | Tale |
| 3,689,017 A | 9/1972 | Harvey |
| 3,713,259 A | 1/1973 | Tkach |
| 3,861,098 A | 1/1975 | Schaub |
| 4,111,585 A | 9/1978 | Mascaro |
| 4,133,312 A | 1/1979 | Burd |
| 4,160,347 A | 7/1979 | Logsdon |
| 4,326,366 A | 4/1982 | Werner |
| 4,388,502 A | 6/1983 | Cohn |
| 4,570,397 A | 2/1986 | Creske |
| 4,584,221 A | 4/1986 | Kung |
| 4,592,574 A | 6/1986 | Vollmuth et al. |
| 4,728,336 A | 3/1988 | Cooper |
| 4,745,715 A | 5/1988 | Hardwicke et al. |
| 4,780,571 A | 10/1988 | Huang |
| 5,027,665 A | 7/1991 | Hayward |
| 5,074,085 A | 12/1991 | Ueda |
| 5,078,203 A | 1/1992 | Shiroki |
| 5,205,668 A | 4/1993 | Adams |
| 5,287,649 A | 2/1994 | Prestele |
| 5,323,575 A | 6/1994 | Yeh |
| 5,392,816 A | 2/1995 | Hagenberg et al. |
| 5,412,914 A | 5/1995 | Daw et al. |
| 5,442,882 A | 8/1995 | Repasky |
| 5,564,855 A | 10/1996 | Anderson |
| 5,588,264 A | 12/1996 | Buzon |
| 5,603,187 A | 2/1997 | Merrin et al. |
| 5,611,514 A | 3/1997 | Oliver et al. |
| 5,762,671 A | 6/1998 | Farrow et al. |
| 5,787,654 A | 8/1998 | Drost |
| 5,788,152 A | 8/1998 | Alsberg |
| 5,791,096 A | 8/1998 | Chen |
| 5,956,905 A | 9/1999 | Wiedrich |
| 6,152,409 A | 11/2000 | Sogrepfer |
| 6,161,984 A | 12/2000 | Sinclair |
| 6,206,613 B1 | 3/2001 | Elkins |
| 6,332,292 B1 | 12/2001 | Buzon |
| 6,347,489 B1 | 2/2002 | Marshall, Jr. et al. |
| 6,349,512 B1 | 2/2002 | Berkey et al. |
| 6,360,491 B1 | 3/2002 | Ullman |
| 6,363,685 B1 | 4/2002 | Kugler |
| 6,442,906 B1 | 9/2002 | Hwang |
| 6,467,843 B1 | 10/2002 | Rossborough |
| 6,520,471 B2 | 2/2003 | Jones et al. |
| 6,520,713 B2 | 2/2003 | Sondrup |
| 6,524,026 B2 | 2/2003 | Sondrup |
| 6,588,717 B2 | 7/2003 | Carnahan et al. |
| 6,604,330 B2 | 8/2003 | Repasky |
| 6,606,823 B1 | 8/2003 | McDonough et al. |
| 6,682,258 B2 | 1/2004 | McNeely |
| 6,711,851 B2 | 3/2004 | Mischo |
| 6,799,920 B2 | 10/2004 | Sondrup |
| 6,851,236 B1 | 2/2005 | Harvey |
| 6,862,842 B2 | 3/2005 | Mischo |
| 6,869,058 B2 | 3/2005 | Tung |
| 6,955,499 B2 | 10/2005 | Sondrup |
| 6,983,570 B2 | 1/2006 | Mead |
| 7,287,732 B2 | 10/2007 | Balistreri |
| 7,344,334 B2 | 3/2008 | Thorkelson |
| D568,721 S | 5/2008 | Greaves |
| 7,386,955 B1 | 6/2008 | Repasky |
| D593,220 S | 5/2009 | Reed |
| 7,527,229 B2 | 5/2009 | Dabrowski |
| 7,596,906 B2 | 10/2009 | Gold |
| 7,610,728 B1 | 11/2009 | Manocchia |
| 7,726,071 B2 * | 6/2010 | Carpenter ............ E04D 11/002 47/65.9 |
| 7,866,096 B2 | 1/2011 | Lee et al. |
| 7,900,397 B2 | 3/2011 | Mischo |
| 7,918,059 B2 | 4/2011 | Repasky |
| 7,921,612 B2 | 4/2011 | Knight, III et al. |
| 7,997,027 B1 | 8/2011 | Mischo |
| 8,075,221 B2 | 12/2011 | MacKenzie |
| 8,122,612 B2 | 2/2012 | Knight, III et al. |
| 8,127,515 B1 | 3/2012 | Horvath |
| 8,128,311 B2 | 3/2012 | Son et al. |
| 8,128,312 B2 | 3/2012 | Stuchell |
| 8,132,365 B2 | 3/2012 | Mischo |
| 8,181,399 B2 | 5/2012 | Knight, III et al. |
| 8,235,863 B2 * | 8/2012 | Mathy ............... A01G 9/028 477/79 |
| 8,272,163 B2 | 9/2012 | Dubner |
| 8,297,004 B2 | 10/2012 | Knight, III et al. |
| 8,302,356 B2 | 11/2012 | Knight et al. |
| 8,381,461 B2 | 2/2013 | Repasky |
| 8,424,258 B2 | 4/2013 | Modica et al. |
| 8,429,860 B2 | 4/2013 | Kugler et al. |
| 8,438,805 B2 | 5/2013 | Repasky |
| 8,453,391 B2 | 6/2013 | Tabibnia |
| 8,479,443 B2 | 7/2013 | Buist |
| 8,479,455 B2 | 7/2013 | Schaefer et al. |
| 8,490,342 B2 | 7/2013 | Greaves |
| 8,555,545 B2 * | 10/2013 | Fischer ............... E04D 11/002 47/65.9 |
| 8,667,747 B2 | 3/2014 | Repasky |
| 8,707,618 B2 | 4/2014 | MacKenzie |
| 8,733,031 B2 | 5/2014 | Knight, III et al. |
| 8,752,346 B1 | 6/2014 | Shaw et al. |
| 8,850,753 B2 | 10/2014 | Tabibnia |
| 8,898,999 B1 | 12/2014 | Kugler et al. |
| 8,966,817 B2 * | 3/2015 | Cronk ............... A01G 9/025 47/81 |
| D728,185 S | 4/2015 | Pelc et al. |
| 9,038,324 B2 | 5/2015 | Kugler et al. |
| 9,879,385 B2 * | 1/2018 | Tabibnia ............... F24D 3/127 |
| 2002/0026757 A1 | 3/2002 | Scissom et al. |
| 2002/0121583 A1 | 9/2002 | Jones et al. |
| 2002/0148173 A1 | 10/2002 | Kugler |
| 2003/0070372 A1 | 4/2003 | Favero |
| 2004/0035064 A1 | 2/2004 | Kugler et al. |
| 2004/0261329 A1 | 12/2004 | Kugler et al. |
| 2005/0193660 A1 | 9/2005 | Mead |
| 2007/0094927 A1 | 5/2007 | Perry |
| 2007/0186498 A1 | 8/2007 | Buzon |
| 2007/0204539 A1 | 9/2007 | Owen |
| 2008/0168710 A1 | 7/2008 | MacKenzie |
| 2008/0222973 A1 | 9/2008 | Lee et al. |
| 2009/0139159 A1 | 6/2009 | Hill |
| 2009/0173018 A1 | 7/2009 | Buzon |
| 2009/0188189 A1 | 7/2009 | Repasky |
| 2009/0199494 A1 | 8/2009 | Lee et al. |
| 2009/0260284 A1 | 10/2009 | Barbalho |
| 2010/0058679 A1 | 3/2010 | Greaves |

(56) References Cited

U.S. PATENT DOCUMENTS

| | | | |
|---|---|---|---|
| 2010/0162623 A1* | 7/2010 | Mathy | A01G 9/028 47/65.9 |
| 2011/0016809 A1 | 1/2011 | Knight, III et al. | |
| 2011/0023385 A1 | 2/2011 | Knight, III et al. | |
| 2011/0030291 A1 | 2/2011 | Whitfield | |
| 2011/0137703 A1 | 6/2011 | Dugan et al. | |
| 2011/0185675 A1 | 8/2011 | Knight et al. | |
| 2011/0192941 A1 | 8/2011 | Lalancette et al. | |
| 2011/0239550 A1 | 10/2011 | Kugler et al. | |
| 2011/0289839 A1* | 12/2011 | Cronk | A01G 9/025 47/65.7 |
| 2012/0168592 A1 | 7/2012 | Jones | |
| 2012/0227319 A1 | 9/2012 | Jaslow | |
| 2012/0255225 A1 | 10/2012 | Dubner | |
| 2012/0272588 A1 | 11/2012 | Kugler et al. | |
| 2012/0272589 A1 | 11/2012 | Kugler et al. | |
| 2012/0291369 A1 | 11/2012 | Knight et al. | |
| 2013/0239476 A1* | 9/2013 | Meyer | A01G 9/033 47/65.9 |
| 2013/0318907 A1 | 12/2013 | Knight, III et al. | |
| 2014/0000161 A1 | 1/2014 | MacKenzie | |
| 2014/0123576 A1 | 5/2014 | Meyer | |
| 2014/0208646 A1 | 7/2014 | MacKenzie | |

FOREIGN PATENT DOCUMENTS

| | | | |
|---|---|---|---|
| DE | 3411339 | 10/1985 | |
| DE | 19635820 | 3/1998 | |
| DE | 19631880 | 7/1998 | |
| FR | 2559529 | 8/1985 | |
| FR | 2598779 | 11/1987 | |
| FR | 2917572 A1 * | 12/2008 | A01G 9/028 |
| GB | 2388181 | 11/2003 | |
| GB | 2427416 | 12/2006 | |
| JP | 2004198019 | 7/2004 | |
| WO | WO-2006106243 A1 * | 10/2006 | A01G 9/028 |
| WO | WO 2007011179 | 1/2007 | |
| WO | WO 2007048204 | 5/2007 | |
| WO | WO 2007121529 | 11/2007 | |
| WO | WO 2008105012 | 9/2008 | |

* cited by examiner

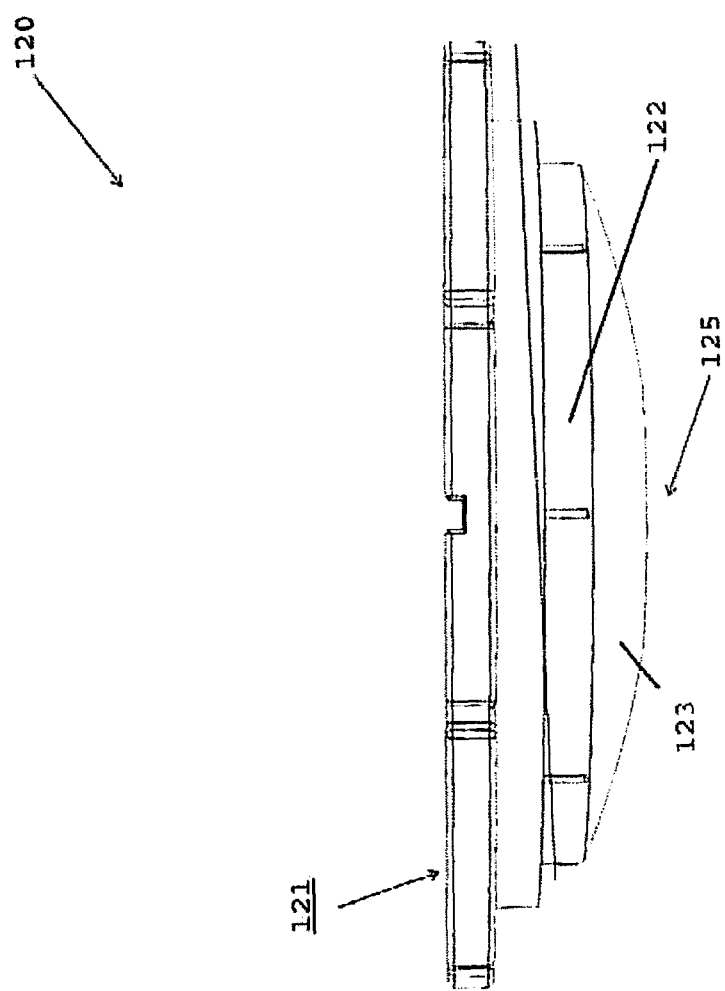

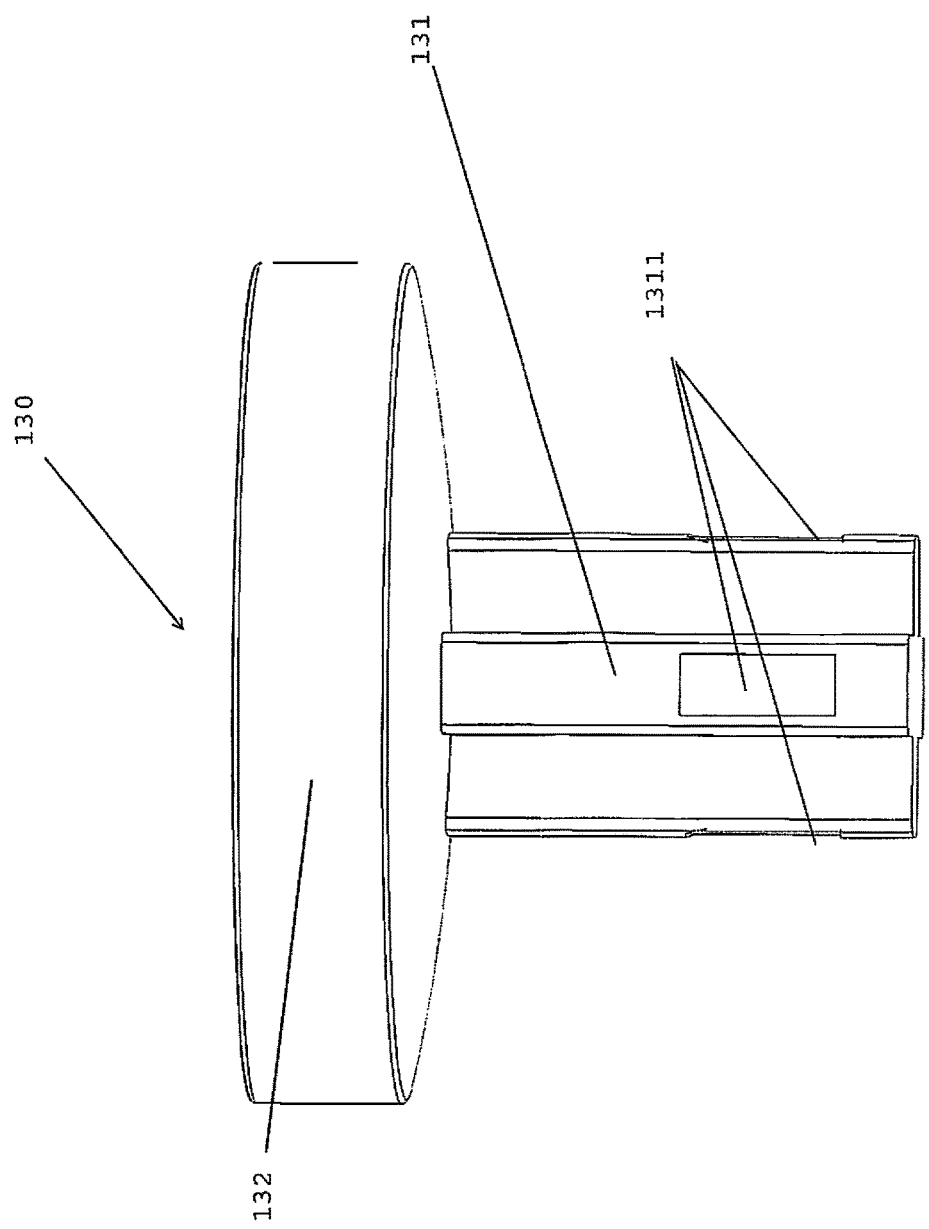

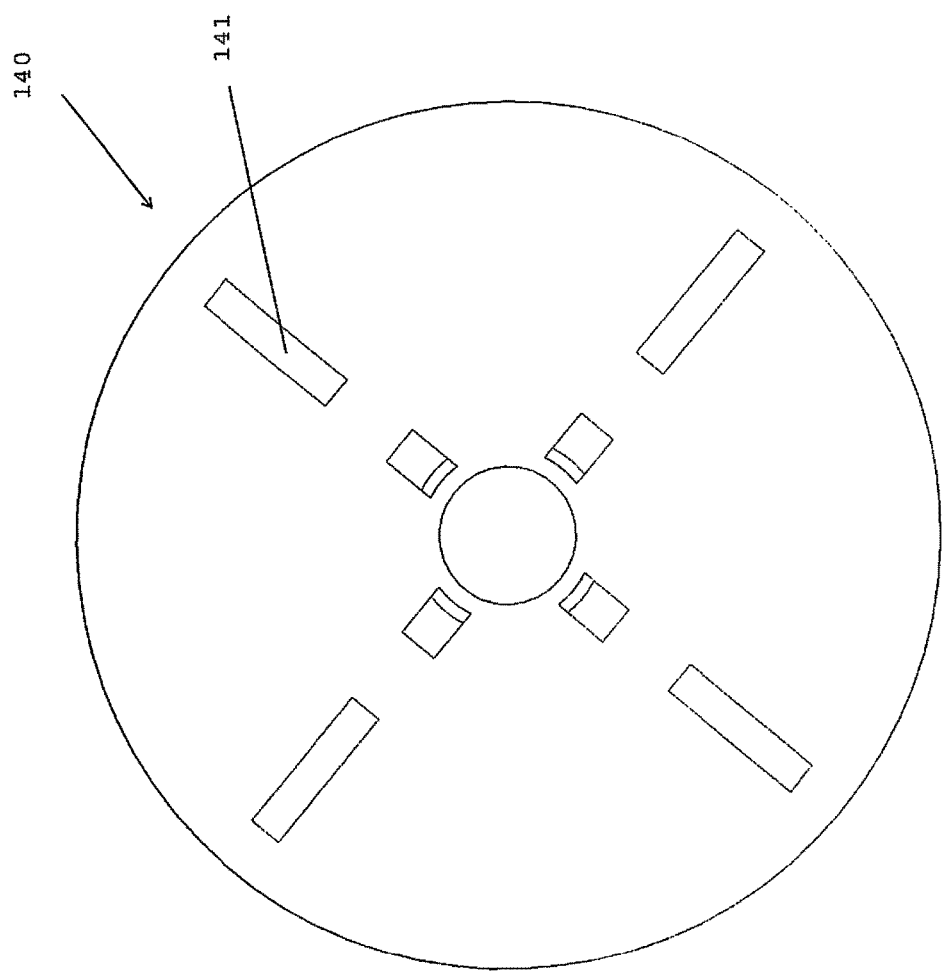

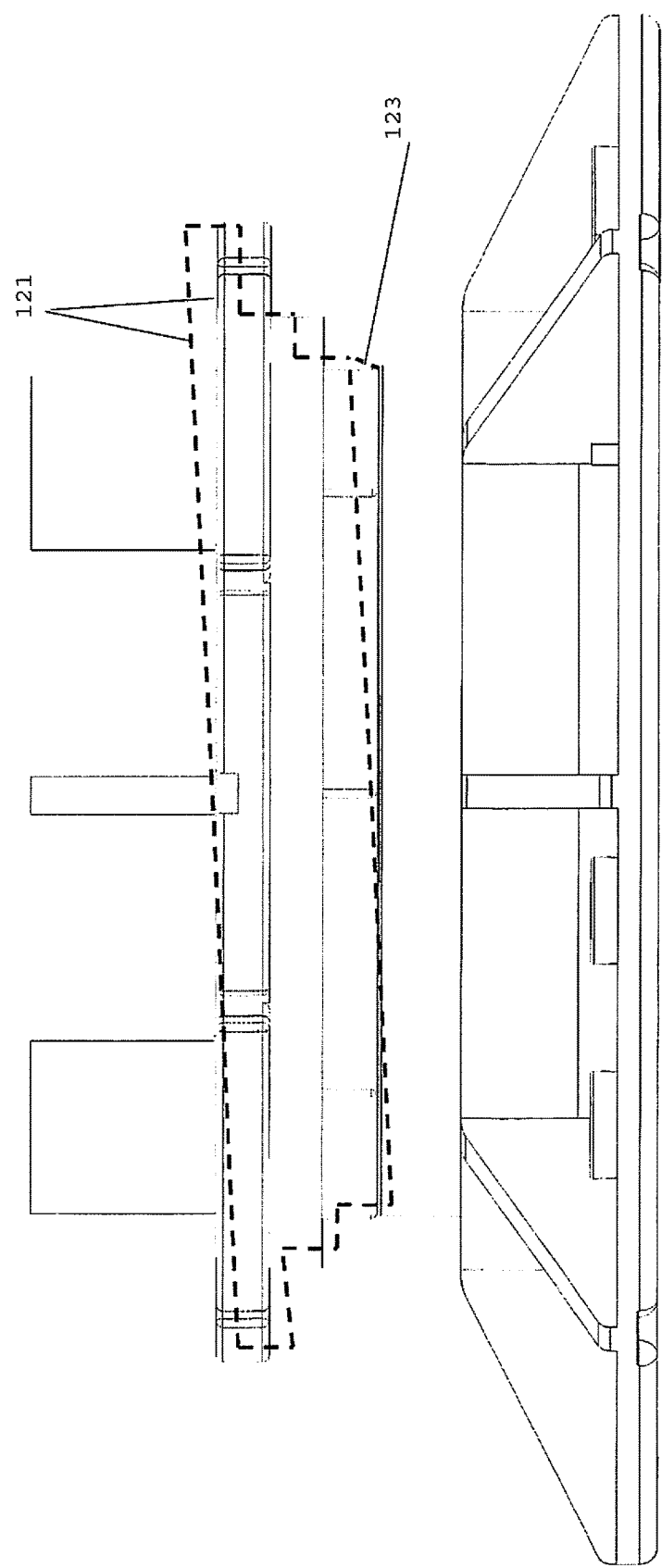

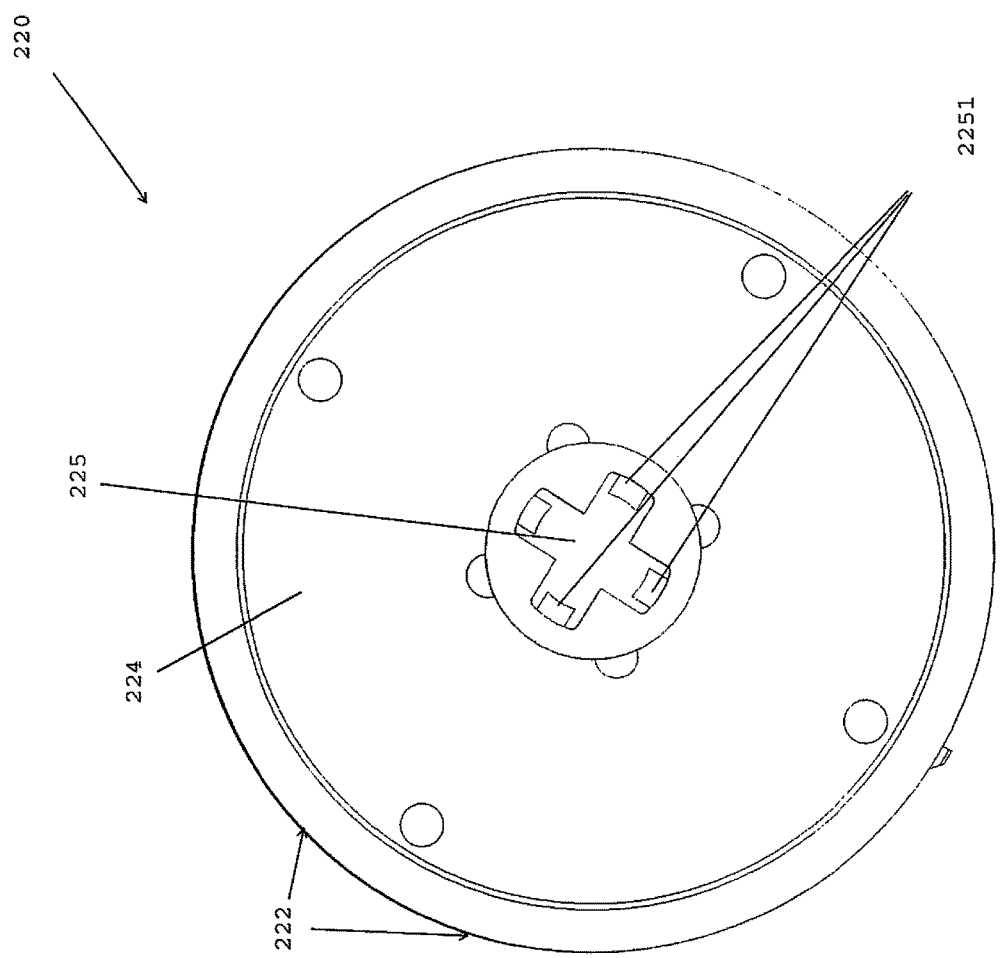

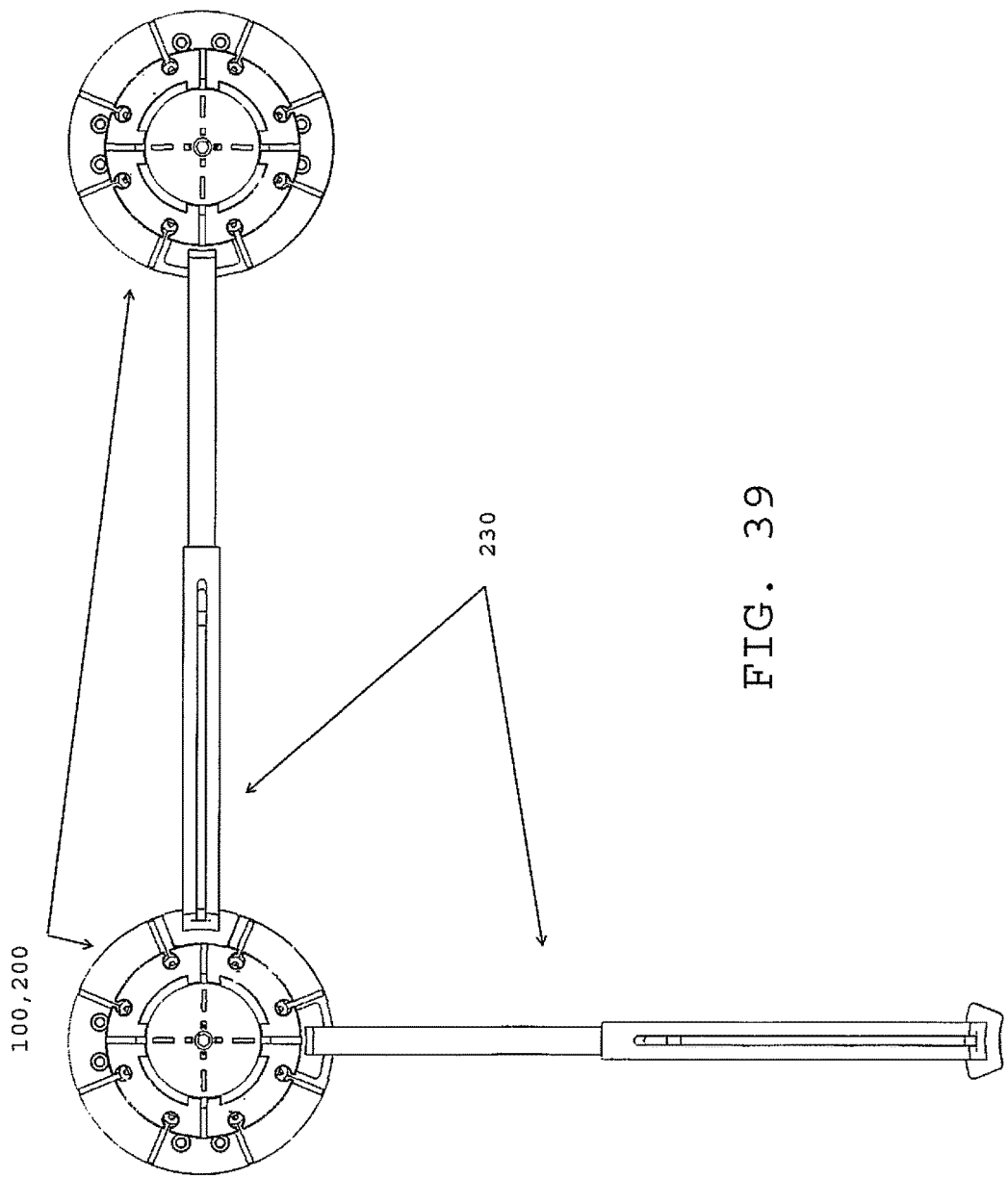

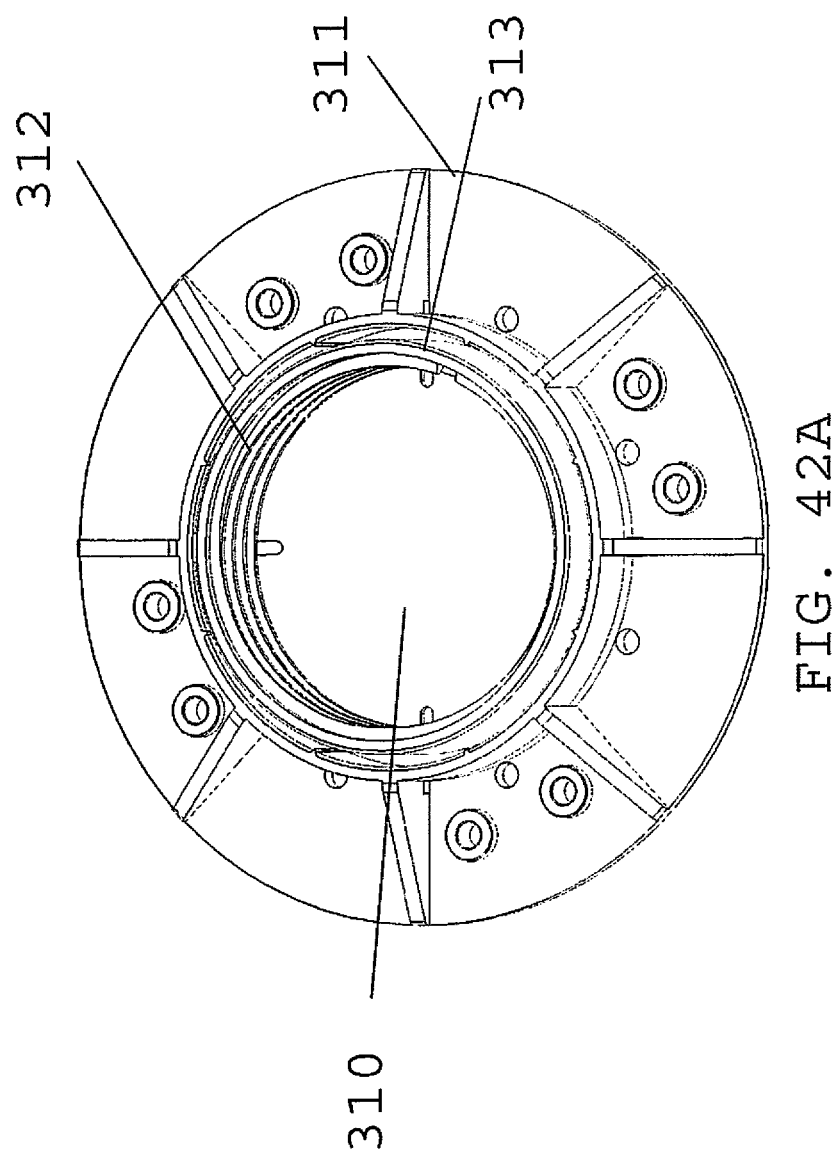

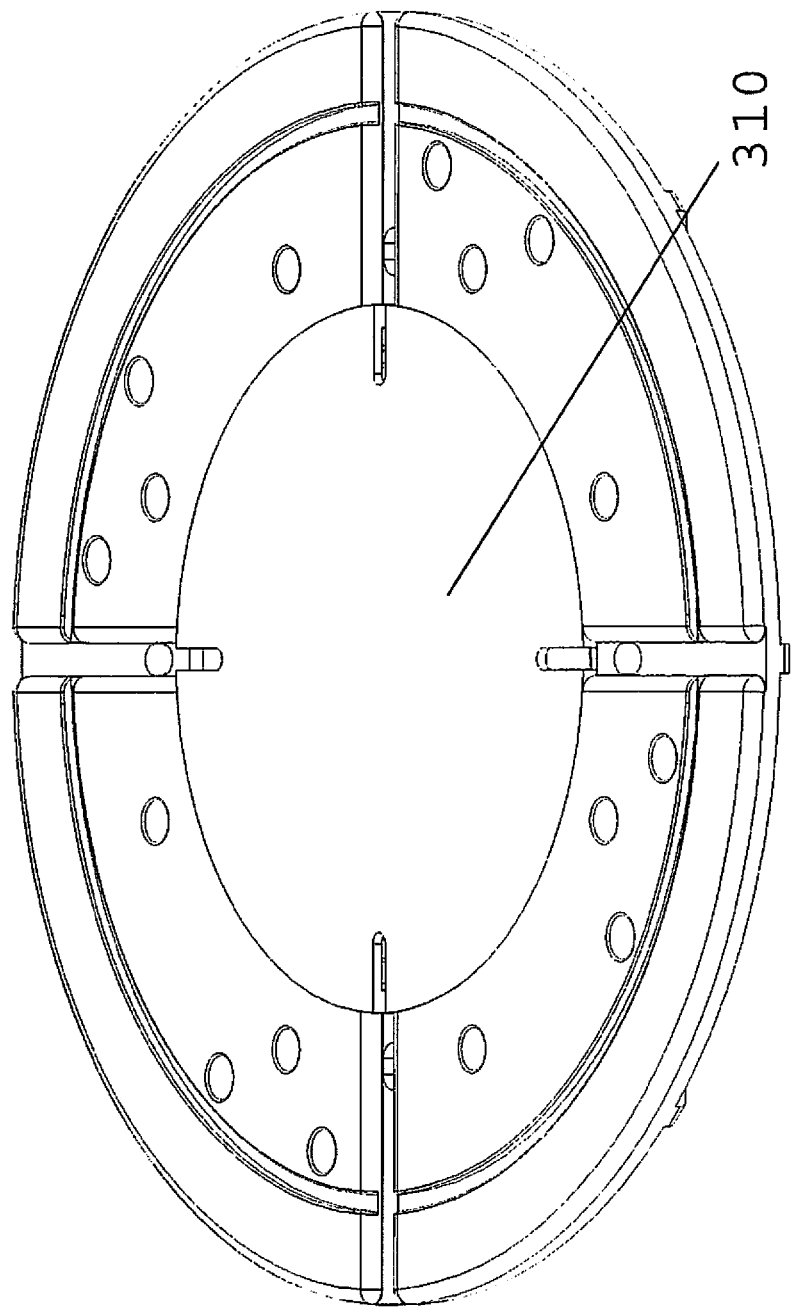

240

240

540

540

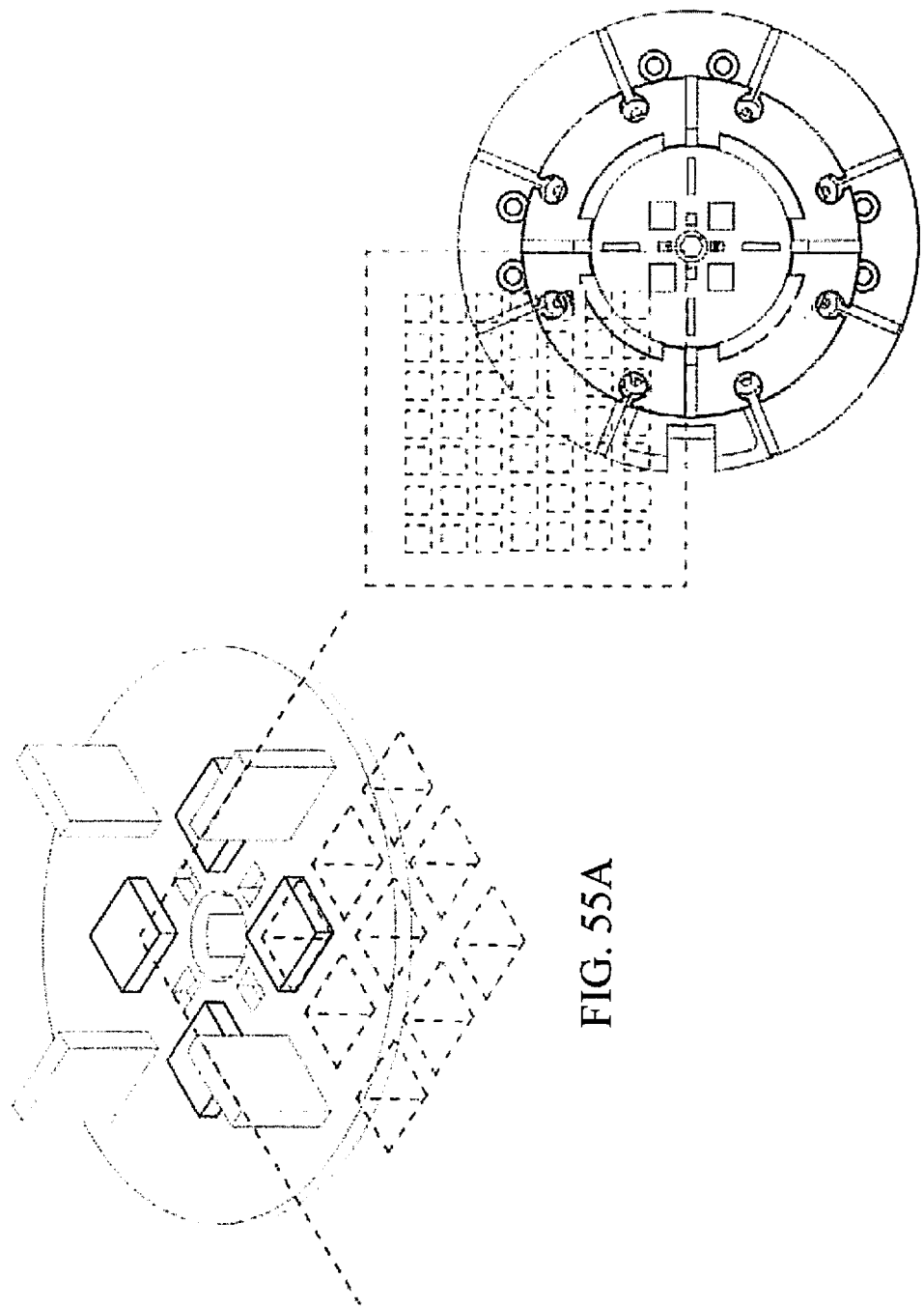

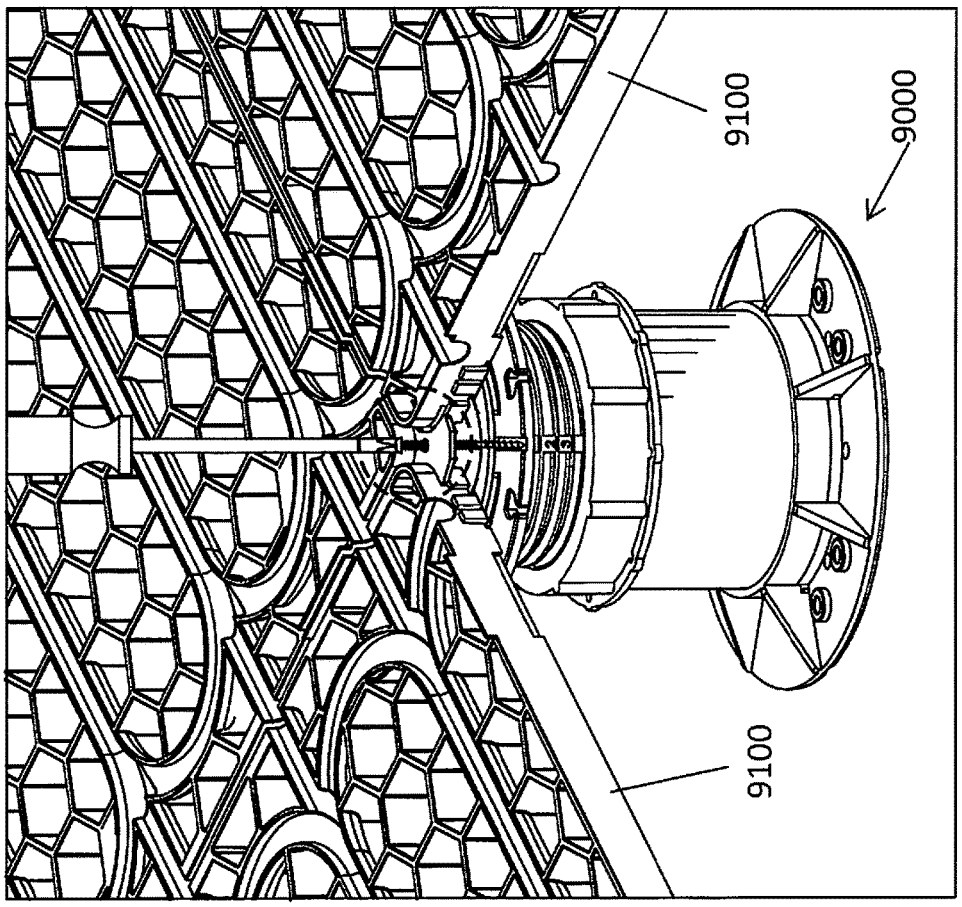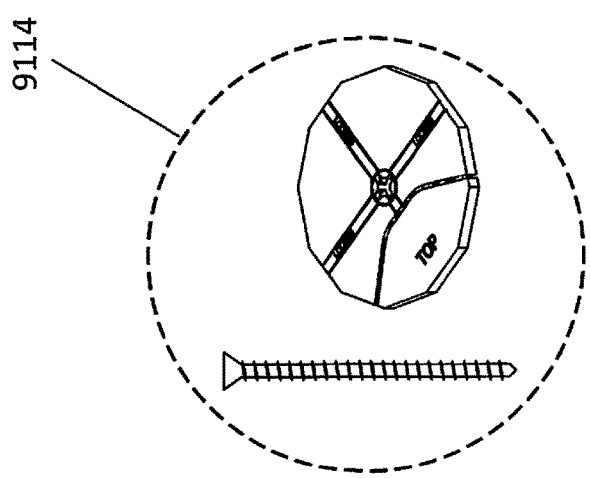
FIG. 56C

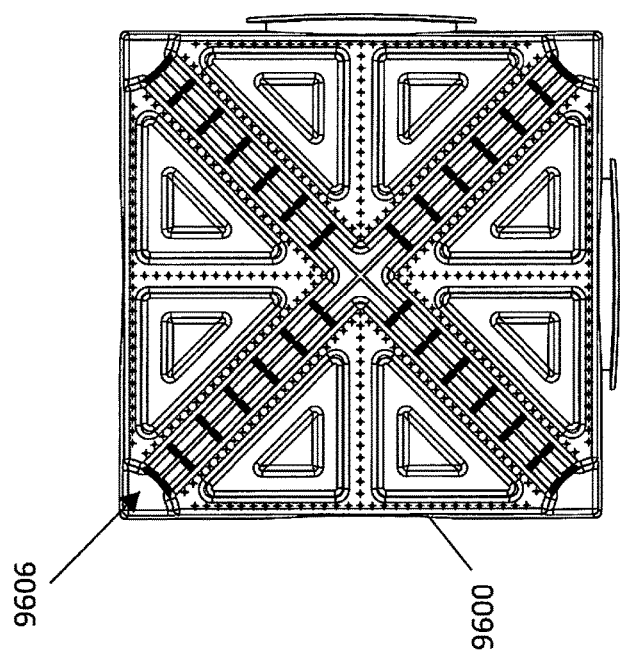
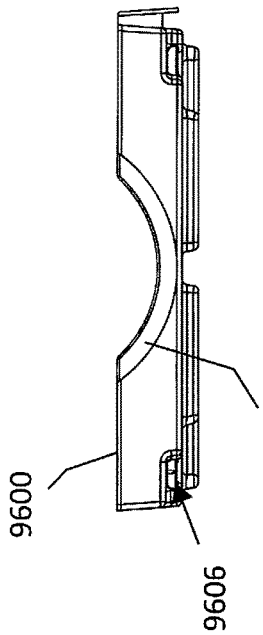
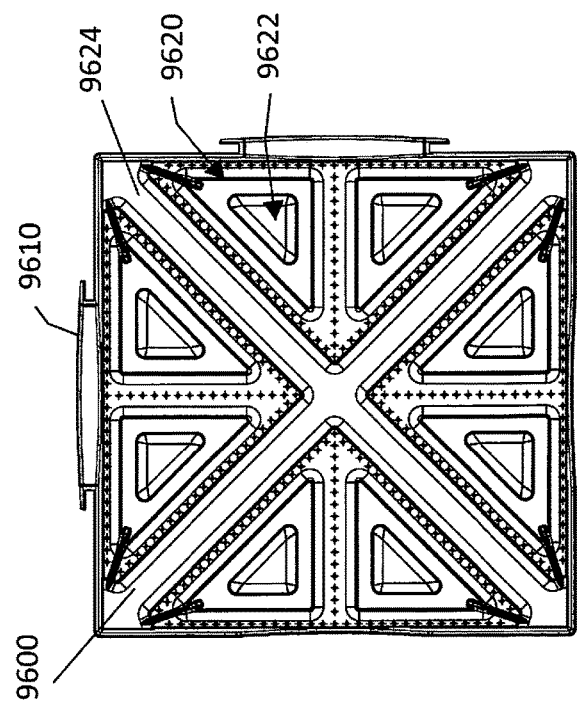
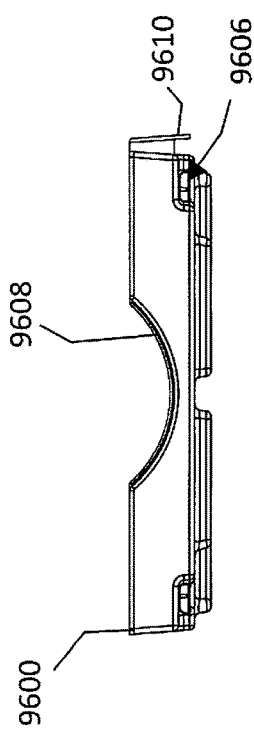
FIG. 61I
FIG. 61K
FIG. 61H
FIG. 61J

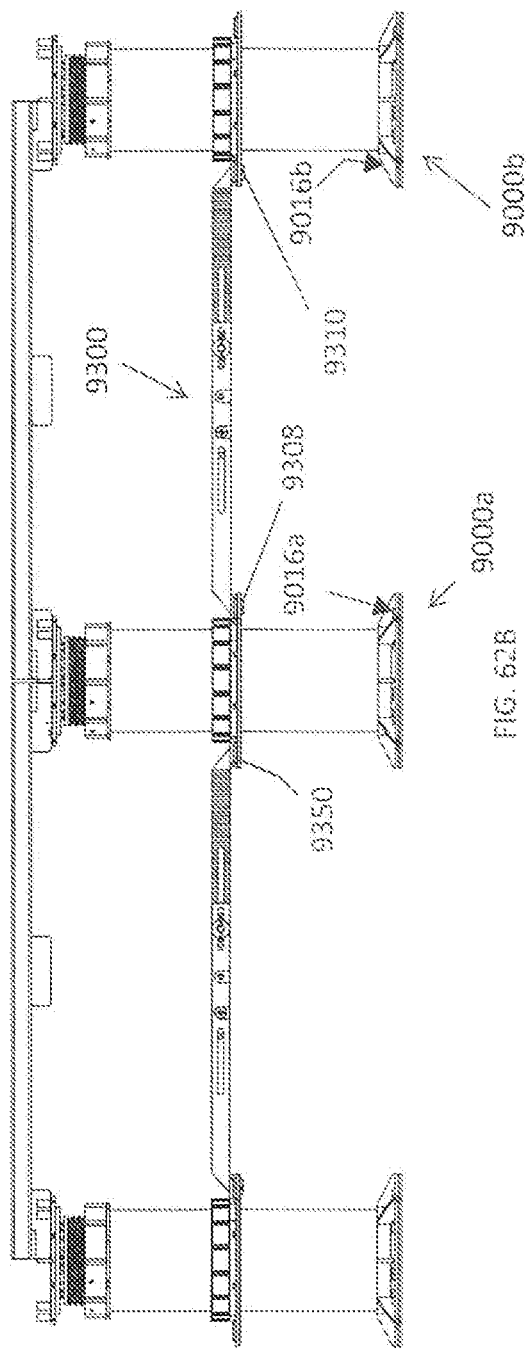

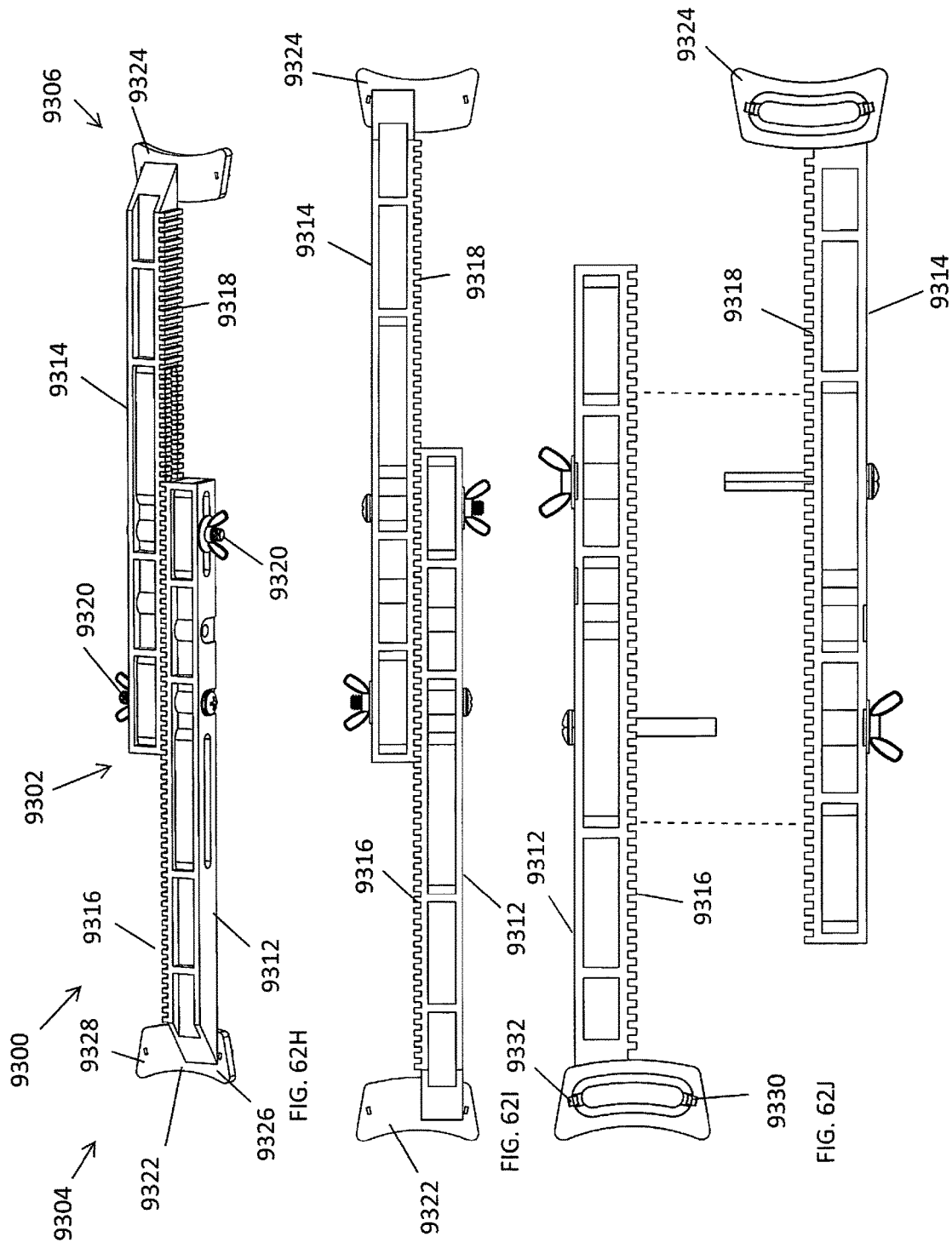

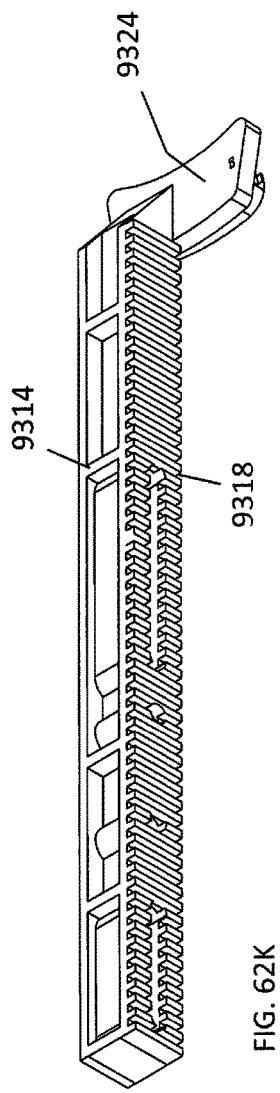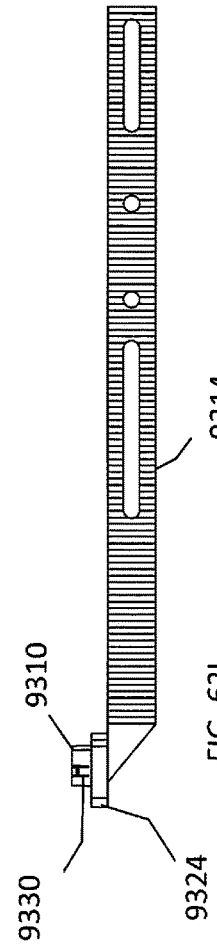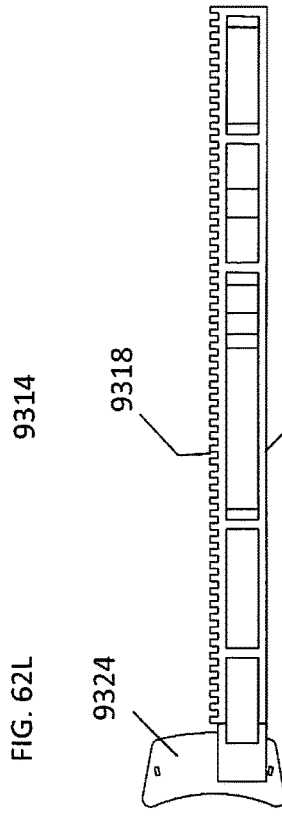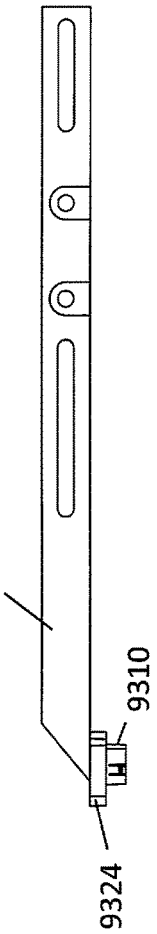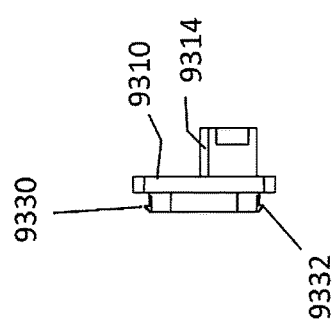

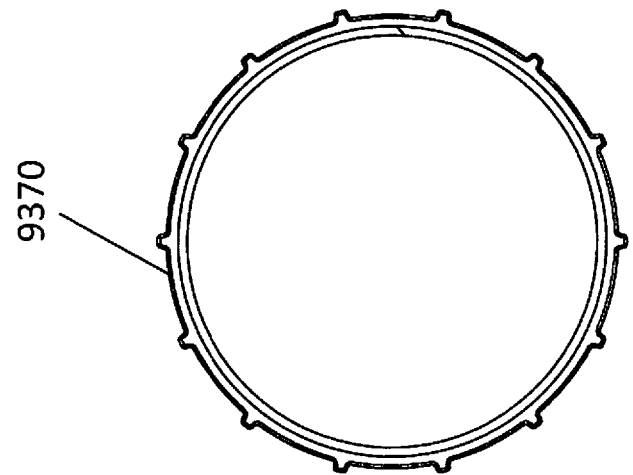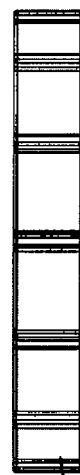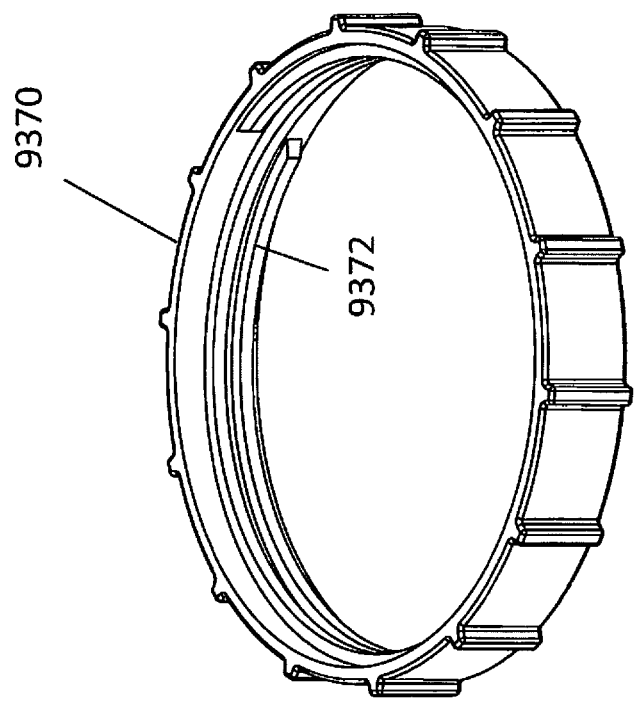
FIG. 63B
FIG. 63C
FIG. 63A

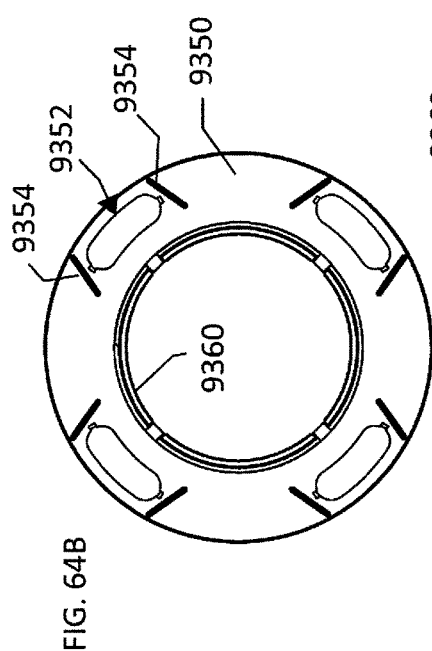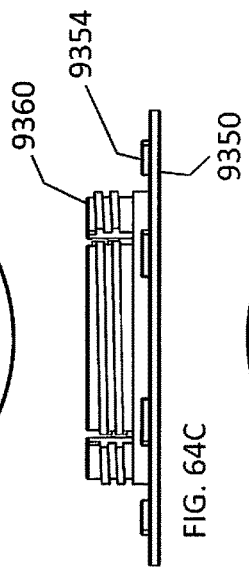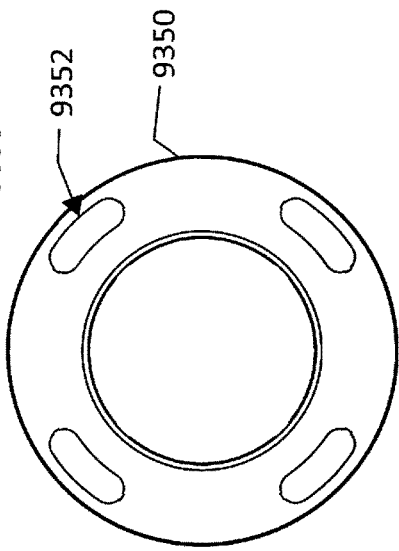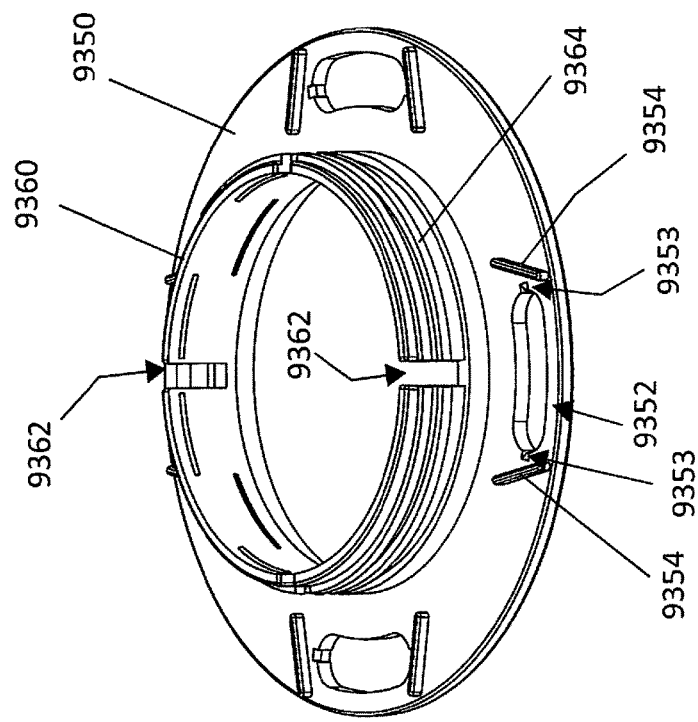

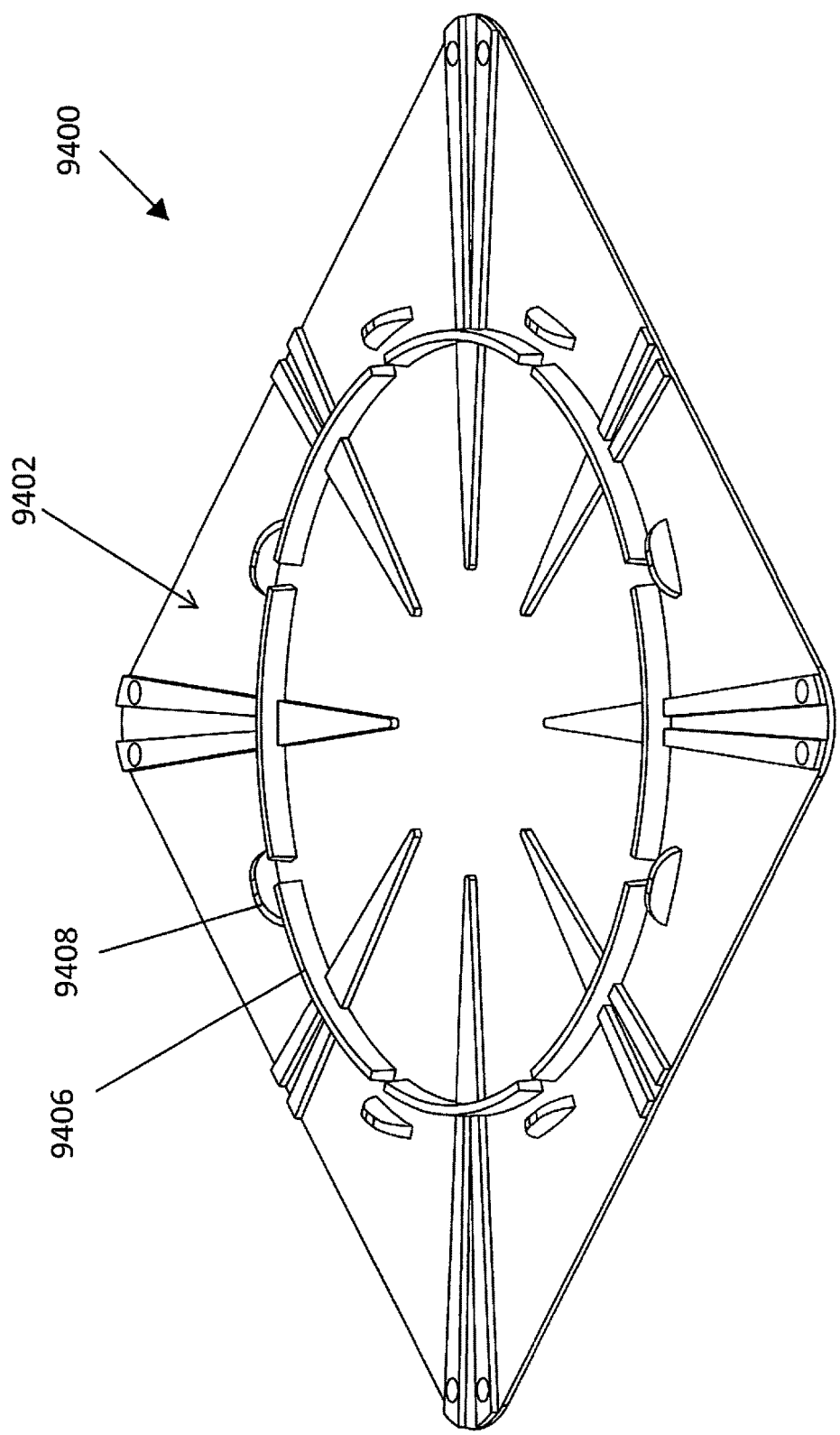

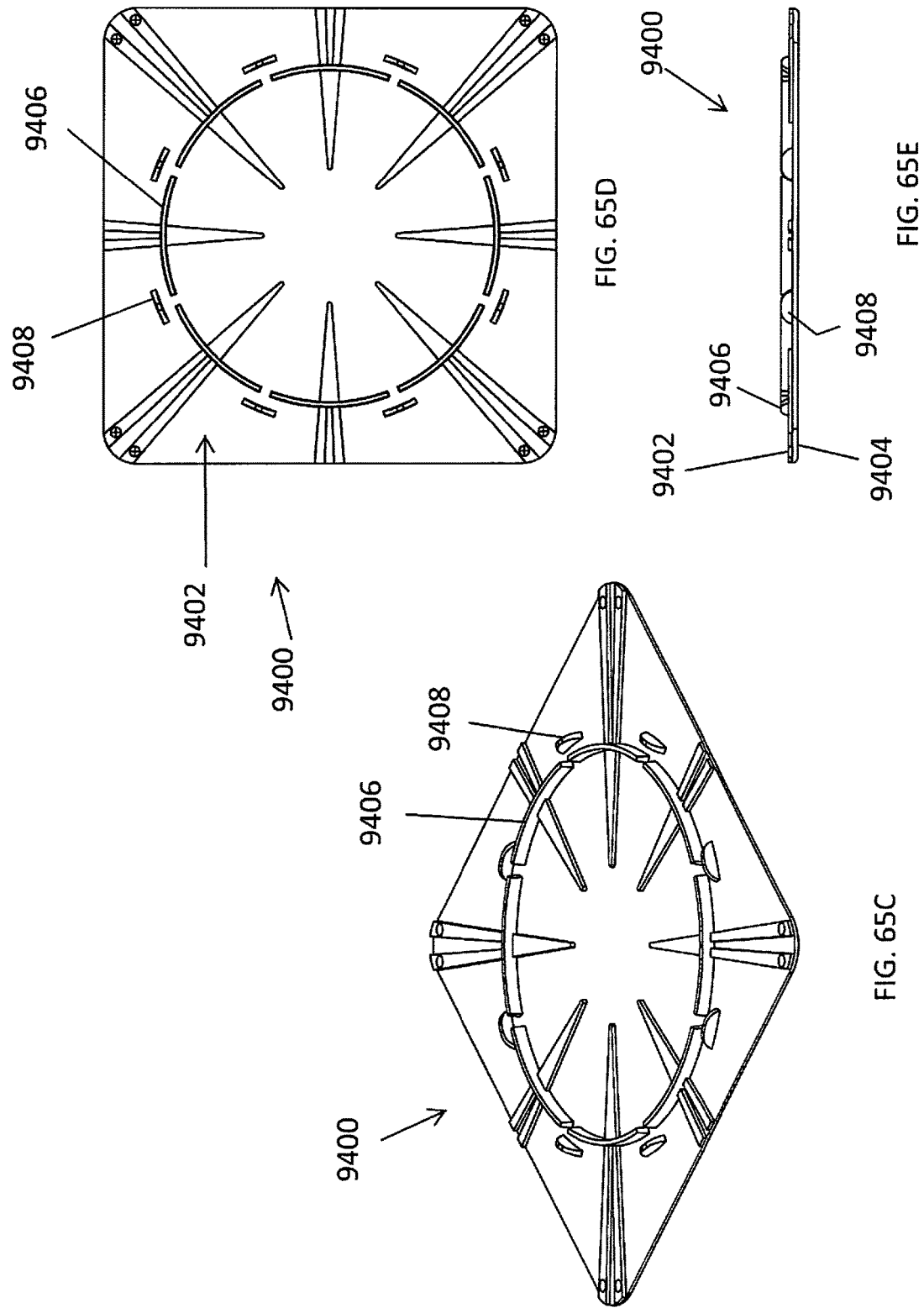

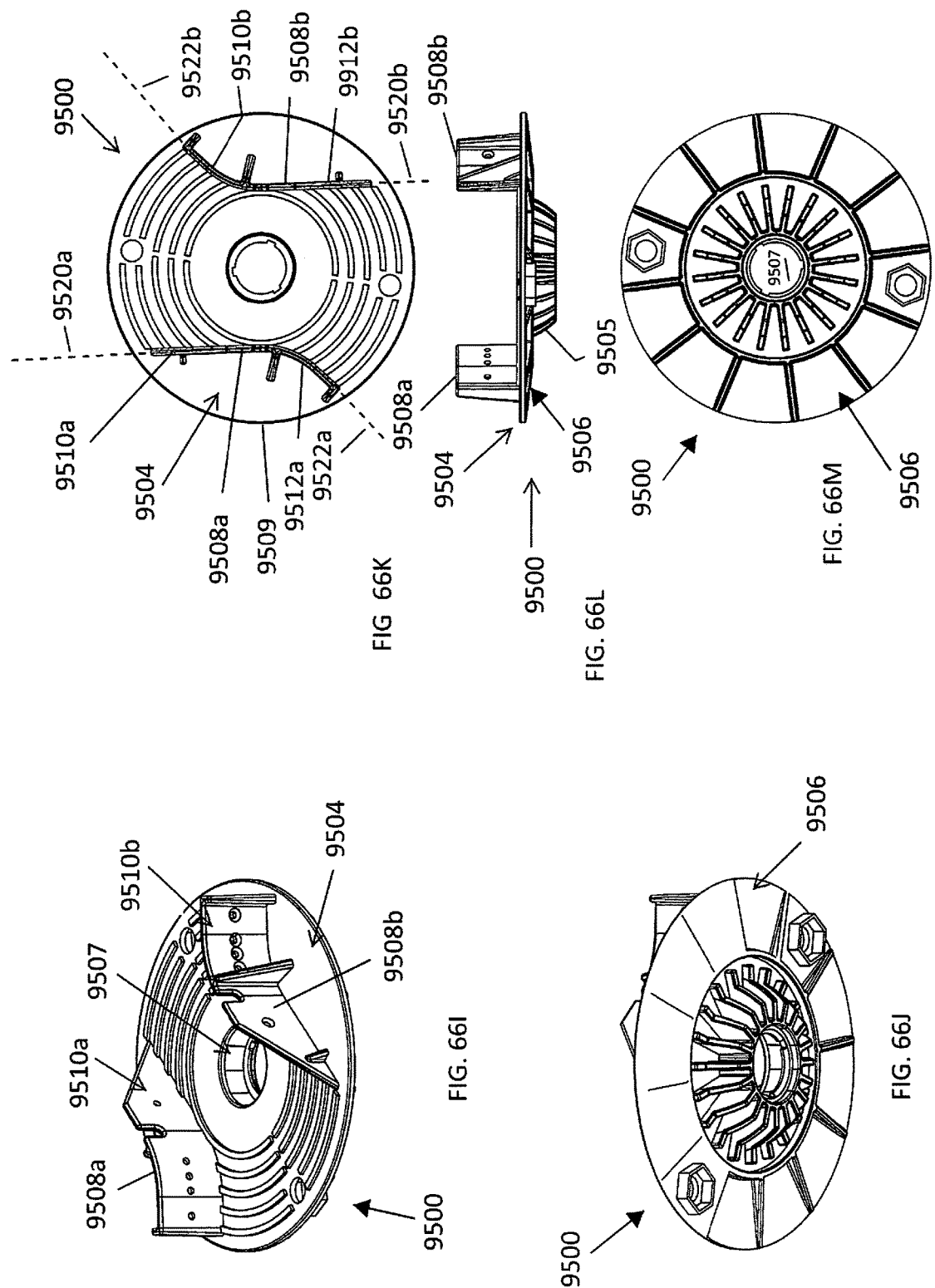

PLANT TRAY

CROSS-REFERENCE TO RELATED APPLICATIONS

This application is a continuation of U.S. patent application Ser. No. 15/230,829 (filed Aug. 8, 2016), which is a continuation-in-part of U.S. patent application Ser. No. 14/657,977 (filed Mar. 13, 2015), now U.S. Pat. No. 9,410,296, which is a continuation of U.S. patent application Ser. No. 14/253,818 (filed Apr. 15, 2014), now U.S. Pat. No. 9,284,693, which is a continuation-in-part of U.S. patent application Ser. No. 13/564,628 (filed Aug. 1, 2012), now U.S. Pat. No. 8,850,753, which is a continuation-in-part of U.S. patent application Ser. No. 12/732,755 (filed Mar. 26, 2010), now U.S. Pat. No. 8,453,391; U.S. patent application Ser. No. 15/230,829 also claims the benefit of U.S. Provisional Pat. App. No. 62/344,920 (filed Jun. 2, 2016), which applications are incorporated in their entirety by this reference.

BACKGROUND OF THE INVENTION

Field of Invention

The present application is in the field of plant trays.

Background of the Invention

In order to plant a garden or flowers, a gardener can plant seeds directly to soil on the ground or in a pot. Using a pot allows the gardener to place the plant or flower in particular locations. However, the size of the pot has limitations. In addition, pots are not necessarily aesthetically pleasing for a garden. Watering pots can also be inefficient as each pot is watered one by one.

Planting the garden directly into the ground provides for a larger surface area than a pot and may be more aesthetically pleasing, but the garden becomes relatively fixed because the ground cannot be moved. However, watering the garden can be efficient as the entire can be watered simultaneously, Therefore, there is a need for a planting system that can combine the versatility of a pot with the size and efficiency of planting directly in the ground.

SUMMARY OF THE INVENTION

The present invention is directed towards a planting system that utilizes a plurality of potting trays that can be connected to each other, thereby creating a modular system that can be configured to create a planting system of various sizes and shapes. Even after the plants or flowers have been planted in the potting tray, the potting trays can be rearranged relative to each other. In order to permit efficient watering, each potting tray may have a conduit below the floor of the tray so as to hide the plumbing, but allow the plumbing to connect with each potting tray. The floor may also have a plurality of holes connected to the conduit so that the watering of the plant or flowers is directly into the soil from the bottom of the potting tray.

Another object of the present invention is to provide a plurality of pedestals to elevate the planting system. The pedestal can be height adjustable.

Another object of the present invention is to provide a plurality of lateral braces to interconnect the pedestals to improve the stability of the elevated planting system.

Another object of the present invention is to provide various other accessories to improve the efficiency of the planting system.

BRIEF DESCRIPTION OF THE FIGURES

The manner in which these objectives and other desirable characteristics can be obtained is explained in the following description and attached figures in which:

FIG. 29E is a side profile view of the cap.
FIG. 30C is a side profile view of the key.
FIG. 31C is a top plan view of the spacer.

FIG. 33 depicts a side view of the assembly and illustrates one mode establishing a leveled surface.

FIG. 36C is a top plan view of the threaded insert.

FIG. 39 is an environmental view of the arm used for fixing the space between two assemblies.

FIG. 42A is a top perspective view of a base.

FIG. 42C is a bottom plan view of the base.

FIGS. 55A, 55B, 55C and 55D are a perspective views and top environmental views of a spacer.

FIGS. 56A-D show perspective, top, close up, and side views, respectively, of the present invention.

FIGS. 61H-61K showed top, bottom, first side, and second side views, respectively, of the plant tray.

FIGS. 62B and 62C show side elevation views of pedestals connected by lateral braces.

FIGS. 62H-62I show a perspective view any top view of the lateral brace.

FIG. 62J shows an exploded view of the bottom of the lateral brace.

FIG. 62K shows a perspective view of one arm of the lateral brace.

FIG. 62L shows a side view of one arm of the lateral brace.

FIG. 62M shows a top view of one arm of the lateral brace.

FIG. 62N shows another side view of one arm of the lateral brace.

FIG. 62O shows another side view of one arm of the lateral brace.

FIGS. 63A-63C are perspective, top, and side views, respectively, of the locking sleeve of the stabilization bar collar.

FIGS. 64A-64D are perspective, top, side, and bottom views, respectively, of the stabilization bar collar.

FIGS. 65B-65E show two perspective views, a top view, and a bottom view, respectively, of the buffer.

FIG. 66D shows the walled spacer with a roller.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFFERED EMBODIMENTS

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Disclosed may be an apparatus and related methods for facilitating the elevated and leveled placement of a paver array onto a subsurface. Each component will be described separately, followed by descriptions of specific examples by mixing and matching the various components. The examples are for illustrative purposes only. The invention is not limited to the examples shown. Having described each component separately, and having provided some examples of how the components work together, a person of ordinary skill in the art would be able to come up with many different combinations of the components described. Furthermore, each component may be used with prior art devices as well. Although the reference numbers change for similar components and subcomponents within different examples, it is to be understood that the features described for each component or subcomponent for any example applies across each example regardless of the different reference numbers. The reference numbers were merely chosen as a convenient way to identify the different examples being described for ease of description.

Figure 56A:
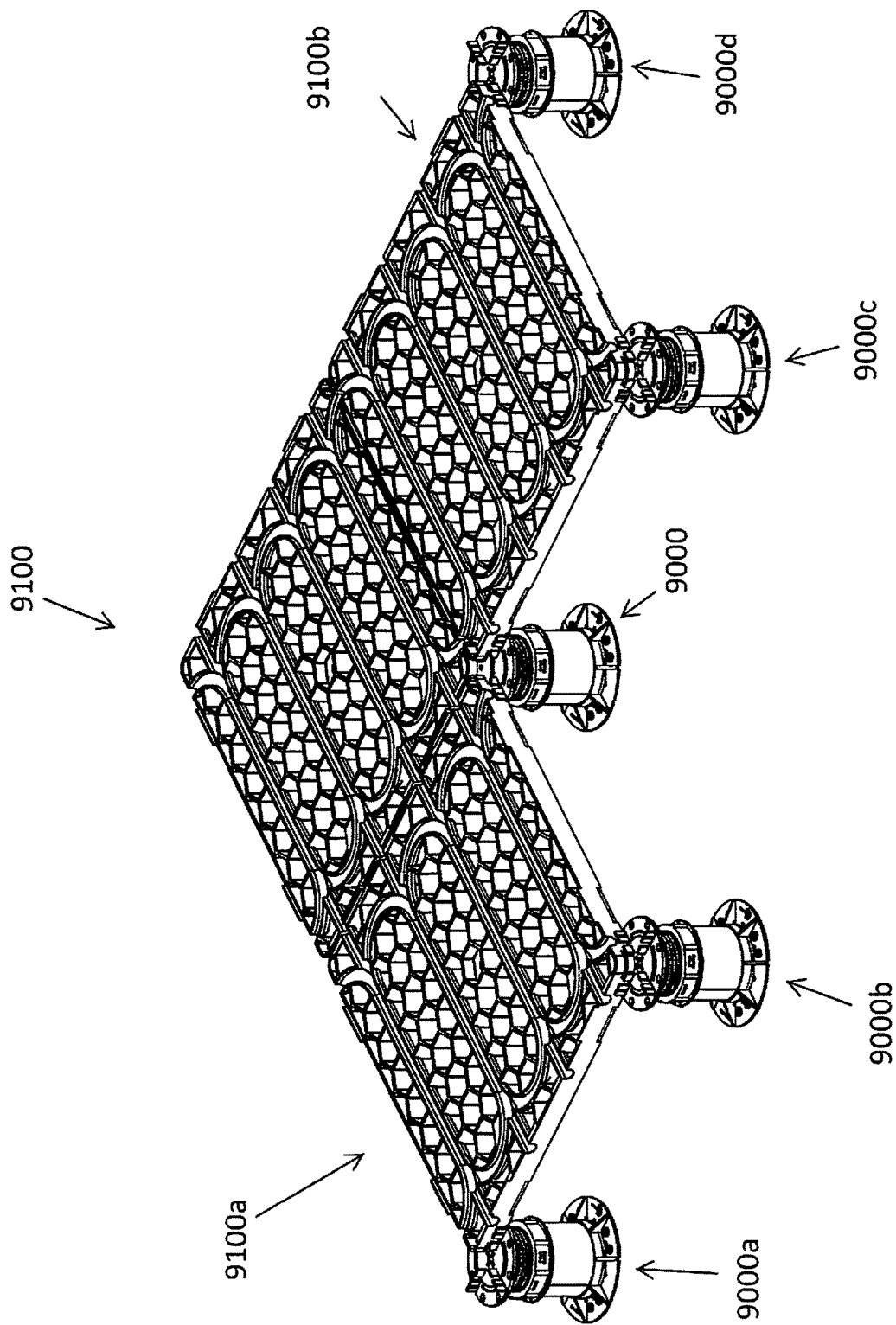
Figure 56B:
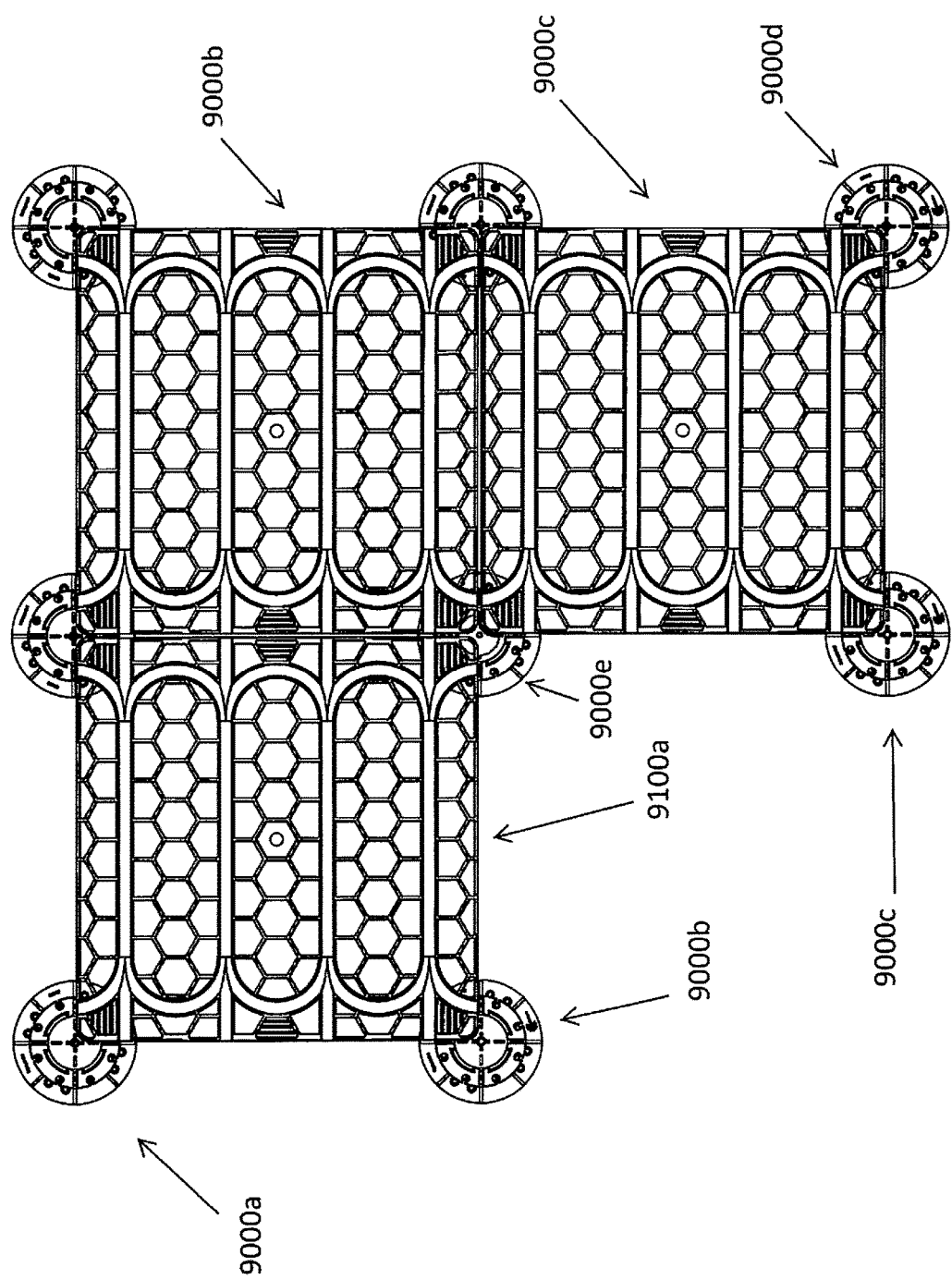
Figure 56D:
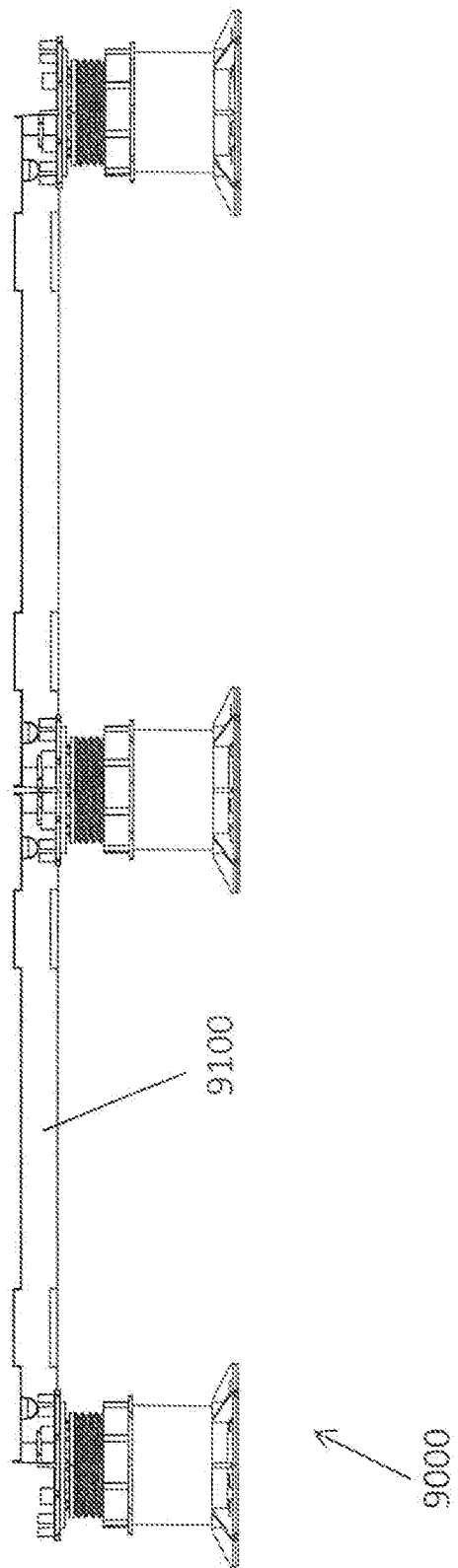
Figure 57A:
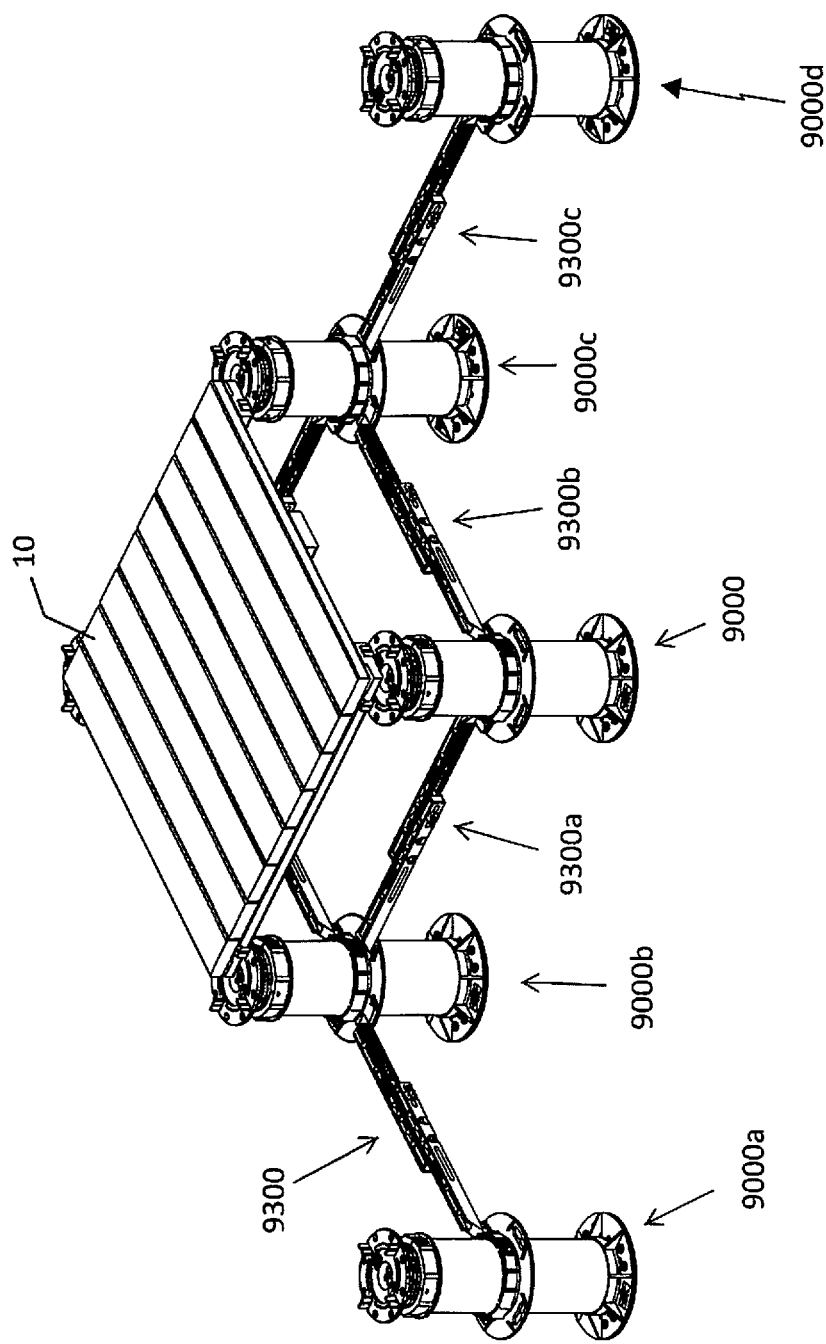
FIGS. 57A-B show perspective views of the present invention with lateral stabilization bars.
Figure 57B:
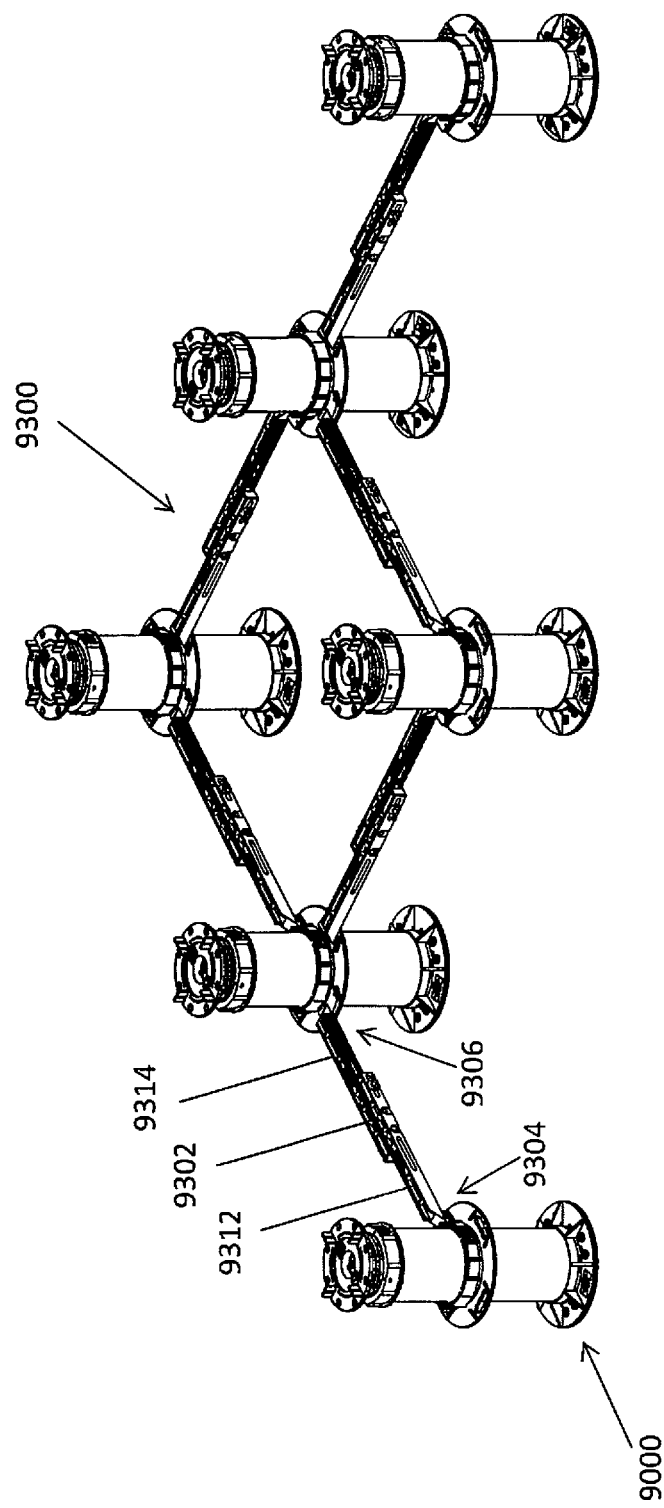

In general, with reference to FIG. 56A-56B a plurality of pedestals or pedestal assemblies 9000-9000d are placed on a subsurface to elevate a set of trays 9100-9100b. A paver 10 is placed on top of the trays 9100-9100b to create a flat, even surface. In some embodiments, to account for uneven subsurfaces, the pedestal 9000 may have an adjustable, self-leveling cap 9020 at the top of the pedestal 9000. Alternatively, or in addition to the cap 9020, a compensation pad 2000 may be provided at the bottom of the pedestal 9000 to adjust the angle of the pedestal relative to the subsurface. As shown in FIGS. 57A-57B, in some embodiments, lateral braces 9300a-9300c may be provided to interlock the plurality of pedestals 9000-9000d for stability. In some embodiments, a buffer 9400 may be provided to increase the surface area of the pedestal 9000 to reduce sinking of the pedestal 9000 into the subsurface. In some embodiments, a pipe riser spacer 9500 may be provided to hold and elevate pipes and other conduits.

Figure 58A:
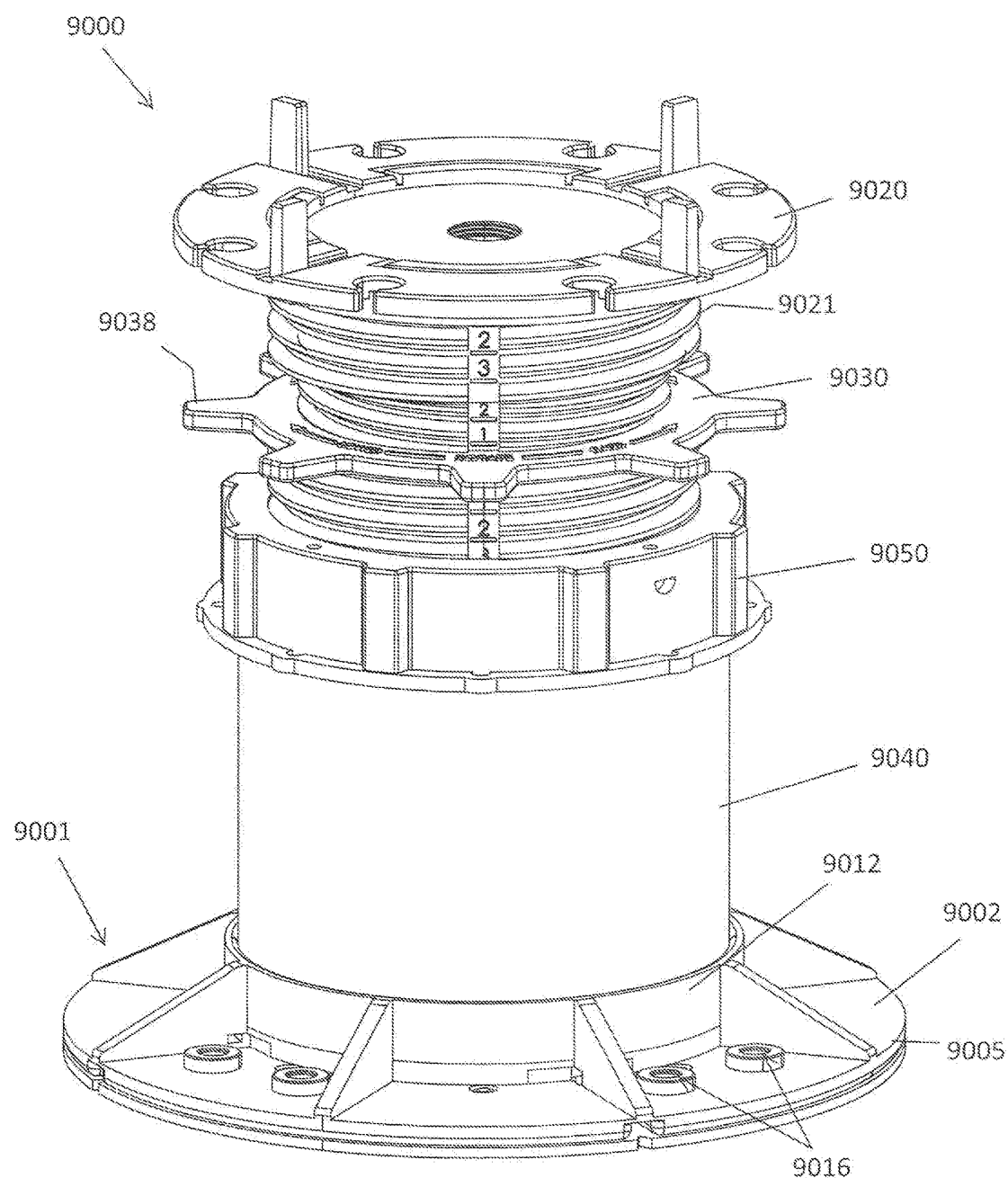
FIGS. 58A-C show perspective, exploded, and cross-sectional views of the pedestal.
Figure 58B:
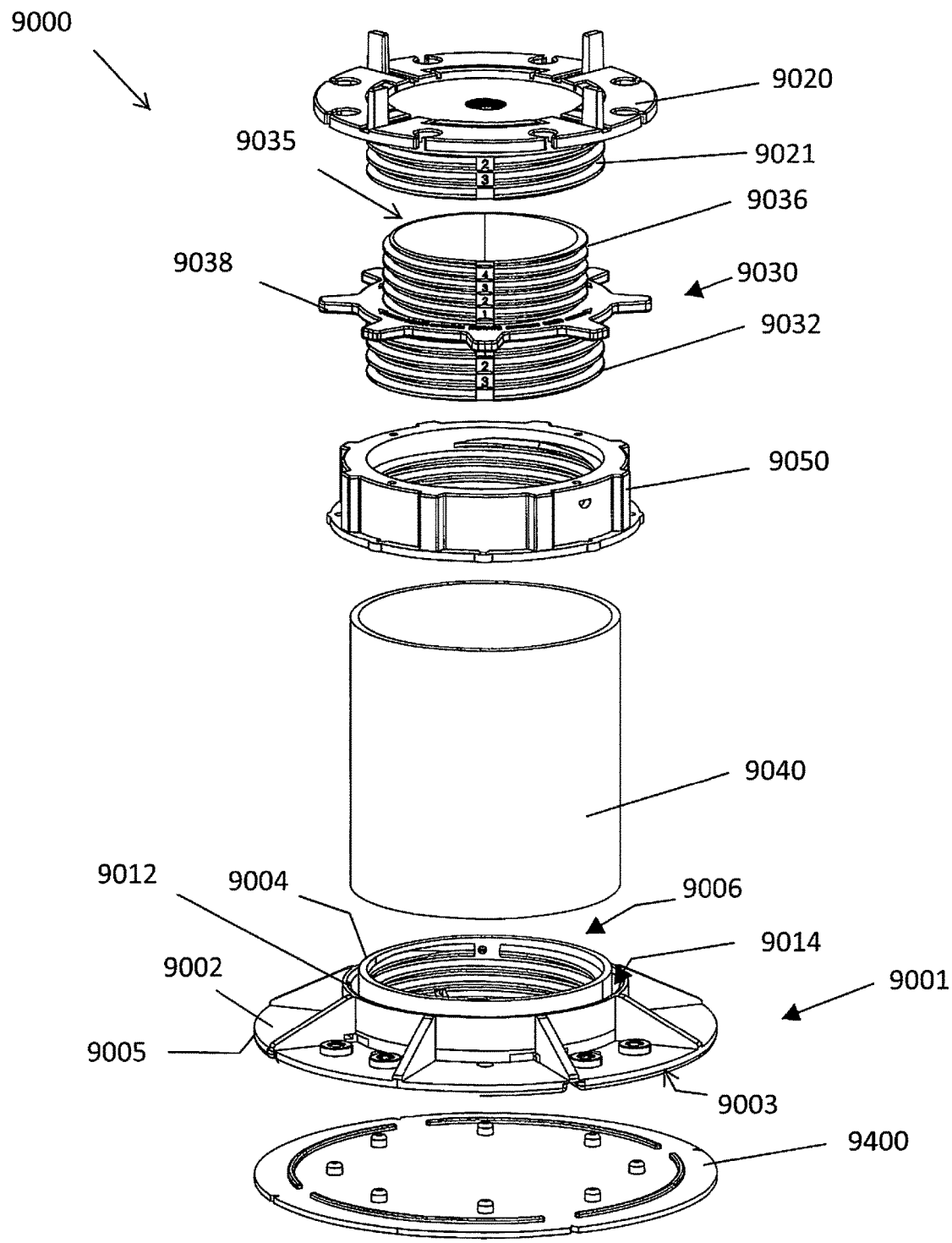
Figure 58C:
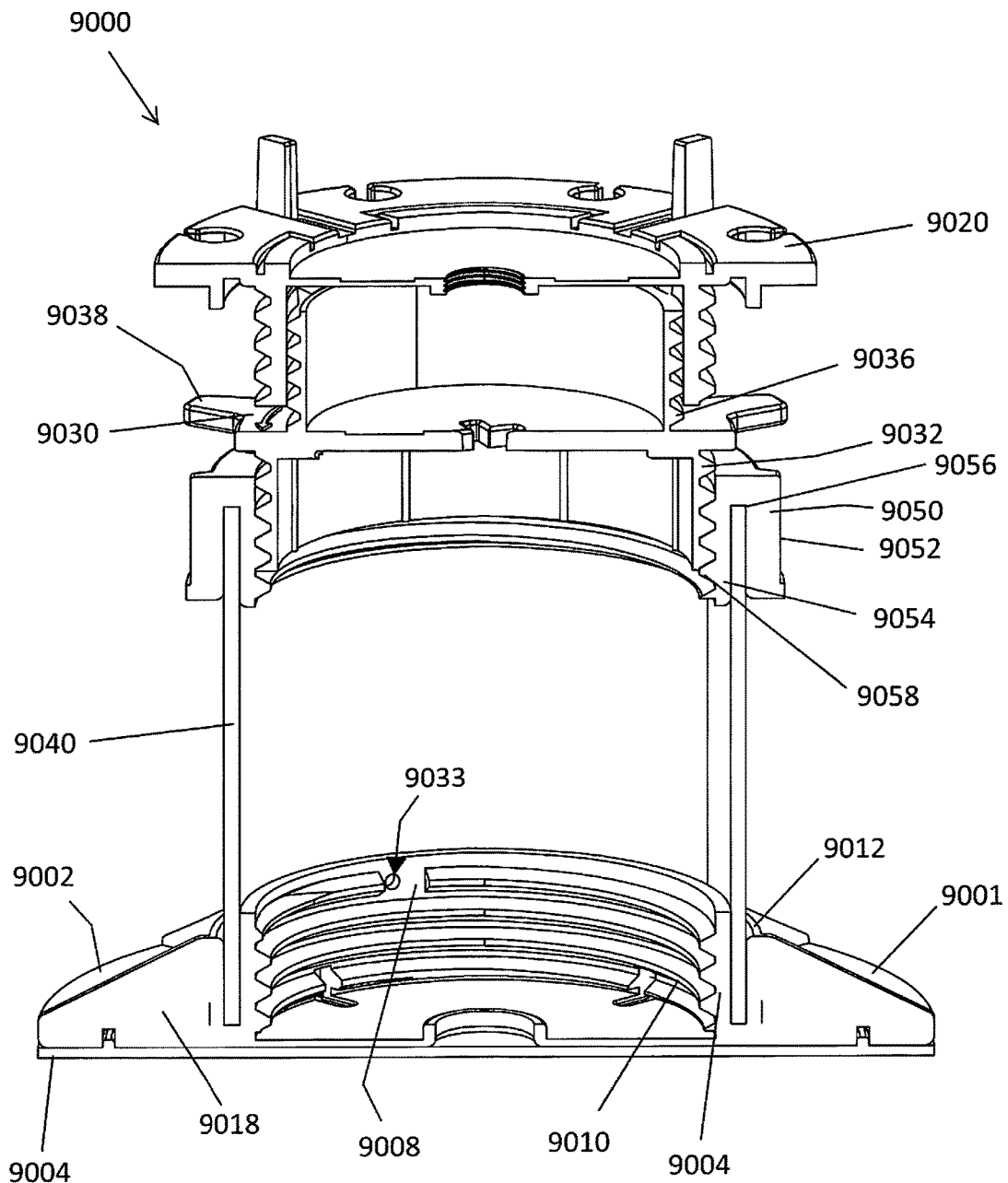
Figure 59:
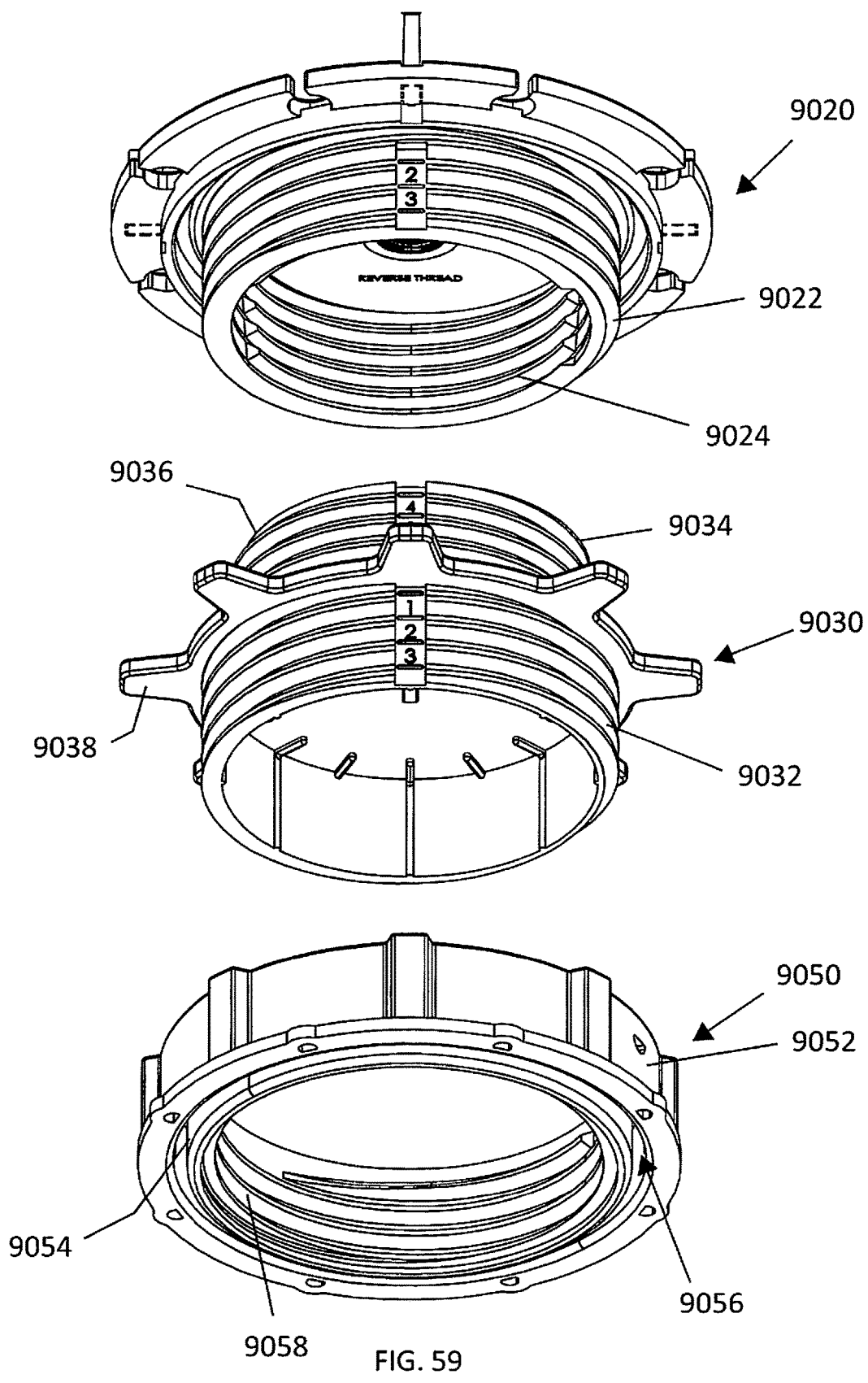
FIG. 59 is an exploded view of the cap, coupler, and collar.

With reference to FIGS. 58A-59, the pedestal 9000 provides a foundation upon which the pavers 10 can be mounted so as to be elevated and to provide the means for leveling the pavers. As shown in FIGS. 58A-58C, the pedestal 9000 comprises a base 9001 having a foot 9002 and a support cylinder 9004. The foot 9002 has a flat surface 9003 defining an outer perimeter 9005. In the preferred embodiment, the foot 9002 may be a flat, circular disk; however, any shape can be used.

The support cylinder 9004 projects perpendicularly away from the foot 9002. The free terminal end of the support cylinder 9004 will be referred to as the top 9006. Although the support cylinder 9004 is preferably cylindrical in shape, any other shape can be used. The support cylinder 9004 may be a hollow cylinder with an open top, a hollow cylinder with a closed top, or a solid cylinder. In embodiments in which the support cylinder 9004 is hollow with an open top, the inner wall 9008 of the support cylinder 9004 may be smooth or may comprise threads 9010. Since the threads 9010 are on the inner wall 9008 of a hollow cylinder, these threads are referred to as feminine threads.

In some embodiments, the base 9001 may further comprise an outer cylindrical wall 9012. The outer cylindrical wall 9012 may be concentrically arranged about and spaced apart from the support cylinder 9004 to define a riser socket 9014 therebetween. In between the outer perimeter 9005 of the foot and the outer wall 9012 may be one or more openings 9016 through the surface 9003 of the foot 9002. In the preferred embodiment, there may be a plurality of openings 9016 intermittently and angularly spaced apart around the foot 9002. The openings 9016 are configured to receive the lateral braces as discussed further below.

A cap 9020 may connect to the top 9006 of the support cylinder 9004 to interface with the pavers 10. As described in further detail below, the cap 9020 can be configured in various ways to create a self-leveling surface for the pavers. In some embodiments, the cap 9020 comprises male threads 9021 to mate with the feminine threads 9010 of the support cylinder 9004.

The height of the support cylinder 9004 generally determines the height of the pedestal 9000, which in turn determines the elevation of the pavers. In some embodiments, a coupler 9030 may be provided to add to the height of the support cylinder 9004. The coupler 9030 attaches to the support cylinder 9004 to add to the height of the support cylinder 9004. For example, the coupler 9030 may have outer threads 9032 that mate with the feminine threads 9010 of the support cylinder 9004. Such a threaded coupler 9030 fits inside the support cylinder 9004 and screws in and out of the support cylinder 9004 to adjust the final height of the pedestal 9000. Alternatively, the coupler 9030 may be ribbed or notched and the inner wall 9008 of the support cylinder 9004 may have reciprocal ribbing or notches so that the coupler 9030 can snap into place at various heights. Other methods of adjusting the height can be used, including automatic height adjustments using electric motors. These alternative height adjusting mechanisms can be applied to any threaded connection described herein. In embodiments utilizing a coupler 9030, the top 9035 of the coupler 9030 may be configured to connect with the cap 9020 as discussed further below.

With reference to FIG. 59, in some embodiments, the coupler 9030 may comprise reversed threading 9036 adjacent to the outer threads 9032. Therefore, a bottom portion of the coupler 9030 may comprise the outer threads 9032 and a top portion of the coupler 9030 may comprise the reversed threading 9036. The reversed threading 9036 may attach to inner threads 9024 of the cap 9020. Normally, if the threading was uniform in one direction along the length of the coupler 9030, and the bottom of the coupler was placed on top of the support cylinder 9004, then rotation of the coupler 9030 in a first direction would cause the coupler 9030 to move into the support cylinder 9004. If a cap 9020 was placed on top of the coupler 9030, then rotation in the first direction would also cause the coupler 9030 to move out of the cap 9020. Therefore, if the user wanted to change the height of the paver, by rotating the coupler in the first direction, the coupler 9030 driving into the support cylinder 9004 at the bottom end, and the coupler 9030 coming out of the cap 9020 at the top end would effectively cancel each other out if the cap 9020 and the support cylinder 9004 were fixed.

With the reversed threading 9036, however, the reversed threads 9036 would be in the opposite direction relative to the outer threads 9032. This way, in the example above, when the coupler 9030 is rotated in the first direction, the coupler 9030 would drive into the support cylinder 9004 while simultaneously driving into the cap 9020 to effectively close the distance between the cap 9020 and the support cylinder 9004 or the base 9001. Conversely, rotating the coupler 9030 in a second direction, opposite the first direction, would cause the coupler 9030 to exit the support cylinder 9004 while at the same time exiting the cap 9020 to effectively increase the distance between the cap 9020 and the support cylinder 9004 or the base 9001. Because there is opposite movement at both ends of the coupler 9030 with rotation of the coupler 9030 in one direction, the distance between the cap 902.0 and the base 9001 opens or closes faster than without the reversed threading 9036.

In some embodiments, the coupler 9030 may further comprise a lever 9038 to facilitate turning the coupler 9030. The lever 9038 may project radially outwardly from the body of the coupler 9030. In the preferred embodiment, the lever 9038 is like a sprocket with multiple projections protruding radially outwardly from the body of the coupler 9030 and angularly, spaced apart from each other to provide multiple places to grab to rotate the coupler 9030.

The height of the pedestal 9000 can be further extended by including a riser 9040. Preferably, the riser 9040 is a hollow tube that is cylindrical in shape. Other shapes may be used, but the shape of the riser 9040 should be the same as the shape of the support cylinder 9004. The similarity in shape allows the riser 9040 to fit inside or outside of the support cylinder 9004. In the preferred embodiment, the inner diameter of the riser 9040 is substantially similar to the outer diameter of the support cylinder 9004 so that the riser 9040 can fit around the support cylinder 9004 and be secured to the support cylinder by resistance fit. More preferably, the inner diameter of the outer wall 9012 of the base 9001 is substantially similar to the outer diameter of the riser 9040 so that the riser 9040 can be seated within the riser socket 9014 and be secured by resistance fit between the support cylinder 9004 and the outer wall 9012. The resistance fit is the preferred method of securement of the riser 9040 so that off-the-shelf PVC pipes can be cut to desired lengths and be used as the riser 9040. Due to the symmetry of the riser 9040, the base 9001 can be attached to either end of the riser 9040.

In embodiments utilizing the riser 9040, a collar 9050 may be provided. The collar 9050 is shaped to match the shape of the riser 9040. In the preferred embodiment, the collar 9050 is cylindrical in shape and may have a double wall, an outer wall 9052 concentrically arranged about and spaced apart from an inner wall 9054 so as to define a riser socket 9056 just like the base 9001. The collar 9050 can, therefore, be seated on op of the riser 9040 by inserting the riser inside the riser socket 9056 of the collar 9050. The inner wall 9054 of the collar 9050 may be threaded 9058 so as to receive the coupler 9030. The cap 9020 can be attached to the coupler 9030 to receive the paver. Alternatively, the cap 9020 can be attached directly to the collar 9050.

Therefore, the cap 9020 can be attached directly to the base 9001 to create a short pedestal 9000. Alternatively, the cap 9020 can be attached to a coupler 9030 attached to the base 9001 to create a pedestal 9000 of intermediate height. Alternatively, the cap 9020 can be attached to a coupler 9030 that is attached to a riser 9040 that is attached to the base 9001 to create the tallest pedestal 9000.

In some embodiments, compensation pads 2000 may be provided to adjust the angle of the pedestal to accommodate various subsurface terrains as discussed further below.

Figure 60A:
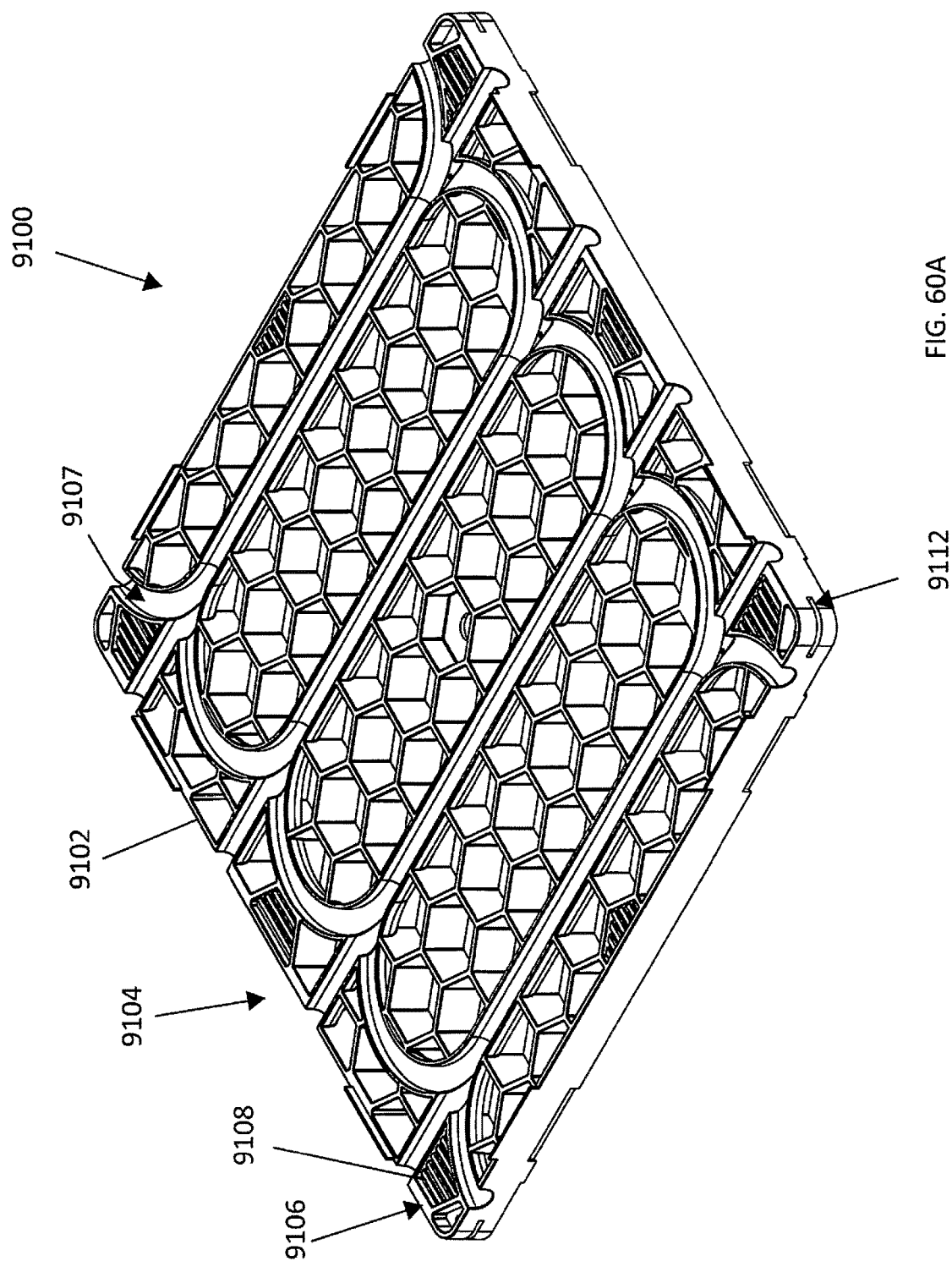
FIGS. 60A-60B are perspective and top views of a tray.
Figure 60B:
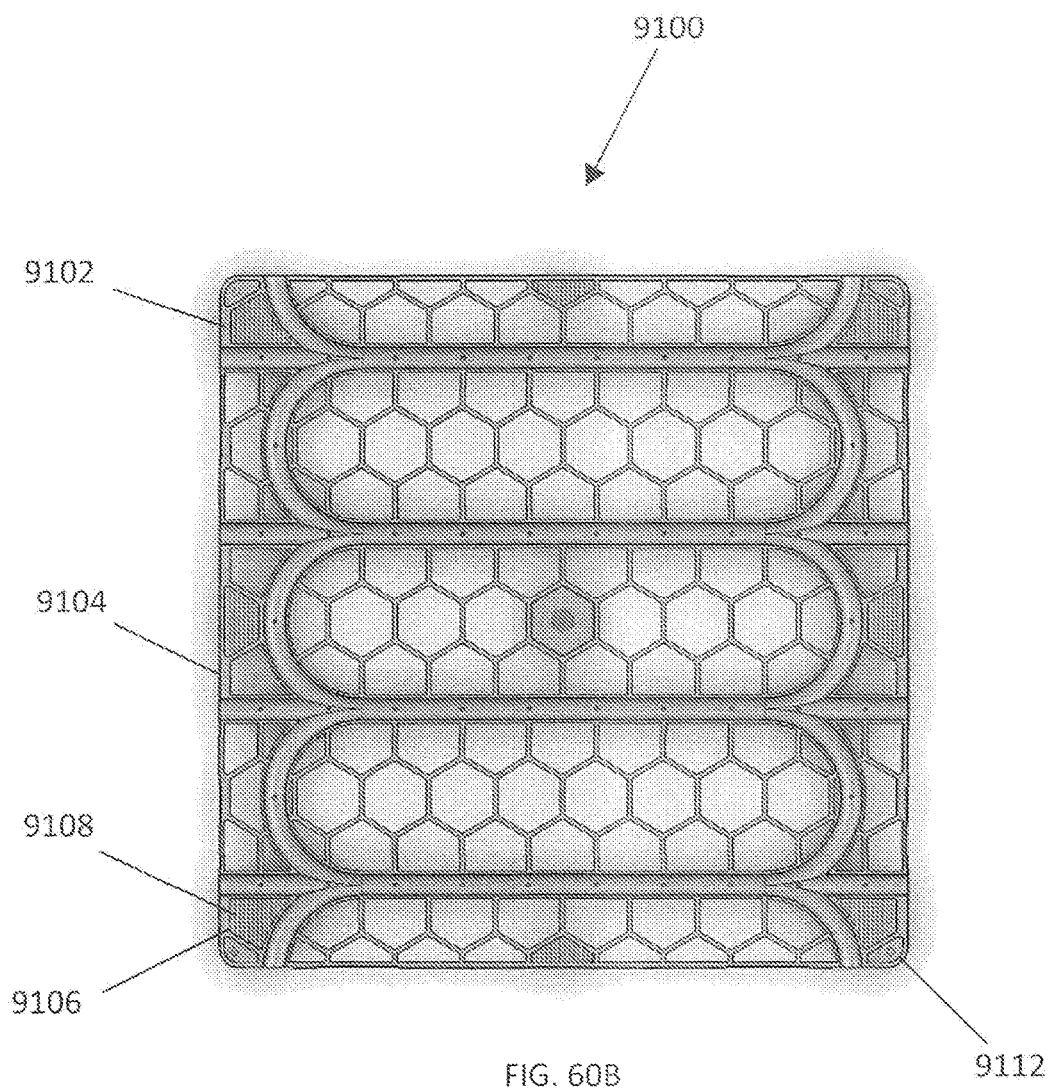
Figure 61A:
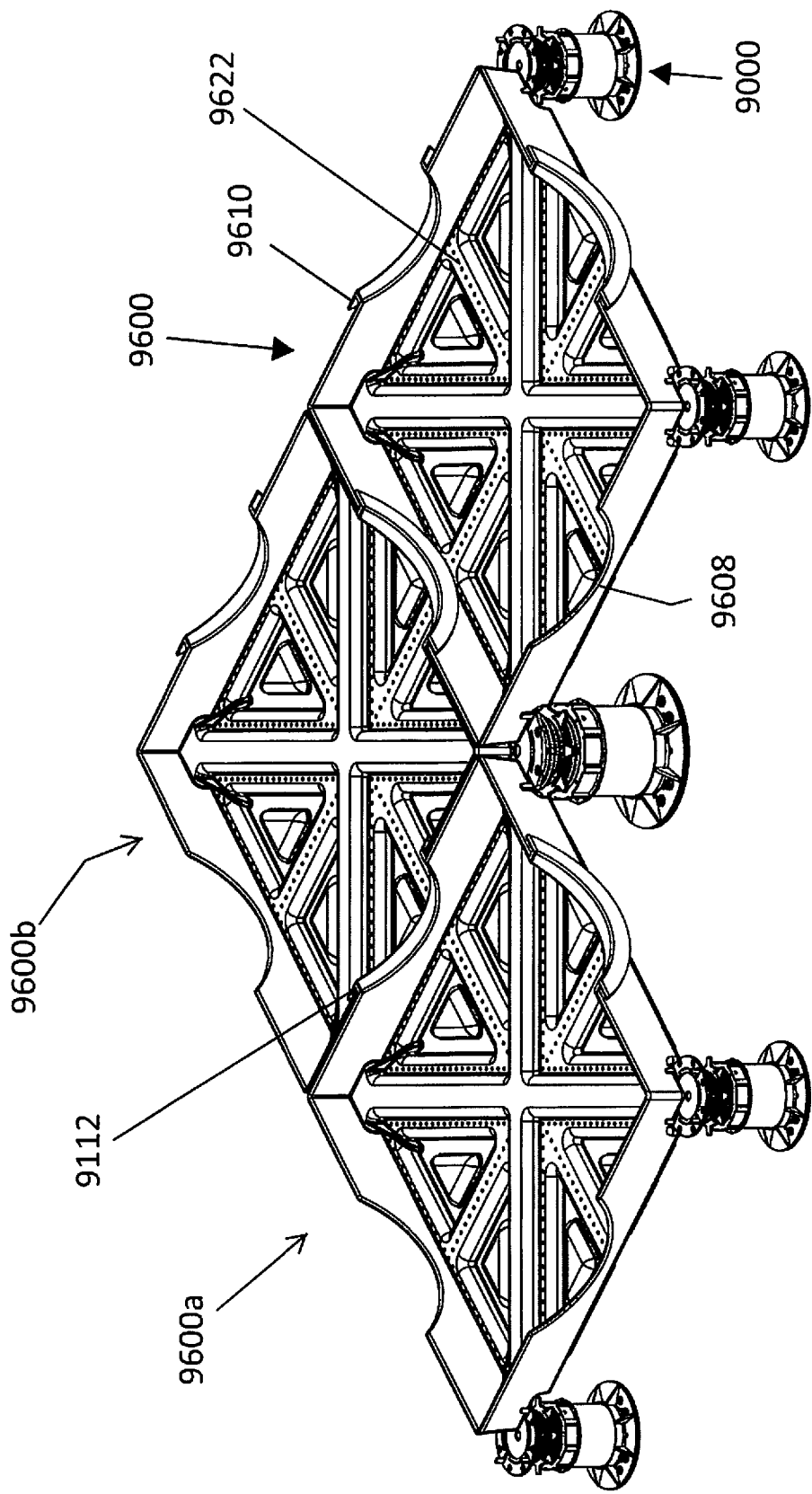
FIG. 61A shows a top perspective view of a series of plant trays connected to pedestals.
Figure 61B:
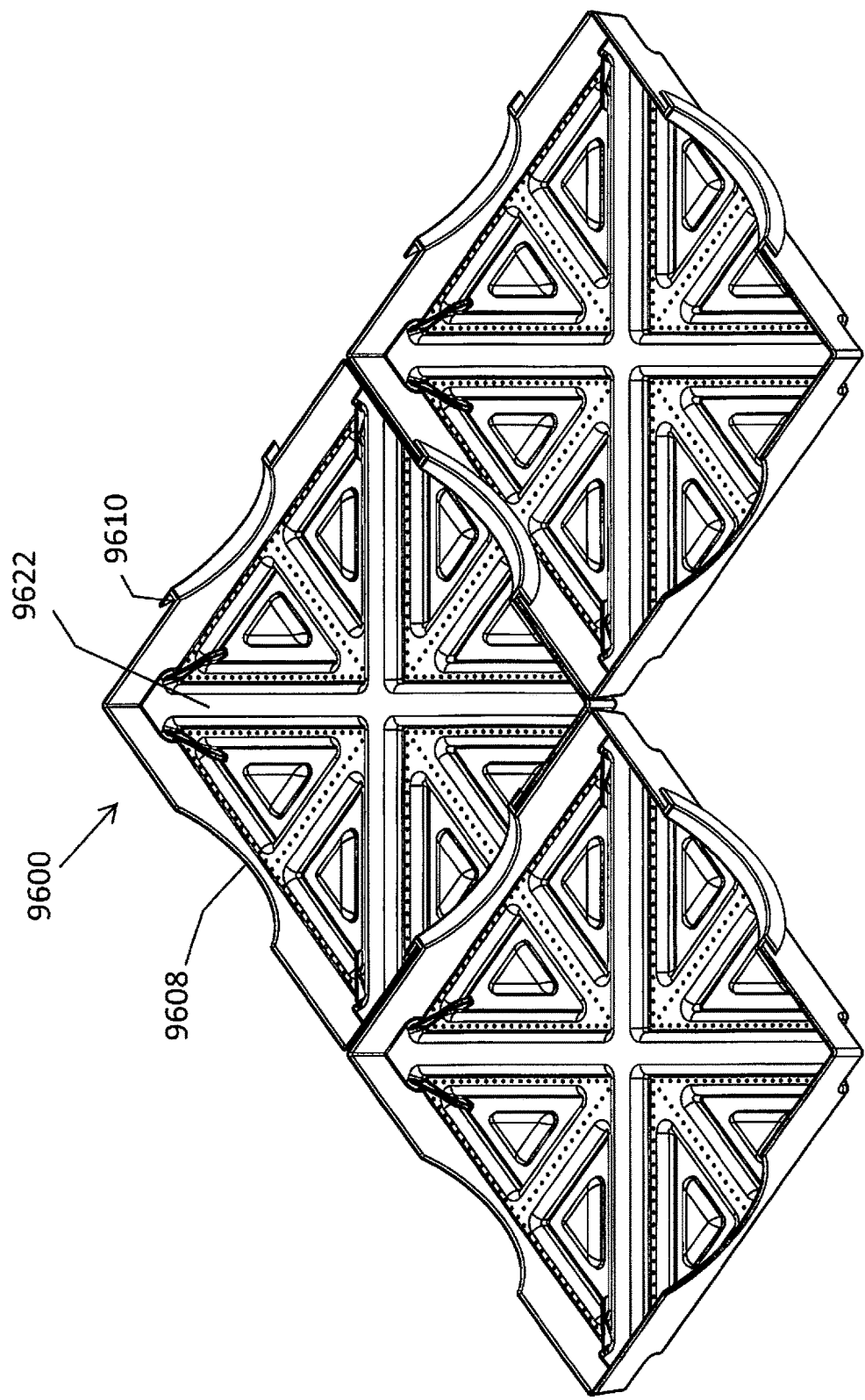
FIG. 61B shows a top perspective view of the plant trays without the pedestals.
Figure 61C:
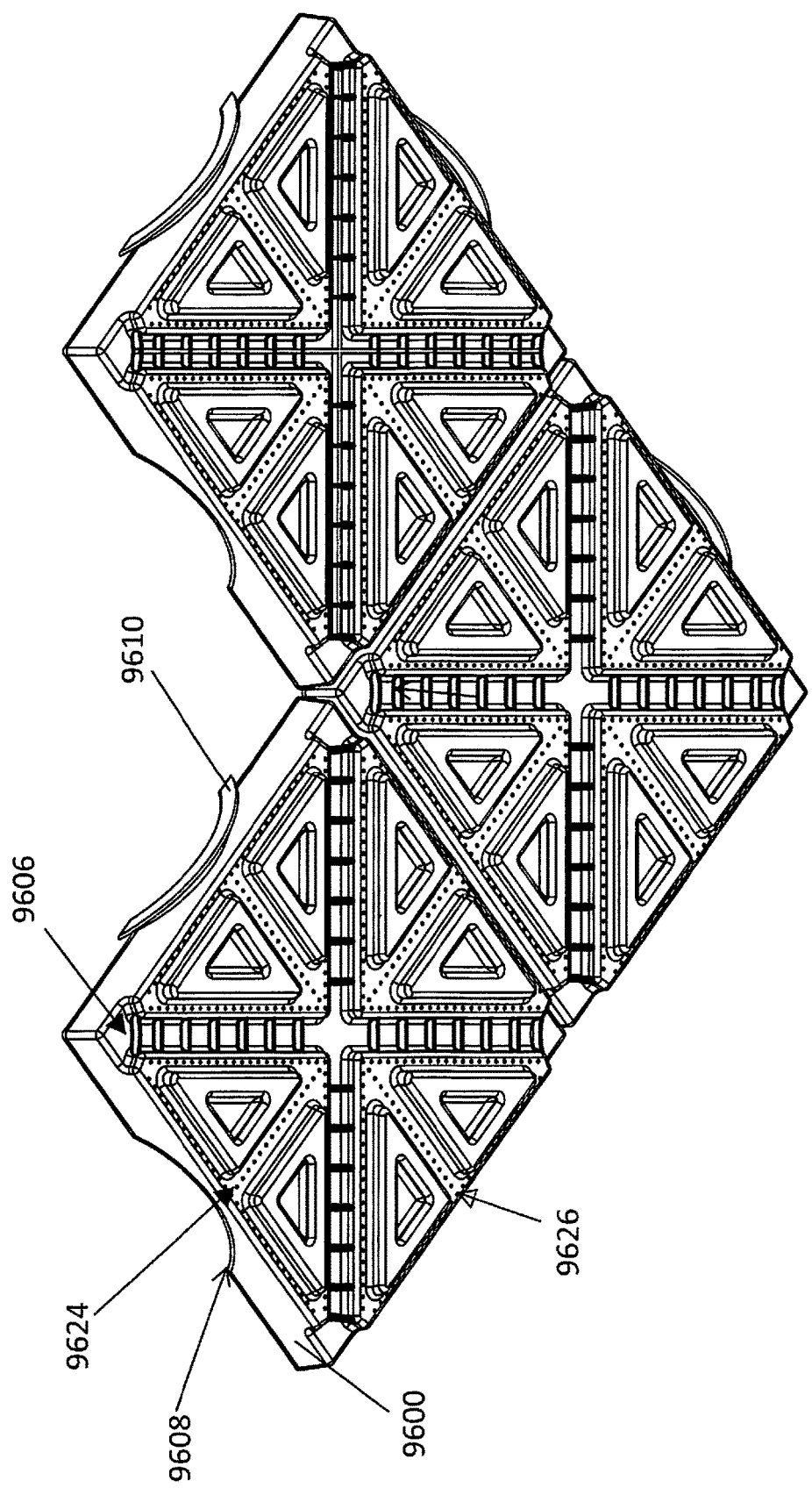
FIG. 61C shows a bottom perspective view of the plant trays without pedestals.
Figure 61D:
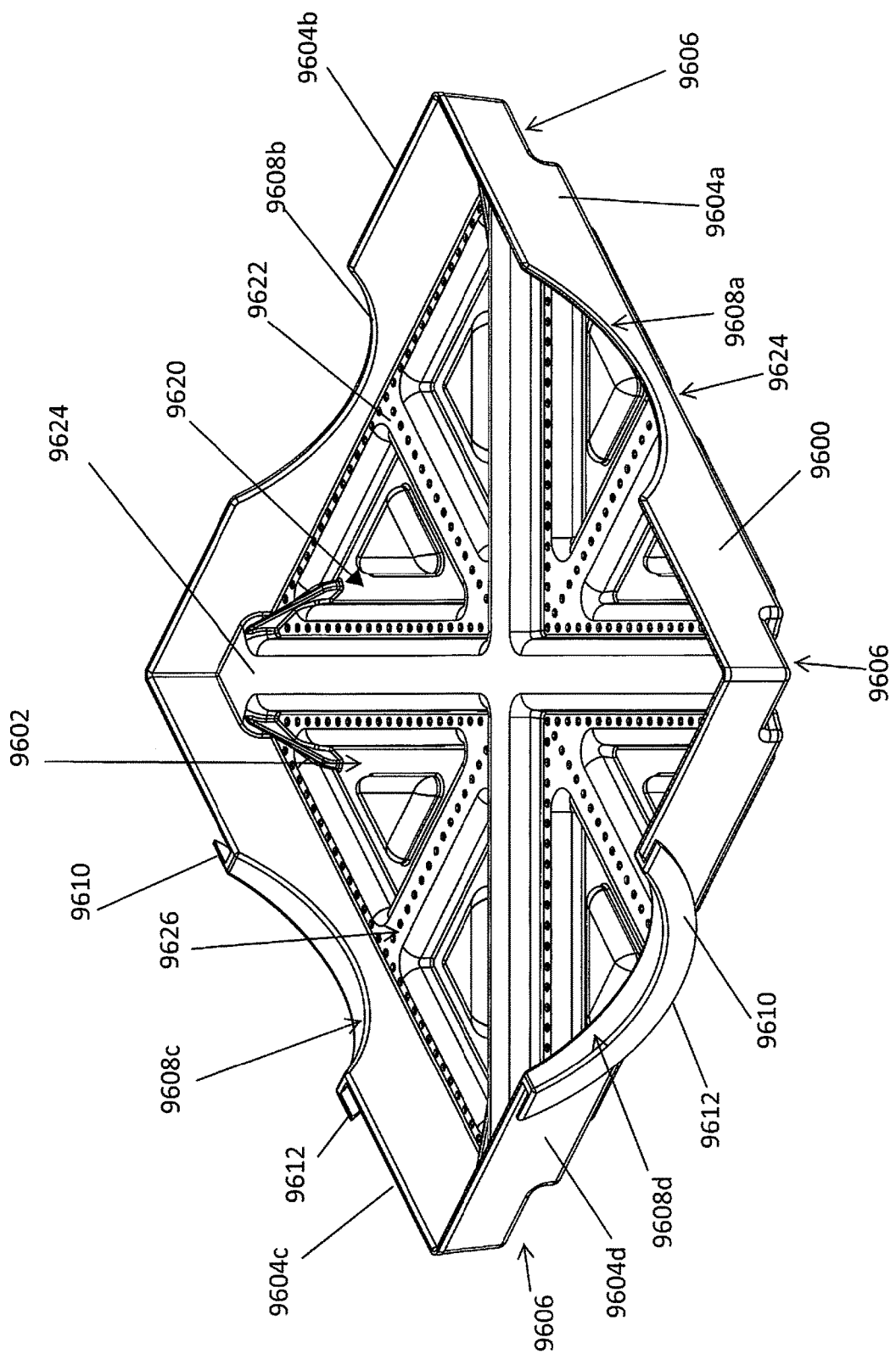
FIG. 61D shows a top perspective view of a plant tray.
Figure 61E:
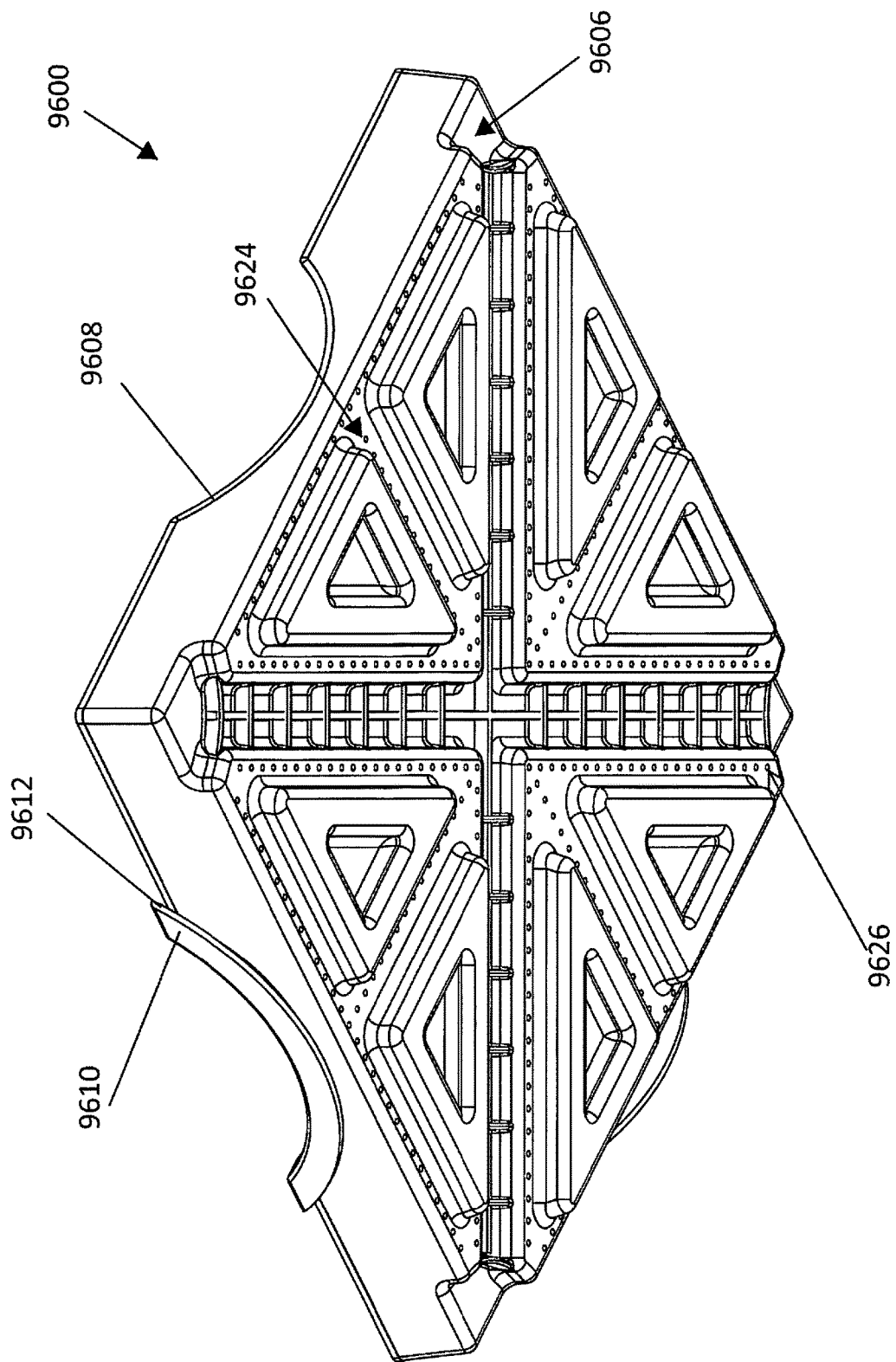
FIG. 61E shows a bottom perspective view of a plant tray.
Figure 61F:
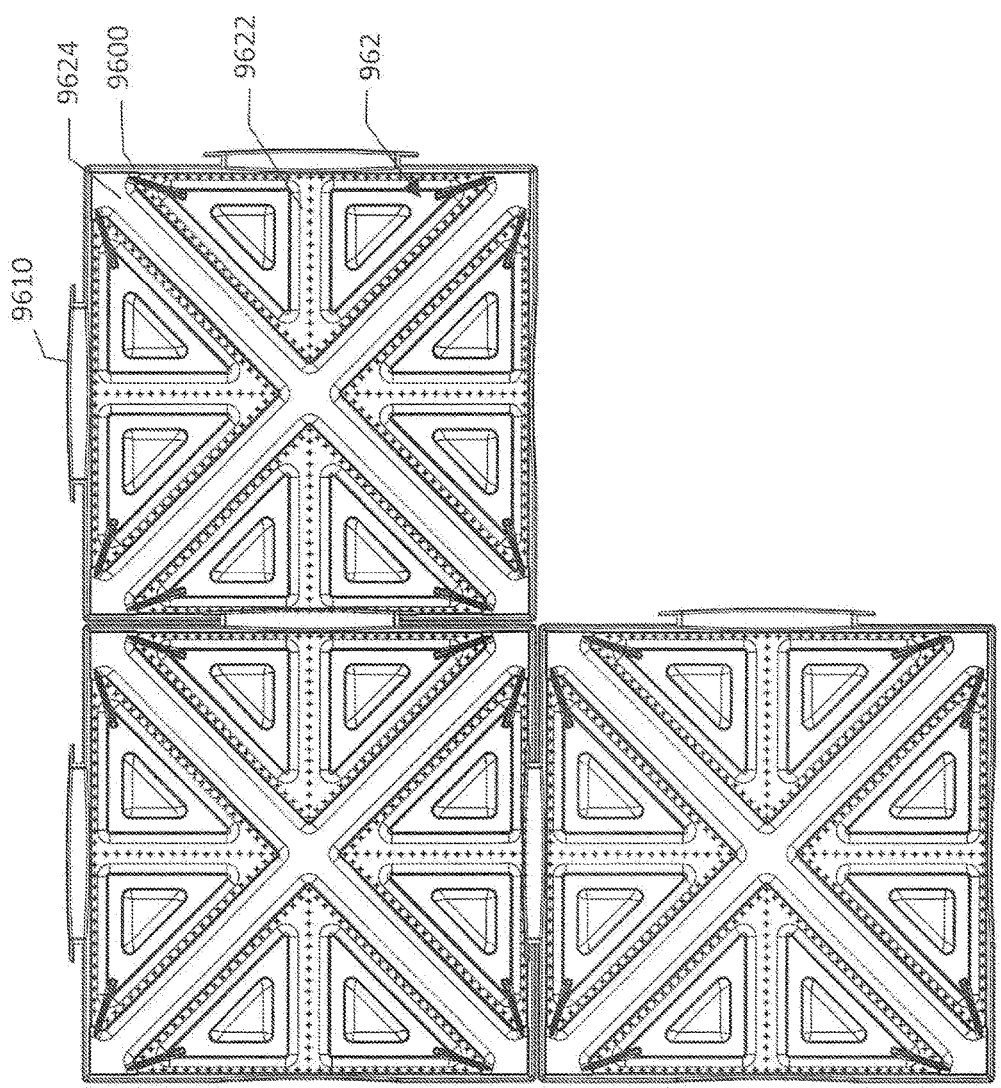
FIGS. 61F and 61G show top and bottom views, respectively, of a series of plant trays connected together.
Figure 61G:
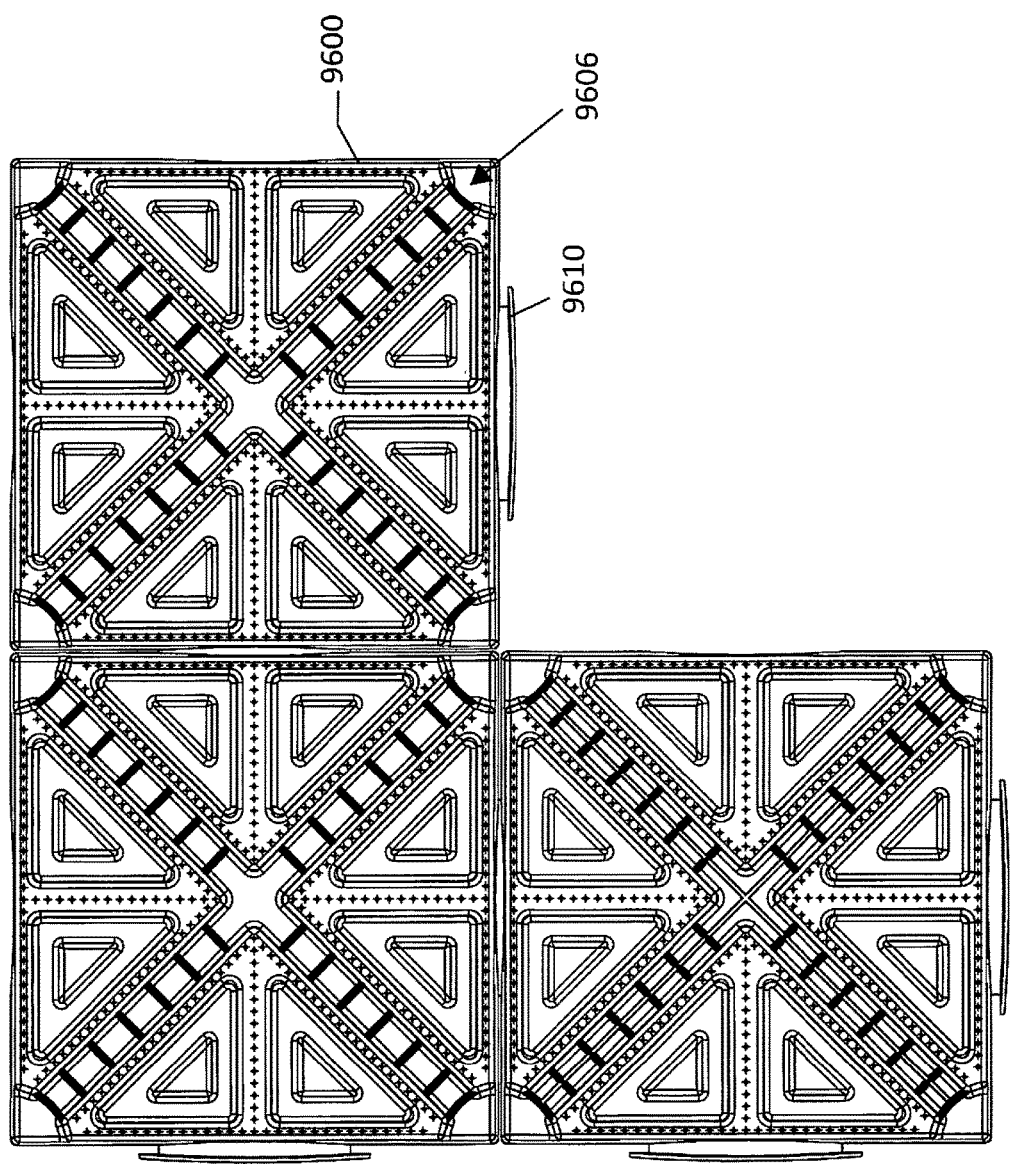

A tray 9100 may attach to the pedestal to provide a surface area for the pavers to lay on. As shown in FIGS. 60A-60B, the tray 9100 comprises a frame 9102 defining a paver support surface 9104 configured to support the paver. Preferably, the frame 9102 is a rectangular or square shape so that multiple trays 9100 can be efficiently placed adjacent to each other to create a large surface area for the pavers. Many other geometric shapes can be used to achieve the same result.

In addition, the frame 9102 may be configured to creating a lattice. In some embodiments, the tray 9100 may be configured as a heat exchanger to provide heat or cooling to the pavers as described further below. For example, tubing tracks 9107 may be created on the paver support surface 9104 through which fluids can be passed having the desired temperature. In some embodiments, it is desirable to configure the frame 9102 to be attached to the paver with a fastener in a manner that prevents the paver from being knocked off the tray 9100. For example, the paver support surface 9104 of the frame 9102 may comprise a well 9106. In the preferred embodiment, the well 9106 is adjacent to one of the corners of the frame. More preferably, at least one well 9106 may be positioned adjacent to each corner of the frame 9102.

The well 9106 is a recessed portion of the paver support surface 9104 capable of retaining a fastener inside. For example, the fastener may be an adhesive, such as glue, that can be poured inside the well 9106 until the well 9106 is filled. Placing a paver on top of the frame 9102 will allow the paver to adhere to the frame 9102 at the well 9106. in the preferred embodiment, the well may contain protrusions 9108. The protrusions 9108 create more surface area for the adhesive to stick to. For example, the protrusions 9108 may be a plurality of ribs protruding upwardly from the bottom of the well 9106. Other types of fasteners may be used such as nails, screws, hooks, magnets, and the like. The wells 9106 may be strategically placed anywhere on the paver support surface 9104.

As will be described further below, the tray 9100 may comprise slots 9112 on the sides of the tray 9100, preferably at the corners, parallel to the paver support surface 9104 to receive a locking mechanism 9114 that allows the tray 9100 to connect to the pedestal 9000.

In some embodiments, the trays 9100 configured to hold pavers can be replaced with a potting trays 9600-9600b used to hold plants and flowers as shown in FIGS. 61A-61K. The potting tray 9600 comprises a frame defined by a floor 9602 and one or more sidewalk 9604a-d defining a container with an open top. Like the paver tray 9100, the potting tray 9600 comprises slots 9606 on the one or more sidewails 9604a-d so that the potting tray 9600 can be elevated. and, optionally, leveled using the pedestal 9000 as discussed with the paver tray 9100.

In the preferred embodiment, the potting tray 9600 is square shape having four sidewalls 9604a-d. Each side wall 9604a-d may have a cutout 9608a-d. In the preferred embodiment, the cutout is in the shape of a semi-circle; however, any shape can be used. Preferably, two adjacent sidewalls will further comprise a connector 9610 protruding away from its respective sidewall to create a lip 9612. The lip 9612 is in the shape of the cutout 9608 and configured to mate with the cutout 9608 of an adjacent potting tray 9600. This allows two adjacent potting trays 9600 to connect with each other, Therefore, a first potting tray 9600a can be connected to an adjacent potting tray 9600b by hooking the lip 9612 of the first tray 9600a to the cutout 9608 of the second tray 9600b. This ability to connect to each other creates a modular planting system.

In some embodiments, the floor 9602 comprises a plurality of separated troughs 9620 defined by barriers 9622. The troughs 9620 allow the potting tray 9600 hold water and soil. In some embodiments, a filter layer may be placed on top of the barrier 9622 to allow separation of the soil from the water. Therefore, the water may be placed in the troughs 9620 with the filter layer on top of the barriers 9622, and the soil placed on top of the filter layer. The filter layer may have large enough holes to allow the roots from the plants to reach down into the trough for water while keeping the soil above the water. The trough can be used to hold other items for promoting the growth or stabilization, such as rocks, nutrients, and the like.

In some embodiments, the floor 9602 may further comprise a covered conduit 9624 to allow plumbing to pass through, such as hoses, cables, wires, and the like. This allows hoses to pass from one side of the potting tray 9600 to the opposite side, underneath the soil to maintain a clean and aesthetic appearance. Since the conduit 9624 is covered, the soil cannot interfere with the passage of the hose through the conduit.

In some embodiments, the floor 9602 may comprise a plurality of holes 9626 through which water can be fed into the potting tray 9600. In some embodiments, these holes 9626 may be in fluid communication with the covered conduit 9624 so that water released from hoses in the covered conduit 9624 can come out into the troughs 9620 via the plurality of holes 9626. In some embodiments, these holes 9626 may be on the barriers 9622 and the barriers 9622 may form the covered conduit 9624.

Figure 62A:
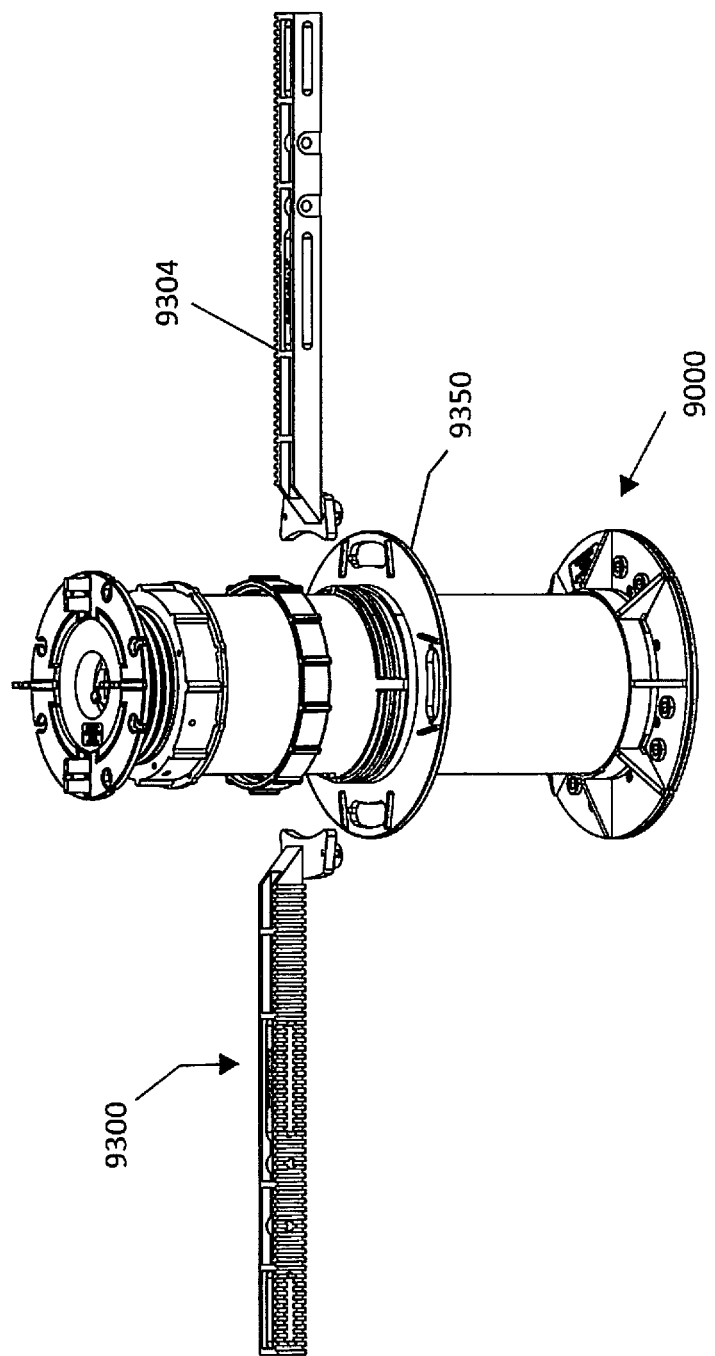
FIG. 62A shows a perspective view of a pedestal being connected to two lateral braces.
Figure 62C:
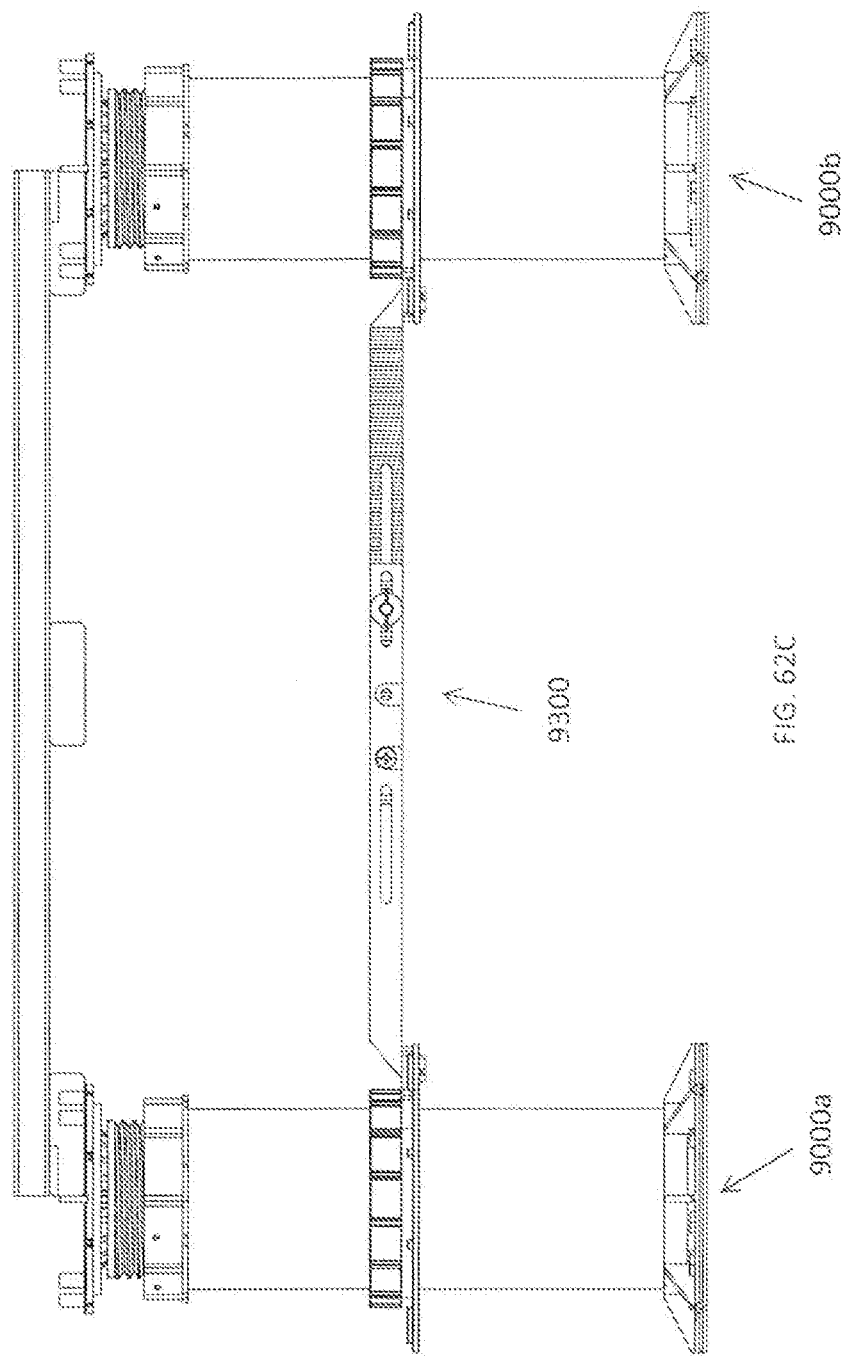
Figure 62D:
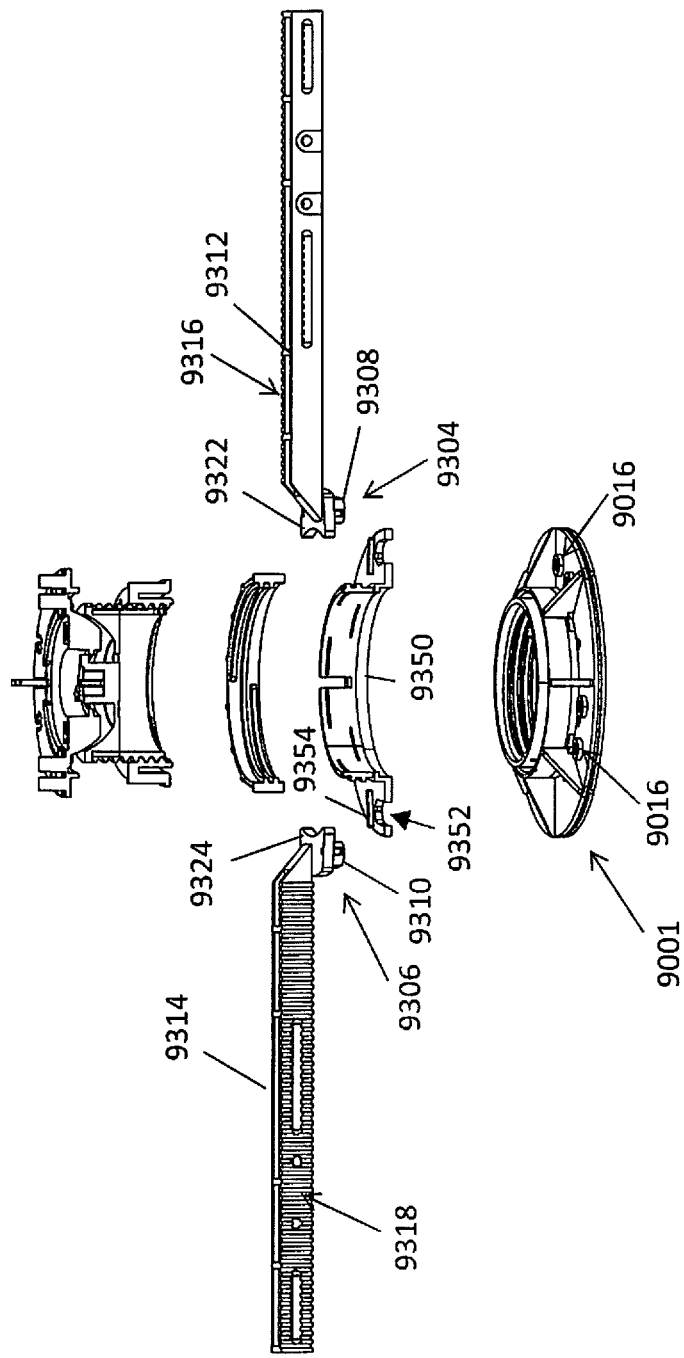
FIGS. 62D-62G show exploded views of the lateral braces and the stabilization bar collar.
Figures 62E, 62F, 62G:
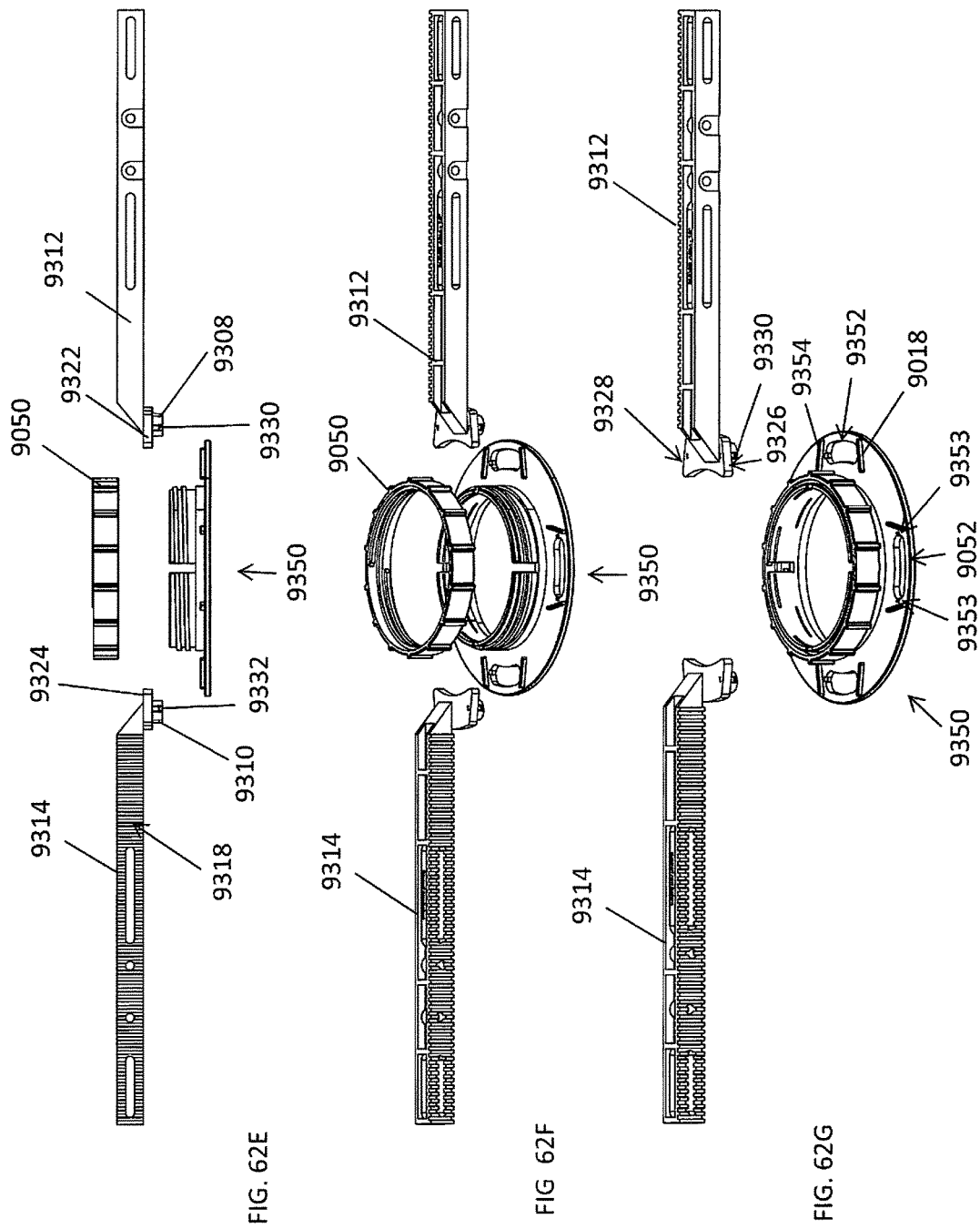
Figure 65A:
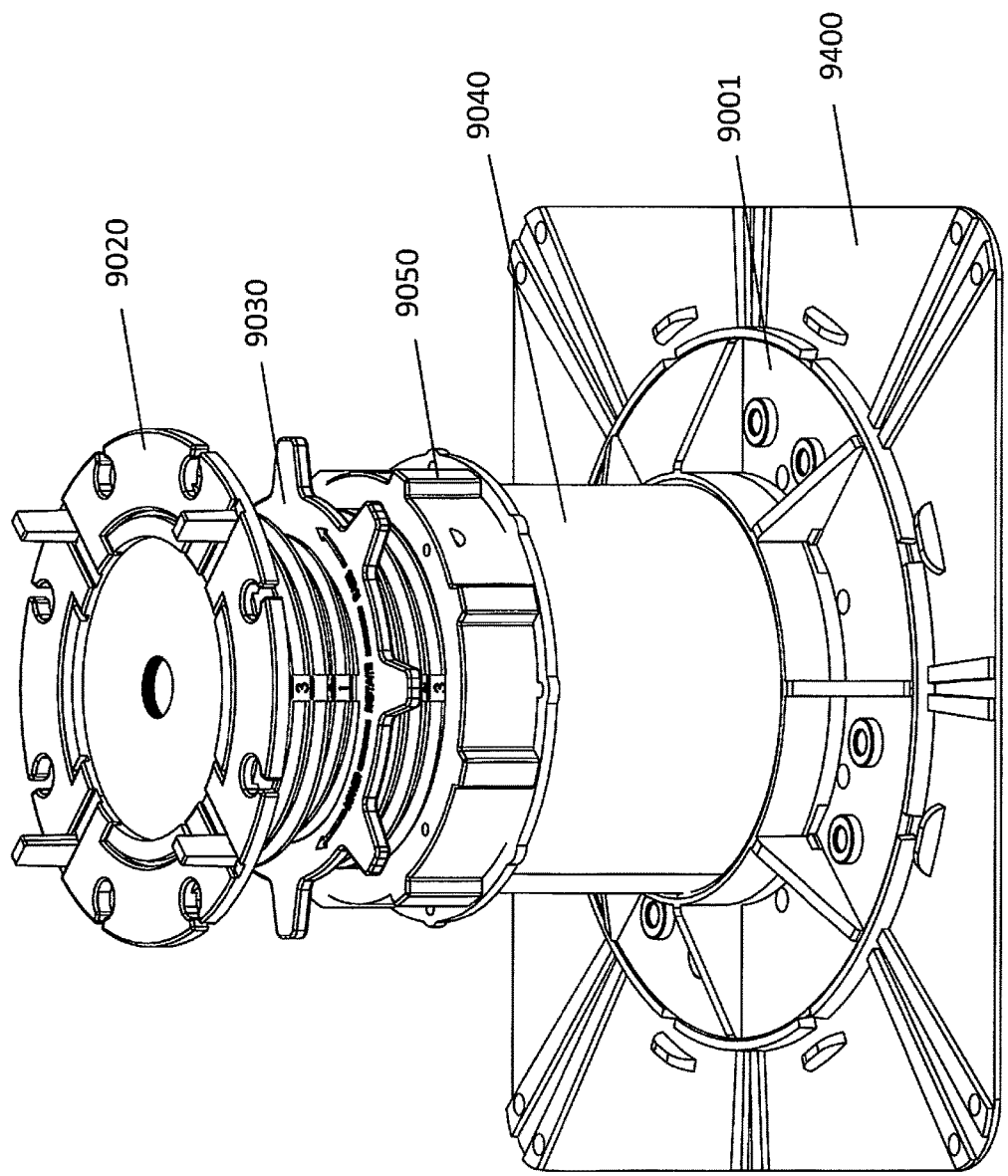
FIG. 65A shows a perspective view of the buffer attached to the pedestal.
Figure 66A:
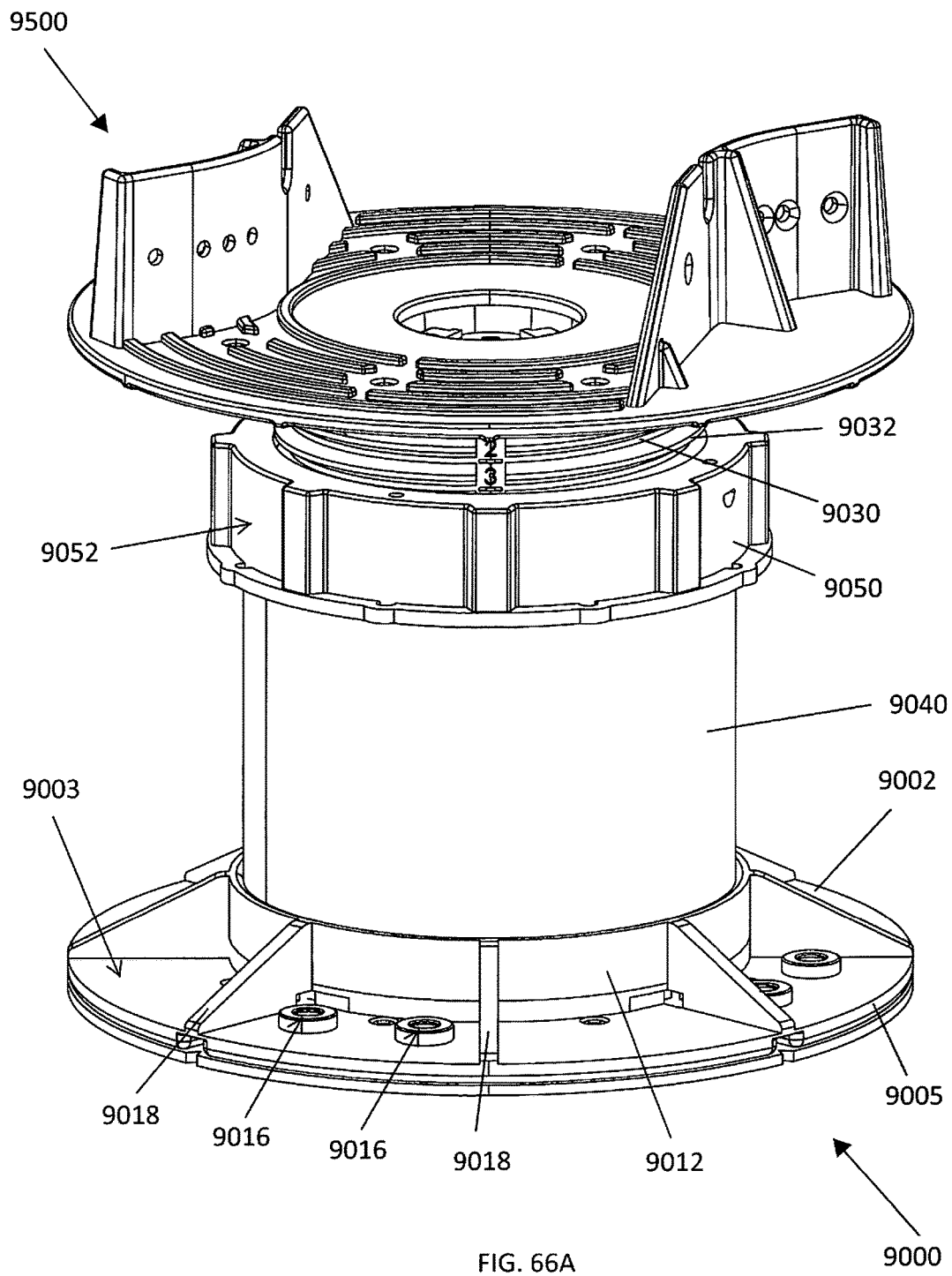
FIG. 66A shows a perspective view of the walled spacer attached to the pedestal.
Figure 66B:
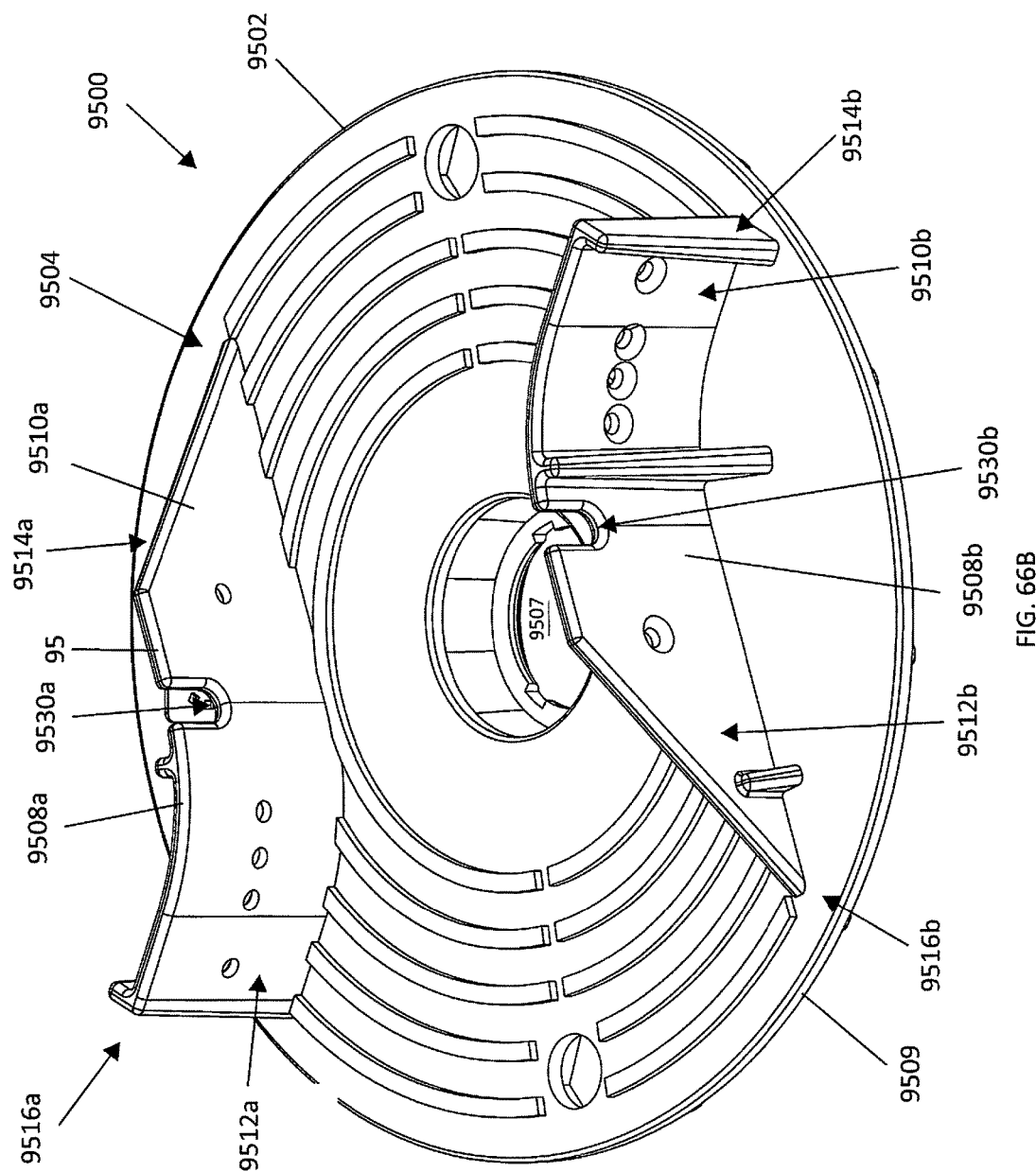
FIG. 66B is a perspective view of the walled spacer.
Figure 66C:
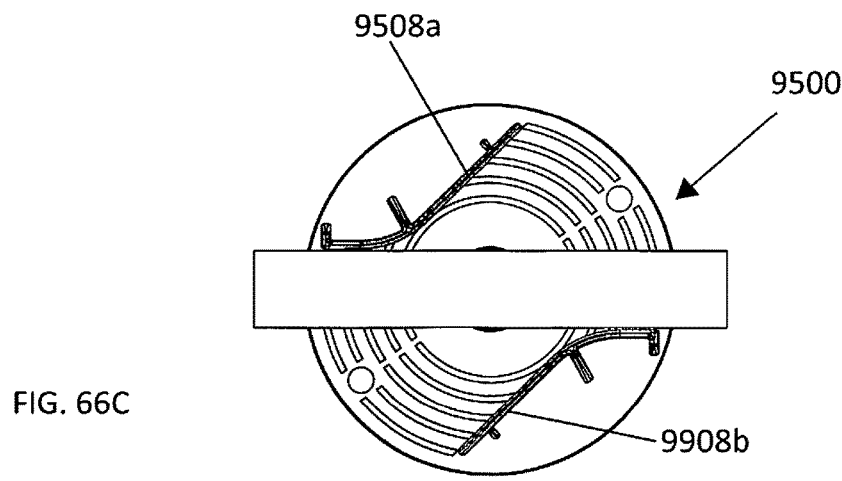
FIGS. 66C and 66D show top use of the walled spacer in use.
Figure 66D:
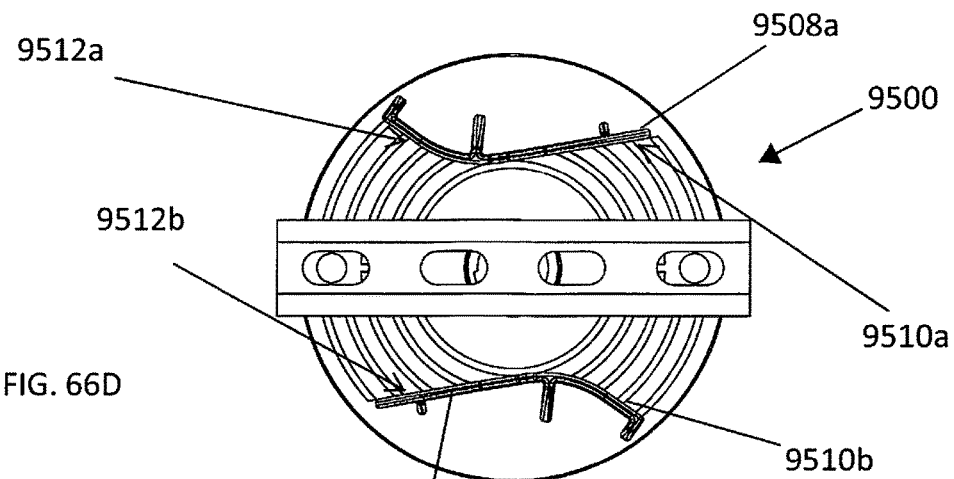
Figure 66E:
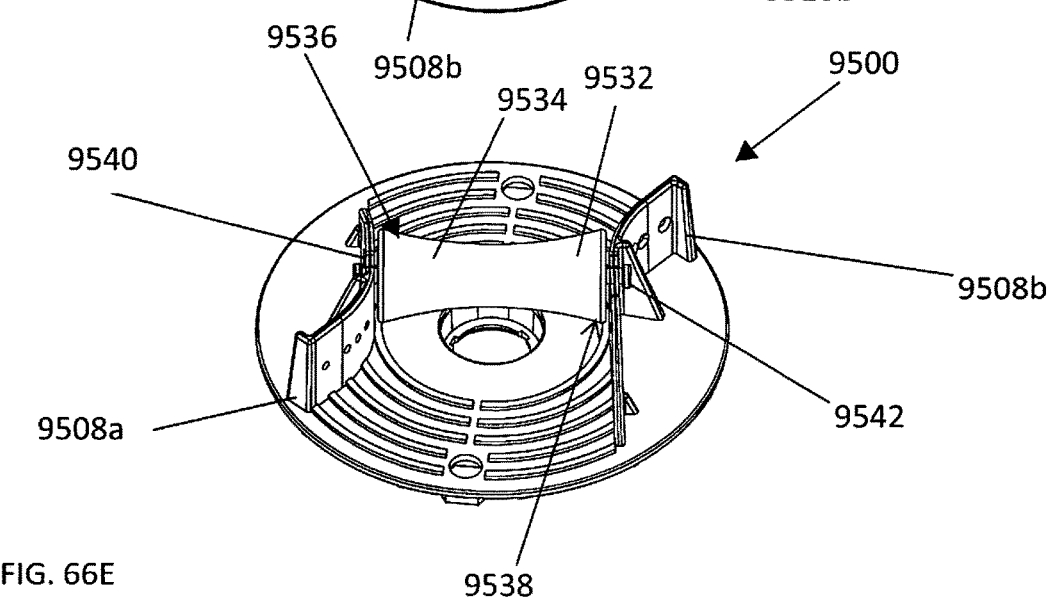
FIGS. 66F-66H show perspective views of the walled spacer in use.
FIGS. 66I-66M show top perspective, bottom perspective, top, side, and bottom views, respectively, of the walled spacer.
Figure 66F:
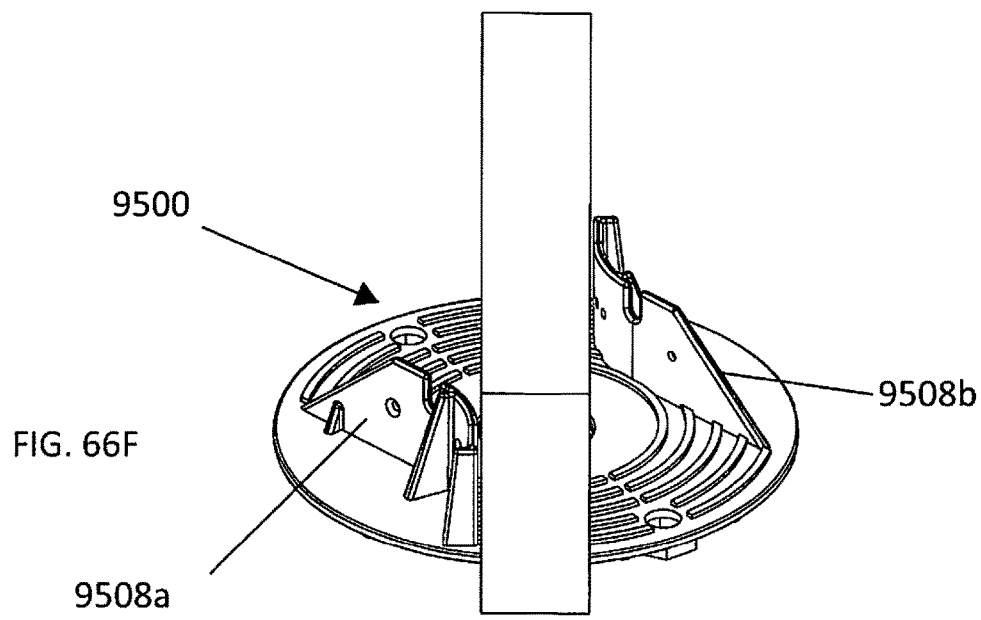
Figure 66G:
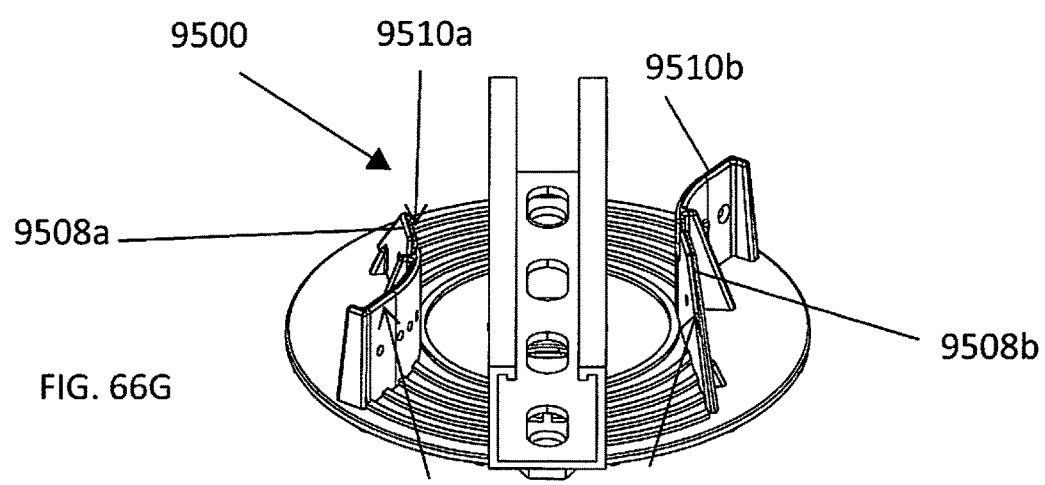
Figure 66H:
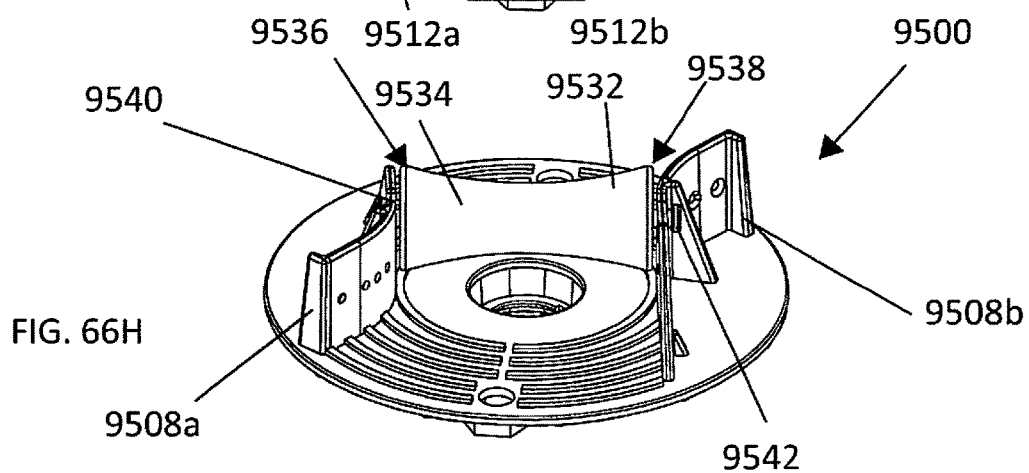

As shown in FIG. 57A-57B a lateral brace 9300 may be used to stabilize the pedestals 9000 relative to each other, Referring to FIGS. 62A-62N, the lateral brace 9300 is an elongated arm 9302 comprising a first end 9304 and a second end 9306 opposite the first end 9304, The first and second ends 9304, 9306 each comprise a projection 9308, 9310. These projections 9308, 9310 are configured to fit within the openings 9016 of the base 9001. In particular, the projection 9308 at the first end 9304 of the lateral brace 9300 is inserted into a first opening 9016a of a first pedestal 9000a, and the projection 9310 at the second end 9306 of the lateral brace 9300 is inserted into the opening 9016b of a second pedestal 9000b, thereby linking the two pedestals together. Continuing this process to link multiple pedestals together creates a sturdy foundation of pedestals.

In some embodiments, the lateral braces 9300 may attach to a stabilization bar collar 9350 that is attached to the riser. In essence the stabilization bar collar 9350 may be much like the base 9001 with a through-hole in the center so that the stabilization bar collar 9350 can be slid up and down on the riser at a desired height. The stabilization bar collar 9350 comprises openings 9352. In some embodiments, the openings 9352 may further comprise notches 9353 at opposite ends to facilitate receiving the lateral brace. In some embodiments, for each opening 9352, a pair of guide walls 9354 may be bilaterally arranged about their respective opening 9352. The guide walls 9354 help with the connection of the lateral brace, In some embodiments, these features that allow the connection to the lateral braces 9300 may be on the base 9001.

In the preferred embodiment, the elongated arm 9302 of the lateral brace 9300 comprises two separate arms 9312, 9314 attached to each other at one side. Each arm 9312, 9314 may comprise a set of teeth 9316, 9318 through which the two arms 9312, 9314 can be attached. This allows the arms 9312, 9314 to attach to each other at first locations along the arm, thereby making the elongated arm telescopic so as to adjust the total length of the elongated arm 9302. Fasteners 9320, such as a nut and bolt, may used to secure the two separate arms 9312, 9314 together. The first and second ends 9304, 9306 may each further comprise a tab 9322, 9324. The tabs 9322, 9324 provide a flat surface from which the projections 9308, 9310 protrude perpendicularly. The tabs 9322, 9324 may have angled sidewalls 9326, 9328 that match the angle of the guide walls 9354 of the stabilization bar collar 9350.

In some embodiments, the first and second ends 9304, 9306 may each comprise projections 9308, 9310. In such case, the stabilization bar collar 9350 would have corresponding openings 9352 to receive the plurality of projections 9306, 9308. The guide walls 9354 would abut against the angled sidewalls 9326, 9328.

In some embodiments, the projections 9308, 9310 may further comprise opposing protruding lips 9330, 9332. These protruding lips 9330, 9332 snap into the notches 9353 of the openings 9352 on the stabilization bar collar 9350.

FIGS. 63A-64D show the stabilization bar collar 9350 and locking sleeve 9370. The stabilization bar collar 9350 may further comprise a threaded cylinder 9360 projecting perpendicularly away from the plane of the stabilization bar collar 9350 as shown in FIGS. 64A-D. Once the stabilization bar collar 9350 is positioned at the desired height on the riser 9040, the locking sleeve 9370 may be threaded onto the threaded cylinder 9360 causing the threaded cylinder to tighten around the riser 9040, thereby locking the stabilization bar collar 9350 in place. To allow for the threaded cylinder 9360 to move radially inward and outward relative to the riser 9040, the threaded cylinder may have a plurality of vertical slits 9362 intermittently and angularly spaced around the threaded cylinder 9360.

As shown in FIGS. 65A-65E, the buffer 9400 may be a flat pad with a larger surface area than the foot 9002 of the pedestal 9000. The buffer 9400 has a top side 9402 and a bottom side 9404. The top side 9402 comprises one or more raised walls 9406 projecting perpendicularly in the upward direction. The raised wall 9406 is in the shape of the foot 9002 and substantially the same size as the foot 9002 so that the foot 9002 can be seated within the raised wall 9406. In some embodiments, the top surface may further comprise a plurality of stops 9408. The stops 9408 may be positioned on the outer side of and spaced radially away from the raised wall 9406 and angularly spaced apart around the raised wall 9406.

With reference to FIGS. 66A-66M, in some embodiments, rather than supporting pavers, the pedestals 9000 may support beams or pipes. Therefore, rather than connecting a cap 9020 onto the pedestal 9000, a walled spacer 9500 may be attached to the top of the pedestal 9000. The walled spacer 9500 may comprise a platform 9502 having a top surface 9504 and a bottom surface 9506. The bottom surface 9506 is configured to attach to the pedestal 9000 like the cap 9020. Therefore, features of the cap 9020 that allow the cap 9020 to attach to the pedestal 9000 apply to the walled spacer 9500, such as the convex portion 9505 on the bottom surface 9506 for self-leveling, and a central orifice 9507. The top surface 9504 of the wall spacer 9500 comprises curved walls 9508a, 9508b projecting perpendicularly upwardly from the top surface 9504. The curved walls 9508*a*, 9508*b* are arranged about the central orifice 9507 such that the convex curvature of each wall 9508*a*, 9508*b* faces toward each other and toward the central orifice 9507 and define the closest points of the curved walls 9508*a*, 9508*b* to each other. The concave curvature of each wall 9508*a*, 9508*b* face towards the outer perimeter 9509 of the platform 9502 on their respective sides.

In some embodiments, the curved wall 9508*a* transitions into flat wall portions 9510*a*, 9512*a* at its terminal ends 9514*a*, 9516*a*. Similarly, curved wall 9508*b* transitions into flat wall portions 9510*b*, 9512*b* at its terminal ends 9514*a*, 9516*b*. Contralateral and opposite flat wall portions of the two curved walls 9508*a*, 9508*b* may be parallel to each other, but not in line with each other. For example, flat wall portion 9510*a* of the first curved wall 9508*a* may be parallel to flat wall portion 9512*b* of the second curved wall 9508*b*. Similarly, flat wall portion 9512*a* of the first curved wall 9508*a* may be parallel to the flat wall portion 9510*b* of the second curved wall 9508*b*.

This configuration allows beams or joists of various sizes to fit within the same walled spacer 9500 simply by rotating the walled spacer 9500 in the proper direction. For example, with reference to FIG. 66K, the first flat wall portion 9510*a* of the first curved wall 9508*a* defines a first imaginary line 9520*a*. The second flat wall portion 9512*b* of the second curved wall 9508*b* defines a second imaginary line 9520*b* that is parallel to and spaced apart from the first imaginary line 9520*a*. Likewise, the second flat portion 9512*a* of the first curved wall 9508*a* defines a third imaginary line 9522*a* and the first flat portion 9510*b* of the second curved wall 9508*b* defines a fourth imaginary line 9522*b*. The fourth imaginary line 9522*b* is parallel to and spaced apart from the third imaginary line 9522*a*. The distance between the first and second imaginary lines 9520*a*, 9520*b* may be different from the distance between the third and fourth imaginary lines 9522*a*, 9522*b*. In this respect, the curved walls can accommodate beams or joists of at least two different widths. Furthermore, the distance between the curved portions of the curved walls 9508*a*, 9508*b* can also be different from the distance between the first and second imaginary lines 9520*a*, 9520*b* and the third and fourth imaginary lines 9522*a*, 9522*b*. This allows the walled spacer 9500 to accommodate beams or joists of at least three different widths as shown in FIGS. 66C-D and FIGS. 66F-G. In general, the distance between the curved portions of the curved walls 9508*a*, 9508*b* may be greater than the distance between imaginary lines 9520*a*, 9520*b* and 9522*a* 9522*b*. In use, a beam or joists may be positioned in between the curved portions of the curved wall 9508*a*, 9508*b*, If the width of the beam is too small, then the walled spacer 9500 can be rotated clockwise or counterclockwise so that the length of the beam or joists is parallel to either the first and second imaginary lines 9520*a*, 9520*b* or the third and fourth imaginary lines 9522*a*, 9522*b*.

In some embodiments, each curved wall 9508*a*, 9508*b* may comprise a notch 9530*a*, 9530*b* defining the upper edge of the curved wall 9508*a*, 9508*b*, The notches 9530*a*, 9530*b* are configured to receive a roller 9532. The roller 9532 mounted upon the notches 9530*a*, 9530*b* allows a beam, joist, or some other elongated object, to be placed upon the roller 9532 for easy movement of the elongated object. The roller 9532 is generally a cylindrical structure defined by a side-wall 9534 and two opposing ends 9536, 9538. Preferably, the sidewall 9534 tapers towards the middle to create an hour-glass shape. Protruding perpendicularly outwardly from each opposing and 9536, 9538 is a peg 9540, 9542. The pegs are mounted on opposite curved walls 9508*a*, 9508*b* at their respective notches 9530*a*, 9530*b*, Preferably, notches 9530*a*, 9530*b* are located approximately at the curved portion of the curved walls 9508*a*, 9508*b*.

Having described the various components of the present invention, a person of ordinary skill in the art would be able to combine the various components in a variety of ways to create a paver elevating system. And some of the components can stand alone as independent inventions. Below are specific examples of combinations of the components described above. The invention, however, is not limited only to the examples below. Many variations can be derived from the examples below and the description above.

In one embodiment, such an apparatus may be defined by two cooperating slope compensation panels that are disposed underneath a paver support pedestal. Each panel has a top surface and a bottom surface. Suitably, the bottom surface of a top panel features a slope relative to the top surface of a bottom panel so that the slopes of each panel compound or offset via the relative rotation of each panel with respect to each other. In one mode of operation, (A) the panels may be coupled and rotated relative to each other to compensate for a slope of an undersurface and (B) a pedestal may be positioned on the panels so that the pedestal's paver support surface is level relative to the subsurface. The details of the preferable panel are best disclosed by reference to FIGS. 1 through 10.

It should be noted that, now, and throughout the application the terms "top" and "bottom" or "lower" and "upper", or any other orientation defining term should in no way be construed as limiting of the possible orientations of the panel 1000 (i.e., the panel 1000 may be positioned sideways, or in reversed vertical orientations even though the specification refers to a "top" and "bottom" parts).

Figure 1:
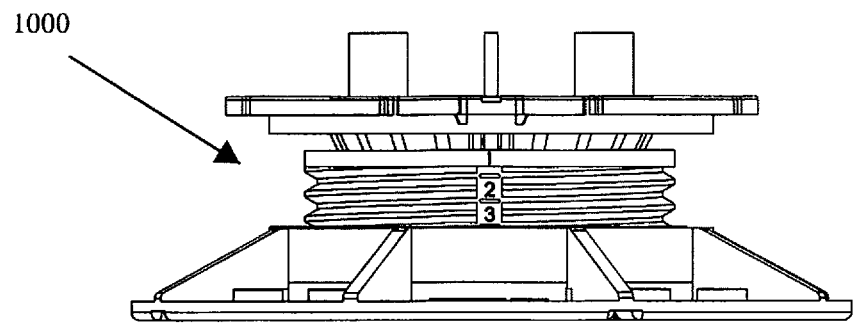
FIG. 1 is a pedestal.

FIG. 1 is a pedestal 1000 for elevating a paver surface. The pedestal 1000 is disclosed in U.S. Pat. No. 8,850,753, and that document is hereby incorporated in its entirety. As disclosed in that document, the pedestal 1000 has a slope compensation mechanism at its paver support surface, but not its base. In one embodiment, the disclosed apparatus is a slope compensation disk 2100 that, when stacked with a like disk, provides a footing for a pedestal 1000 that is configured to compensate for the slope of the subsurface.

Figure 2:
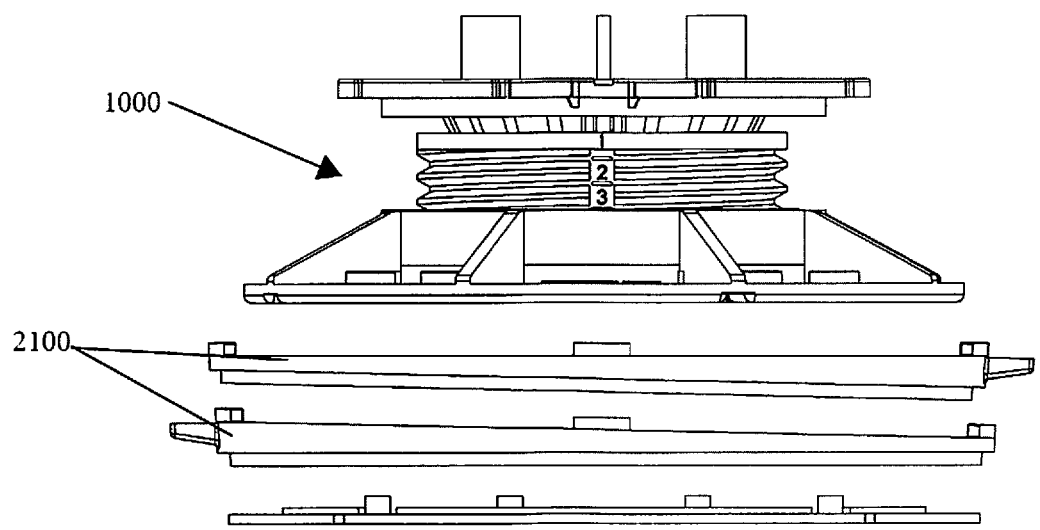
FIG. 2 is an exploded view of the pedestal over a base and two slope compensation panels.
Figure 3:
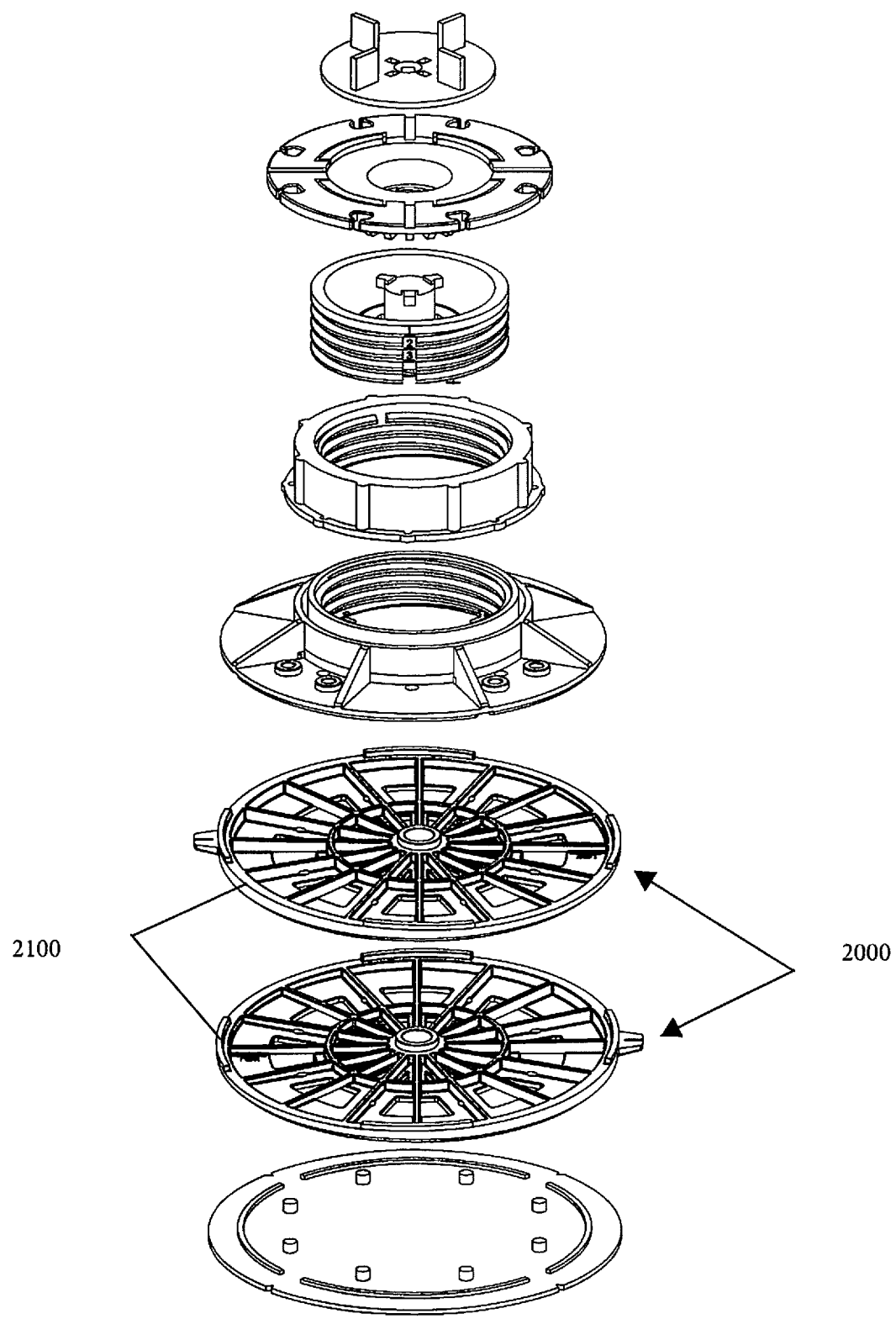
FIG. 3 is an exploded view of the pedestal and the slope compensation panels.
Figure 4:
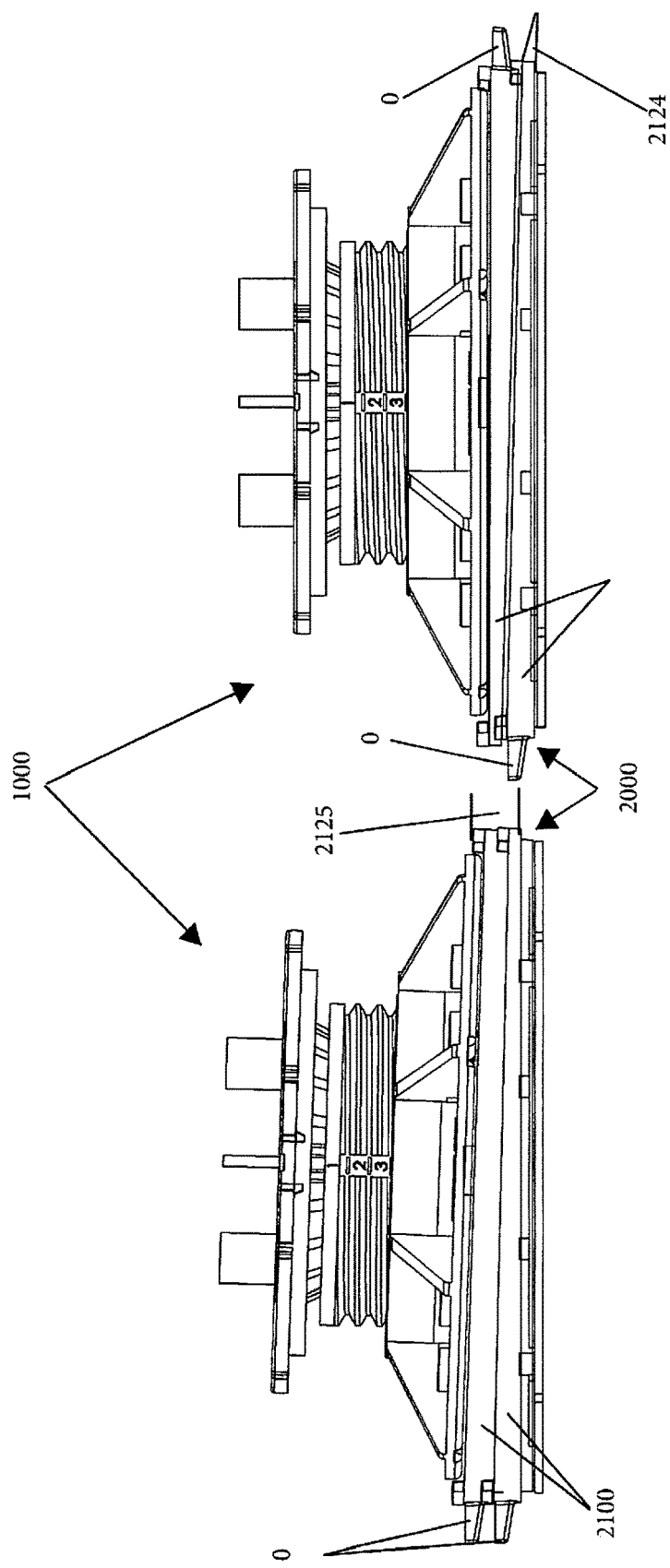
FIG. 4 is a side-by-side view of a pedestal and a slope compensated pedestal.

Referring now to FIG. 4, the pedestal 1000 may be positioned on a slope compensation panel 2000 defined by two or more slope compensation disks 2100. FIGS. 2 and 3 illustrate how two panels might be stacked. As alluded to above, the disks 2100 are configured with a top surface plane that is angled relative to the plane of its bottom surface. The top surface plane of a first panel 2100 may interact with a bottom surface plane of a second panel to result in the compounding or offsetting of disks 2100 respective angle. As shown in the figure, the pedestal 1000 on the right is on a panel 2000 that has the angles of its disks 2100 offset while pedestal 1000 on the left is on a panel 2000 that has had the angles of the stacked disks 2100 compounded. FIG. 2 is a side view of the pedestal 1000 being positioned over two slope compensation panels 2000.

Figure 5:
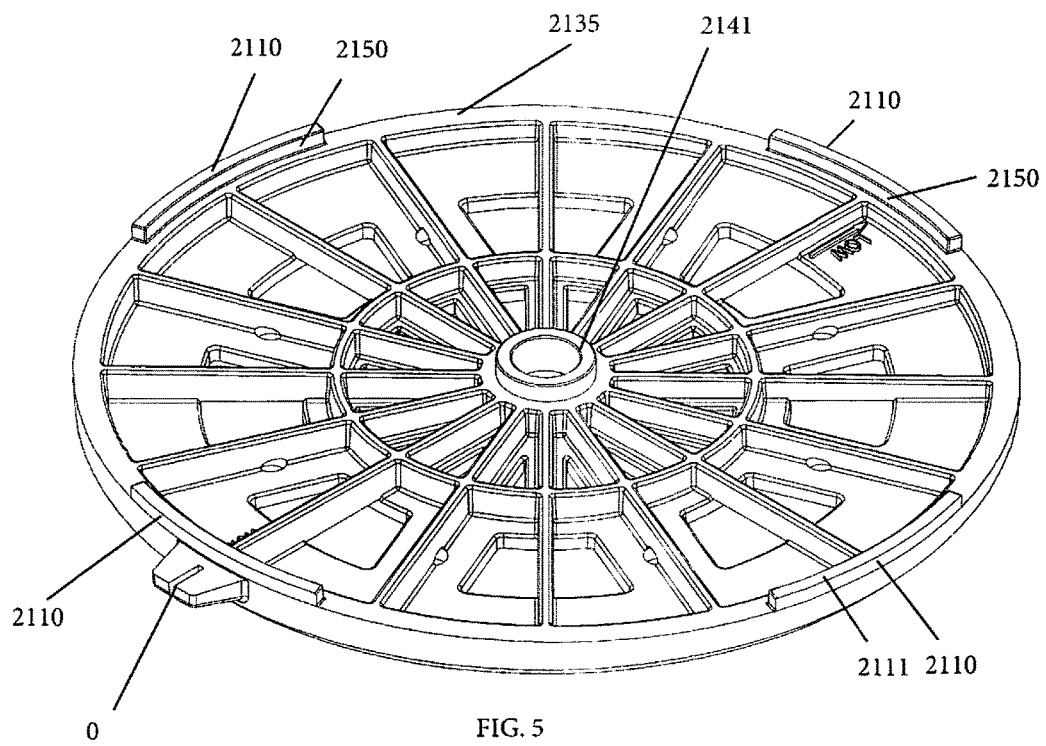
FIG. 5 is a top perspective of a slope compensation panel.
Figure 6:
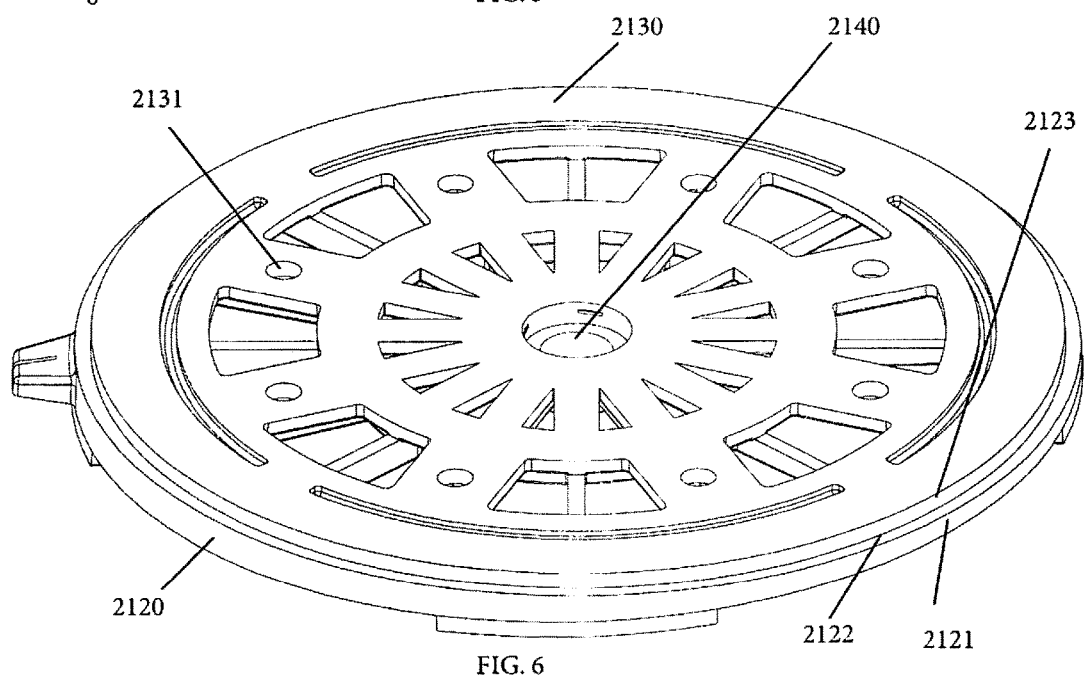
FIG. 6 is a bottom perspective of a slope compensation panel.
Figure 7:
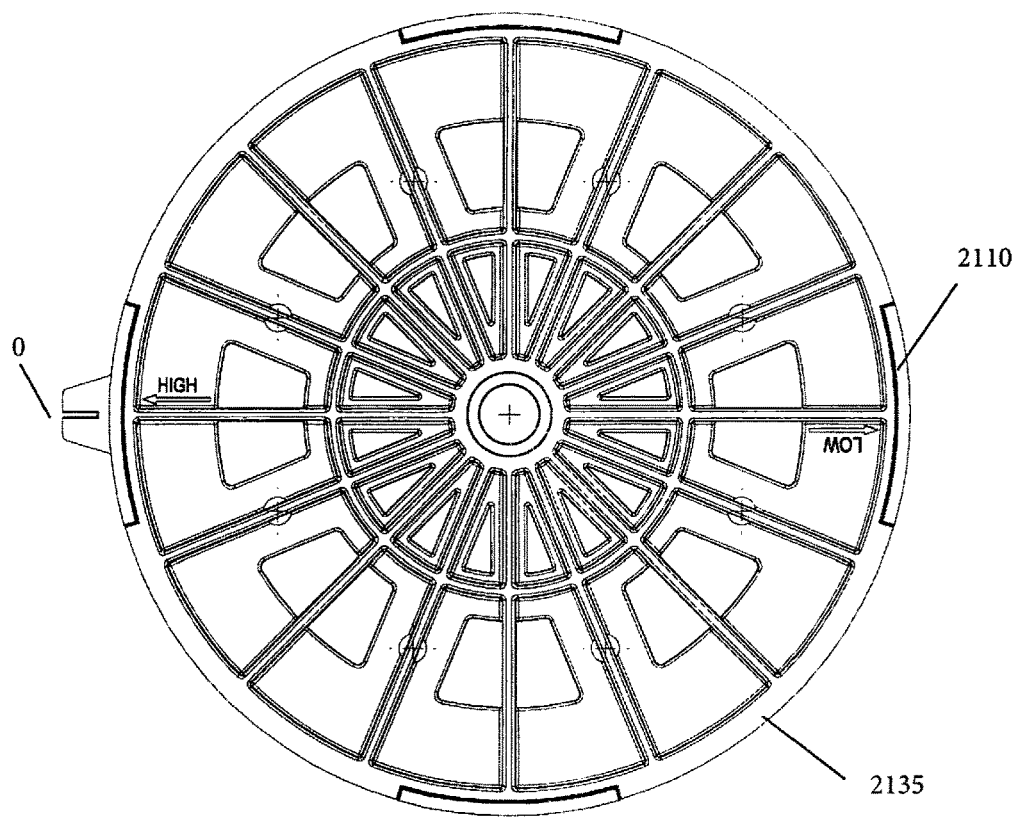
FIG. 7 is a top view of the slope compensation panel.
Figure 8:
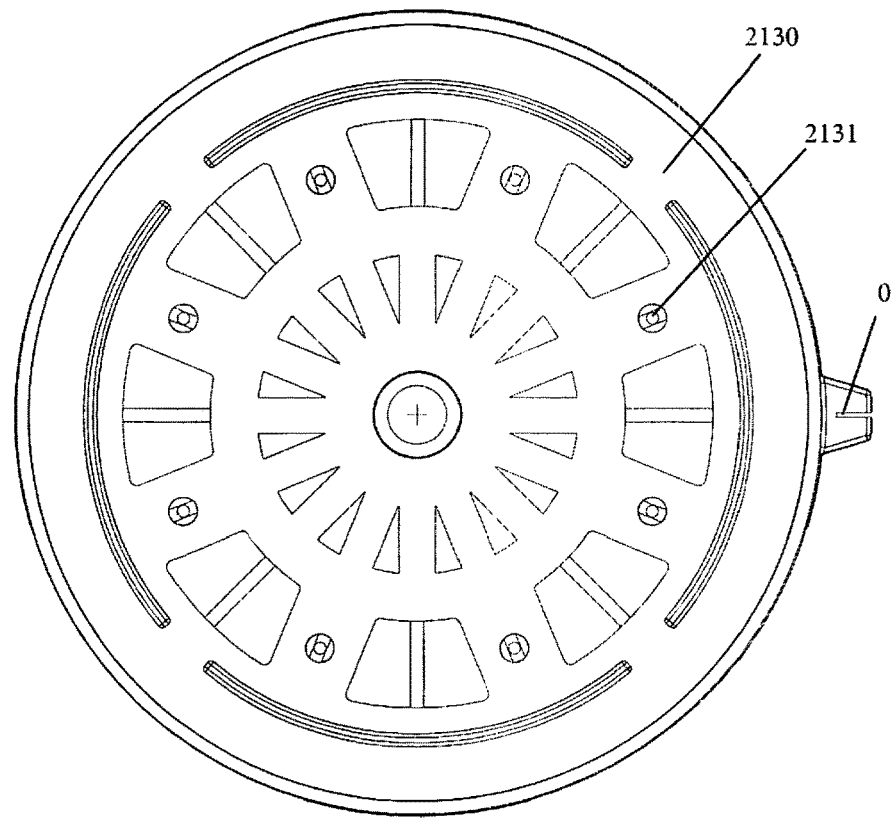
FIG. 8 is a bottom view of the slope compensation panel.

FIGS. 5 and 6 respectively depict bottom and top perspective views of the slope compensation panel 2000. FIGS. 7 through 10 respectively depict top, bottom, left side, and right side view of the compensation panel 2000. As can be seen in the referenced drawings, the panel 2000 is generally a truncated tubiform and may comprise: feet 2110; an outer wall 2120; an established top surface 2130 on at least a part of one end of the truncated tubiform; an established bottom surface 2135 on the underside of the panel 2100; an attachment receptacle 2140 on the top surface 2130; an inner wall 2150 accessible at the unclosed end of the component's 1 truncated tubiform; and the underside 2160 of the surface 2130. FIGS. 5 through 10 suitably illustrate the above referenced components of the depicted panel 2000.

The feet 2110. The feet 2110 are best depicted in FIGS. 5, 6, 7, 9, and 10. As seen in the cited figures, the feet 2110 may generally be a rim or portion thereof or distal projection around the open end of the panels 2000 truncated tubiform. As such, the feet 2110 feature lowe(see,r FIG. 7) surfaces 2112. Operably, the feet 2110, via the lower surface 2112, may uprightly support a panel 2000 on a subsurface when such is positioned with its open end against the subsurface. In an alternate embodiment (see, e.g., FIG. 4, the feet 2110 may be positioned on a base plate). Further, as discussed below, because the panel 2100 is configured to receive/retain items within its tubiform, the foot 2110 may further define a gripping means for facilitating the receipt/retention and/or removal of such items.

Figures 9, 10:
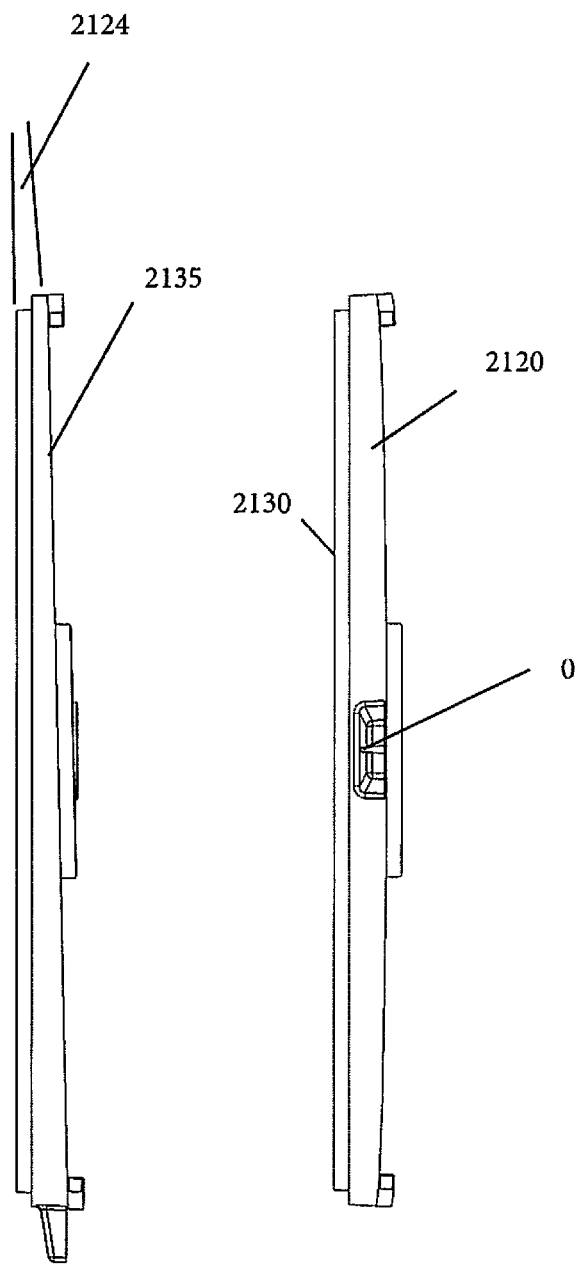
FIG. 9 is a side view of the slope compensation panel.
FIG. 10 is a rear-view of the slope compensation panel.

The outer wall 120. The outer wall 2120 is best depicted in FIGS. 5, 6, 9 and 10. As seen in the figures, the outer wall 2120 may suitably be the external portion of the component's tubiform. As such, the outer wall 2120 generally extends between the foot 2110 and the surface 2130. As is further depicted, the outer wall 2120 is suitably divided at a midpoint by a step 2122 into lower 2121 and upper 2123 sections. As seen in FIGS. 9 and 10, the upper portion 2123 is offset from the lower portion 2121 in terms of the ponent's external diameter to generally define the step 2122 (see also FIG. 5). As further seen in FIGS. 5, 9, and 10, the step 2122. generally defines a plane that is oblique to the plane of the bottom surface 2135. The oblique angle is generally referenced by angle 2124. Preferably, the step 2122 is disposed on the outer wall 2120 at a location that is more t rd the top surface 2130 end of the panel 2000, but the top plane of the surface 2130 should suitably be above the plane of the step 2122 and the plane of the bottom surface 2135.

When a panel is used in isolation, as discussed further below, the top surface 2130, the step 2122, and bottom surface 2135 suitably serve only aesthetic purposes. However, when used in conjunction with a like panel 2100 (i.e., more than one panel 2100) the step 2122 and surface serves as a means for altering the slope of the surface 2130 with respect to a subsurface. This functionality is discussed later below.

The top surface 2130 and bottom surface 2135. The top and bottom surfaces 2130, 2135 are best seen in FIGS. 5, 6, 7, and 8. Referring to these figures, the surface 2130 generally encloses one end of the component's tubiform to establish a load bearing surface. The bottom surface 2135 generally defines a plane on the bottom of the panel 2000. Operably, the top surface 2130 is adapted for receiving a pedestal (see e.g., FIG. 2) whereby the pedestal is supported above a subsurface by the panel. For example, a panel 2000 used in isolation may, after being placed feet 2110 down on a subsurface or base plate, receive a pedestal on its top surface 2130 whereby the paver is above the subsurface.

The attachment receptacle 2140. Referring now to FIGS. 5, 6, 7 and 8, the top surface 2130 features at least one mortise 2131 and an attachment receptacle 2140. The mortise 2131 is generally an aperture or depression around the periphery of the surface 2130. The mortise 2131 are generally for receiving a corresponding Lennon for securing a pedestal to the top surface 2130. The attachment receptacle 214( )is generally a larger, central depression or aperture. The attachment receptacle 2140 is generally for receiving a corresponding extension 2141 from the bottom surface 2135 of a panel that has been stacked on the top surface.

The inner wall 2150. The inner wall 2150 is best viewed in FIG. 6. As seen in the figures, the inner wall 2150 may suitably be the internal portion of the panel's 2000 tubiform. As such, the inner wall 2150 generally extends internally between the foot 2110 and the underside 2135 of the surface 300. As further depicted in the figures, the inner wall 2150 ends at the bottom surface 2135. As further seen in FIGS. 5, 6, 7, and 8 the bottom surface 2135 generally defines a plane that is oblique to the plane of the foot surface 102 and the plane of the top surface 2130. The oblique angle has generally been identified by angle 2124. Preferably, the plane of the feet surface 2111 should suitably be below the plane of the bottom surface 2135.

FIG. 4 depicts two like panels coupled in stacked configurations. The panel 2100, as best seen in FIG. 6, features a receptacle which is generally defined by the inner wall 2150 and is adapted to femininely receive the surface 2130 end of a like panel 2100 until the bottom surface of the receiving panel (2135) interfaces with the top surface 2135 and the feet 2110 interface with the step 2122 of the inserting panel 2100. Referring still to FIGS. 4 through 10, the orientation of the interface of the upper and lower surfaces 2130 and 2135 may be manipulated to change the slope of the top surface 2100 of the receiving panel 2100 with respect the feet plane 2111 of the lower panel 2100. The stated change in slope can be viewed by comparing the rotated pad 2000 of FIG. 4.

Referring first to FIG. 4, the upper and lower panels 2000 on the right are oriented with respect to one another whereby the angles 2124 of the panels are approximately alternate interior angles with respect to the panel interface, the top surface 2130 of the upper panel 2000, and the bottom surface 2135 of the bottom panel. (i.e., the surface 2130 of the upper panel and the bottom surface 2135 of the feet of the bottom panel are parallel and the concentric axes of the panels are aligned). The pedestal on the right of FIG. 4, can generally be obtained by identifying an origin point 0 on the pedestal of both panels and subsequently stacking the components whereby the origin 0 on the first panel 2000 is diametrically opposite (one-hundred and eighty degrees around the axis of the insertive panel 2000) to the origin 0 of the second panel. Further, the angle 2125 in this configuration is suitably zero degrees whereby the surface 2130 of the receiving panel is parallel with the feet surface 2111 of the inserting panel 2100.

Referring now to the left side of 4, the receptive and insertive panels 2000 are oriented with respect to one another whereby the angles 2124 of the insertive and receptive components compound (i.e., have the same vortex point and share a common reference plane). The above described second configuration typically occurs when the origin point 0 on the first panel is aligned with the origin point 0 on the second panel as depicted on the left in FIG. 4. Further, the angle 2125 in this configuration is suitably the sum of angles 2124.

Preferably, rotating the first panel around the axis of the second panel along the interface of the top and bottom surfaces 2130, 2135 of the panels and between the above-identified configurations (i.e., rotating the origin of the first panel with respect to the axis of component 1B) will vary the size of the angle 2125 between the upper surface 2130 of the upper panel and the relative horizontal. Suitably, a maximum degree for the angle 2125 will be obtained in the identified left configuration of FIG. 4, a zero degree will be obtained as identified in the right configuration of FIG. 4, and an intermediate angle may be elected via positioning the origin of the first panel between zero or one hundred eighty degrees relative to the origin and axis of the second component. Referring again to FIGS. 9 and 10, in the present embodiment the angles 2124 are approximately 1 degree whereby the angle 2125 may vary from between 0 and two degrees. Subject thereto, the angles need not be limited to 1 degree, but rather it is preferable that the angles be in a range of about 0 to 5 degrees whereby the resulting angle 2125 may be selected to between a range of about 0 and 10 degrees depending on the circumstances.

The components of the pad 2000 being or composing a paver load bearing apparatus, slipresistant mechanism, noise dampening mechanism, and protective buffering to the substrate, should preferably be fashioned out of materials that are capable of these functions. As the weight of a paver may vary from extrodinarily heavy to very light, the materials which may be is acceptable for fabricating the components will typically vary according to the applicable paver to be supported thereon the pads. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies being or composing a paver load bearing apparatus should preferably be dimensioned to a size that renders the assemblies capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to, a cap having an diameter spanning of 1.36 inches. The dependence of the size and dimensions of the component apply equally well to the other aspects and parts of this disclosure.

A slope compensation panel 2000 comprised of the above disclosed panels may be used to compensate for variations in the slope of the undersurface with regard to the leveling of a paver surface via a pedestal. For example, the method may comprise the following steps: obtaining a plurality of components comprising a structure having an undersurface and a top surface, said under surface configured to interface with the top surface of a like component; insertably coupling two of said components whereby the under surface of the receptive component interfaces with the top surface of the insertive component; manipulating the orientation of the insertive component with respect to the receptive component along the interface; and, providing a pedestal to the support surface.

Figure 21:
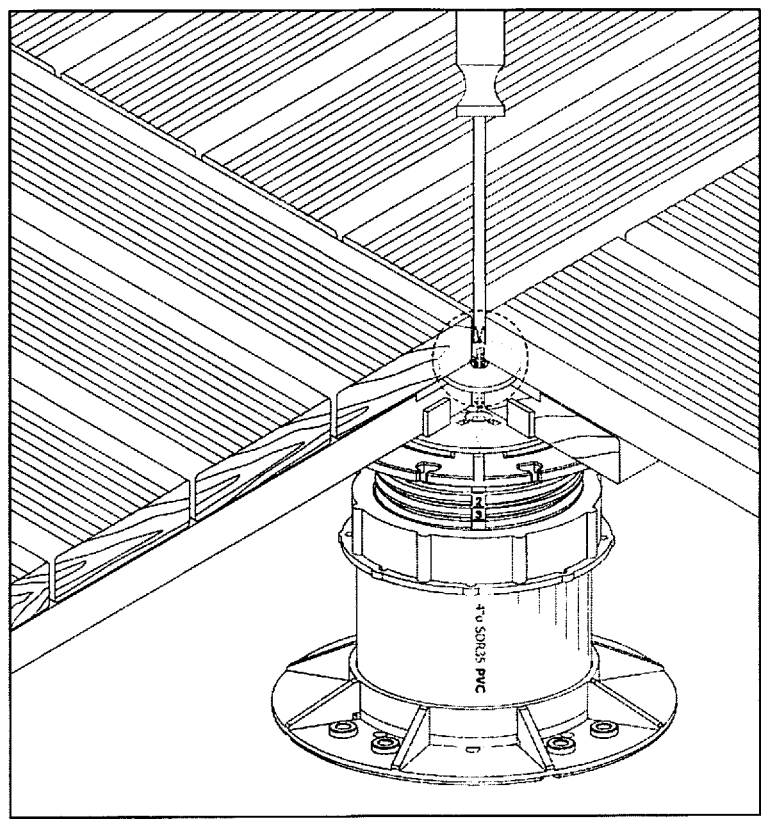
FIG. 21 is an environmental view of the locking disk.
Figure 22:
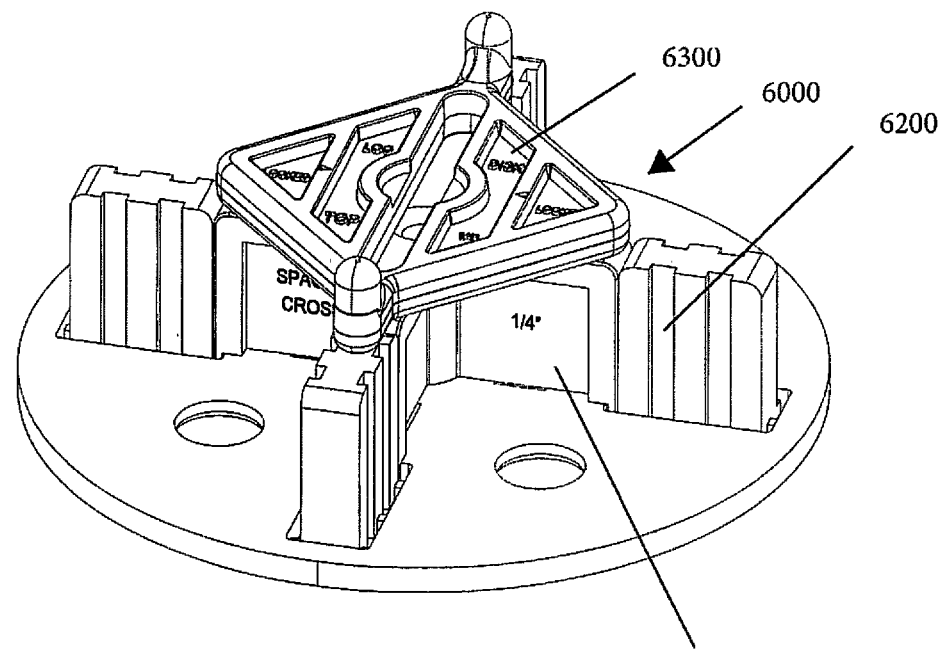
FIG. 22 is a perspective view of a locking slider.

As described to above, the disclosed assembly may be used for establishing a level paver surface over a sloped subsurface. FIG. 21 depicts a side view of the assembly 2000 and illustrates one mode establishing such leveled surface. Referring first to FIGS. 21A and 21B, the threaded insert 3200 suitably features a concave surface 3240 and the cap 3200 suitably features a convex surface 3230 whereby the slope of the paver support surface 3230 may be skewed in any direction relative to the plane of the foot 3110 of the base 3100 via sliding the convex surface 3230 of the cap 3200 along the concave surface 3240 of the insert 3200. In one embodiment, the paver support surfaces 3210 of four assemblies 4000 positioned at the four corners of a square paver will self level with respect to one another under the weight of the pavers installed thereon the assemblies 2000.

Figure 11:
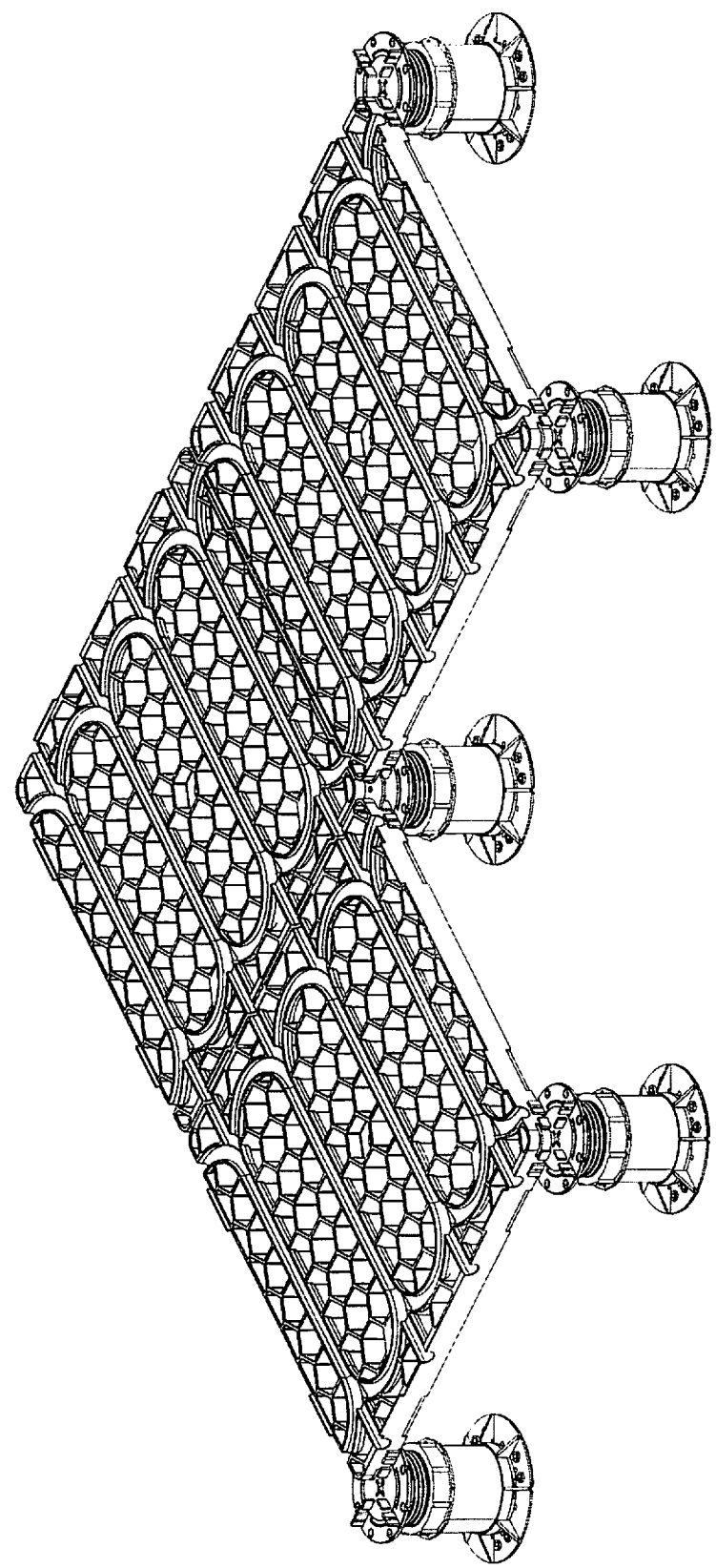
FIG. 11 is an environmental view of a pedestal array supporting a paver support pan
Figure 12:
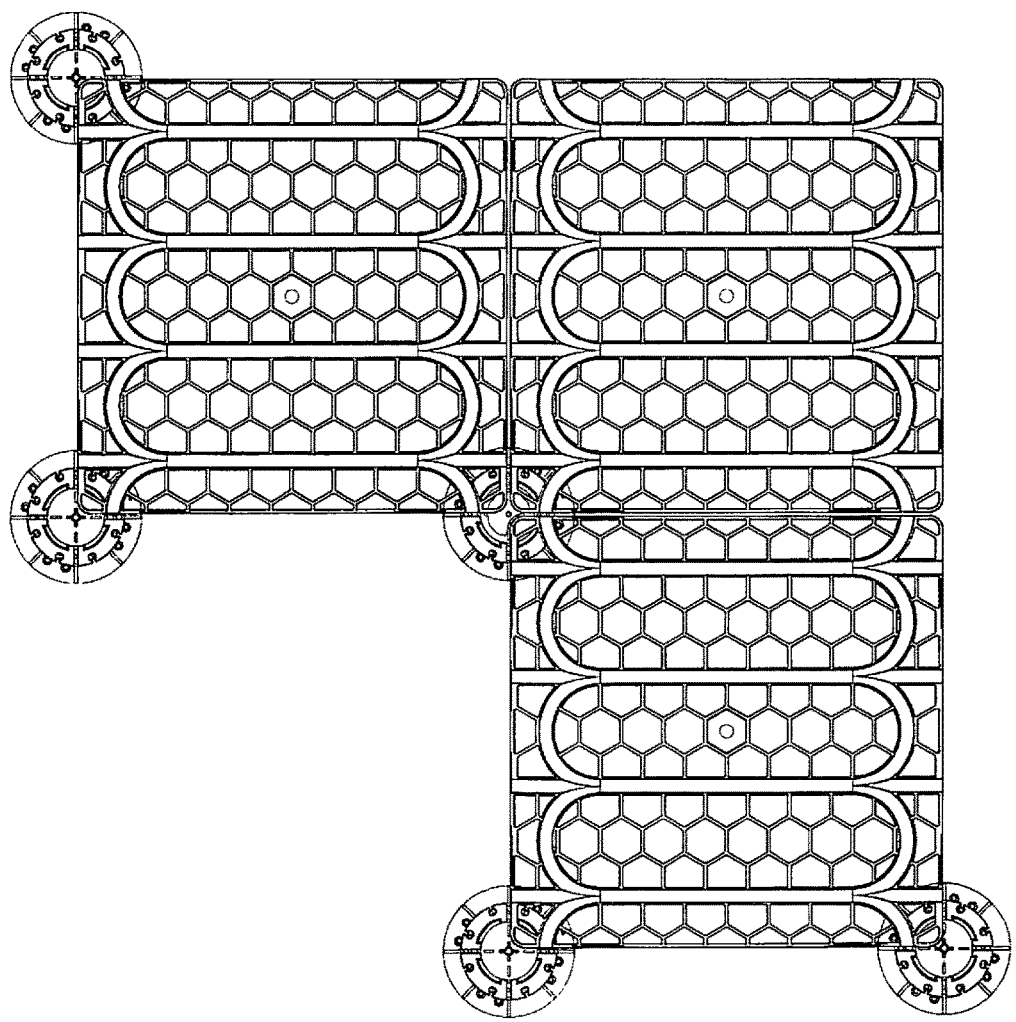
FIG. 12 is a top view of FIG. 11.
Figure 13:
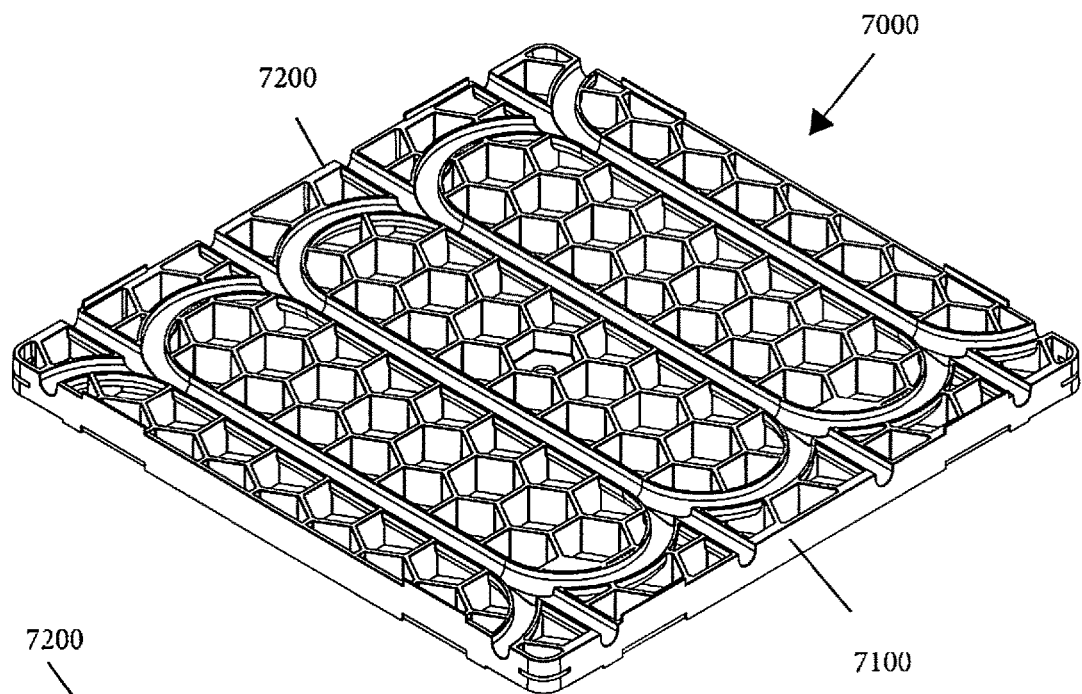
FIG. 13 is a perspective view of a paver support panel.
Figure 14:
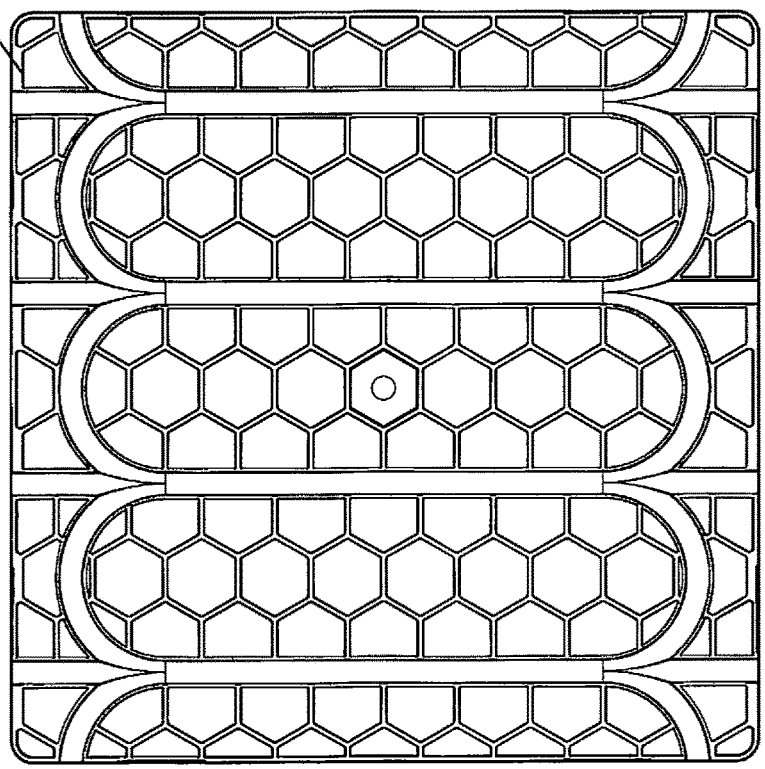
FIG. 14 is a top view of the paver support panel.
Figure 14A:
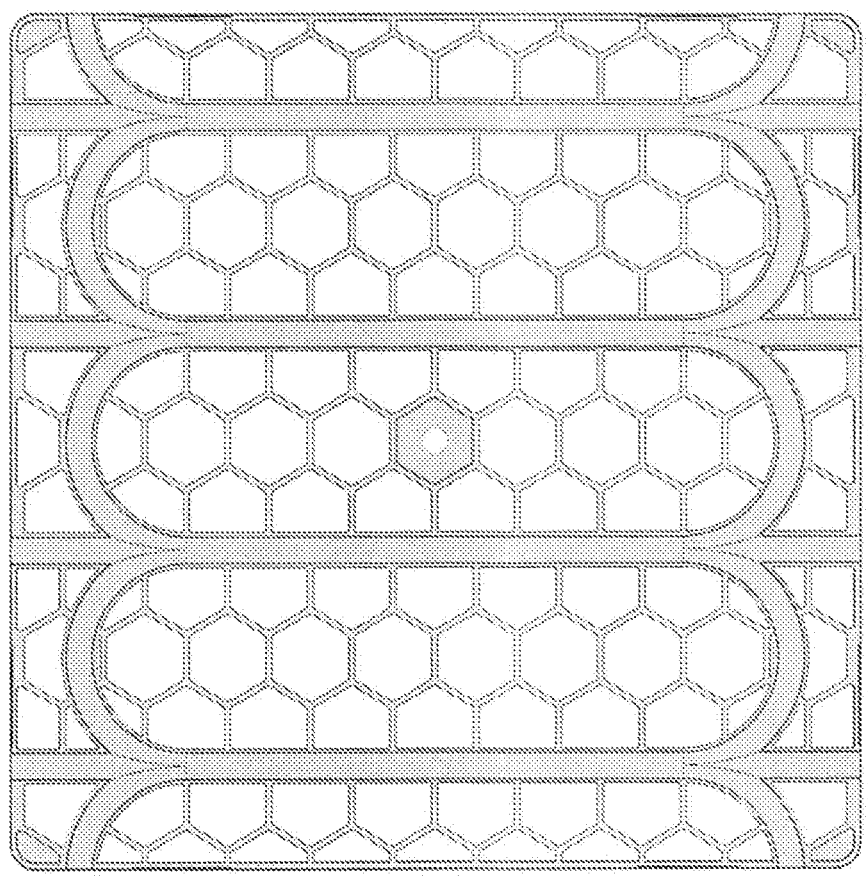
FIG. 14A is a top view of the paver support panel.

FIGS. 11 and 12 depict a plurality of trays 7000 installed on top of a plurality of paver pedestals. FIG. 13 is a perspective view of a tray 7000, which is an intermediate paver support surface. FIG. 14 is a top view of the tray 7000 of FIG. 13. In operation, a tray 7000 may be provided to a paver pedestal in the manner of a large paver and as shown in FIGS. 11 and 12 and small pavers deposited thereon in an array. In an alternate embodiment, the tray 7000 may be placed directly on the subsurface to provide a larger footprint for said small pavers.

Figure 19:
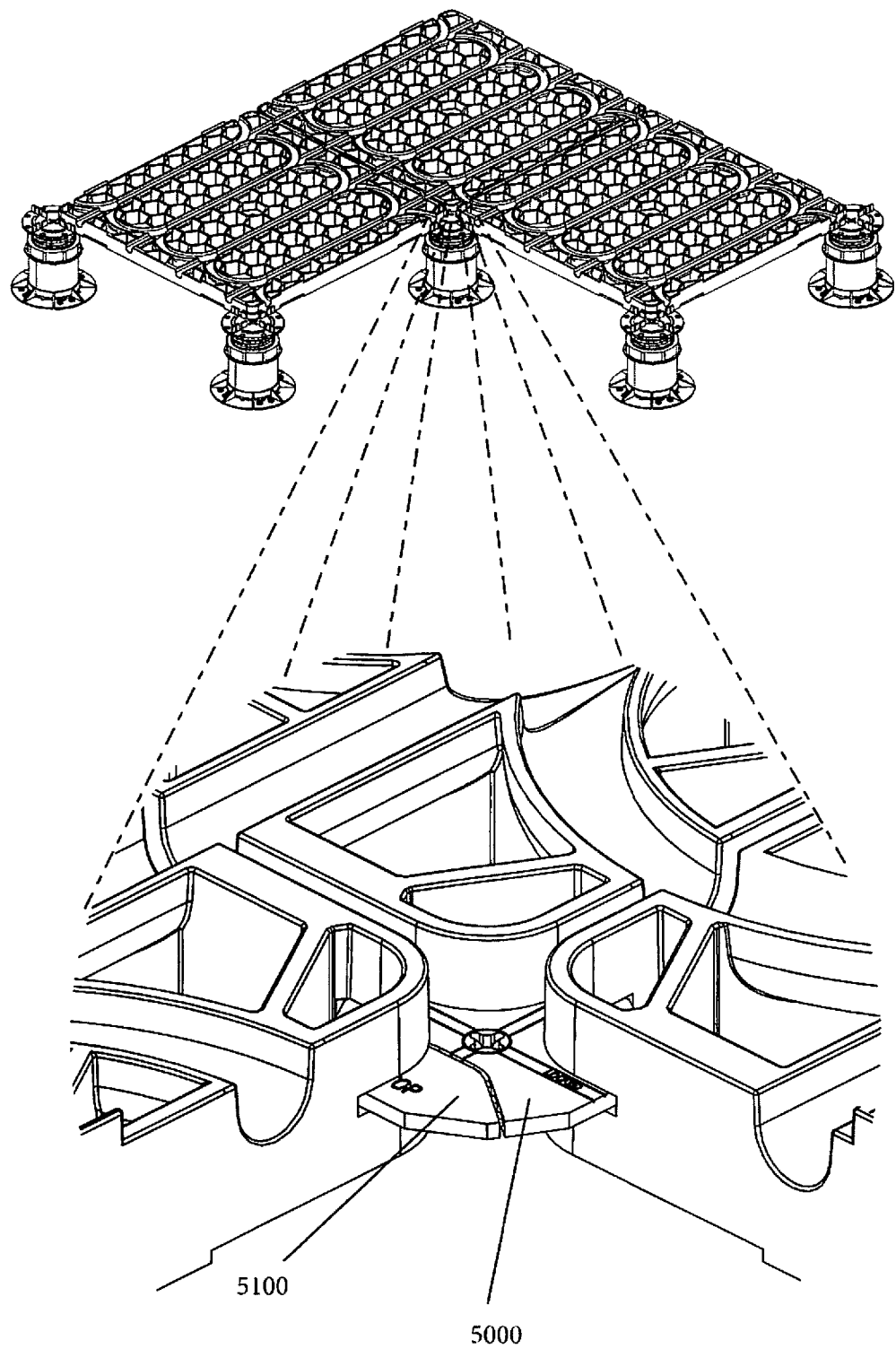
FIG. 19 is an environmental view of a locking disk.

Referring to FIG. 13, the tray 7000 is generally square and defined by a frame 7100 and a lattice 7200 having a plurality of spaces. As shown in FIGS. 13 and 14, the tray 7000 features a tubing track 7300 and all of the spaces in the lattice 7200 may define an aperture through the tray 7000 except the center space hexagon 7310 (See the shaded portion of FIG. 14). In one embodiment, the frame 7100 has holes or other apertures in its corner for securement to a pedestal as described in U.S. Pat. No. 7,140,156 (issued Nov. 28, 2006). As discussed later, each corner of the tray 7000 features a slot for receiving a locking disk or a locking slider (see FIG. 19).

It should he noted: although the locking tray 700( )is depicted as a square, any number of suitable shapes may be used. Such shapes will be known by those of skill in the art, and may include, but should not be limited to, triangle squares, circles, ovals, rectangles and other polygonal shapes. Also, the tray should be constructed of suitable material. Such materials will be readily known to one of skill in the art, and may include, without being limited to: plastics, polymers, PVC, polypropylene, polyethylene; metals; woods; ceramics; composites and other synthetic or natural materials whether molded; extruded; stamped or otherwise fabricated. Finally, it should further be noted that the dimensions of the tray 7000 will vary with the size of the paver to be retained by the pedestal. In particular, the height of the projections may vary depending on the thickness of a paver, e.g. in a range of about 0 to 100 inches.

Figure 15:
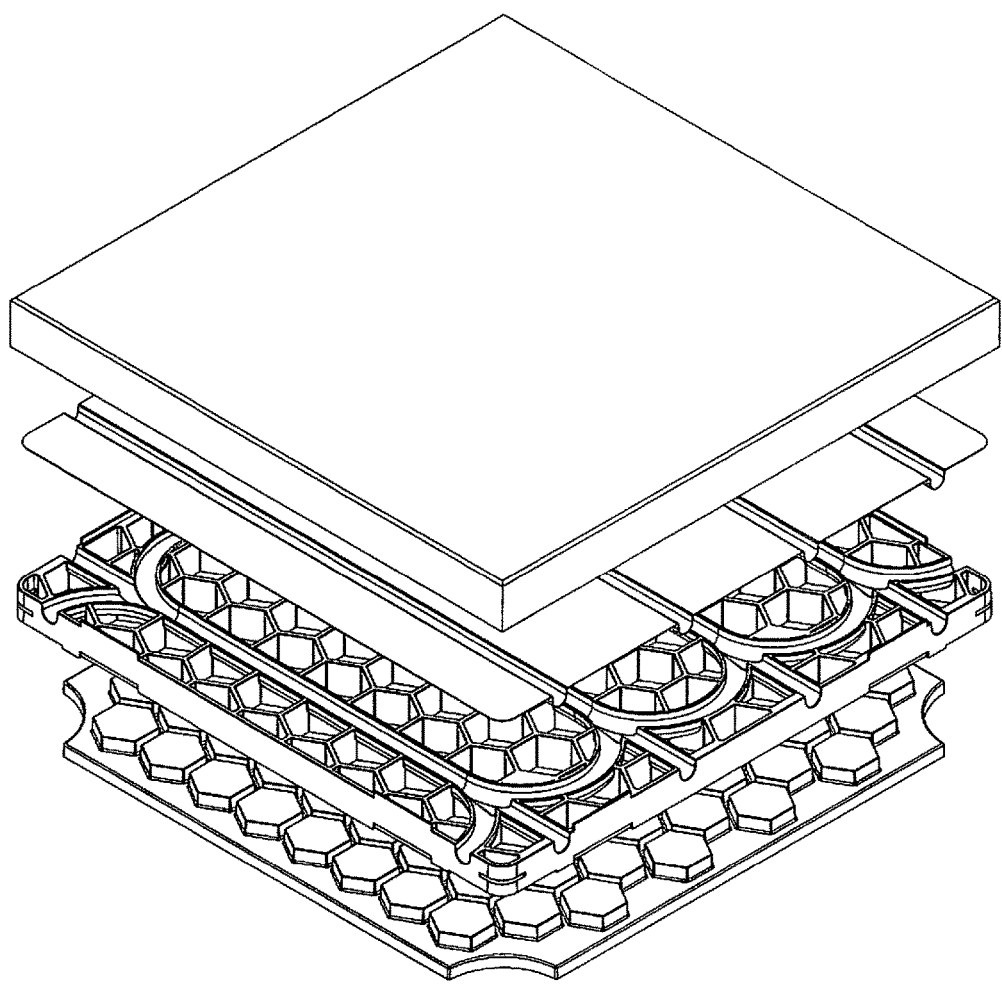
FIG. 15 is an exploded view of a heat exchanger paver support panel.
Figure 16:
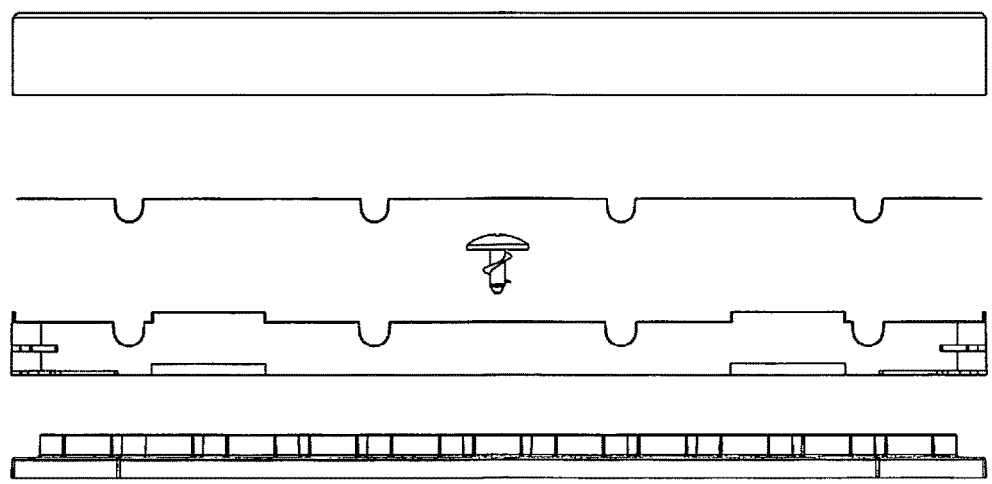
FIG. 16 is an exploded side view of FIG. 15.
Figure 17:
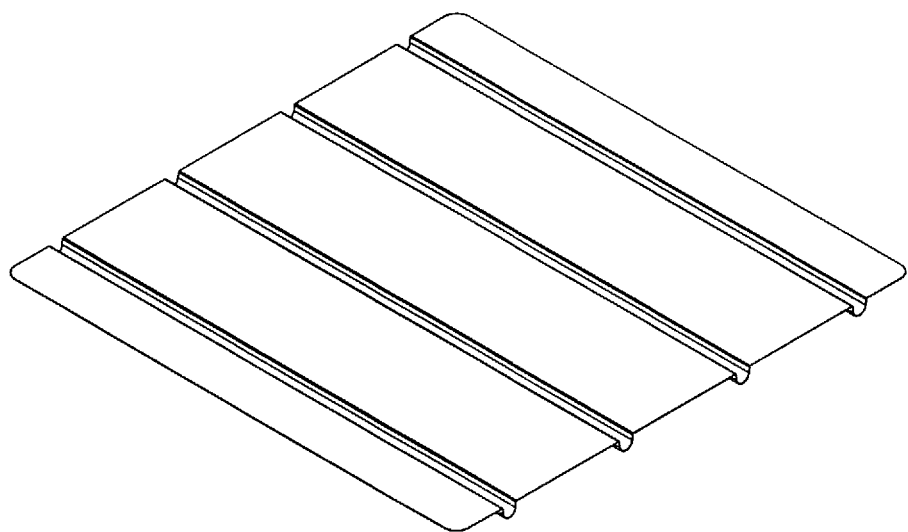
FIG. 17 is a perspective view of an aluminum tray.
Figure 18:
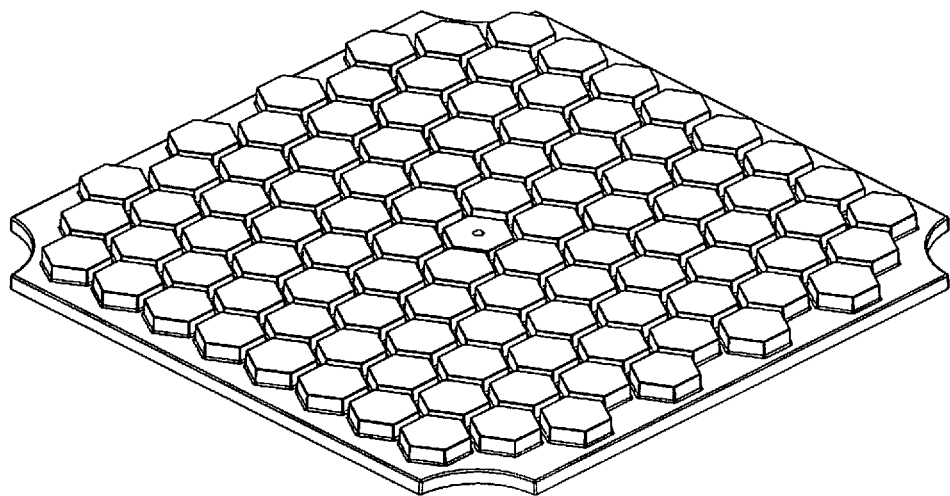
FIG. 18 is a perspective view of a foam tray.

In a preferred embodiment, the tray 7000 may be used to provide a heat exchanger to a paver for heating or cooling a paver surface. FIG. 15 is an exploded view of a tray with a heat exchange configuration. FIG. 16 is a side view of the exploded tray 7000 configuration. As shown, insulation 7400 may be provided to the bottom of the frame 7100 and secured to the tray 7000 via a screw with large threads for gripping the insulation and retaining the insulation against the tray 7000. Referring to FIG. 18, the insulation 74000 is a pad with protrusions 7402. that insert into the apertures of the lattice. Therefore, the shape of the protrusions will match the shape of the apertures. An aluminum or other heat conducting metal plate 7500 with tubing lanes 7502 may suitably be positioned on top of the tray so that the tubing lanes are disposed within the tubing track 7300 of the tray 7000 (see FIG. 19). Tubing (not shown) may be provided through the tubing lanes 7502 and connected to a hot or cold water source and discharge. Finally a paver may be positioned above the tubing and aluminum plate.

When constructed as shown in FIGS. 15 and 16, the tray 7000 operates as a heat exchanger for the paver. For cooling a paver surface, cool water may be provided to the tubing so that heat may be conducted through the paver surface, along the heat conducting plate and into the water. For heating a paver surface, hot water may be provided to the tubing for the opposite heat flow. Suitably, the insulation keeps heat from being lost below the tray 7000.

Although water through tubing is described as the heat transfer mechanism, in an alternate embodiment, a refrigeration unit may be applied to the tray. in a preferred embodiment, the refrigeration unit is similar to the one disclosed in U.S. Pat. Pub. No. 2012/0298331 (published Nov. 29, 2012). In a preferred embodiment, the refrigeration will comprise an aluminum plate with capillary heat exchangers, wherein the plate features male inserts that will register in the apertures of tray. In other words, the system may be outfitted with a heat exchanging aluminum plate or heat exchanging panel that will fit and align with the hexagonal structures of the tray.

Figure 20:
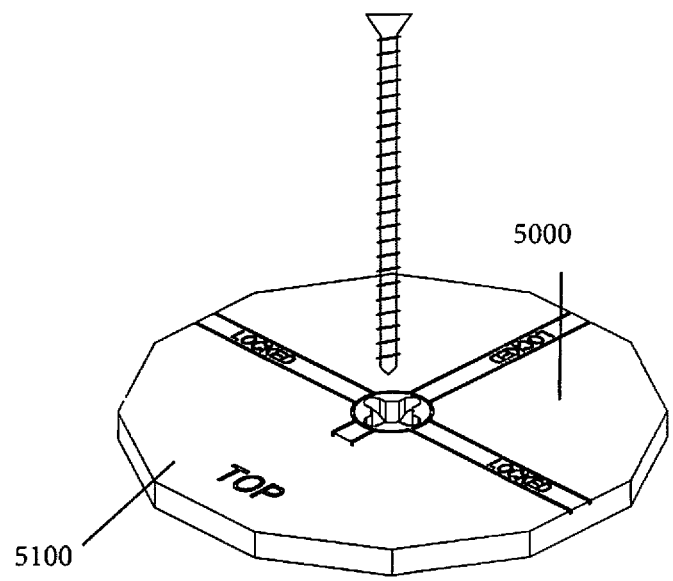
FIG. 20 is a perspective of a locking disk.

FIGS. 20 and 21 are respectively a view of a locking disk 5000 for securing tiles and an environmental view of the same. As shown in FIG. 20, the disk is circular and features a screw for anchoring the disk 5000 to a pedestal. As shown, the disk 5000 suitably features a break-away portion 5100, with perforation so that said portion 5100 may be broken off or folded away. In general, the disk 5000 may be inserted into corner slots of four adjacent tiles and secured to a pedestal, as shown in FIG. 21. Suitably, the disk 5000 feature indicia so that a user may, by looking between two adjacent tiles, identify when the disk is properly positioned. In one embodiment, the disk may feature teeth for a screwdriver (Phillips or flat head) so that the disk 5000 can be turned when in installed between pavers. A screw may be provided through the center of the disk for anchoring the disk to the pedestal. When the break-away portion of the disk is broken, bent or folded along the perforations, the locking disk suitably operates like the anchoring washer disclosed by U.S. Pat. No. 8,302,356 (issued Nov. 6, 2012), and that patent is hereby incorporated by reference. In a preferred embodiment, the disk 5000 is constructed of plastic.

Instead of a locking disk or anchoring pavers or tiles to the support surface of a pedestal, sliding attachment may be used for that purpose. FIGS. 22 through 25 respectively illustrate perspective, alternate perspective, top, and side views of a locking slider attachment 6000 for a paver support surface of a pedestal. Referring to these figures, the attachment 6000 is generally a disc adapted for placement within an attachment receptacle of a pedestal's paver support surface whereby the disc and pedestal surface establish a paver support plane. The attachment 6000 is preferably retained within the receptacle via the locking means 6100 deflectively inserting into an aperture until its nibs snap into restrictive interface with the rim of the aperture for restricting the removal of the attachment 6000. As seen in FIGS. 22 through 25 the attachment features projections 6200 that operate to divide the surface 300 into evenly spaced paver receptacles whereby pavers provided to the pedestal may be uniformly oriented and spaced. For example, a paver may be supported above a subsurface via: positioning a pedestal on a subsurface; installing the attachment 6000 on the pedestal's support surface in the manner disclosed above, rotating the attachment 6000 until the orientation of the projections 6200 align with planned paver surface, and providing a corner of the paver to the surface support surface whereby the sides of the paver abut the projections 6200. See also FIG. 26 wherein the depicted pavers 10 are supported, spaced, and oriented by a component fitted with the attachment 6000. In a preferred embodiment, the projections 6200 define a spacer cross 6400 for dividing the paver support surface of a pedestal into quadrants.

Figure 23:
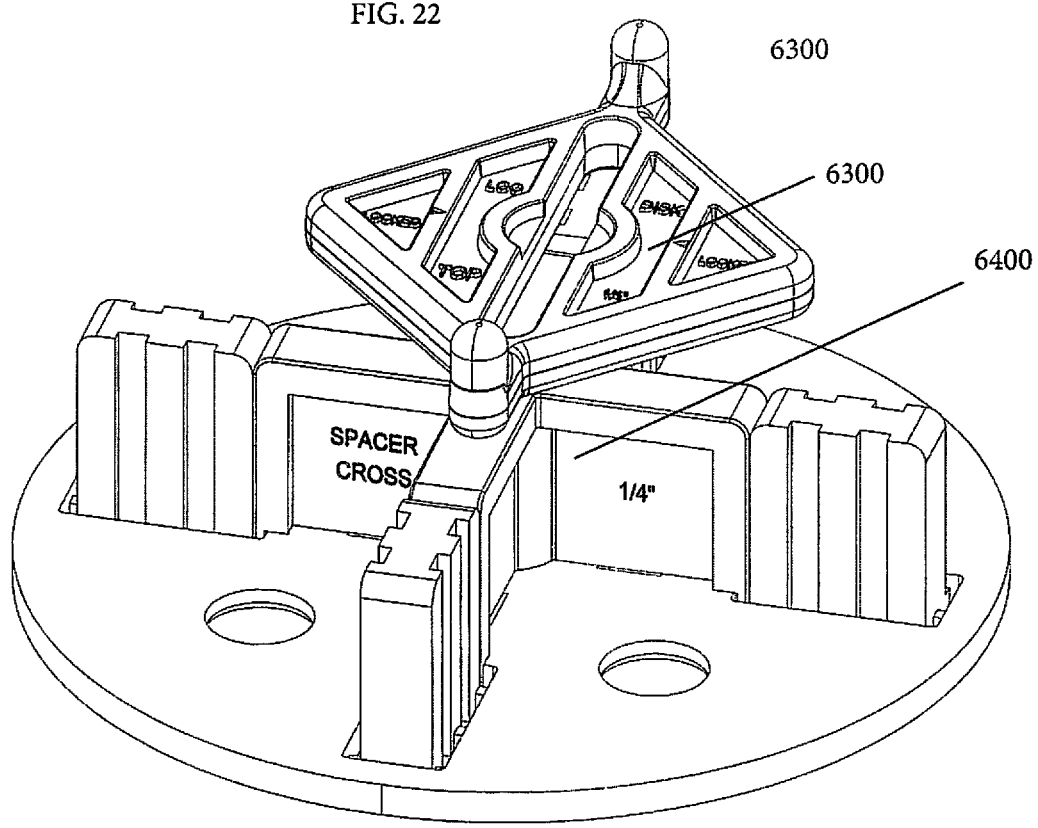
FIG. 23 is a perspective view of a locking slider.
Figure 24:
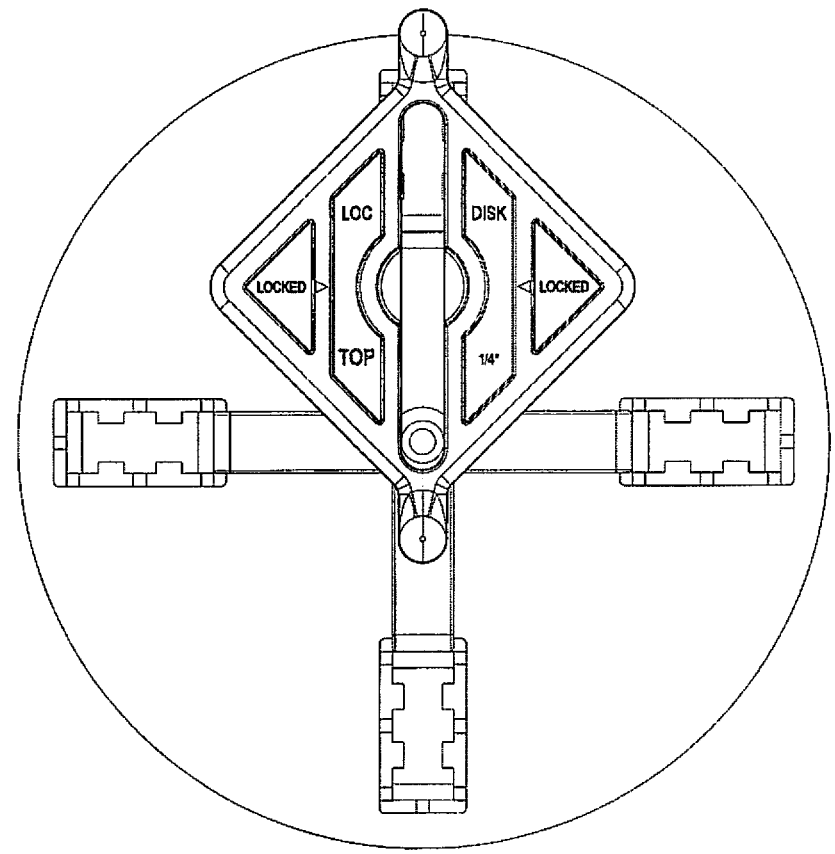
FIG. 24 is a top view of a locking slider.
Figure 25:
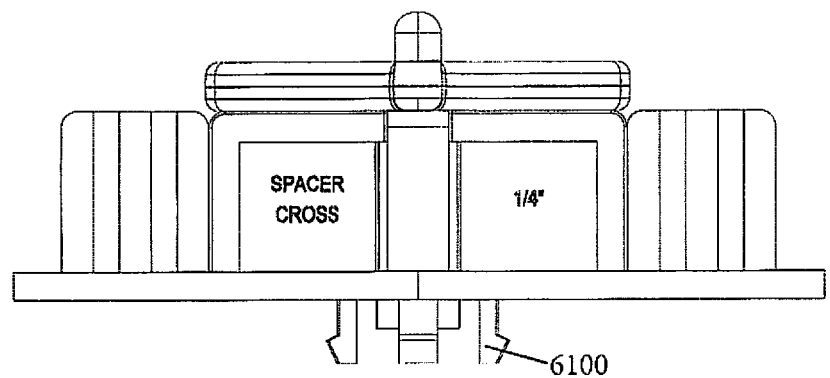
FIG. 25 is a side view of a locking slider.
Figure 26:
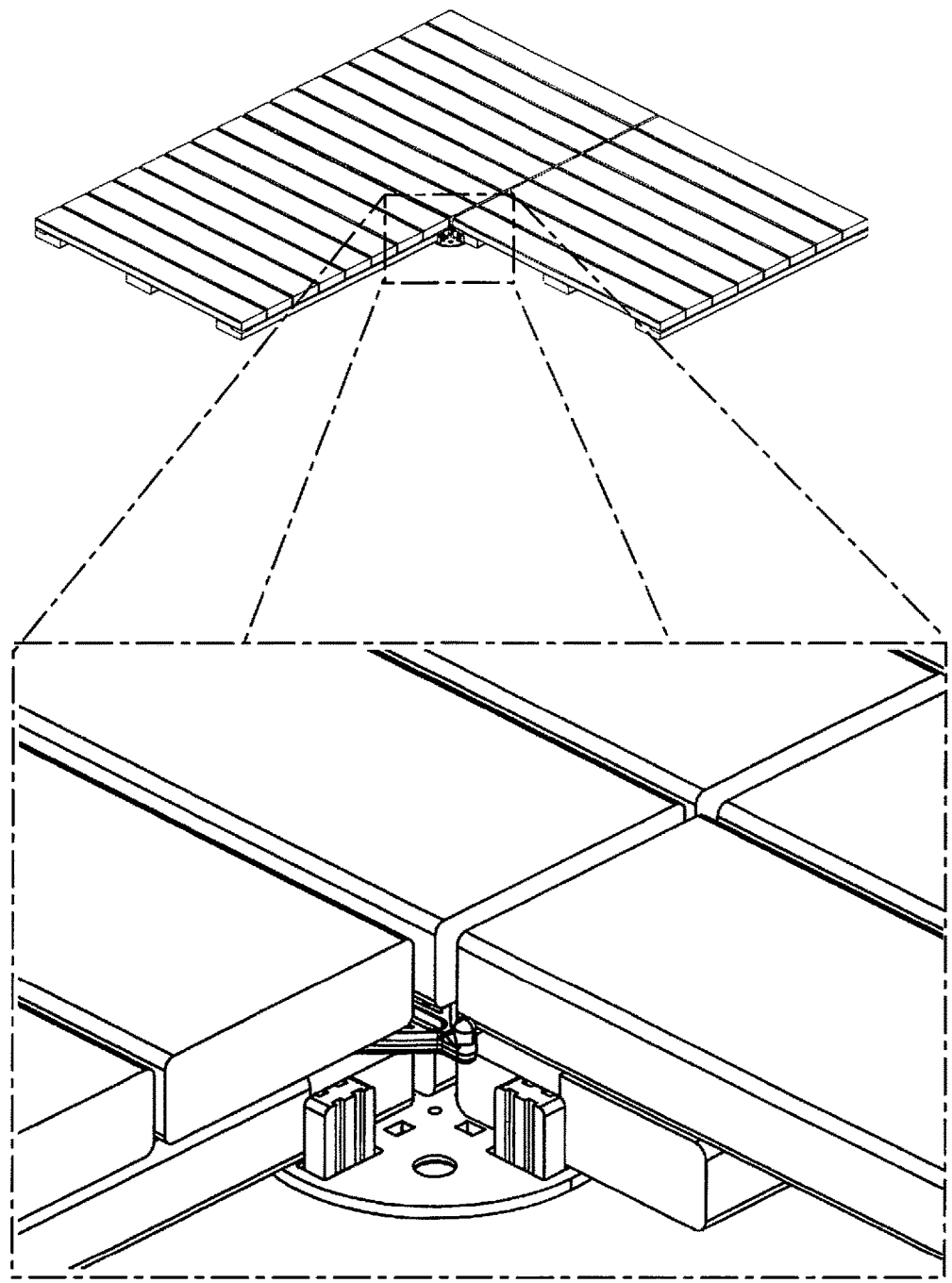
FIG. 26 is an environmental view of a locking slider.

Referring now to FIG. 26, a slider 6300 may suitably be positioned on the projections 6200 so that the slider may suitably he provided to a slot in a tray corner whereby the tray is anchored to the pedestal. Wither reference to FIGS. 22 and 23, the slider 6300 may be slidable between three locations: (1) a first side of the spacer cross 6400 (FIG. 23); (2) the center of the spacer cross 6400 (FIG. 22); and (3) the opposite side of the spacer cross 6400 (opposite of FIG. 23). Referring again to FIG. 26, two pavers may he provided to the first side of the paver cross 6400, the slider slid into the first position, two pavers may be placed on the other side of the paver cross 6400 and the slider 6300 slid to the center position hereby the pavers are anchored to the pedestal (FIG. 26).

It should be noted that the dimensions of the projections 6200, slider 6300 and spacer cross 6400 will vary depending on the desired paver spacing for the planned paver surface. It should be noted: although the locking means is depicted as a projection with a nib for restrictive interaction with an aperture rim, any number of suitable locking means may be used. Such locking means will be known by those of skill in the art, and may include, but should not be limited to, snaps, buttons, bolts; screw and nut mechanisms, and the like (e.g., a screw projecting downward for threaded entry into the aperture 117). Such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated. Finally, it should further be noted that, the dimensions of the attachment 6000 will vary with the size of the paver to be retained by the pedestal. In particular, the height of the projections may vary depending on the thickness of a paver, e.g. in a range of about 0 to 20 inches.

An apparatus comprised of an above disclosed component may be used to compensate for variations in the slope of the undersurface with regard to the leveling of a paver surface. It should be noted that FIGS. 1 through 26 and the associated description are of illustrative importance only. In other words, the depiction and descriptions of the present invention should not be construed as limiting of the subject matter in this application. Additional modifications may become apparent to one skilled in the art after reading this disclosure.

The following disclosure describes embodiments of assemblies of components for facilitating the elevated and leveled placement of a paver array onto a subsurface. Suitably, the disclosed assemblies may be apparatus for supporting a paver surface or may interact with assembly components for establishing an elevated and slope adjusted surface, Yet still, the assemblies may suitably incorporate a riser to produce an apparatus for elevating and leveling a paver surface. The disclosed assemblies may receive attachments for orienting and spacing an array of pavers to be supported by the assemblage, Other embodiments of the present disclosure may be methods of establishing a paver surface using the assemblies, The details of the preferable assemblies are best disclosed by reference to FIGS. 27A through 55D.

Figure 27A:
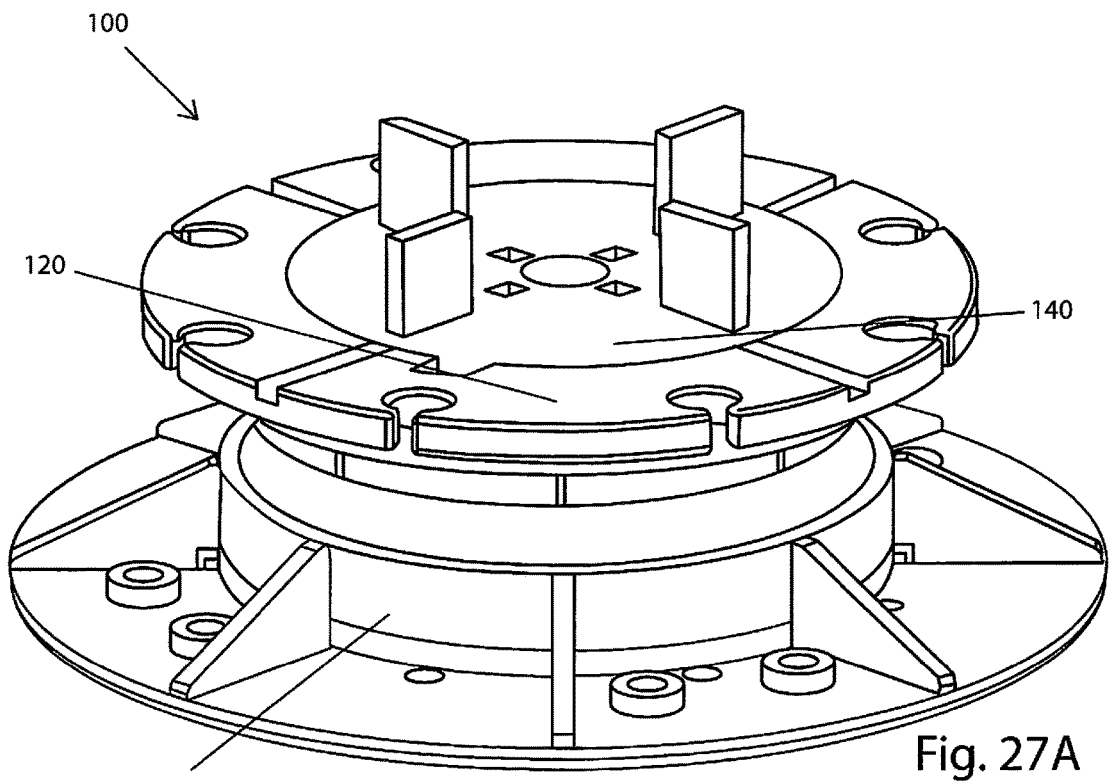
FIG. 27A is a perspective view of an assembly.
Figure 27B:
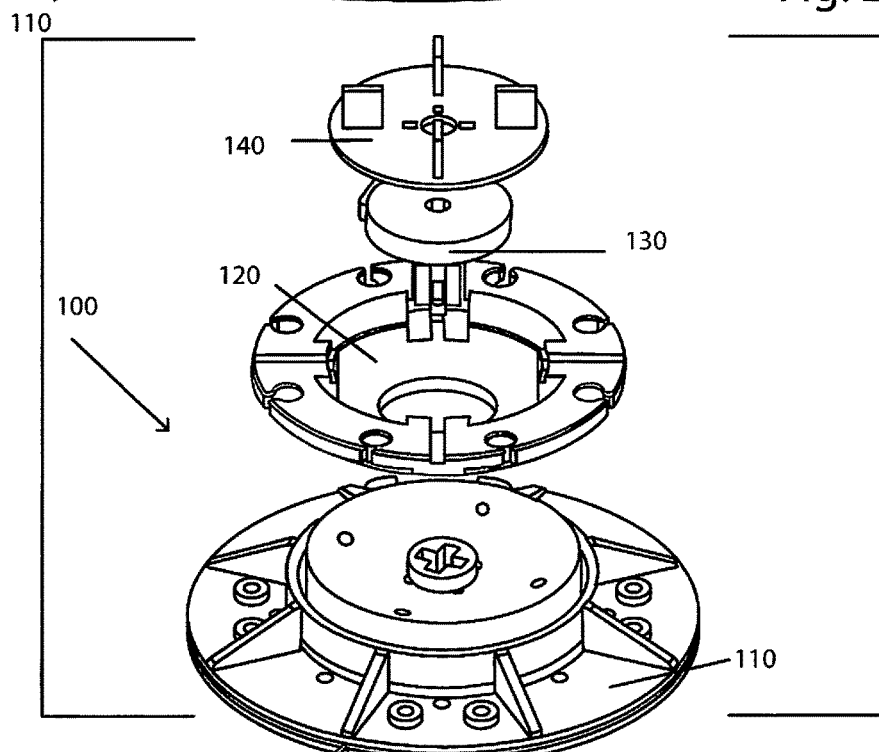
FIG. 27B is an exploded view of the assembly.

FIGS. 27A and 27B depict a first embodiment of a pedestal or a assembly 100 for facilitating the elevated and leveled placement of a paver array onto a substrate. FIG. 27A is a perspective view of the pedestal assembly 100 and FIG. 27B is an exploded view of the same. As seen in the figures pedestal the assembly 100 comprises: a base 110; a cap 120; a key 130; and, a tile spacer 140.

FIGS. 28A through 28E depict different views of a preferable embodiment of the base 110 component of the apparatus 100 depicted in FIGS. 27A and 27B. Specifically, FIGS. 28A through 28E respectively depict a top perspective, bottom perspective, top plan, bottom plan, and side profile view of the base 110. As can be seen in the referenced drawings, the base is generally a truncated cylinder and may comprise: a foot 111; a support cylinder 112; a riser is socket 113 around the cylinder; a concave surface 114 defining the top of the cylinder 112; and a key socket 115 through the concave surface 114 along the axis of the cylinder 112.

Figure 28A:
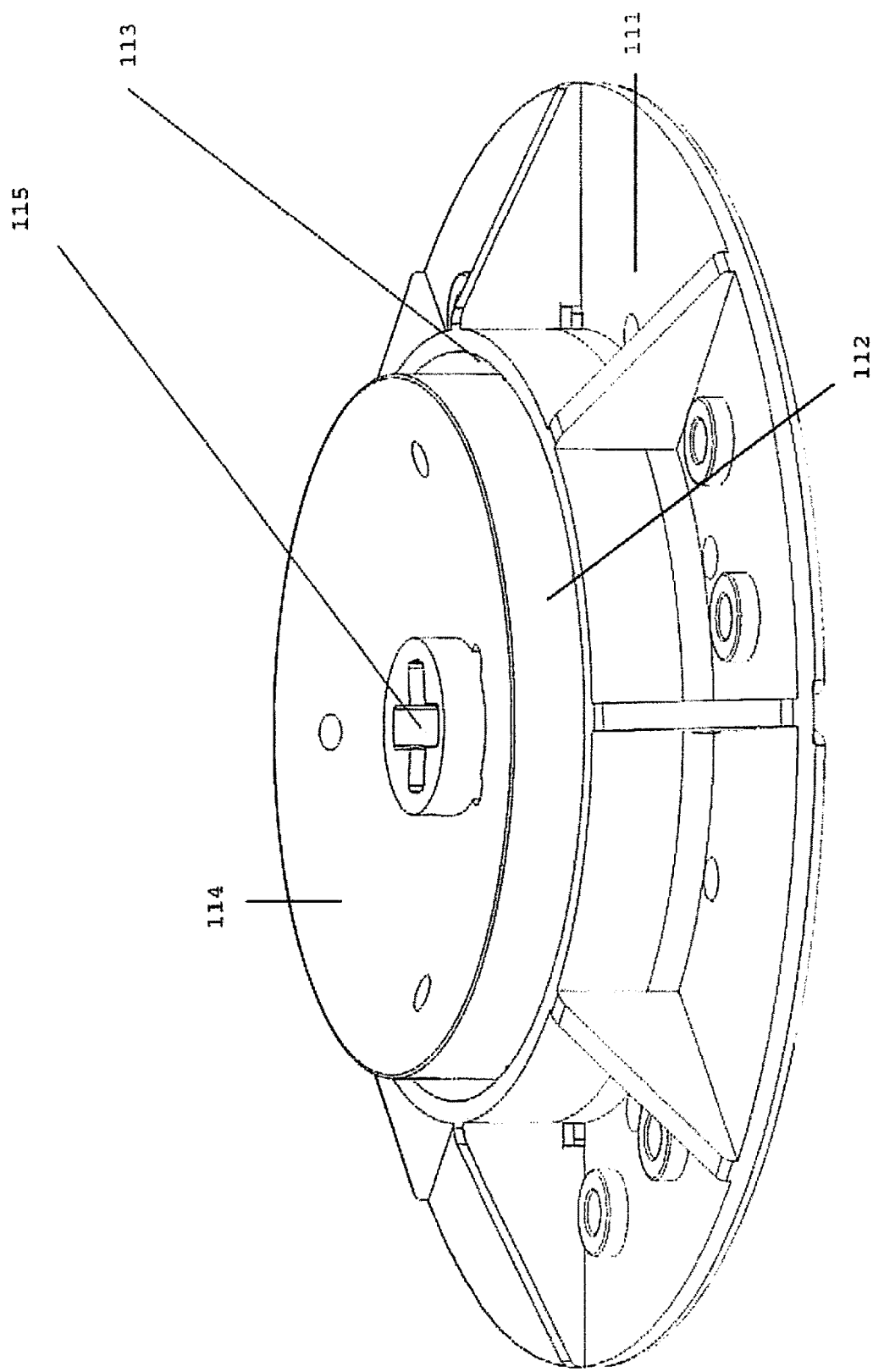
FIG. 28A is a top perspective view of a base.
Figure 28B:
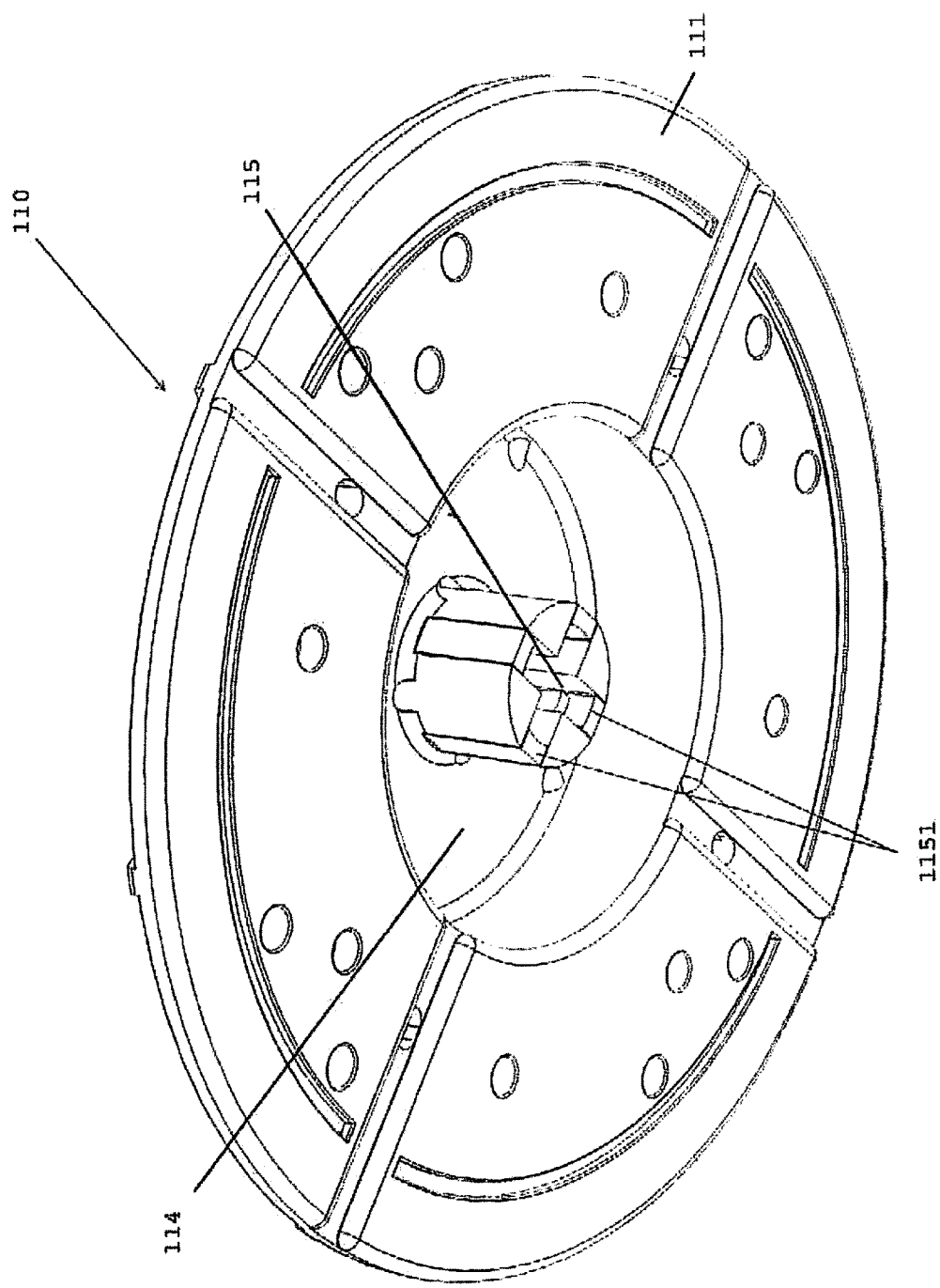
FIG. 28B is a bottom perspective view of the base.
Figure 28C:
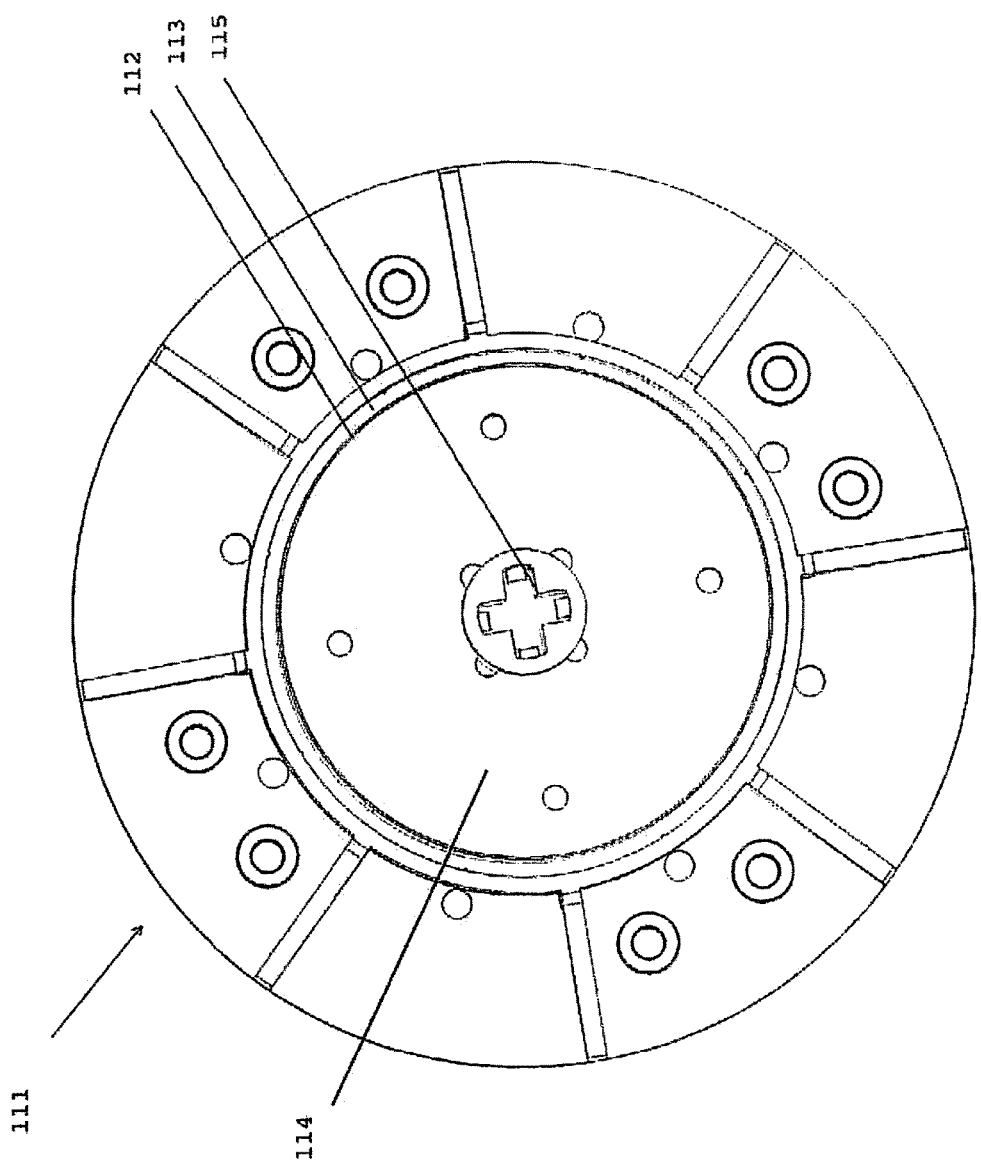
FIG. 28C is a top plan view of the base.

FIGS. 29A through 29E depict different views of a preferable embodiment of the cap 120 component of the apparatus 100 depicted in FIGS. 27A and 28B. Specifically, FIGS. 29A through 29E respectively depict a top perspective, bottom perspective, top plan, bottom plan, and side profile view of the cap 120. As can be seen in the referenced drawings, the cap 12.0 is generally a disc with a convex surface on its bottom side. Still referring to FIGS. 29A through 29E, the cap 120 may comprise: a paver support surface 121; a cylinder 122 extending from the bottom of the paver support surface 121; a convex surface 123 defining the bottom of the cylinder 122; a tile spacer receptacle 124 that is coaxial to the tile support surface 121; and, a key socket access hole 125 through the convex surface 114 along the axis of the cylinder 122.

Figure 30A:
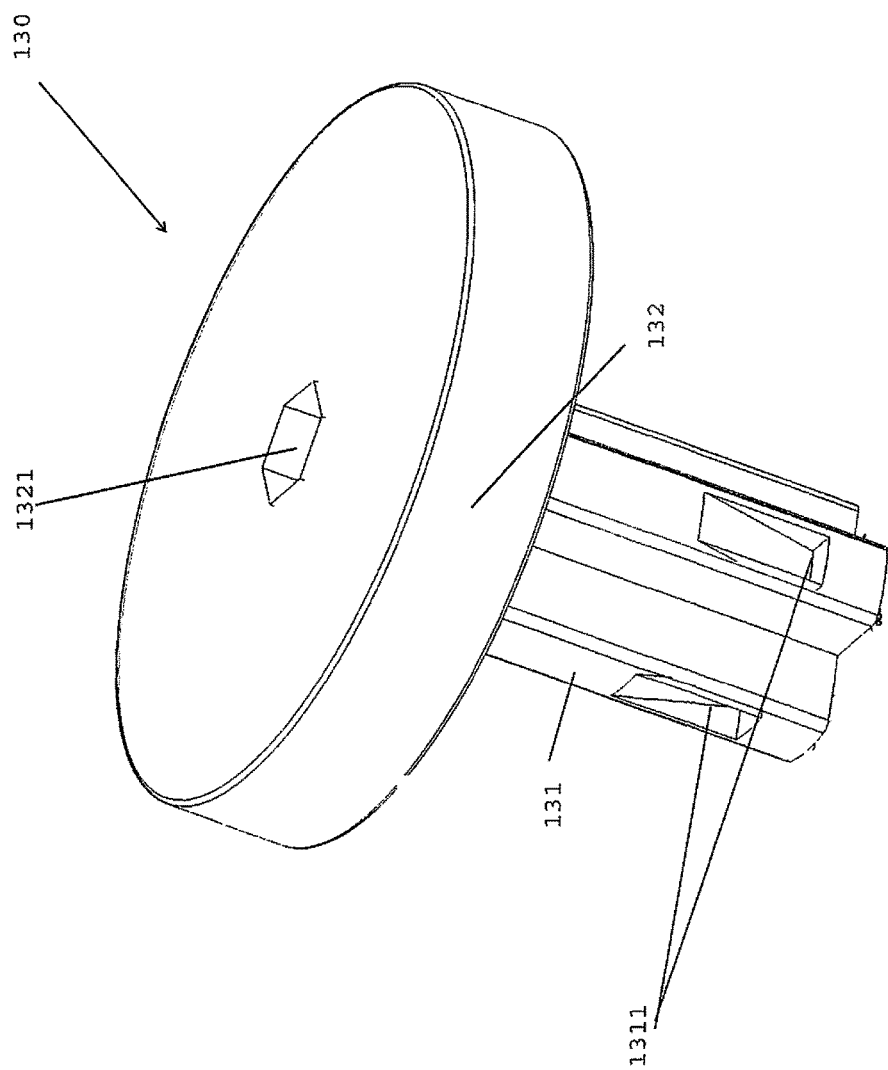
FIG. 30A is a top perspective view of a key.
Figure 30B:
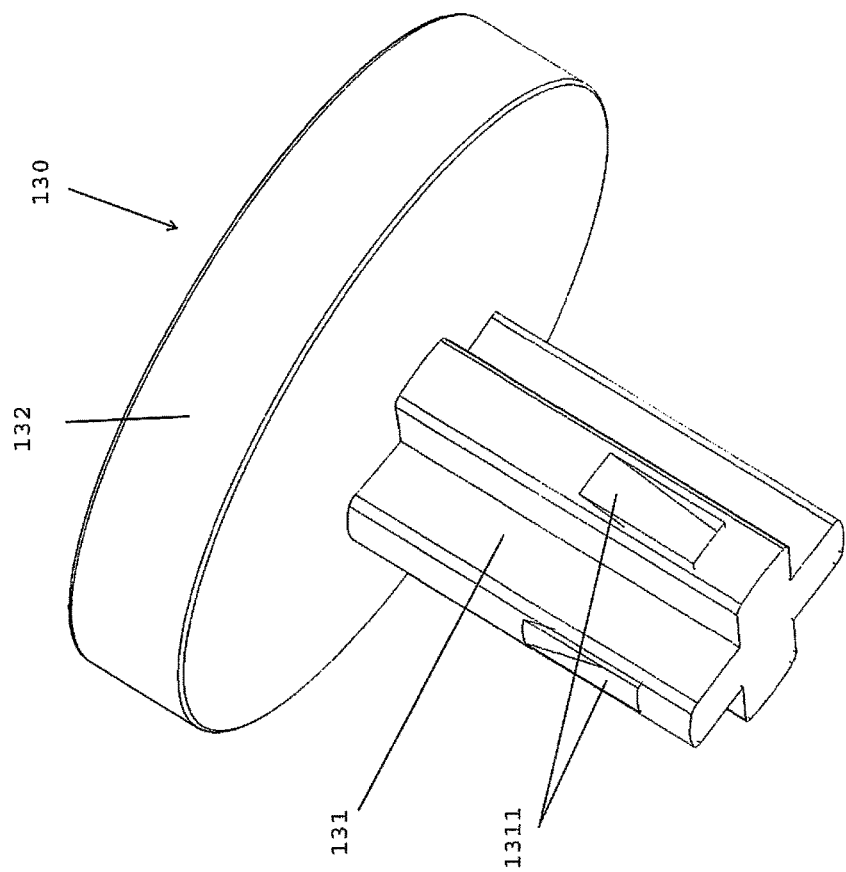
FIG. 30B is a bottom perspective view of the key.

FIGS. 30A through 30C depict different views of a preferable embodiment of the key 130 component of the apparatus 1000 depicted in FIGS. 1A and 1B, and 17A-29E. Specifically, FIGS. 30A through 30C respectively depict a top perspective, bottom perspective; and side profile view of the key 130. As can be seen in the referenced drawings, the key 130 is generally an elongated x-shaped member 131 with a flange 132. Referring to FIG. 30A, the elongated x-shaped member 131 features locking lugs 1311 at its lower end and the flange features a coaxial wrench socket 1321.

FIGS. 31A through 31E depict different views of a preferable embodiment of the tile spacer 140 component of the apparatus 100 depicted in FIGS. 27A and 27B. Specifically, FIGS. 31A through 31E respectively depict a top perspective, bottom perspective, top plan, bottom plan, and side profile view of the spacer 140. As can be seen FIG. 31, the spacer 140 is generally a disc that features projections 141 that operate to divide the paver support surface 123 of the cap into evenly spaced paver receptacles whereby pavers provided to the assembly 100 may be uniformly oriented and spaced.

FIG. 27B shows a preferable method for assembling the assembly 100. First, the base 110 may be positioned so that the bottom side of the foot 111 interfaces with a subsurface and wherein the cylinder 112 extends outwardly and transversely relative to a plane of the subsurface. Second, the cap 120 may be positioned on top of the cylinder 112 of the base 110 so that the concave surface 114 of the base interfaces with the convex surface 123 of the cap 120 and wherein the key socket 115 of the base 100 is located within the key socket receptacle or access hole 125. Third, the x-shaped member 131 of the key 130 may be inserted through the key socket receptacle 125 and into the key socket 115 until the locking teeth 115 inside the key socket 115 interact with the locking lug 131 of the key 131 so that: (1) the key is retained inside the key socket 115; and (2) the cap 120 is movably (e.g., slidably and/or rotatably) retained between the flange 132 of the key 132 and the concave surface 114 of the base 110. Finally, the tile spacer 140 may be provided to the spacer receptacle 124 of the cap 120 whereby the spacer 140 surface and the support surface 123 of the cap 120 generally form a plane.

Referring to FIG. 27B, a paver may be supported above a subsurface via: positioning an assembly 100, foot 111 down, on the subsurface; rotating the cap 120 around the key 130 until the orientation of the projections 141 of the spacer 140 align with a planned paver surface; and providing a corner of the paver to the paver support surface 123 whereby the sides of the paver abut the projections 141. See FIGS. 55A-D wherein the depicted pavers 10 are supported, spaced, and oriented by an assembly 100 with projections 141.

It should be noted that although the spacer 140 is depicted with four projections 141 for dividing the surface 123 into quadrants, the attachment may feature less or more projections to accommodate the orientation and spacing of non-square pavers. It should further be noted that the projections 141 may feature perforations (not shown) whereby the projections 141 may be individually removed from the spacer 140. For instance; two of the four projections 141 may be removed from the attachment whereby the side of a square paver, instead of its corner, may be received by the paver support surface 124 of the cap 120. Finally: the dimensions of the assembly 100 will vary with the size of the paver to be retained by the paver support surface 123. In particular, the height of the projections may vary depending on the thickness of a paver; e.g. in a range of about 0 to 20 inches.

Figure 28D:
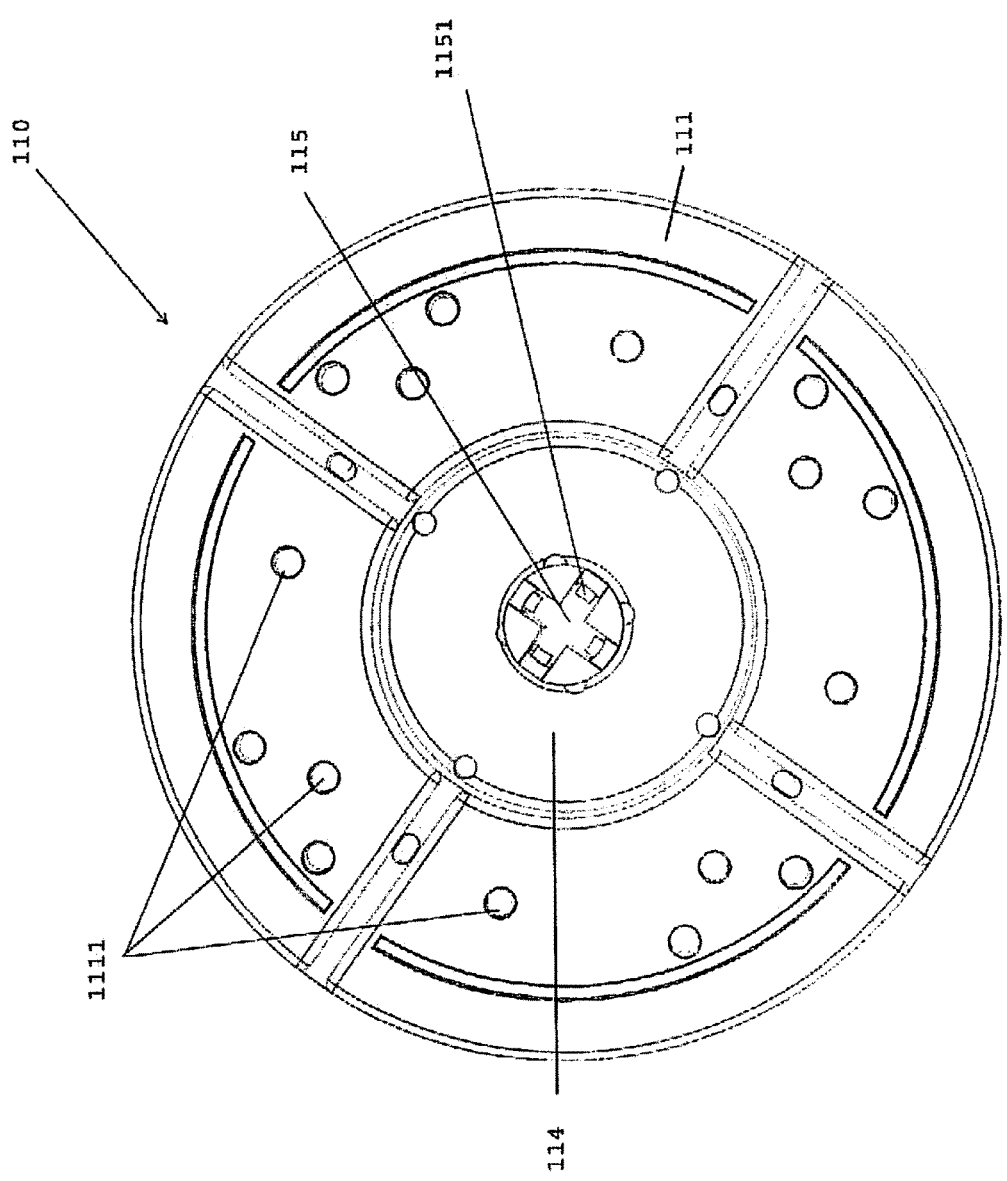
FIG. 28D is a bottom plan view of the base.
Figure 28E:
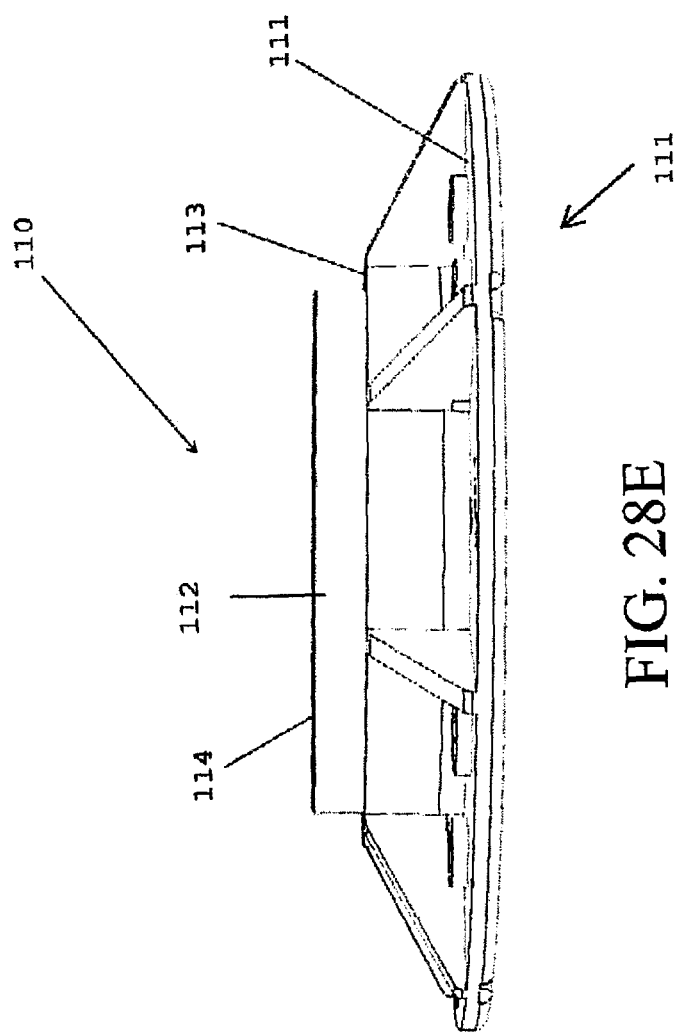
FIG. 28E is a side profile view of the base.
Figure 29A:
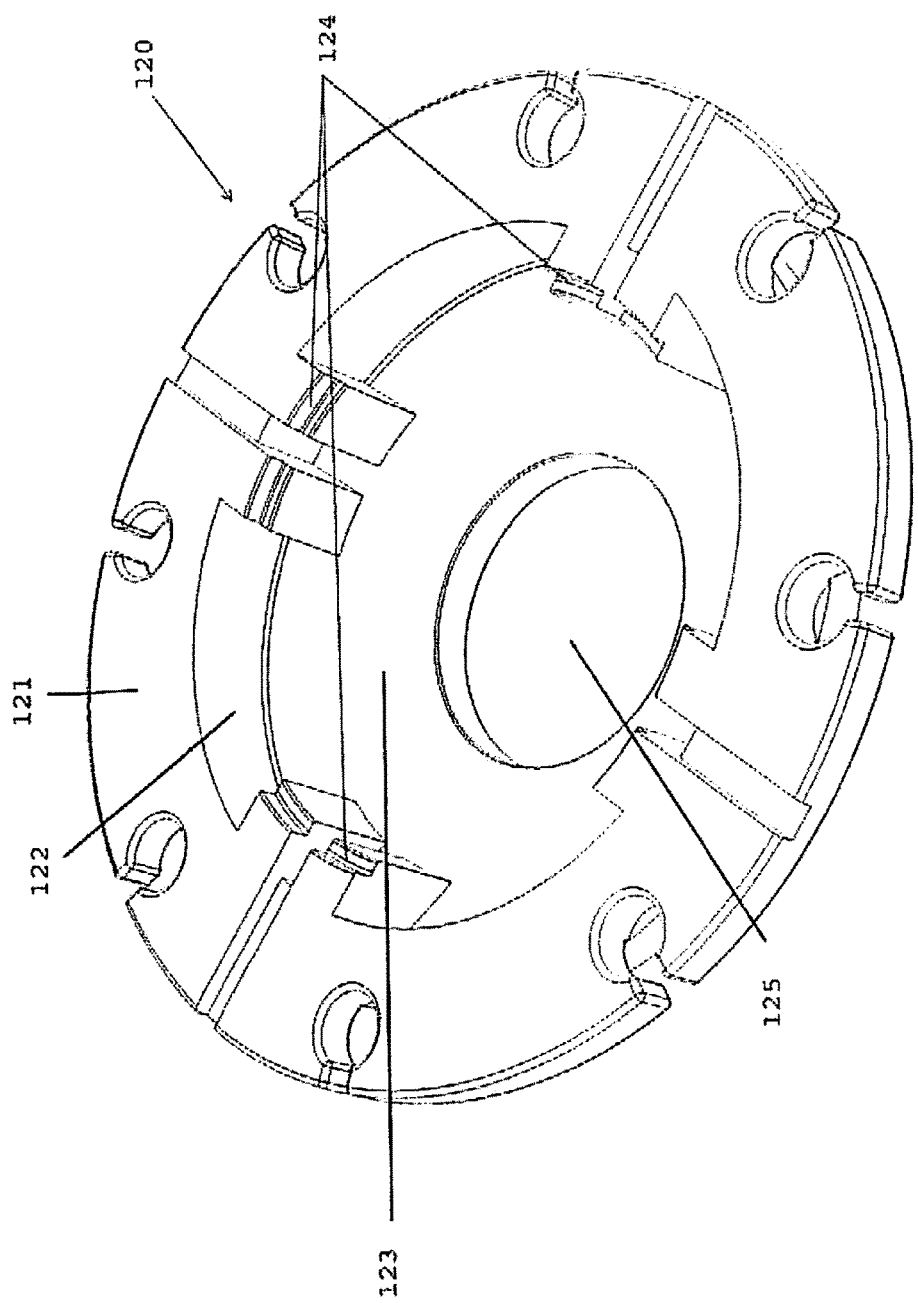
FIG. 29A is a top perspective view of a cap.
Figure 29B:
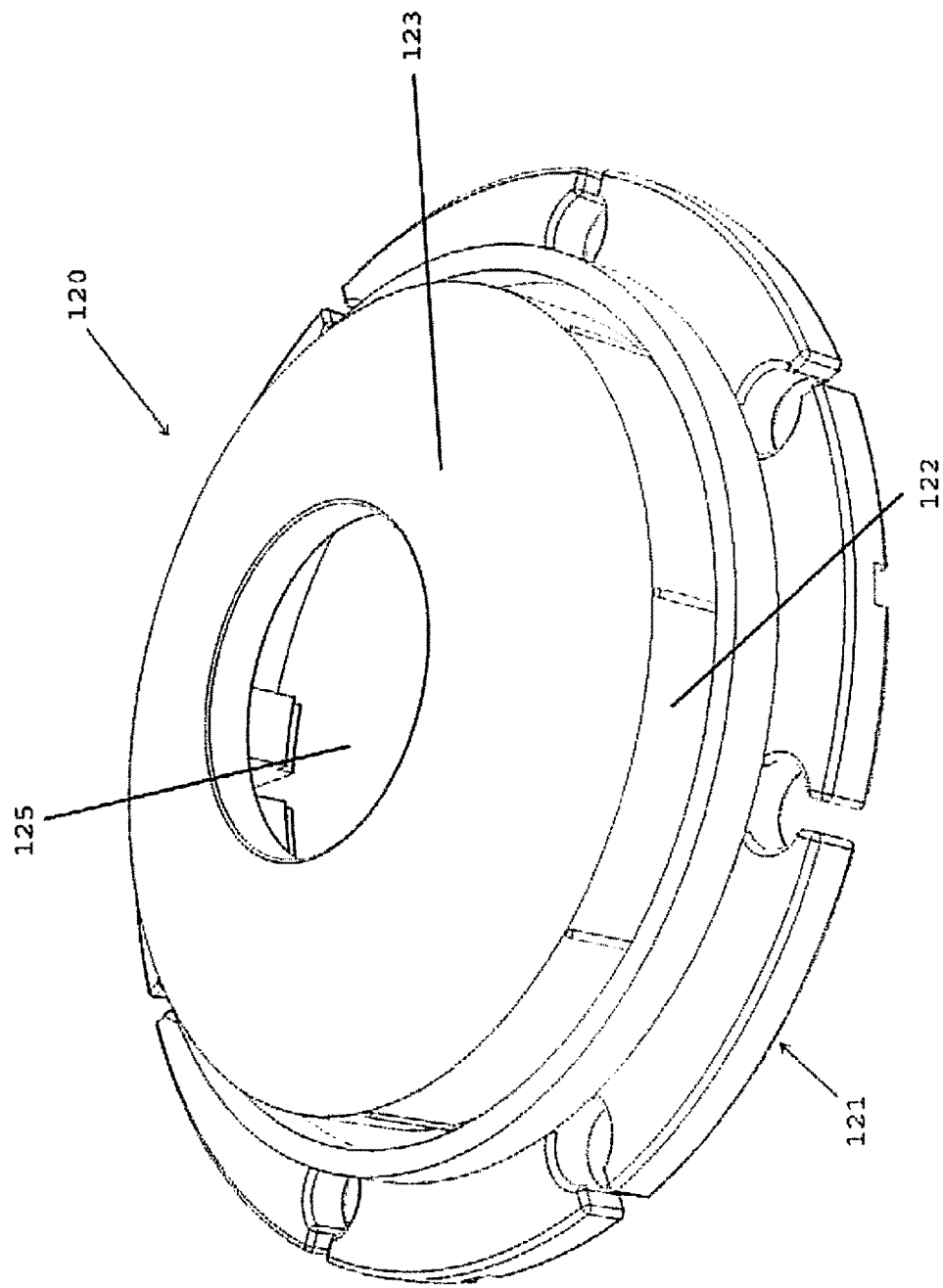
FIG. 29B is a bottom perspective view of the cap.
Figure 29C:
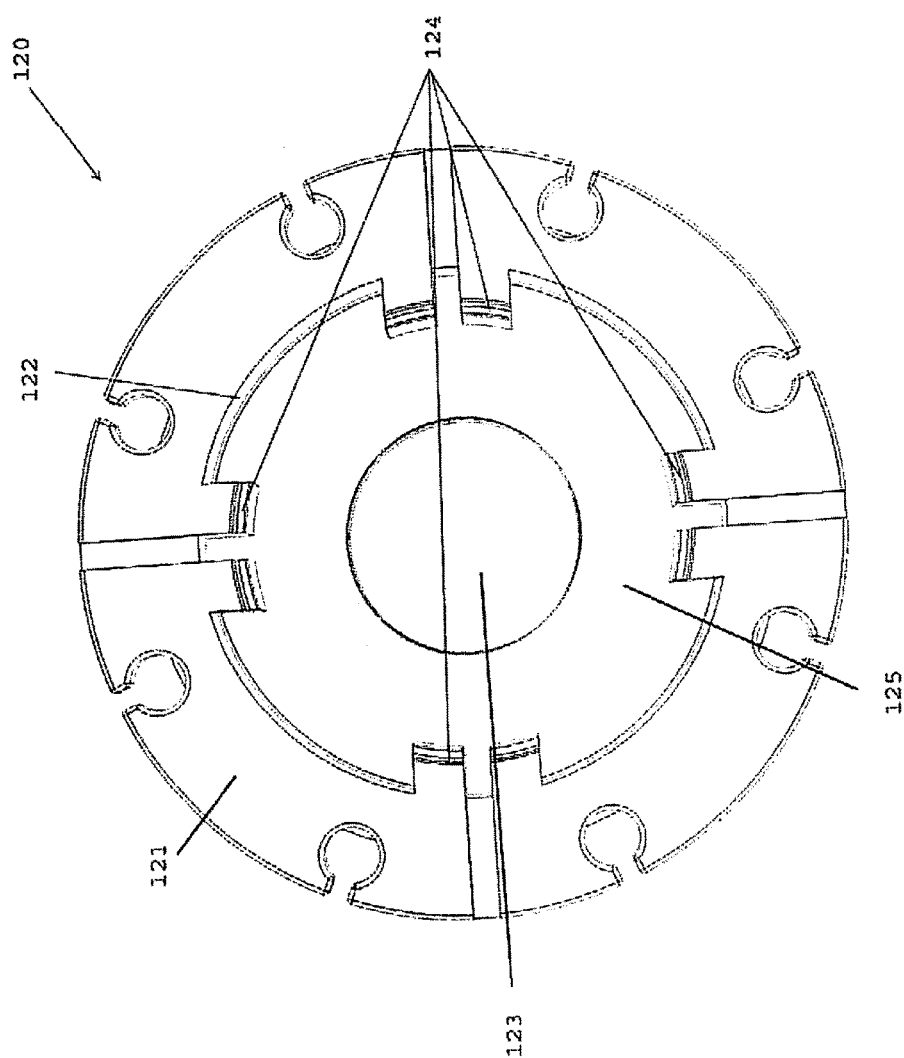
FIG. 29C is a top plan view of the cap.
Figure 29D:
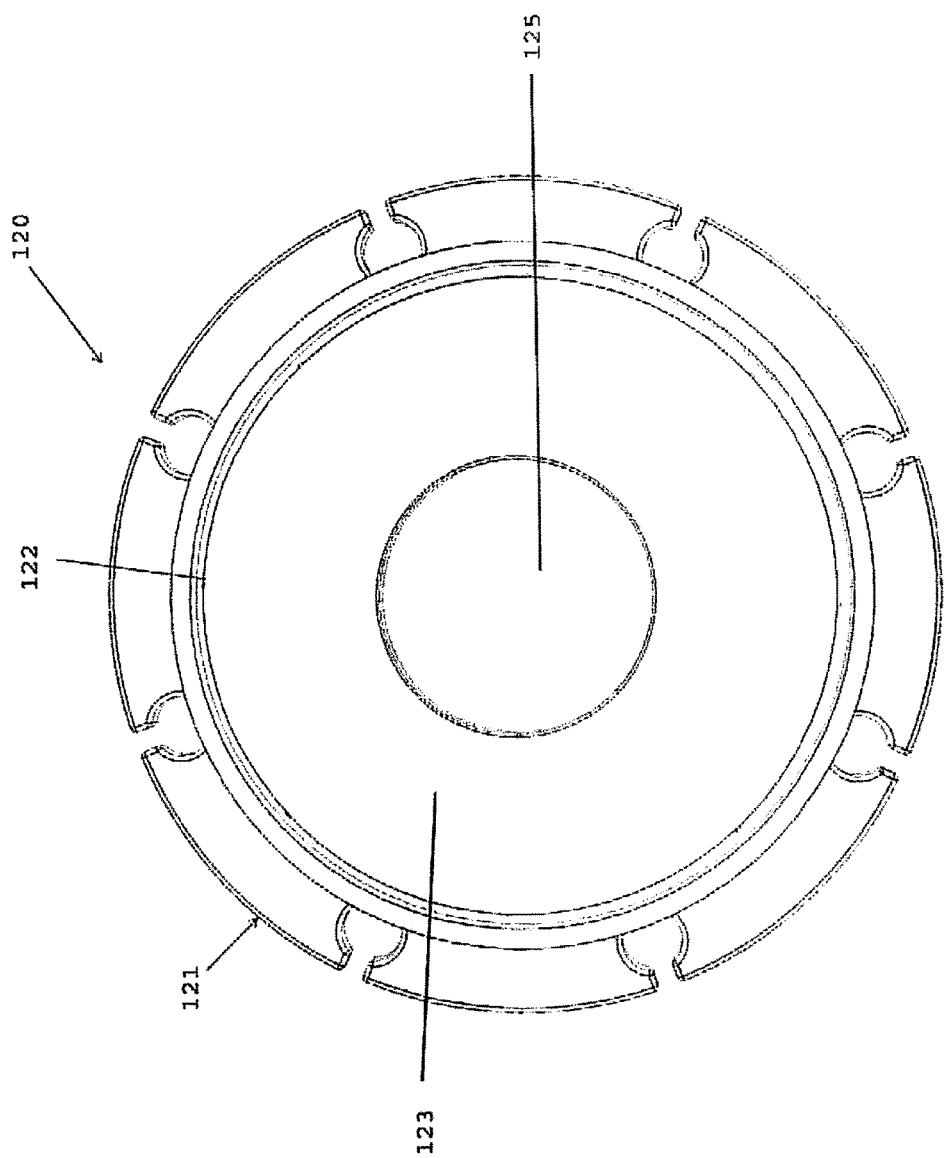
FIG. 29D is a bottom plan view of the cap.
Figure 31A:
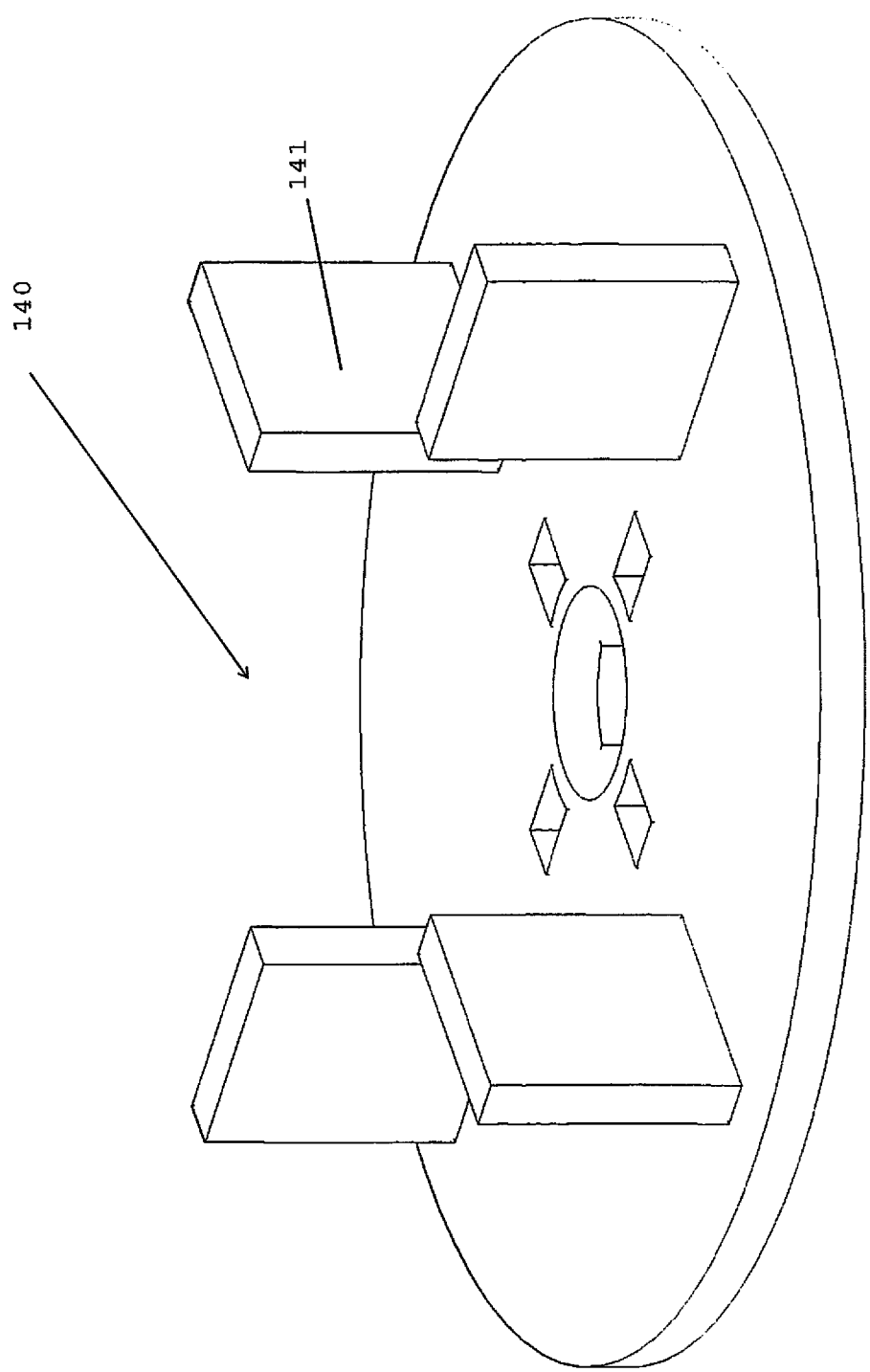
FIG. 31A is a top perspective view of a spacer.
Figure 31B:
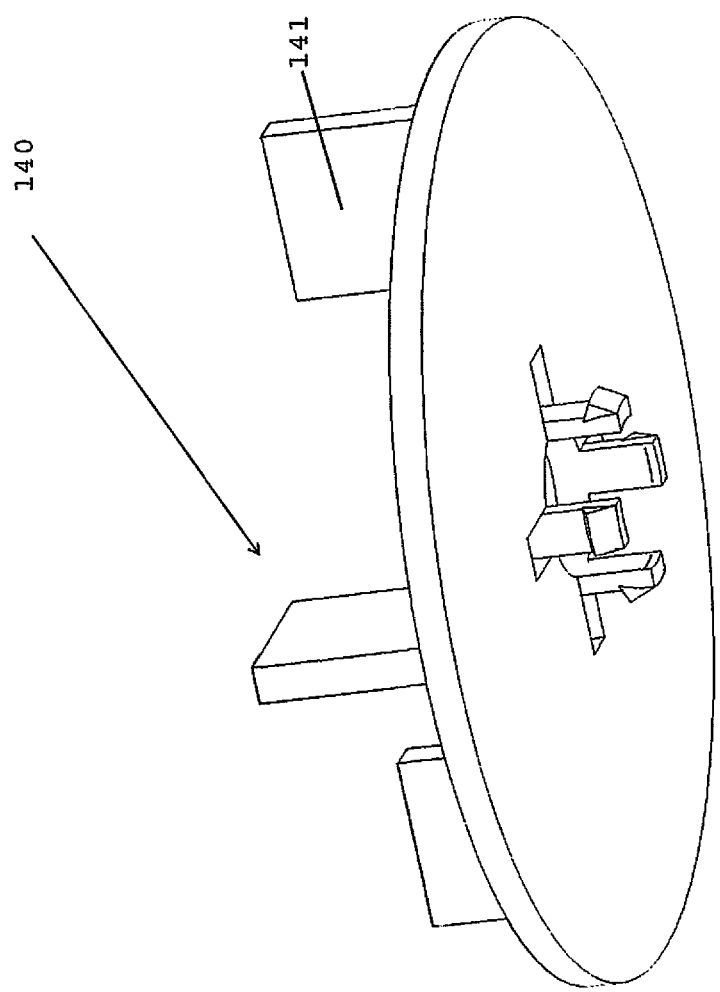
FIG. 31B is a bottom perspective view of the spacer.
Figure 31D:
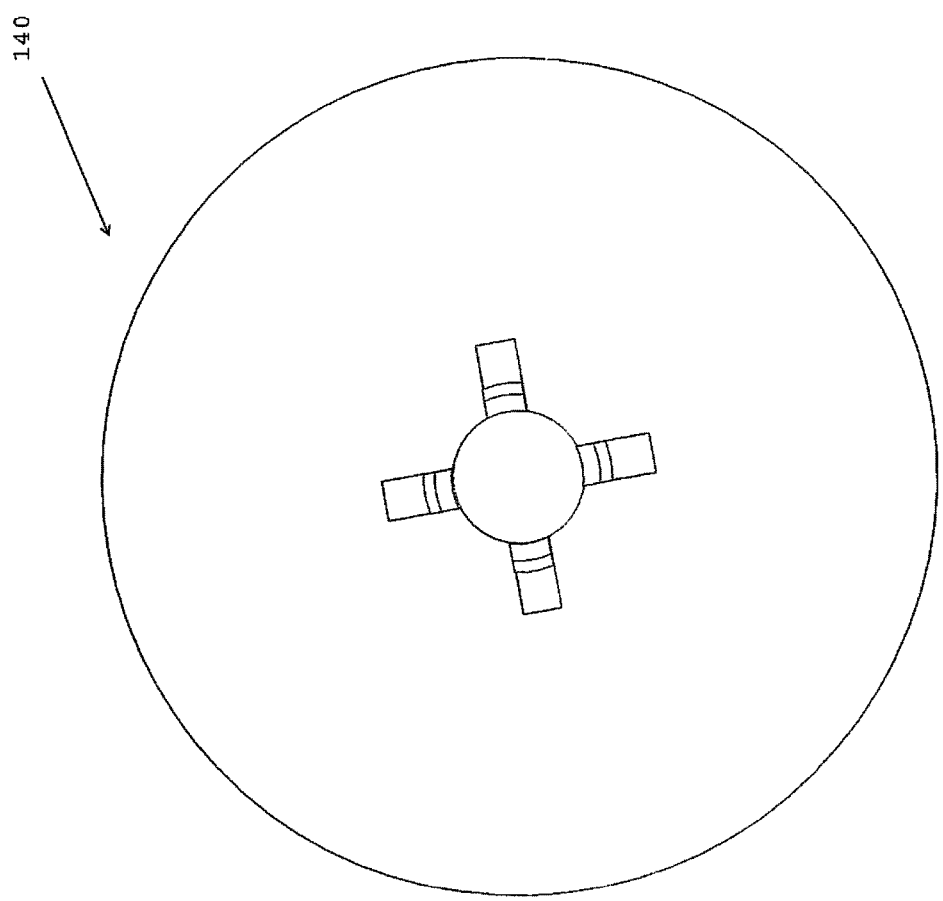
FIG. 31D is a bottom plan view of the spacer.
Figure 31E:
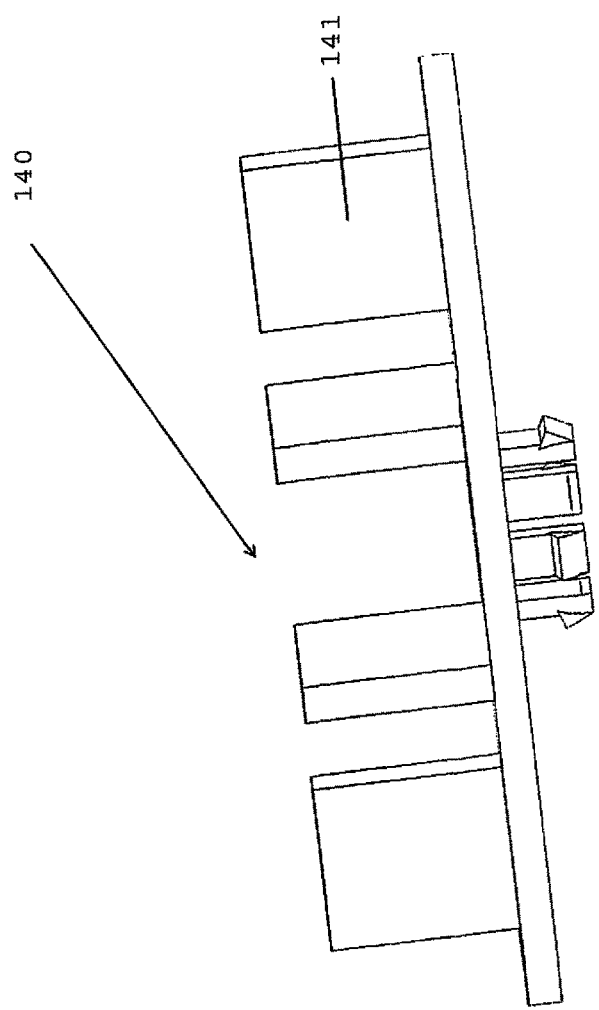
FIG. 31E is a side profile view of the spacer.
Figure 32A:
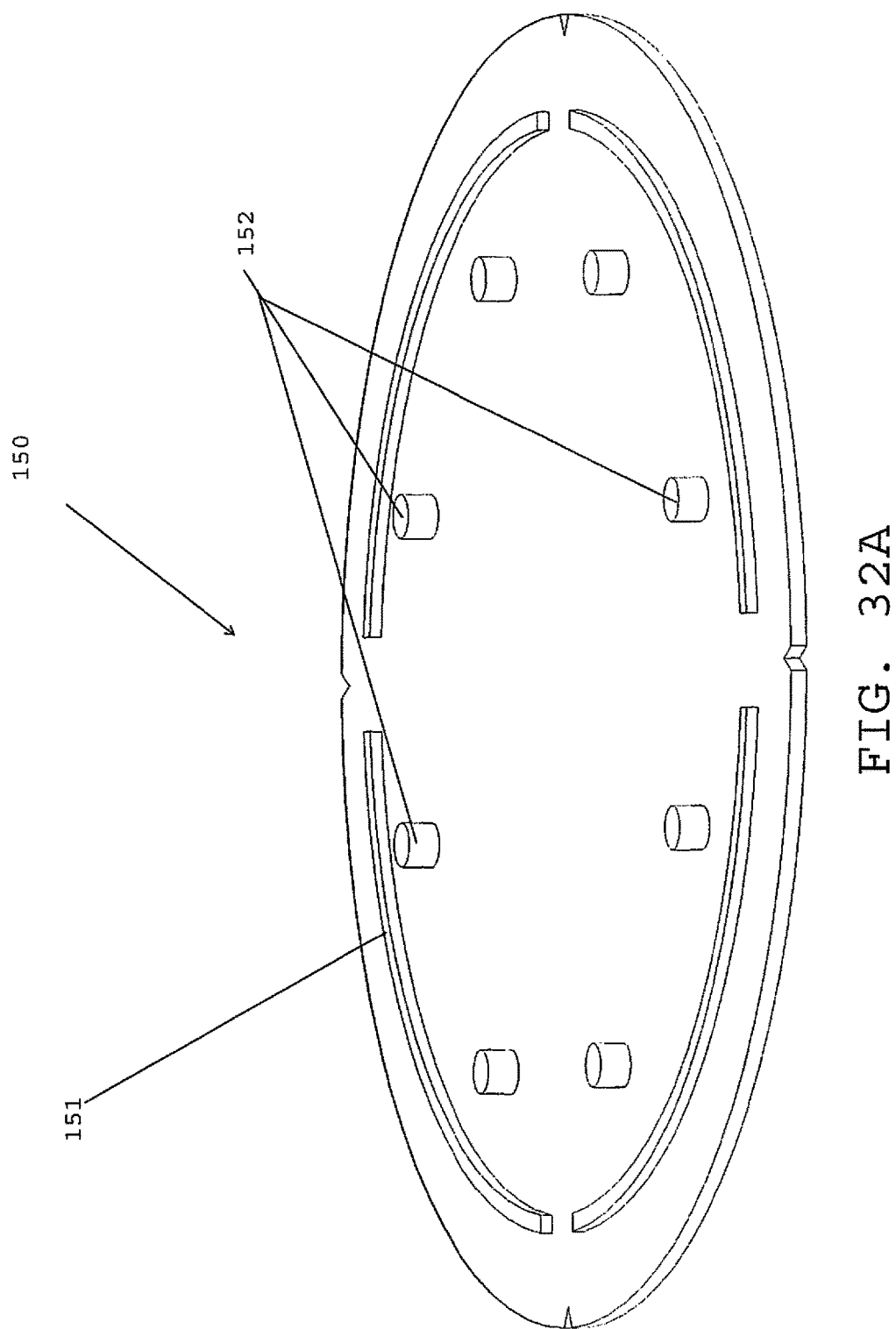
FIG. 32A is a top perspective view of a buffer.
Figure 32B:
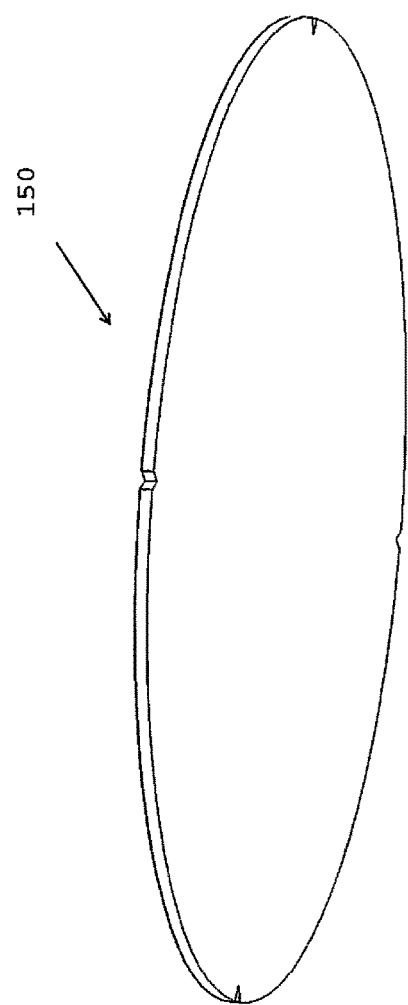
FIG. 32B is a bottom perspective view of the buffer.
Figure 32C:
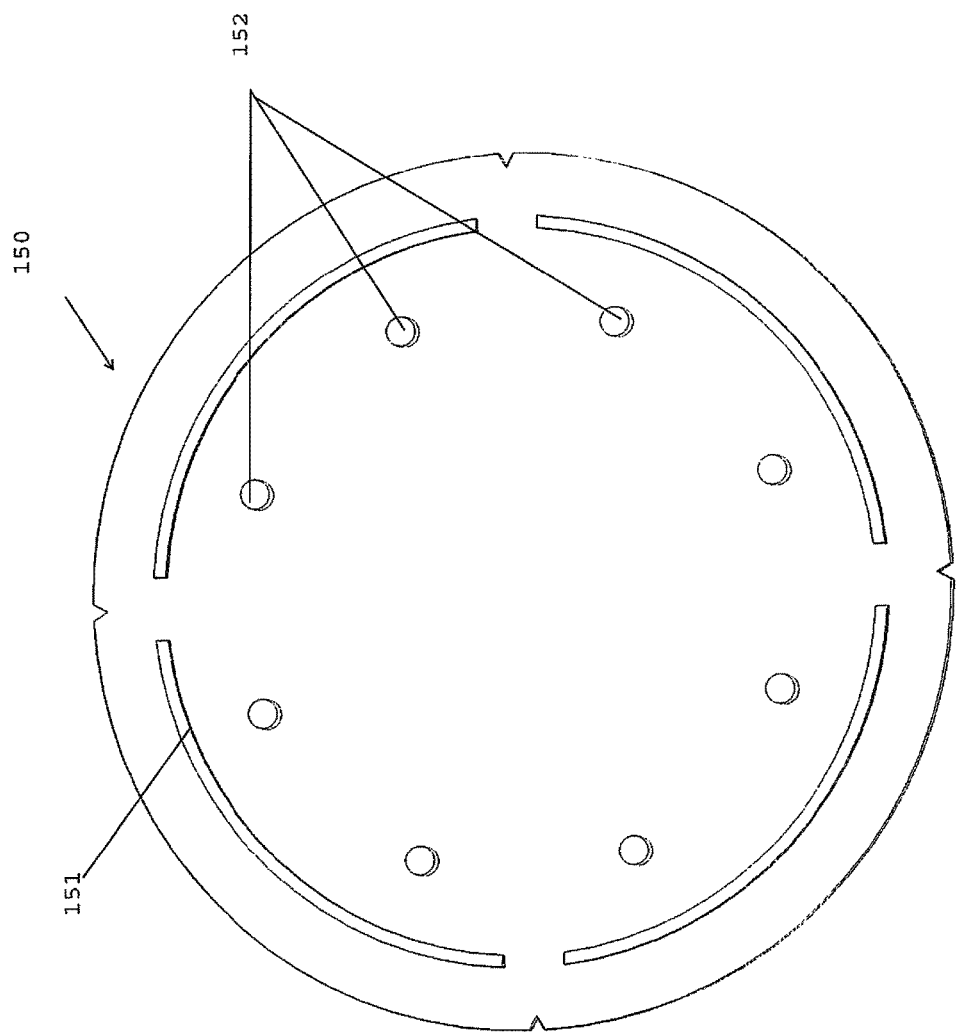
FIG. 32C is a top plan view of the buffer.
Figure 32D:
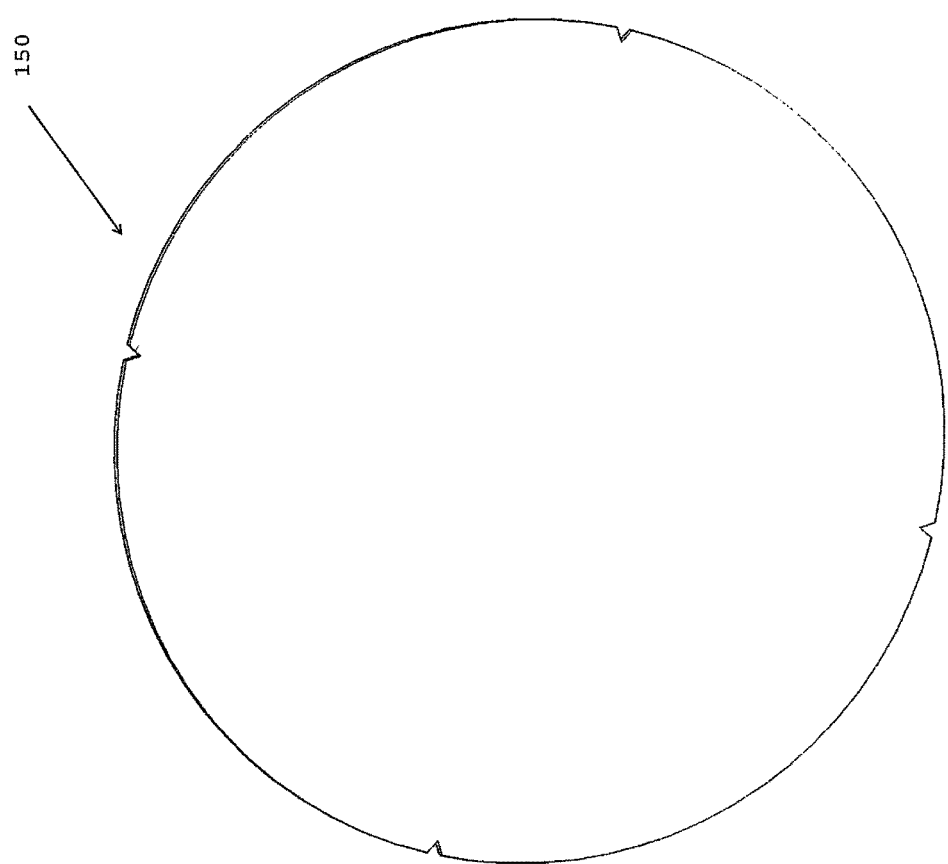
FIG. 32D is a bottom plan view of the buffer.
Figure 32E:
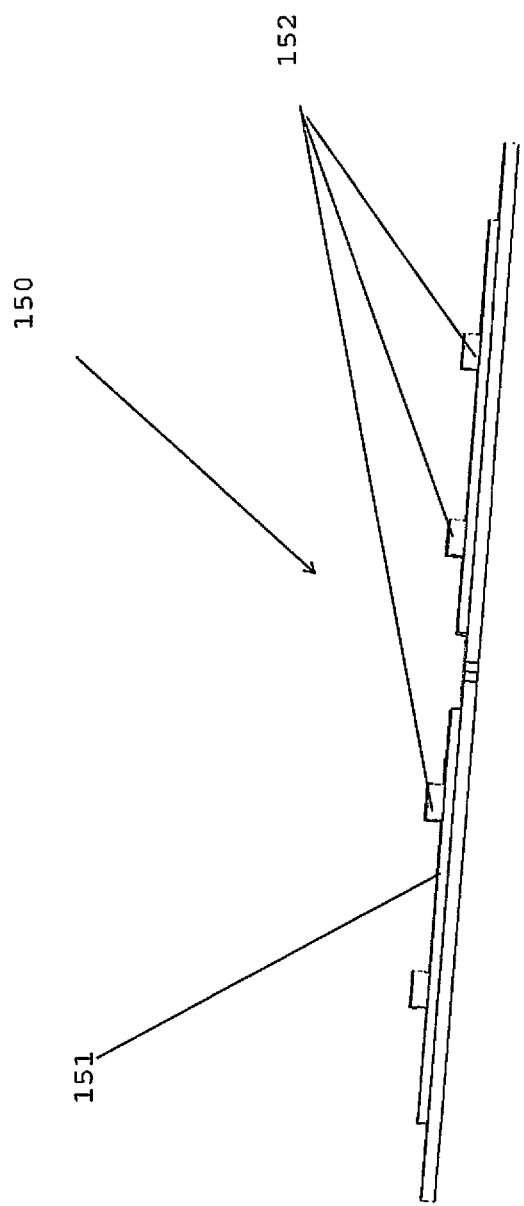
FIG. 32E is a side profile view of the buffer.

Referring still to FIG. 27A-B, the foot 111 of is adapted to support the assembly 100 on a substrate or subsurface. This said, there may be instances where the substrate may be sensitive and require a larger footprint than that provided by the foot 111. For instance, the substrate may feature a waterproofing means that may be punctured by the weight of a paver on the assembly 100. In such a circumstance, the foot print of the foot 1110 may be supplemented with a buffer 150 as best depicted in FIGS. 31A, through 31E, which respectively depict a top perspective, bottom perspective, top plan, bottom plan, and side profile view of the butler 150. Referring to FIGS. 32A and 32E, the buffer 150 may generally be a disc with an upward projection 151 of slightly larger plan than the plan of foot 111 of the assembly whereby the foot 111 may be retained therein and where the disc of the buffer 150 distributes the footprint of the assembly 100 over a wider area. In one embodiment, the underside of the foot 111, as seen in FIG. 28D, features mortises 1111 which may cooperate with tenon 152, shown in FIG. 32A, so that the assembly may be positioned on the buffer 150 with greater stability. Other features of the buffer 150 will be set forth in greater detail below As alluded to above, the disclosed assembly may be used for establishing a level paver surface over a sloped subsurface. FIG. 33 depicts a side view of the assembly 100 and illustrates one mode establishing such leveled surface. Referring first to FIGS. 33, 28A and 29E, the base 110 may suitably feature a concave surface 114 and the cap 120 may suitably feature a convex paver support surface 123 whereby the slope of the paver support surface 123 may be skewed in any direction relative to the plane of the foot 111 of the base 110 via sliding the convex surface 123 of the cap 12.0 along the concave surface 114 of the base 110. In one embodiment, the paver support surfaces 123 of four assemblies 100 positioned at the four corners of a square paver will self level with respect to one another under the weight of the pavers installed thereon the assemblies.

Figures 34A, 34B:
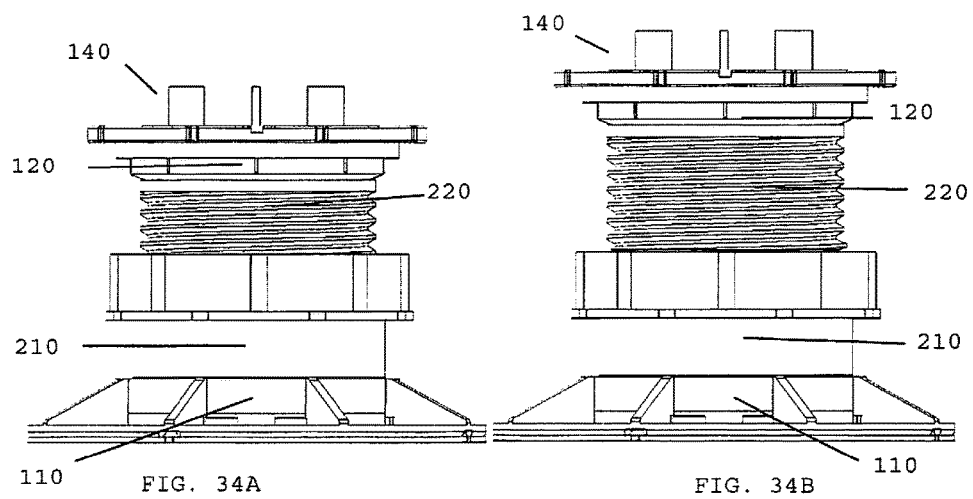
FIG. 34A is a perspective view of an assembly in a first configuration.
FIG. 34B is a perspective view of the assembly in a second configuration.
Figure 34C:
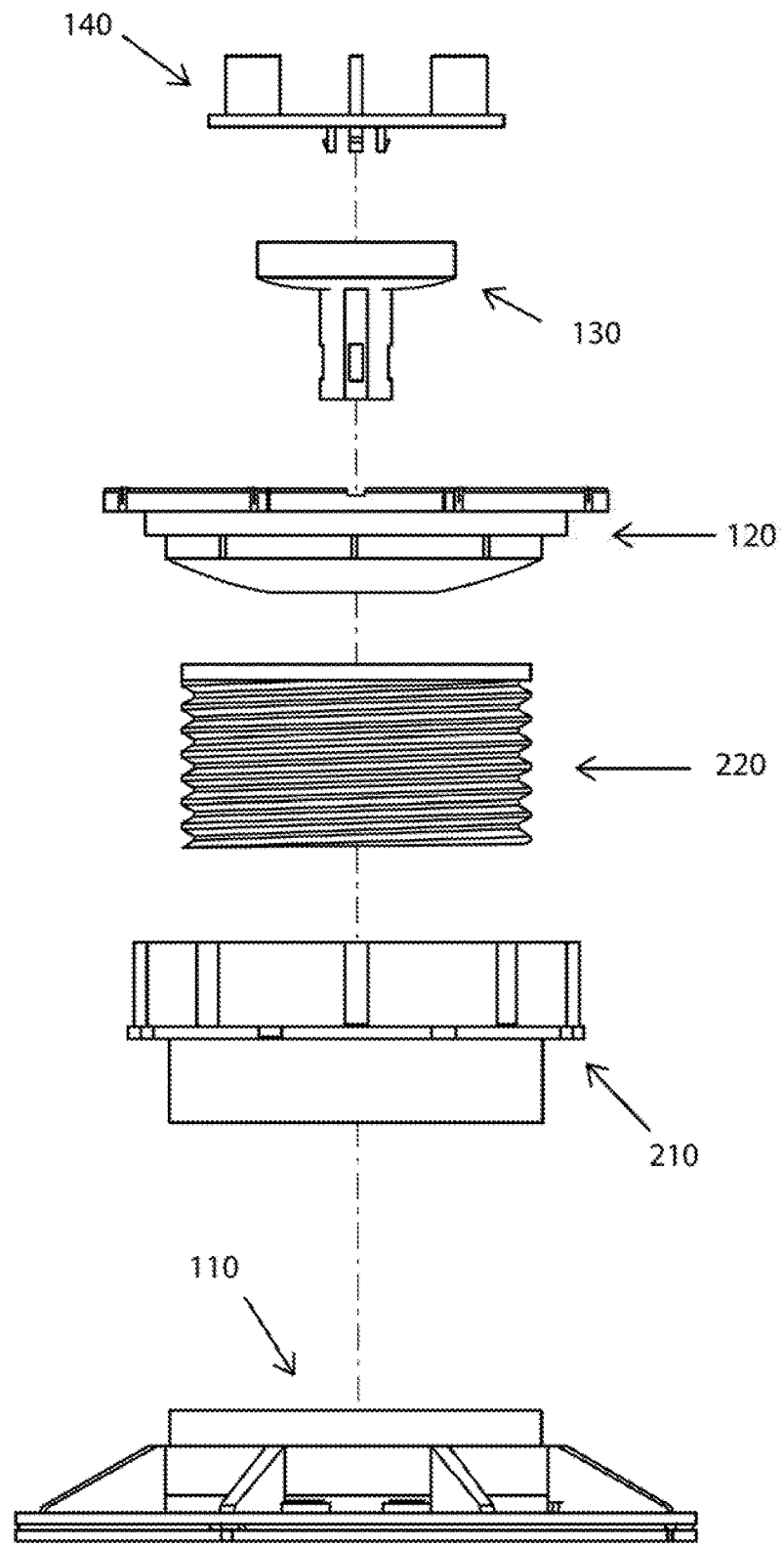
FIG. 34C is an exploded view of the assembly.
Figure 35A:
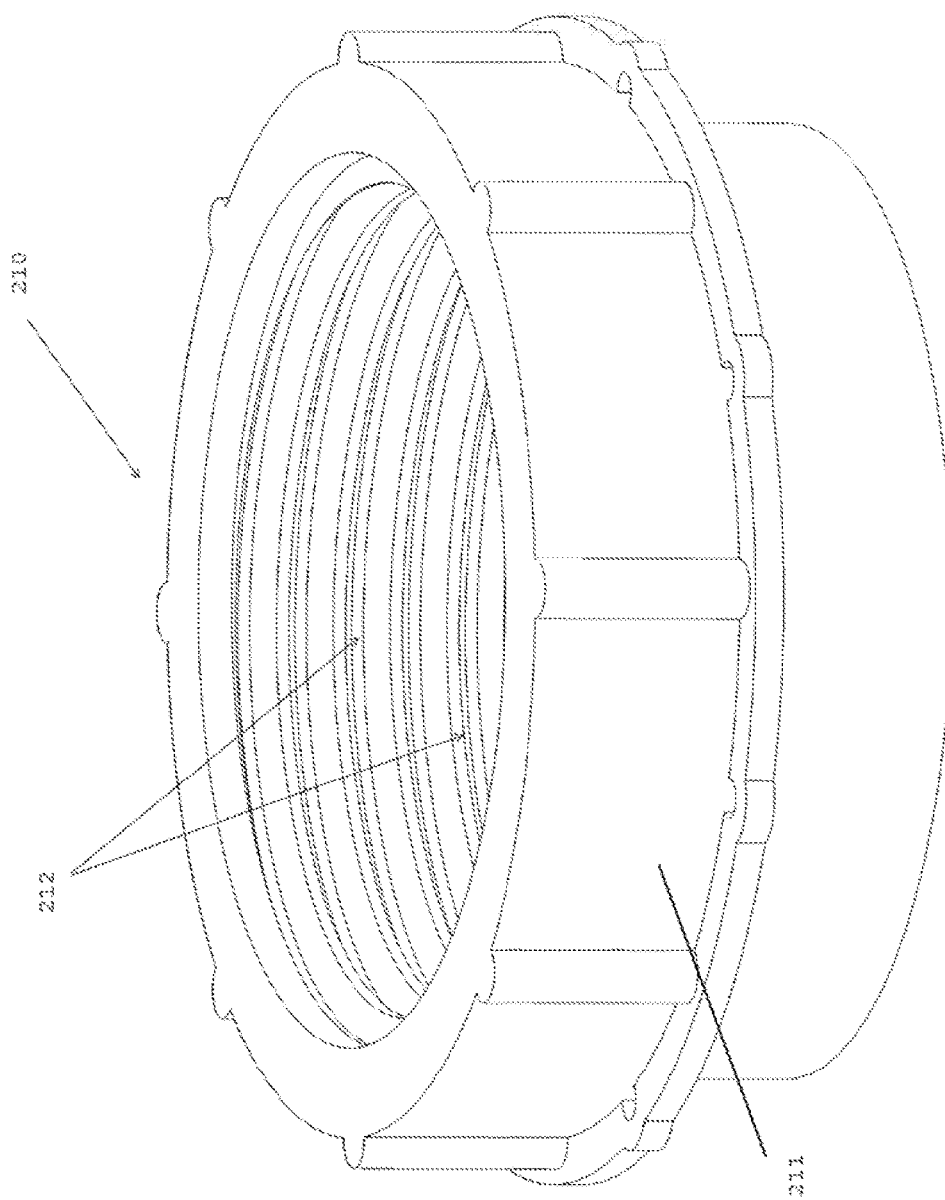
FIG. 35A is a top perspective view of a threaded collar.
Figure 35B:
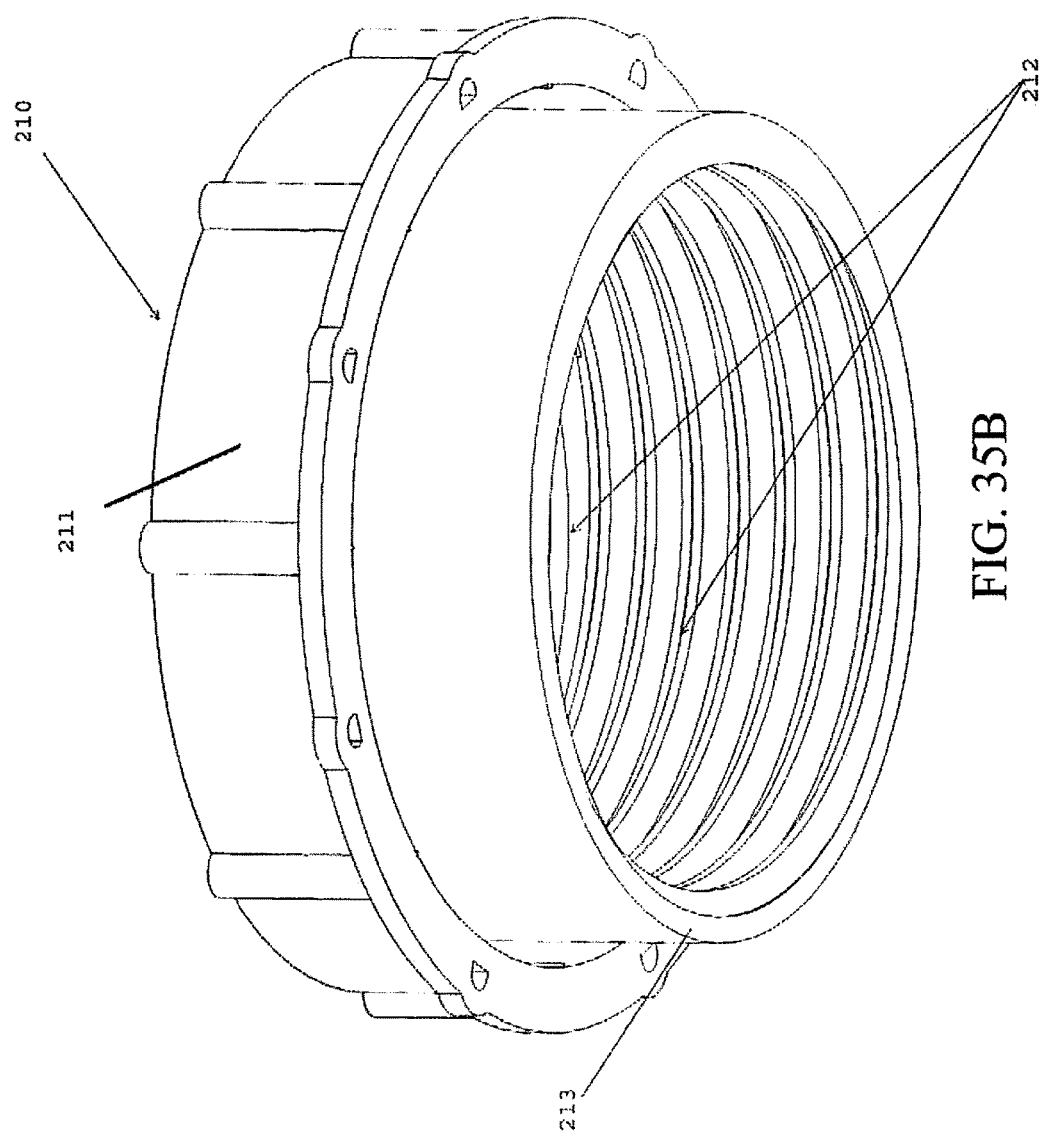
FIG. 35B is a bottom perspective view of the threaded collar.
Figure 35C:
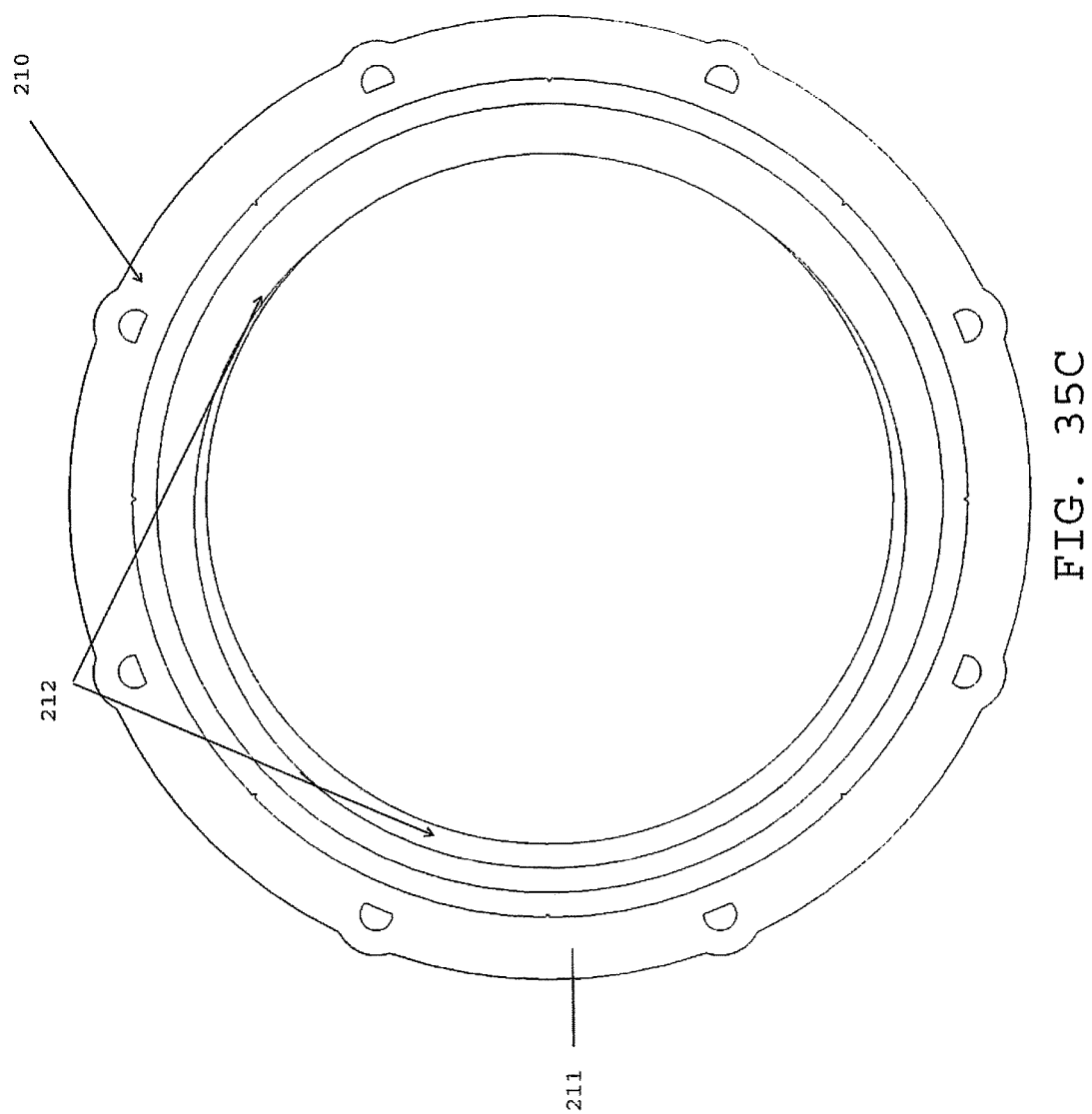
FIG. 35C is a top plan view of the threaded collar.
Figure 35D:
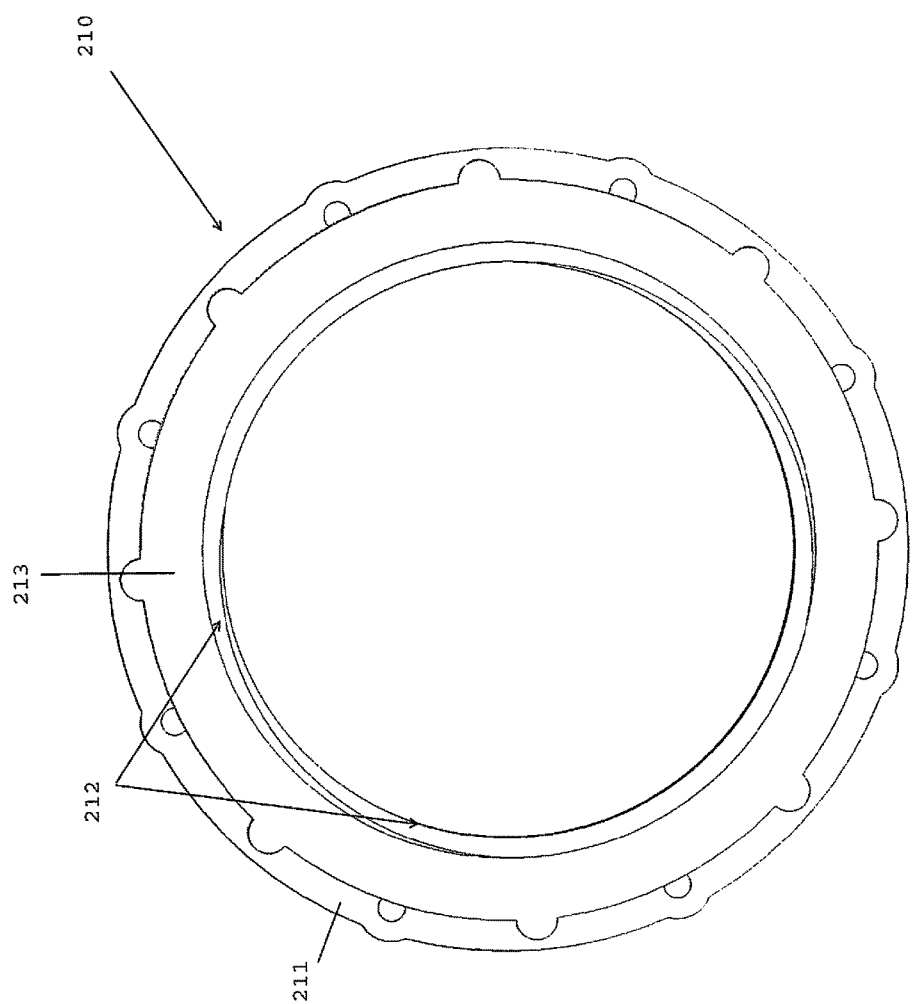
FIG. 35D is a bottom plan view of the threaded collar.
Figure 35E:
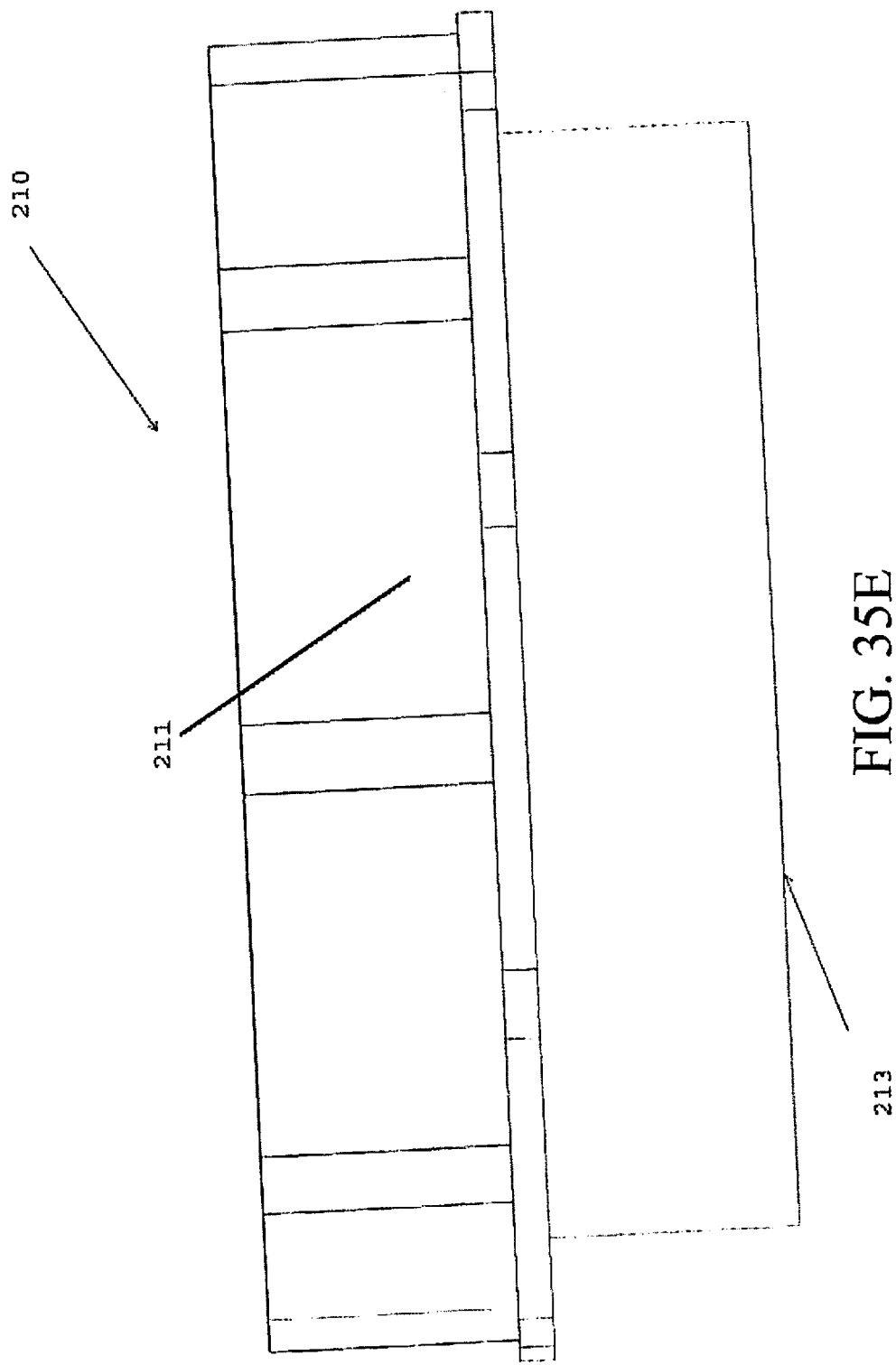
FIG. 35E is a side profile view of the threaded collar.

FIGS. 34A through 34C depict a second embodiment of a pedestal assembly 200 for facilitating the elevated and leveled placement of a paver array onto a subsurface. FIG. 34A is a side elevation view of the assembly 200 in a first configuration; FIG. 34B is a side elevation view of the assembly 200 in a second configuration; and FIG. 34C is an exploded view of the assembly 200. As seen in the figures the assembly 200, like the assembly of FIGS. 27A and 27B, comprises: a base 110; a cap 120; a key 130; and, a tile spacer 140. The structure and operability of those components are the same as described above in connection with the first embodiment of the assembly 100. Unlike the assembly 100 of FIGS. 27A and 27B, the assembly 200 further comprises a female threaded collar 210; and a male threaded insert 220.

FIGS. 35A through 35E depict different views of a preferable embodiment of the threaded collar 210 component of the apparatus 200 depicted in FIGS. 34A through 34C. Specifically, FIGS. 35A through 35E respectively depict a top perspective, bottom perspective, top plan, bottom plan, and side profile view of the threaded collar 210. As can be seen in the referenced drawings, the threaded collar 210 is generally a truncated tubiform with; a grip flange 211; female threads 212 on the inside of its tubiform; and a foot 213.

FIGS. 36A through 36E depict different views of a preferable embodiment of the threaded insert 220 component of the apparatus 200 depicted in FIGS. 34A through 34C. FIGS. 36A through 36E respectively depict a top perspective, bottom perspective, top plan, bottom plan, and side profile view of the threaded insert 220. As can be seen in the referenced drawings, the threaded insert is generally a truncated cylinder and may comprise: a foot 221; a male threads 222 on the outside surface of its cylinder shape; a concave surface 224 defining the top of the cylinder; and a key socket 225 through the concave surface 224 along the axis of the cylinder.

FIG. 34C shows a preferable method for assembling the pedestal assembly 200. First, the base 110 may be positioned so that the bottom side of the foot 111 interfaces with a subsurface and wherein the cylinder 112 extends outwardly and transversely relative to a plane of the subsurface. Second, a riser 420 (e.g., a pipe section) may be positioned within the riser socket 113 of the base 110. Third, the foot 213 of the threaded collar 210 may be provided to the top of the riser 420 so that the foot 213 of the threaded collar 410 is positioned inside of the riser 420. Fourth, the foot 221 of the threaded insert 220 may be provided to the top of the threaded collar 210 so that the threads 212 of the collar 210 and the threads 222 of the insert 220 cooperate to drive the insert 220 to within the tubiform of the collar 410. Fifth, the foot 22.1 of the threaded insert 220 may be provided to the top of the threaded collar 210 so that the threads 212 of the collar 210 and the threads 222 of the insert 220 cooperate to drive the insert 220 to within the tubiform of the collar 210. Sixth, the cap 120 may be positioned on top of the threaded insert 220 so that the concave surface 22.4 of the insert 220 interfaces with the convex surface 123 of the cap 120 and wherein the key socket 225 of the insert 220 is located within the key socket receptacle 125 of the cap 120. Seventh, the x-shaped member 131 of the key 130 may be inserted through the key socket receptacle 125 and into the key socket 225 until the locking teeth 2251 inside the key socket 225 interact with the locking lug 1311 of the key 131 so that: (1) the key is retained inside the key socket 225; and (2) the cap 120 is movably (e.g., slidably and/or rotatably) retained between the flange 132 of the key 132 and the concave surface 224 of the threaded insert 220. Finally, the tile spacer 14( )may be provided to the spacer receptacle 124 of the cap 120 whereby the spacer 140 surface and the support surface 123 of the cap 120 generally form a plane.

Referring to FIGS. 34A and 34B, a paver may be supported above a subsurface via: positioning an assembly 200, foot 111 down, on the subsurface; rotating the cap 120 around the key 130 until the orientation of the projections 141 of the spacer 140 align with a planned paver surface; and providing a corner of the paver to the paver support surface 123 whereby the sides of the paver abut the projections 141.

Figure 36A:
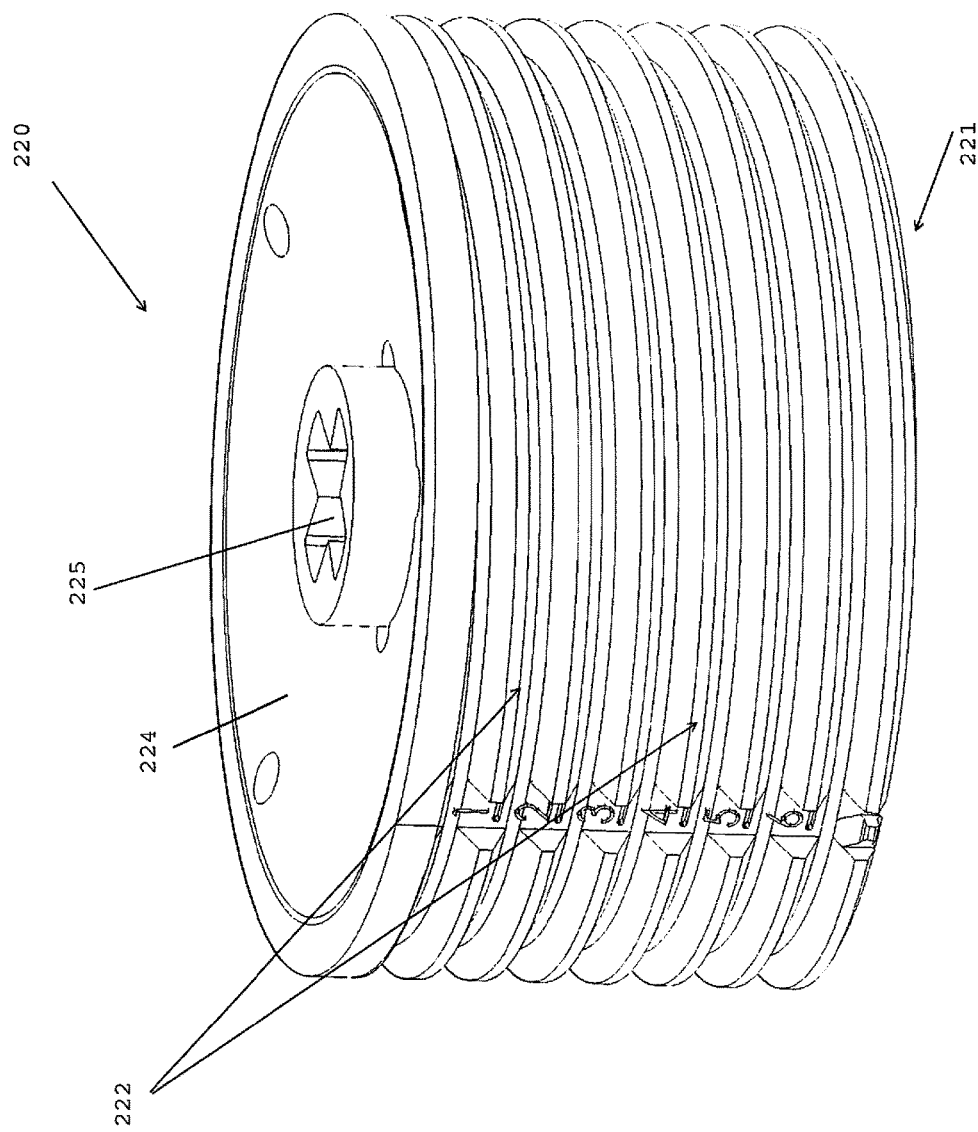
FIG. 36A is a top perspective view of a threaded insert.
Figure 36B:
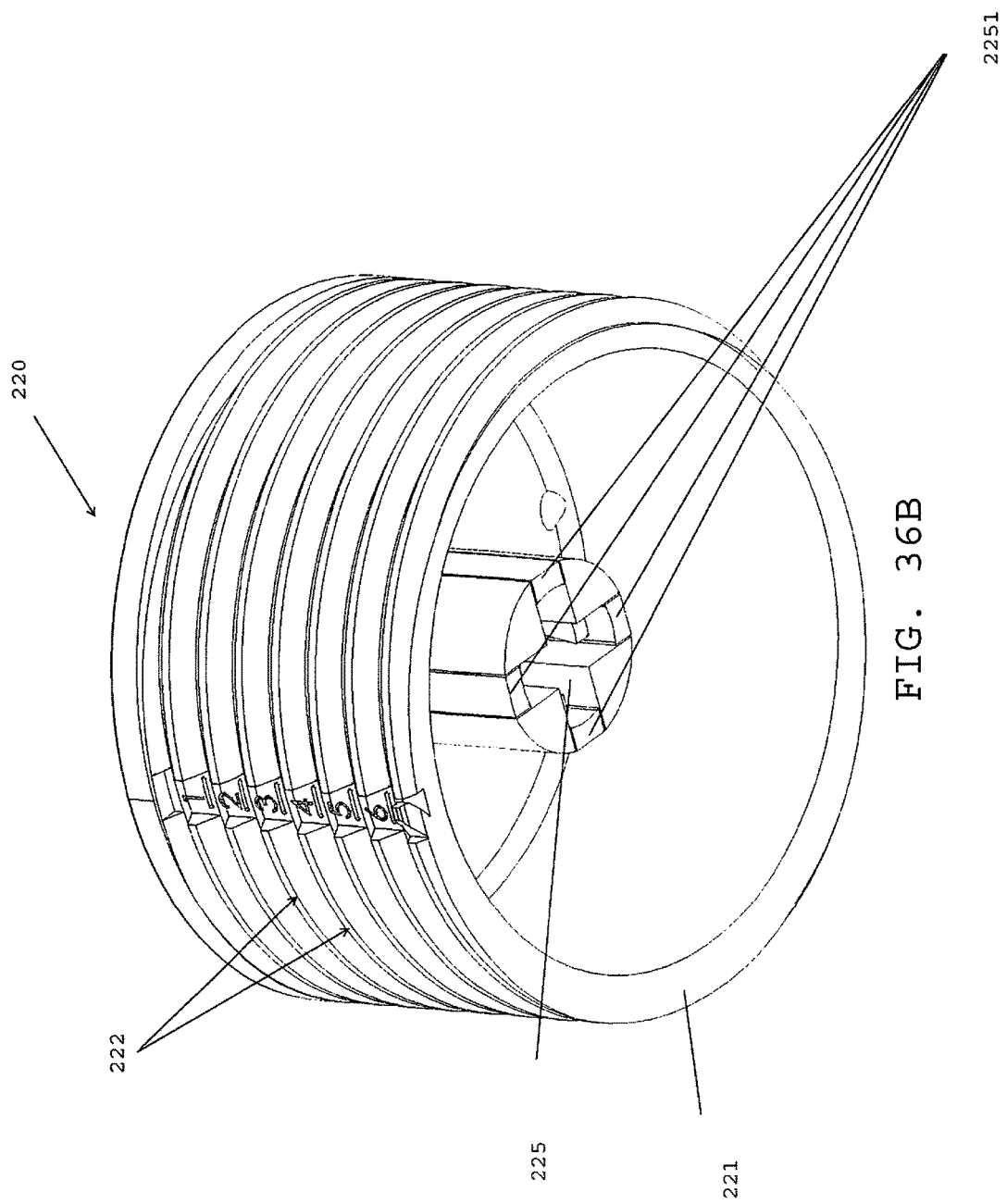
FIG. 36B is a bottom perspective view of the threaded insert.
Figure 36D:
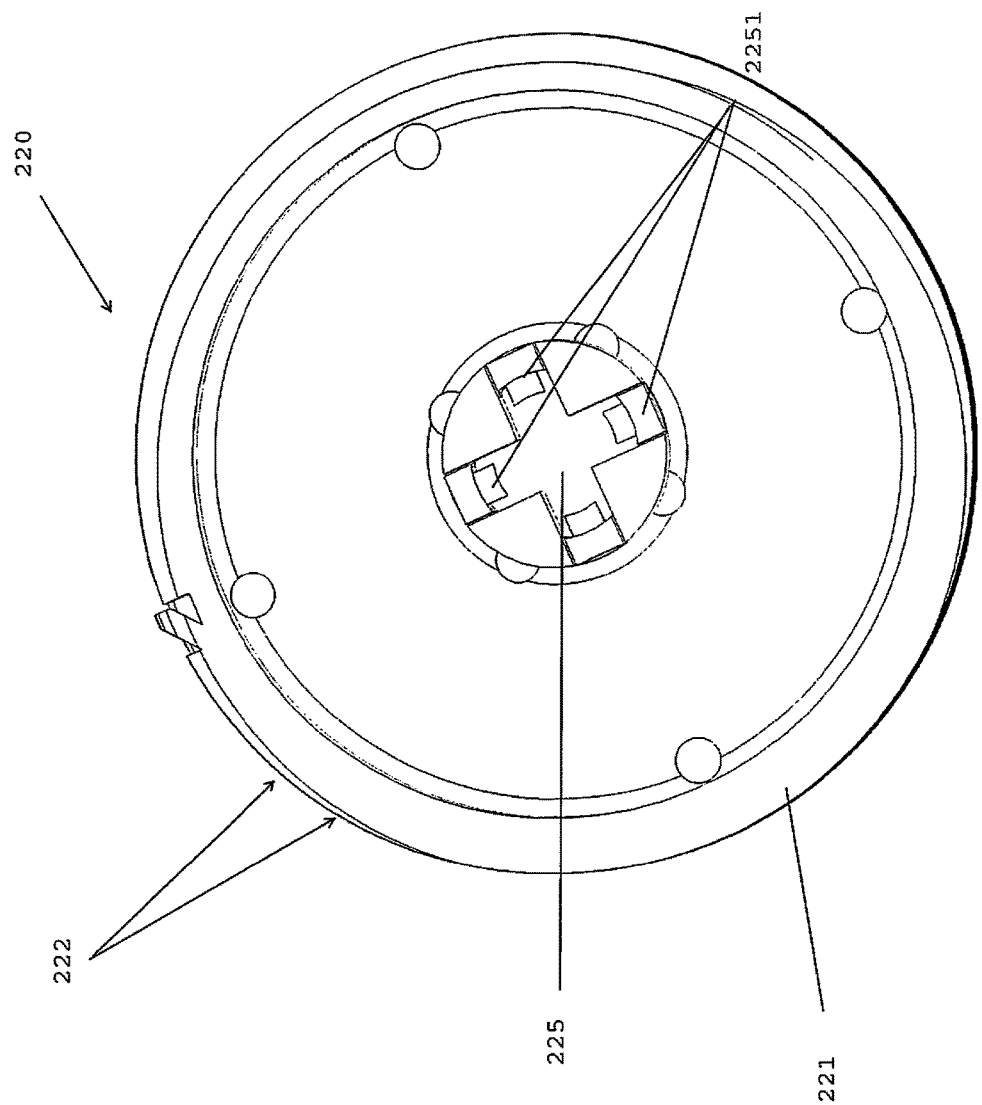
FIG. 36D is a bottom plan view of the threaded insert.
Figure 36E:
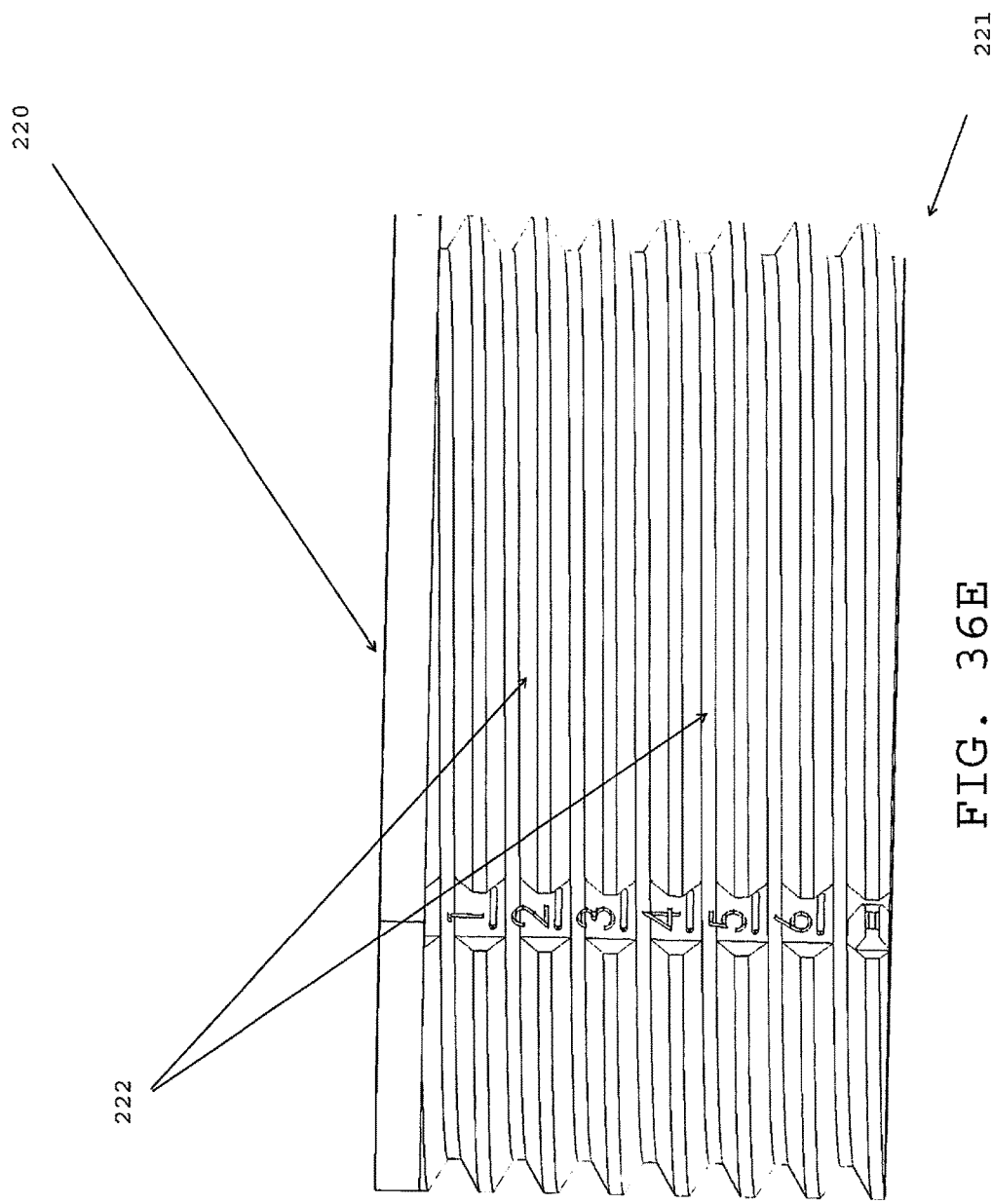
FIG. 36E is a side profile view of the threaded insert.
Figure 37:
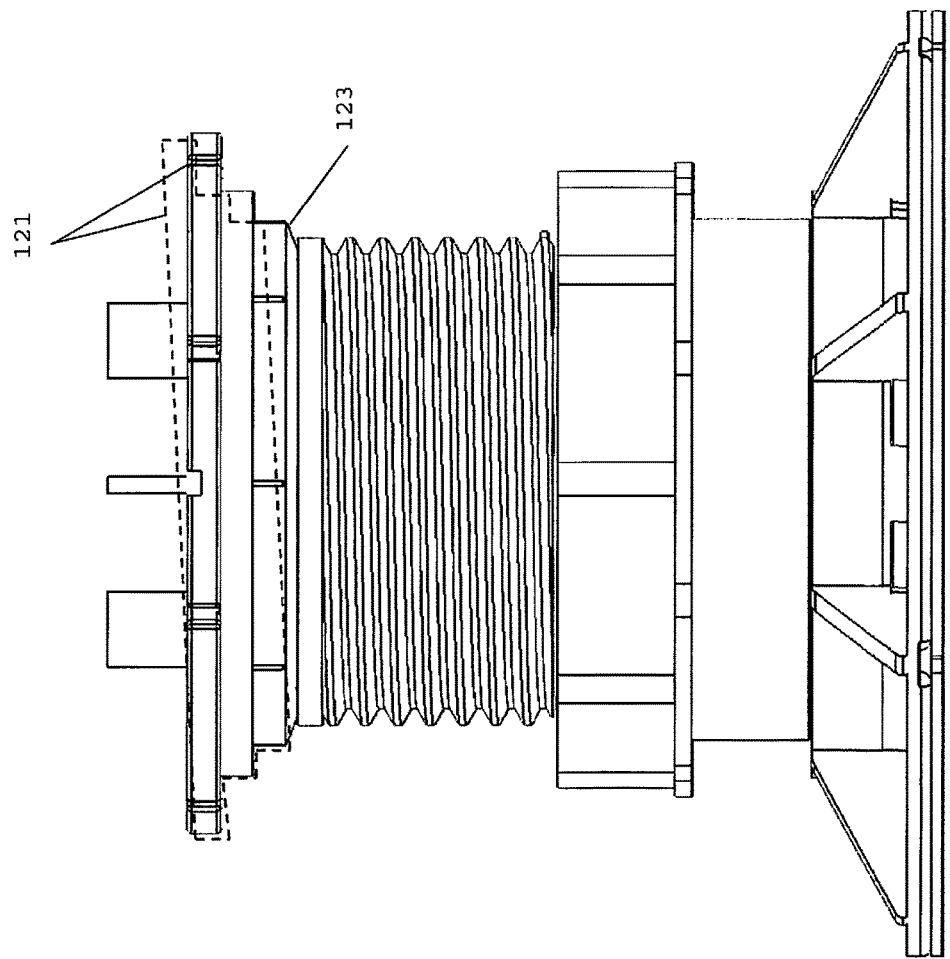
FIG. 37 depicts a side view of the assembly and illustrates one mode establishing such leveled surface.
Figure 38A:
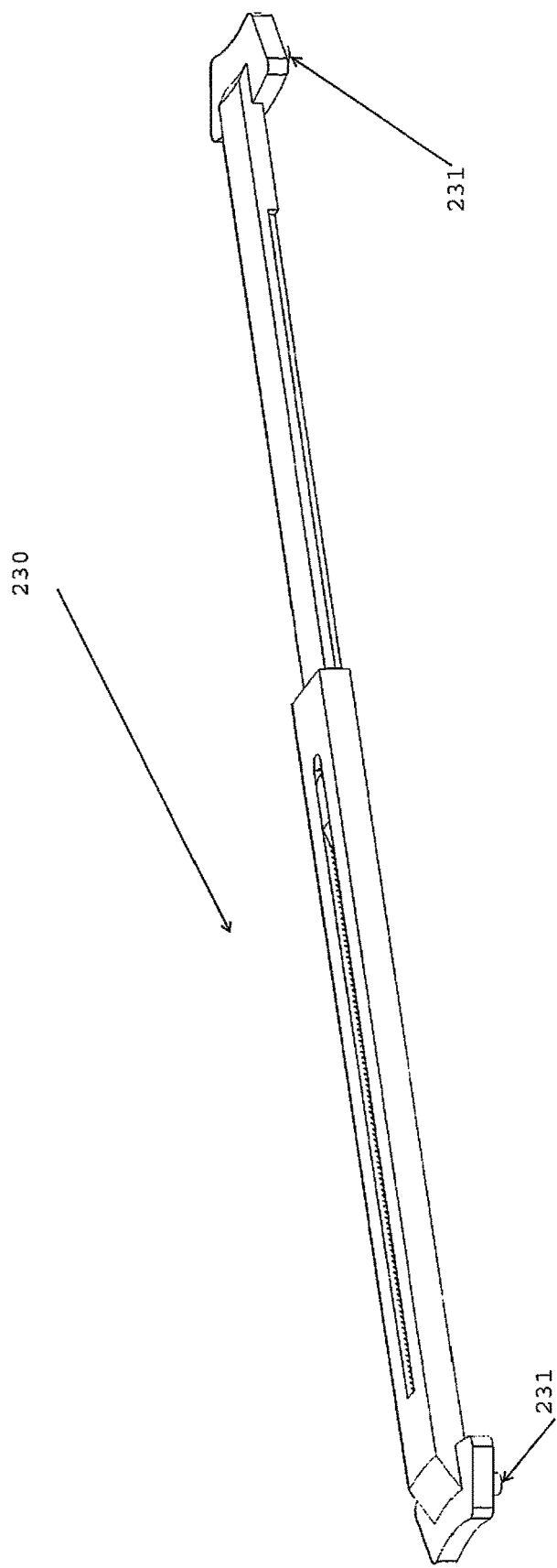
FIG. 38A is a top perspective view of an arm.
Figure 38B:
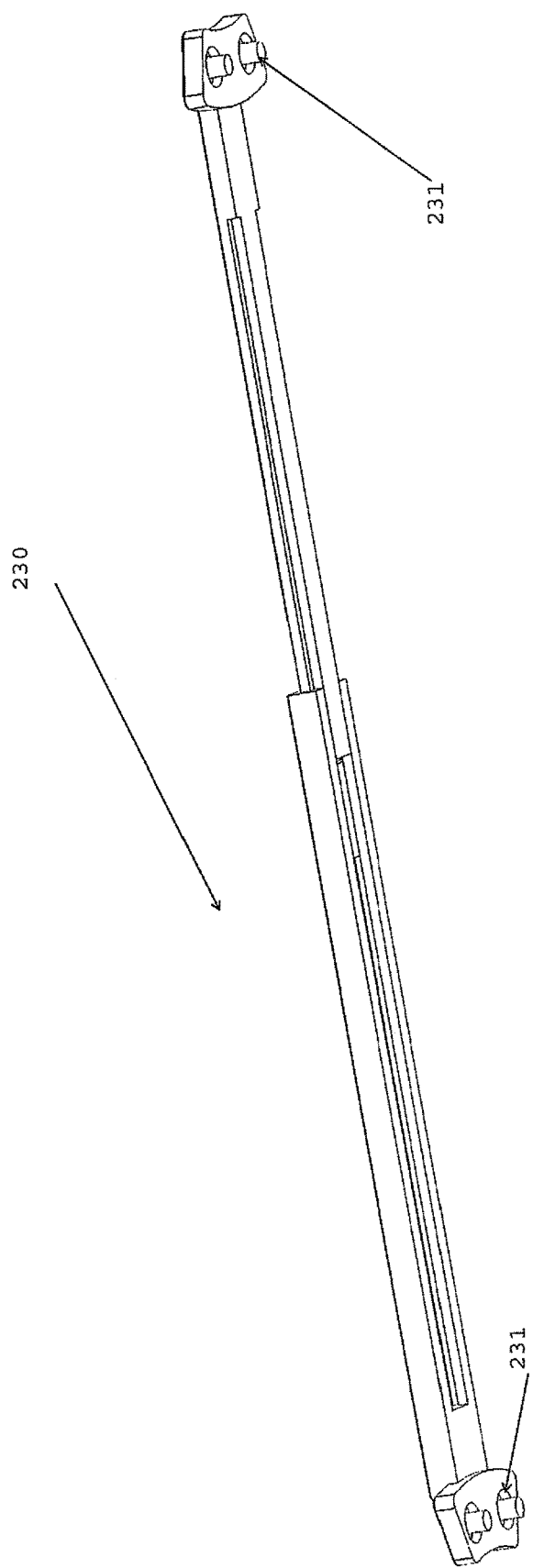
FIG. 38B is a bottom perspective view of the arm.
Figure 38C:
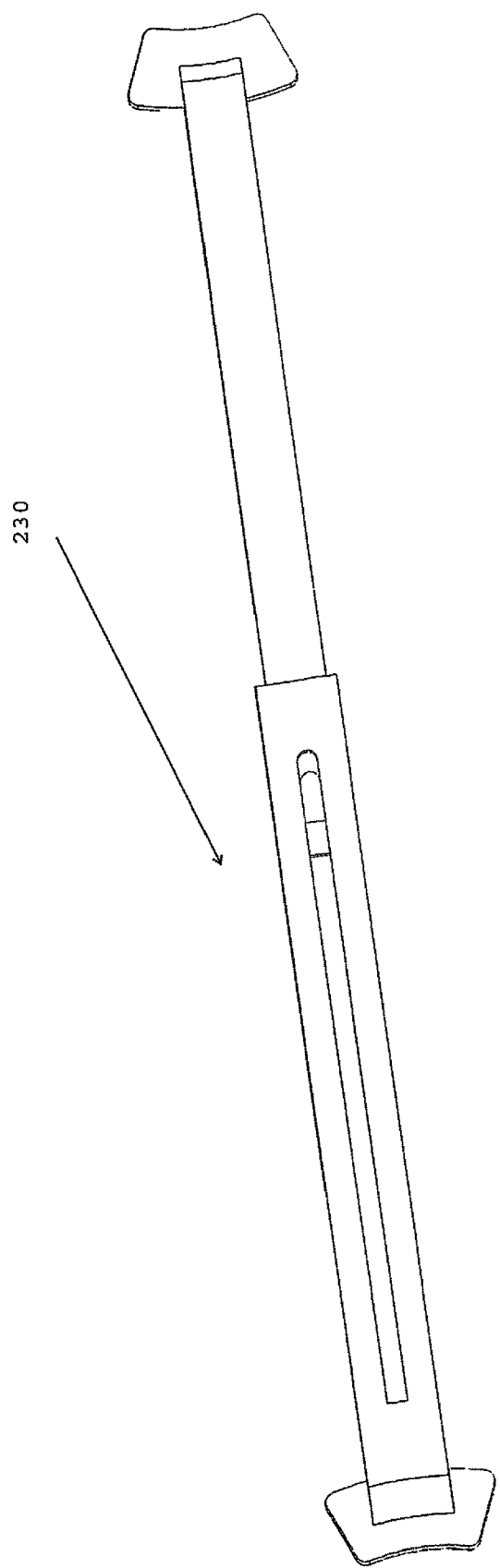
FIG. 38C is a top plan view of the arm.
Figure 38D:
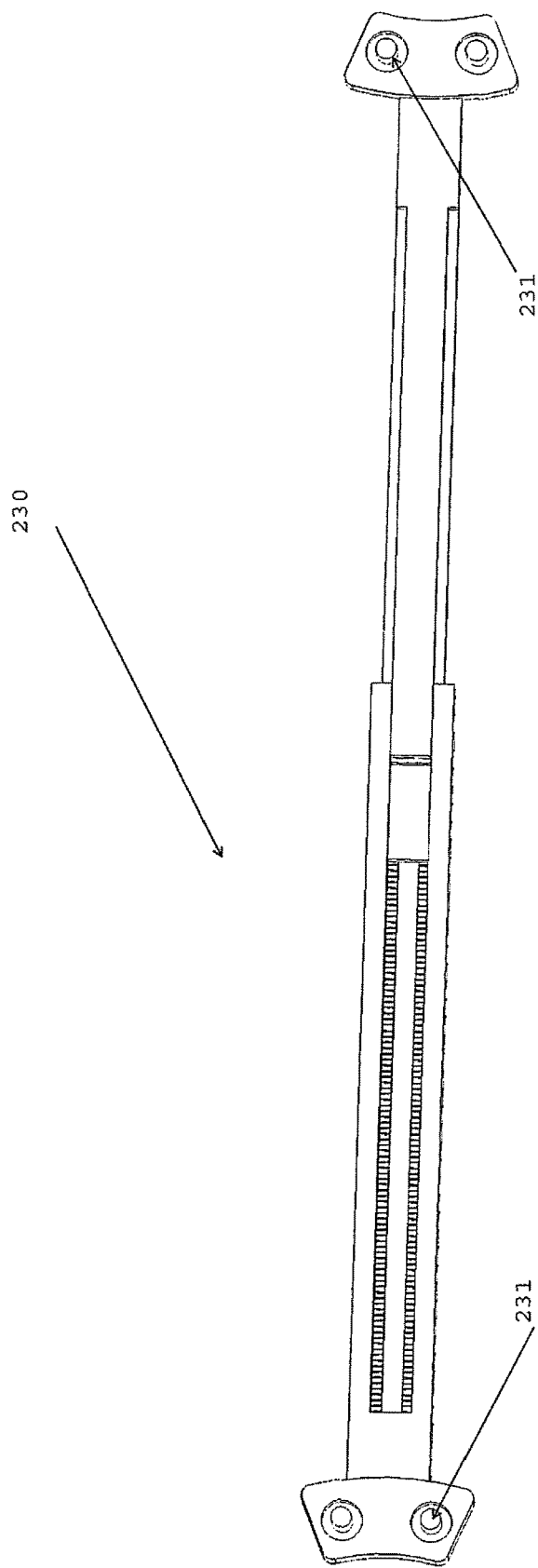
FIG. 38D is a bottom plan view of the arm.
Figure 38E:
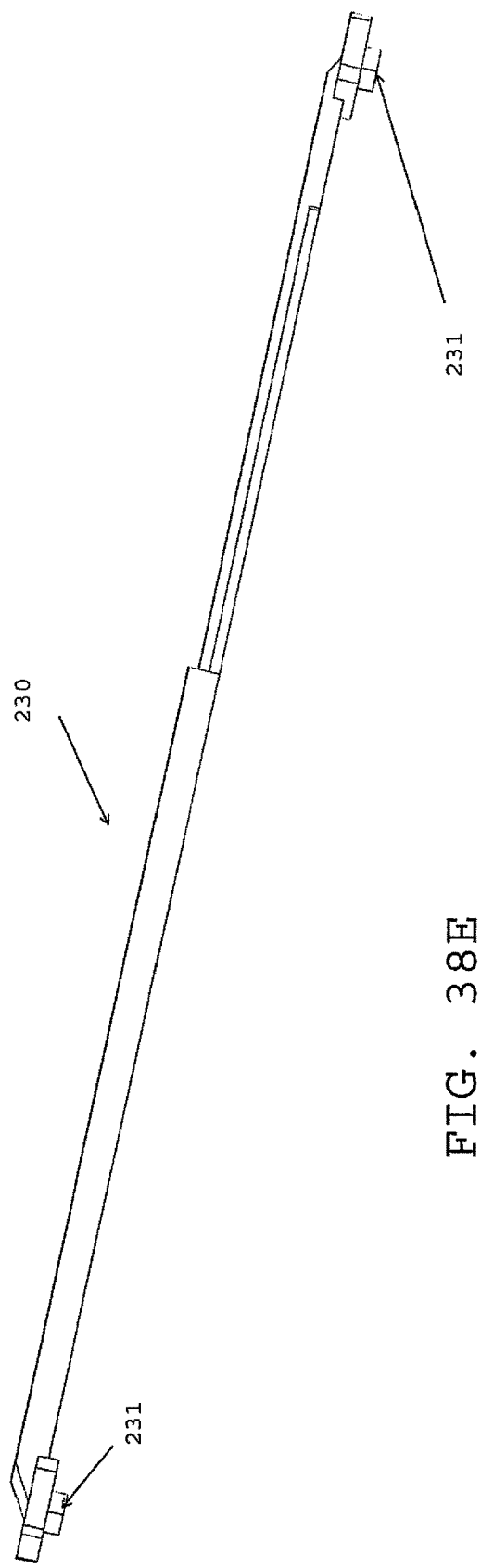
FIG. 38E is a side profile view of the arm.

As described above, the disclosed assembly may be used for establishing a level paver surface over a sloped subsurface. FIG. 37 depicts a side view of the assembly 200 and illustrates one mode establishing such leveled surface. Referring first to FIGS. 36A and 29E, the threaded insert 220 suitably features a concave surface 224 and the cap 120 suitably features a convex surface 123 whereby the slope of the paver support surface 123 may be skewed in any direction relative to the plane of the foot 111 of the base 110 via sliding the convex surface 123 of the cap 120 along the concave surface 224 of the insert 220. In one embodiment, the paver support surfaces 121 of four assemblies 200 positioned at the four corners of a square paver will self level with respect to one another under the weight of the pavers installed thereon the assemblies 200.

In some instances, the caps 120 of a four assembly system cannot, without more than sliding the convex surface 123 of the cap 120 along the concave surface 224 of the insert 220, be skewed enough in the applicable direction to accomplish a level surface of a square paver because the slope of the under surface may be too drastic. In such instances, a level paver surface may be accomplished via raising or lowering one or more of the paver support surface 123 of the pedestal assemblies 200 relative to one or more of the paver support surface 123 of the other pedestal assemblies 200. In one embodiment, such raising or lowering of the paver support surface 123 of an assembly 200 may be accomplished via: (1) removing the paver spacer 140 from the assembly cap 120 of the assembly 200; (2) inserting a wrench into the wrench socket 1321 of the key; (3) griping the flange grip 211 of the collar 210; and (3) torqueing the wrench so that the key 130 turns the insert 220 whereby the threads of the insert 220 and collar 210 interact to drive the insert further into or out of the tubiform of the collar 210.

In one embodiment, a plurality of assemblies 100, 200 may be used to support a paver surface. Frequently, the plurality of assemblies 100, 200 must be fixedly positioned at specific locations relative to one another for supporting the paver surface. To facilitate such positioning, an arm 230 may be provided that connects to two pedestal assemblies whereby their relative positions are so fixed. Such an arm 230 is depicted in FIGS. 38A through 38E. Specifically, FIGS. 38A through 38E respectively depict a top perspective, bottom perspective, top plan, bottom plan, and side profile view of the arm 230. Generally referring to the figures, the arm is comprised of retractable extensions with tenon 231 on either side. FIG. 39 is an environmental view of the arm 230 used for fixing the space between two pedestal assemblies 100, 200. As shown in the figure, the tenon 231 of the arm 230 may be inserted into mortises 2112 on the upperside of the foot 111, 211 of the bases 110; 210 of two adjacent pedestal assemblies 100; 200.

The components of the pedestal assemblies 100, 200, being or composing a paver load bearing apparatus, should preferably be fashioned out of materials that are capable of supporting the weight of a paver. As the weight of a paver may vary from extraordinarily heavy to very light, the materials which may be acceptable for fabricating the components will typically vary according to the applicable paver to be supported thereon the pedestal assemblies 100, 200. Depending on the circumstance, such materials will be readily known to one of skill in the and may include; without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies 100, 200 being or composing a paver load bearing apparatus should preferably be dimensioned to a size that renders the assemblies 100, 200 capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure.

Figure 40:
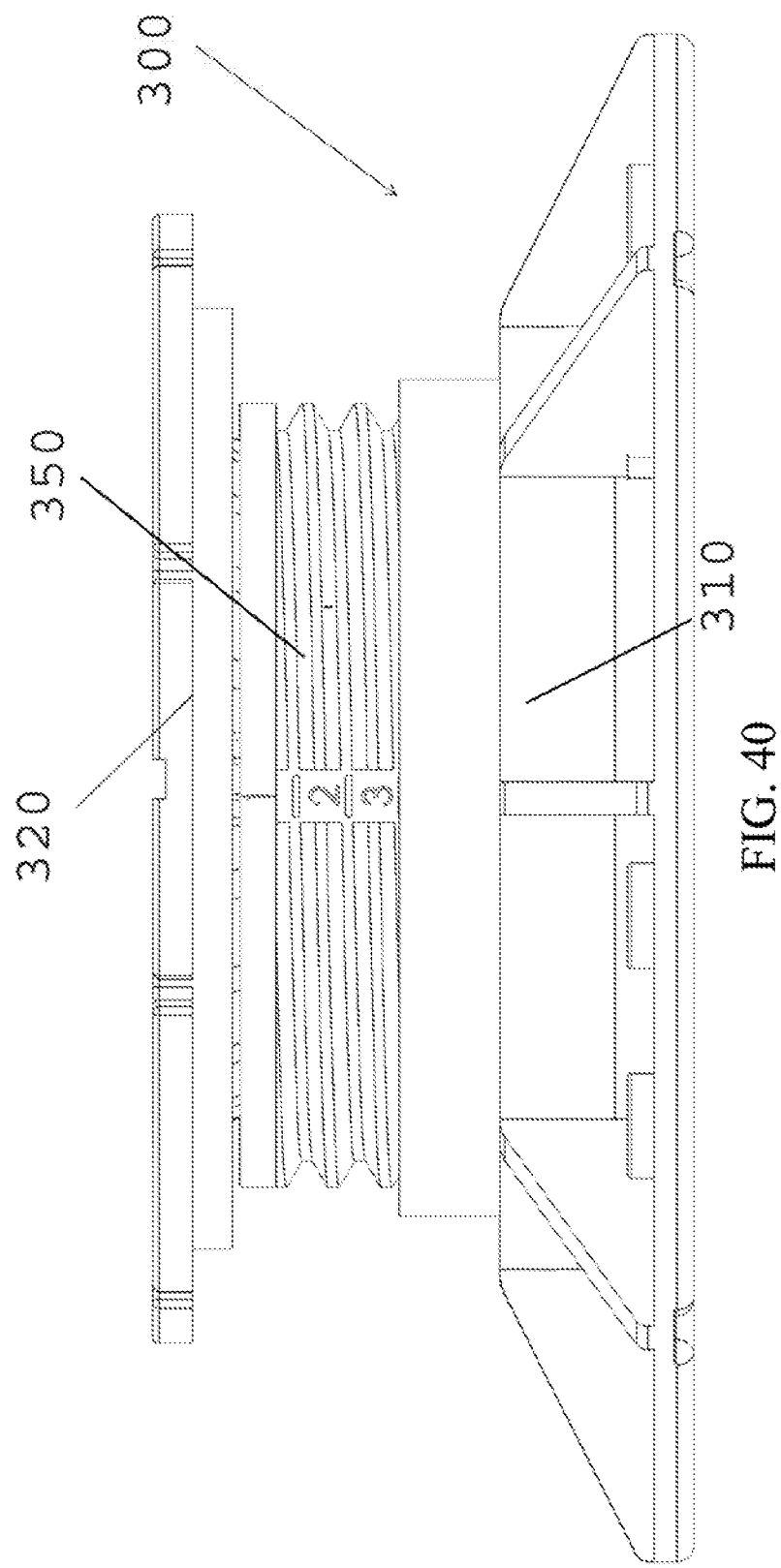
FIG. 40 is a side view of an assembly.
Figure 41:
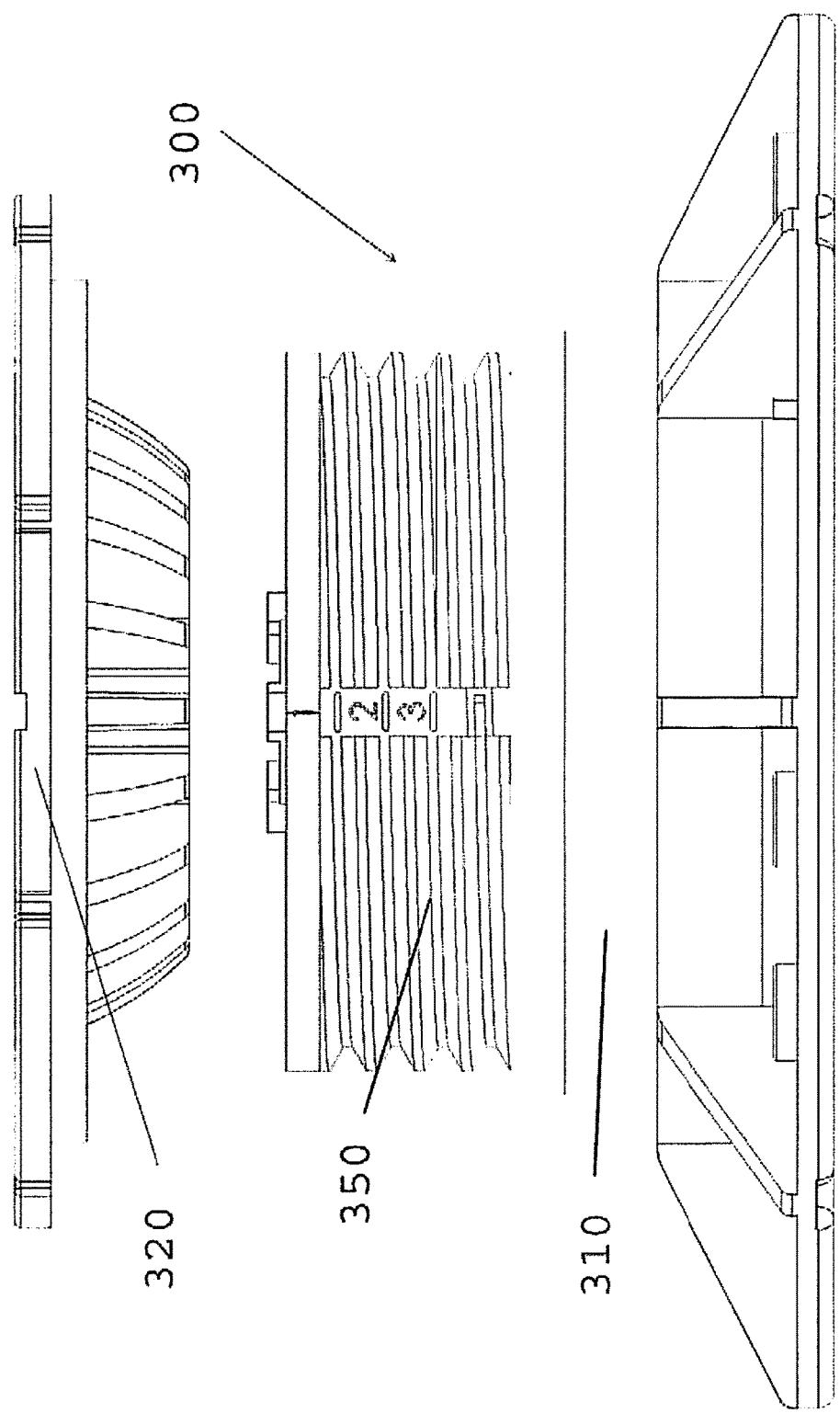
FIG. 41 is an exploded view of the assembly.
Figure 42B:
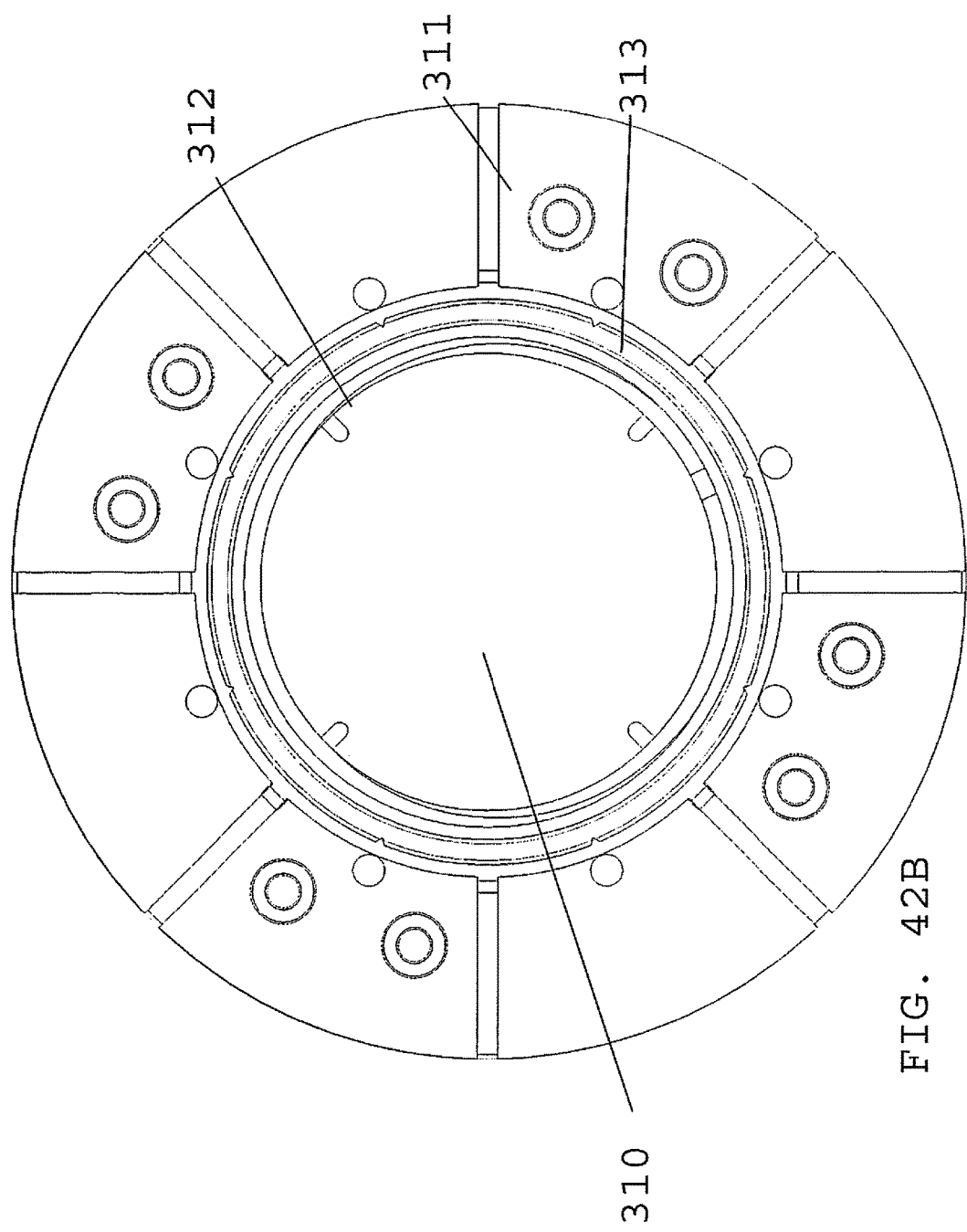
FIG. 42B is a top plan view of the base.
Figure 42D:
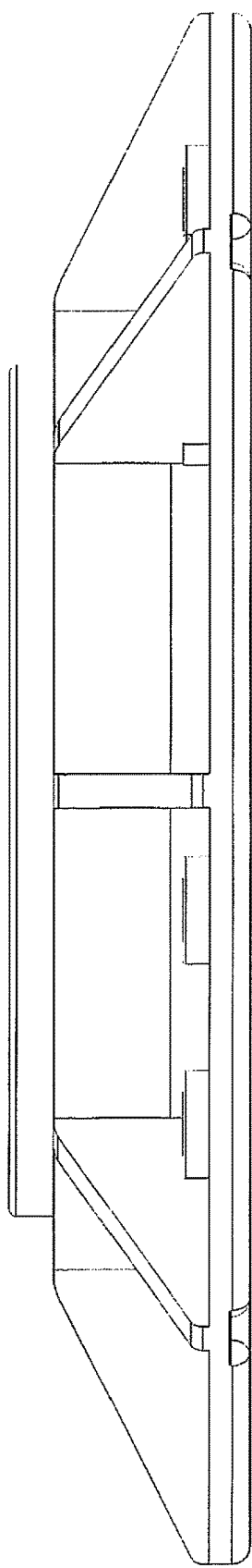
FIG. 42D is a side profile view of the base.
Figure 43A:
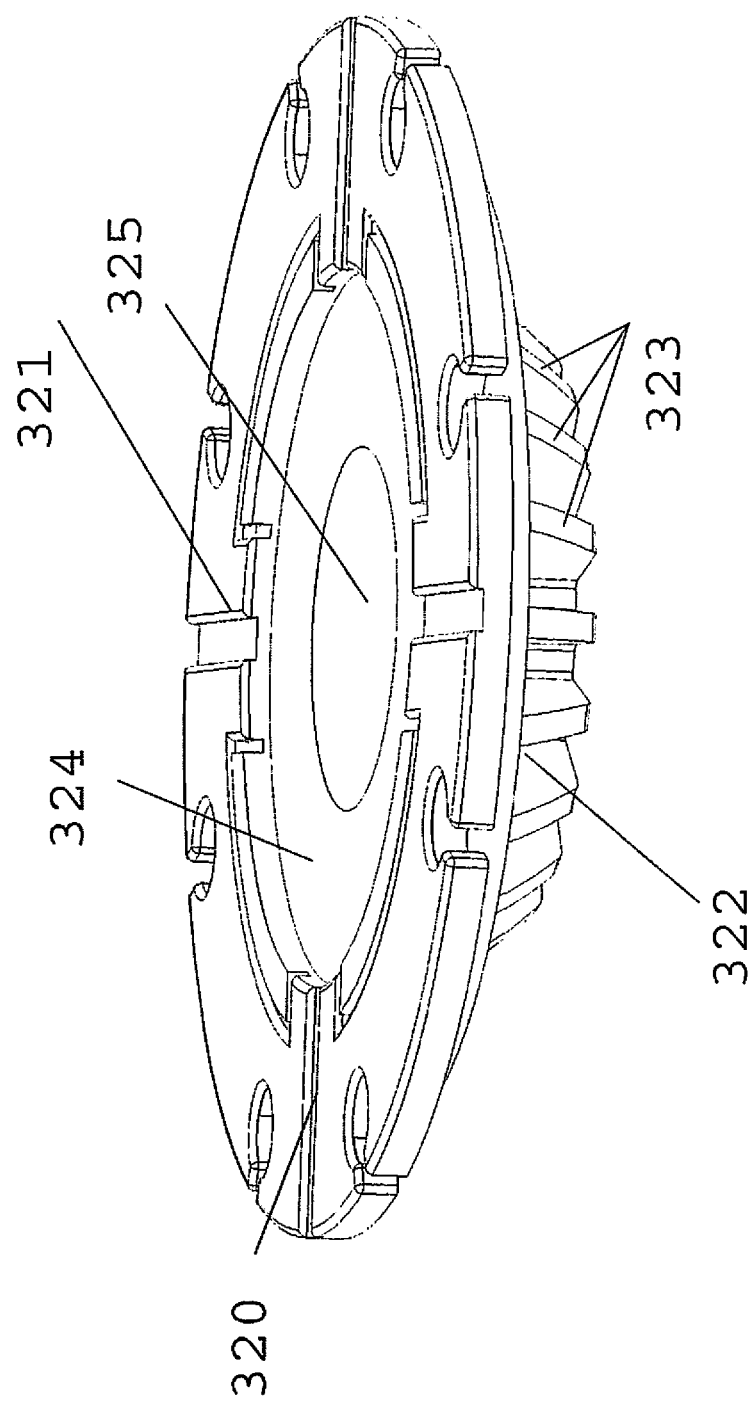
FIG. 43A is a top perspective view of a cap.
Figure 43B:
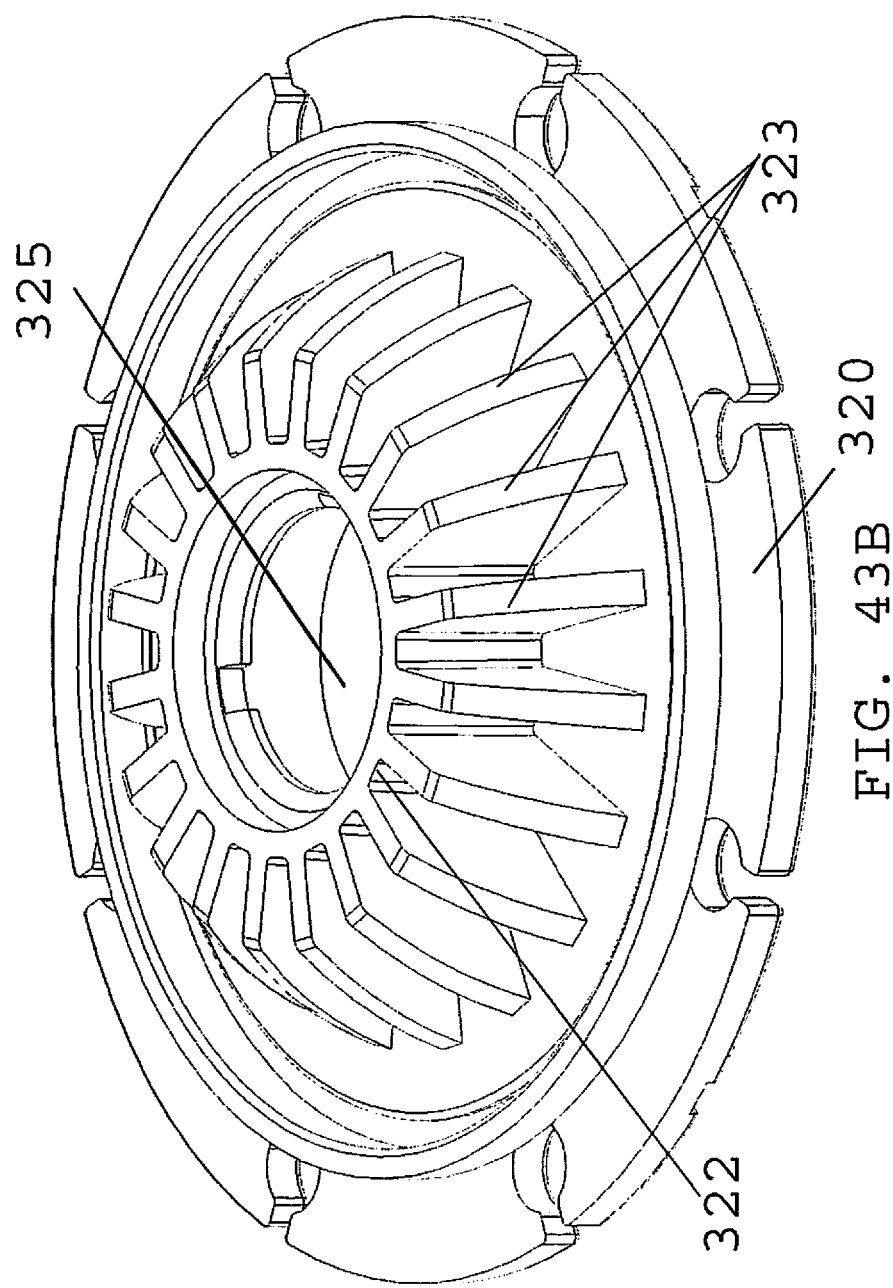
FIG. 43B is a bottom perspective view of the cap.
Figure 43C:
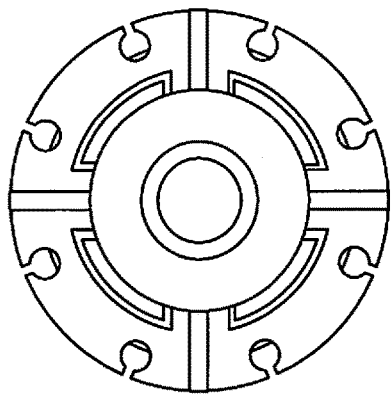
FIG. 43C is a top plan view of the cap.
Figure 43D:
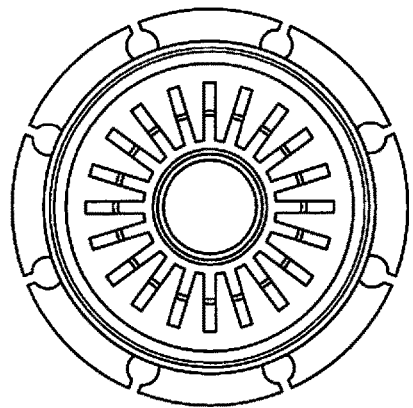
FIG. 43D is a bottom plan view of the cap.
Figure 43E:
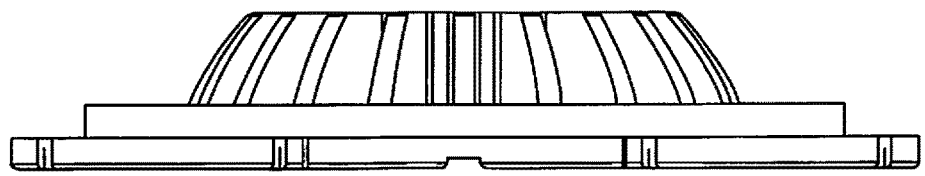
FIG. 43E is a side profile view of the cap.

FIGS. 40 and 41 depict a third embodiment of a pedestal assembly 300 for facilitating the elevated and leveled placement of a paver array onto a substrate. FIG. 40 is a side view of the pedestal assembly 300 and FIG. 41 is an exploded view of the same. As seen in the figures, the assembly 300 comprises: a base 310; a threaded insert 350, and a cap 320.

FIGS. 42A through 42D depict different views of a preferable embodiment of the base 310 of the pedestal 300 depicted in FIGS. 40 and 41. Specifically, FIGS. 42A through 42D, respectively, depict a top perspective, top perspective, bottom plan, and side profile view of the base 310. As can be seen in the referenced drawings, the base is generally a truncated cylinder and may comprise: a foot 311; a femininely threaded support cylinder 312; and, a riser socket 313 around the cylinder.

FIGS. 43A through 43E depict different views of a preferable embodiment of the cap 320 of the apparatus 300 depicted in FIGS. 40 and 41. Specifically, FIGS. 43A through 43E respectively depict a top perspective, bottom perspective, top plan, bottom plan, and side profile view of the cap 320. As can be seen in the referenced drawings, the cap 320 is generally a disc with a convex surface on its bottom side. Still referring to FIGS. 43A through 43E, the cap 320 may comprise: a paver support surface 321; a cylinder 322 extending from the bottom of the paver support surface 321; a convex surface 323 defining the bottom of the cylinder 322; a tile spacer receptacle 324 that is coaxial to the tile support surface 321; and, a key socket access hole 325 through the convex surface 325 along the axis of the cylinder 322.

Figure 44:
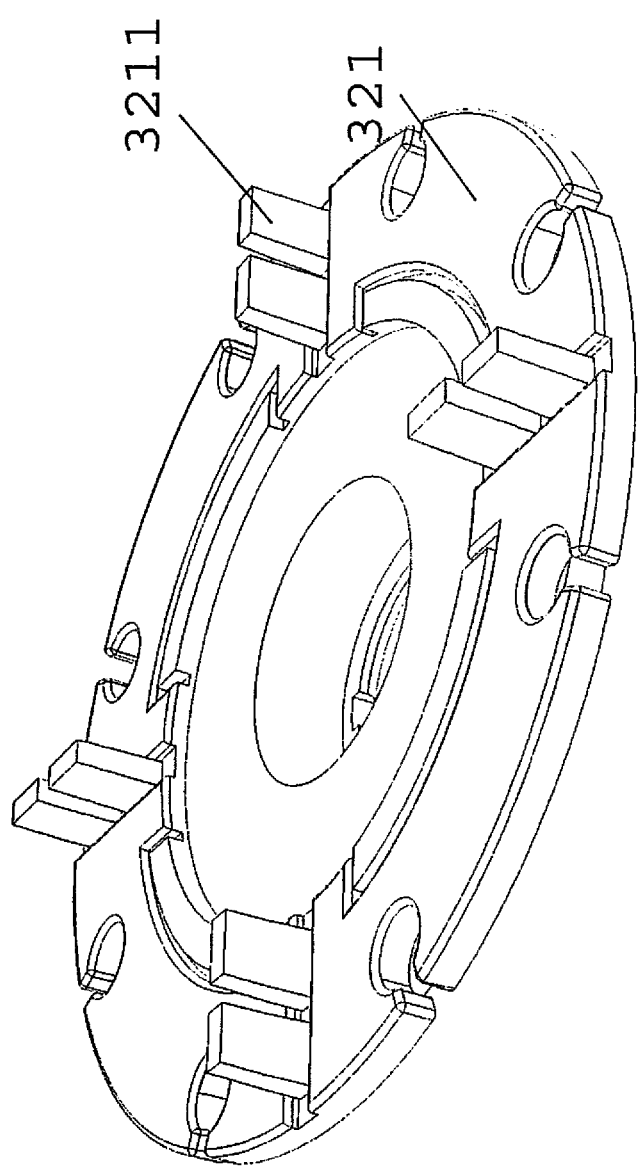
FIG. 44 is a top perspective view of an alternate embodiment of a cap.

FIG. 44 depicts the tile support surface 321 of the cap 320 with tile spacers 3211 provided thereto.

Figure 45A:
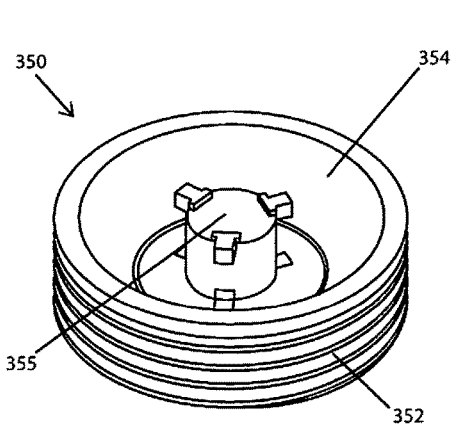
FIG. 45A is a top perspective view of a threaded insert.
Figure 45B:
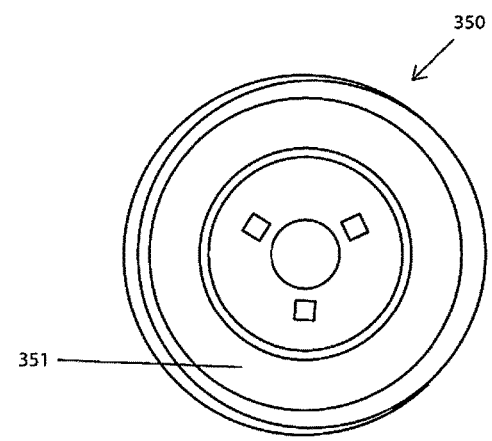
FIG. 45B is a top plan view of the threaded insert.
Figure 45C:
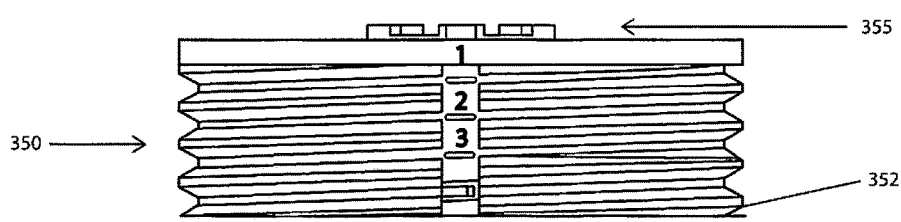
FIG. 45C is a side profile view of the threaded insert.

FIGS. 45A through 45C depict different views of a preferable embodiment of the threaded insert 350 component of the apparatus 300 depicted in FIGS. 40 through 41. Actually, FIGS. 45A through 45C respectively depict a top perspective, top plan; and side profile views of the threaded insert 350, As can be seen in the referenced drawings, the threaded insert is generally a truncated cylinder and may comprise: a foot 351; a male threads 352 on the outside surface of its cylinder shape; a concave surface 354 defining the top of the cylinder; and a key 355 extending coaxially from the concave surface 354 along the axis of the cylinder 350.

FIGS. 40 through 45C show a preferable method for assembling the assembly 300. First, the base 310 may be positioned so that the bottom side of the foot 311 interfaces with a subsurface extends outwardly and transversely relative to a plane of the subsurface. Second, the foot 351 of the threaded insert 350 may be provided to the top of the base 310 so that the threads 312 of the base 310 and the threads 352 of the insert 350 cooperate to drive the insert 350 to within the tubiform of the base 310. Fourth, the cap 320 may be positioned on top of the threaded insert 350 so that the concave surface 354 of the insert 350 interfaces with the convex surface 323 of the cap 320 and wherein the key 355 of the insert 350 is located within the key socket access hole 325 of the cap 320 so that: (1) the key is retained inside the key socket 325; and (2) the cap 320 is movably (e.g., slideably and/or rotatably) retained between the flange of the key 355 and the concave surface 354 of the threaded insert 350.

Referring to FIGS. 40 through 45C, a paver may be supported above a subsurface via: positioning pedestal assembly 300, foot 311 down, on the subsurface; and providing a corner of the paver to the paver support surface 321 whereby the sides of the paver abut. It should be noted that the dimensions of the assembly 300 will vary with the size of the paver to be retained by the paver support surface 321. In particular, the height of the projections may vary depending on the thickness of a paver, e.g. in a range of about 0 to 20 inches. it should be also noted that, now, and throughout the application the terms "top" and "bottom" or "lower" and "upper", or any other orientation defining term should in no way be construed as limiting of the possible orientations of the assembly 300 (i.e., the assembly may be positioned sideways, or in reversed vertical orientations even though the specification refers to a "top" and "bottom" parts)

Figure 46B:
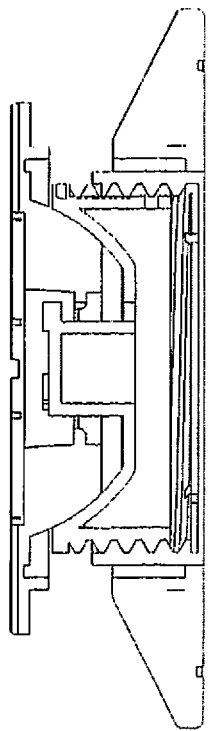
FIGS. 46A and 46B depicts a side cross-section view of the assembly and illustrates one mode establishing a leveled surface.
Figure 46A:
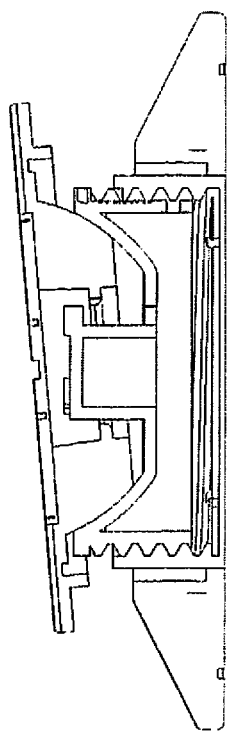

As described to above, the disclosed assembly may be used for establishing a level paver surface over a sloped subsurface. FIGS. 46A and 46B depict side cross-section views of the assembly 300 and illustrate one mode establishing such leveled surface. Referring first to FIGS. 46A and 46B, the base 310 suitably features a concave surface 314, and the cap 320 suitably features a convex surface whereby the slope of the paver support surface 321 may be skewed in any direction relative to e plane of the foot 311 of the base 310 via sliding the convex surface 323 of the cap 320 along the concave surface 314 of the base 310. In one embodiment, the paver support surfaces 321 of four assemblies 300 positioned at the four corners of a square paver will self level with respect to one another under the weight of the pavers installed thereon the assemblies.

Figure 47A:
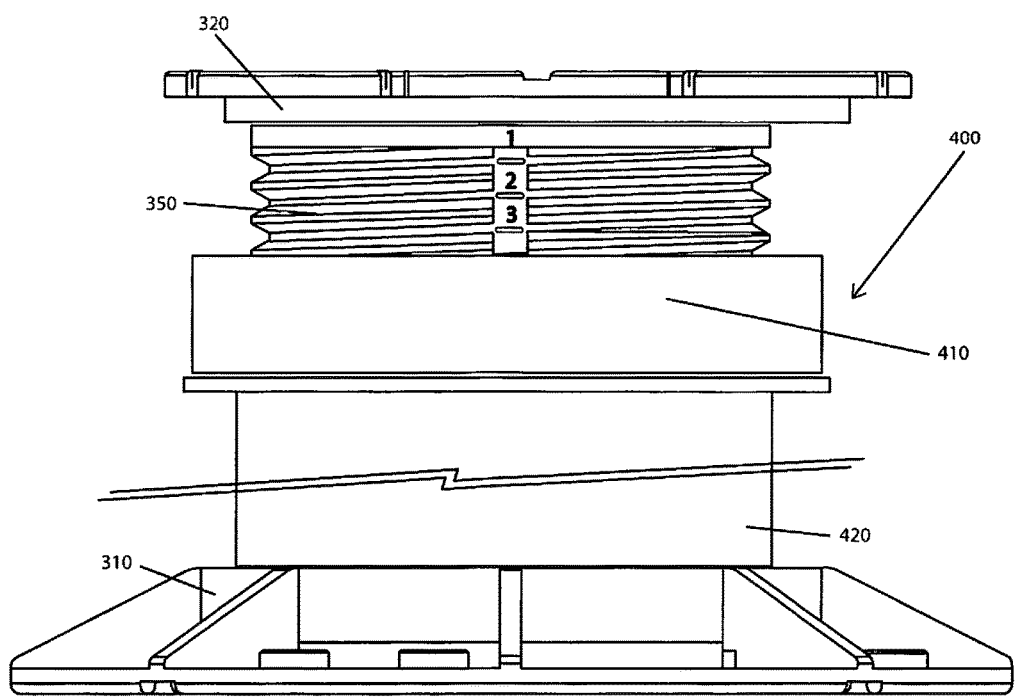
FIG. 47A is a side view of an assembly.
Figure 47B:
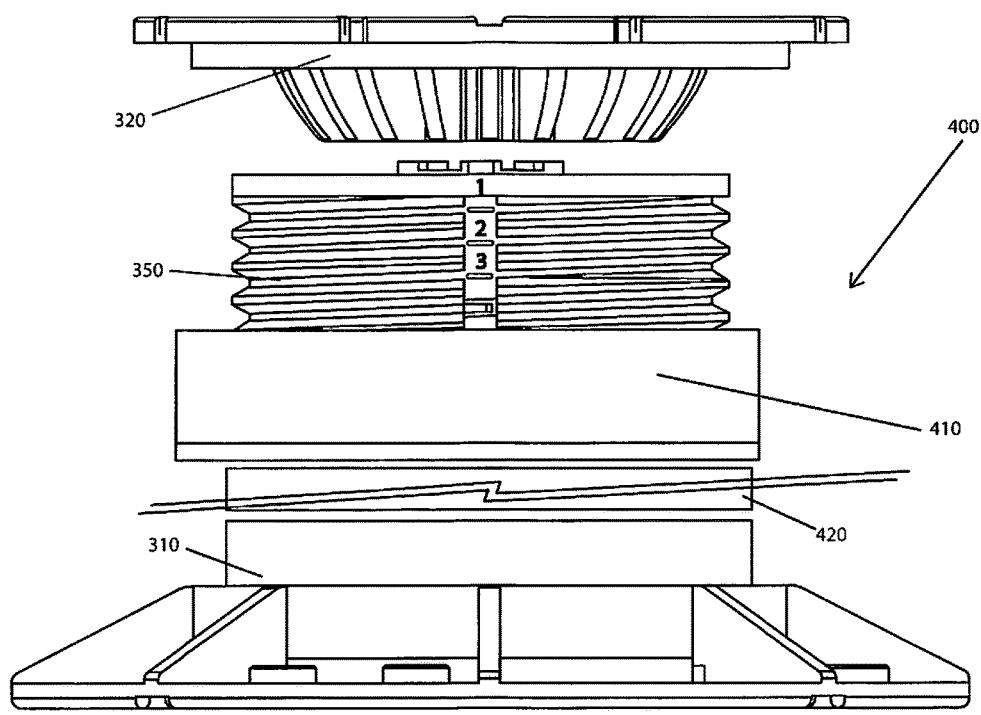
FIG. 47B is an exploded view of the assembly.

FIGS. 47A through 47B depict a fourth embodiment of a pedestal assembly 400 for facilitating the elevated and leveled placement of a paver array onto a subsurface. FIG. 47A is a side view of the pedestal assembly 400; FIG. 47B is an exploded side view of the pedestal assembly 400 of FIG. 47A. As seen in the figures, the pedestal assembly 400, like the pedestal assembly 300 of FIGS. 40 and 41, comprises: a base 310; a threaded insert 350, and a cap 320. The structure and operability of those components are the same as described above in connection with the third embodiment of a pedestal assembly 300 shown in FIGS. 40 and 41. Unlike the assembly 300 of FIGS. 40 and 41, the assembly 400 further comprises a female threaded collar 410 and a riser 420.

Figure 48A:
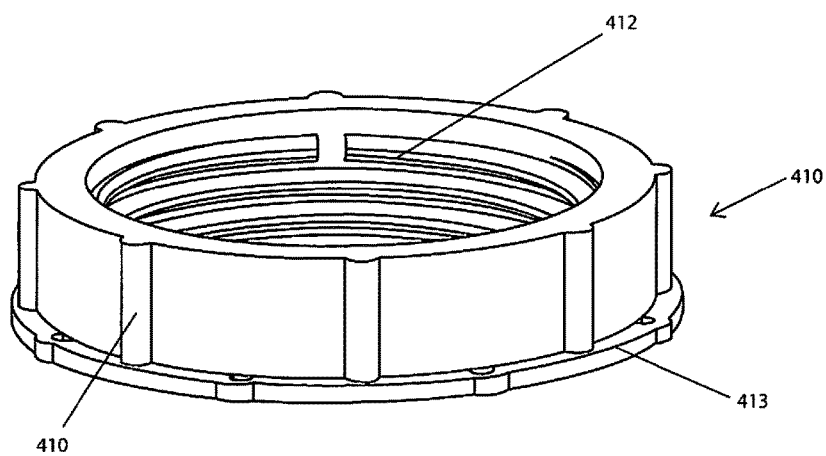
FIG. 48A is a top perspective view of a threaded collar.
Figure 48B:
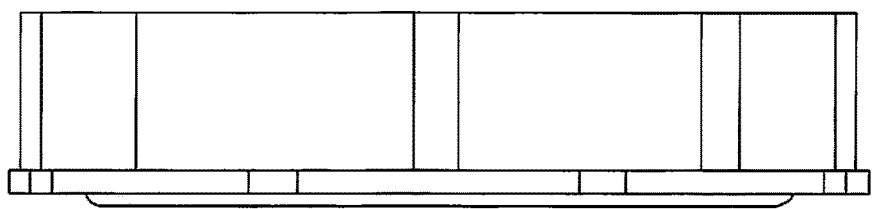
FIG. 48B is a bottom plan view of the threaded collar.
Figure 48C:
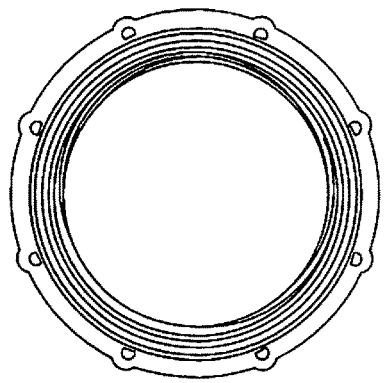
FIG. 48C is a side view of the threaded collar.

FIGS. 48A through 48C depict different views of a preferable embodiment of the threaded collar 410 component of the apparatus 400 depicted in FIGS. 46A through 46B. Specifically, FIGS. 48A through 48C respectively depict a top perspective, side profile view, and bottom plan view of the threaded collar 410. As can be seen in the referenced drawings, the threaded collar 410 is generally a truncated tubiform with; a grip flange 411; female threads 412 on the inside of its tubiform; and a foot 413.

FIGS. 47A through FIGS. 48C show a preferable method for assembling the assembly, 400. First, the base 410 may be positioned so that the bottom side of the foot 311 interfaces with a subsurface and extends outwardly and transversely relative to a plane of the subsurface. Second, a riser 420 (e.g., a pipe section) may be positioned within the riser receptacle 313 of the base 310. Third, the foot 413 of the threaded collar 410 may be provided to the top of the riser 420 so that the foot 413 of the threaded collar 410 is positioned inside of the riser 420. Fourth, the foot 351 of the threaded insert 350 may be provided to the top of the threaded collar 410 so that the threads 412 of the collar 410 and the threads 352 of the insert 350 cooperate to drive the insert 350 to within the tubiform of the collar 410. Fifth, the cap 320 may be positioned on top of the threaded insert 350 so that the concave surface 354 of the insert 350 interfaces with the convex surface 323 of the cap 320 and wherein the key 355 of the insert 350 is located within the key socket access hole 325 of the cap 320 and wherein the cap 320 is movably (e.g., slidably and/or rotatably) retained between the flange of the key 325 and the concave surface 354 of the threaded insert 320. Finally, the tile spacer 140 may be provided to the spacer receptacle 324 of the cap 320 whereby the spacer 140 surface and the support surface 321 of the cap 320 generally form a plane.

Referring to FIGS. 47A and 47B, a paver may be supported above a subsurface via: positioning an assembly 400, foot 311 down, on the subsurface; rotating the cap 320 around the key 325 until the orientation of the projections 141 of the spacer 140 align with a planned paver surface; and providing a corner of the paver to the paver support surface 321 whereby the sides of the paver abut the projections 141.

As described to above, the disclosed assembly may be used for establishing a level paver surface over a sloped subsurface. FIG. 47A depicts a side view of the pedestal assembly 400 and illustrates one mode establishing such leveled surface. Referring first to FIGS. 47A and 47B, the threaded insert 350 suitably features a concave surface 354 and the cap 320 suitably features a convex surface 323 whereby the slope of the paver support surface 321 may be skewed in any direction relative to the plane of the foot 311 of the base 310 via sliding the convex surface 323 of the cap 320 along the concave surface 354 of the insert 320. In one embodiment, the paver support surfaces 321 of four assemblies 400 positioned at the four corners of a square paver will self level with respect to one another under the weight of the pavers installed thereon the assemblies 200.

In some instances, the caps 320 of a four assembly 300, 400 system cannot, without more than sliding the convex surface 323 of the cap 320 along the concave surface 354 of the insert 350, be skewed enough in the applicable direction to accomplish a level surface of a square paver because the slope of the under surface may be too drastic. In such instances, a level paver surface may be accomplished via raising or lowering one or more of the paver support surface 321 of the assemblies 300/400 relative to one or more of the paver support surface 321 of the other assemblies 300/400. In one embodiment, such raising or lowering of the paver support surface 321 of an assembly 300/400 may be accomplished via: (1) removing the paver spacer from the assembly cap 320 of the pedestal assembly 300; (2) inserting a wrench into the wrench socket 1321 of the key; (3) griping the grip flange 411 of the collar 410; and (3) torqueing the wrench so that the key 130 turns the insert 350 whereby the threads of the insert 350 and collar 410 interact to drive the insert further into or out of the tubiform of the collar 410.

Figure 49A:
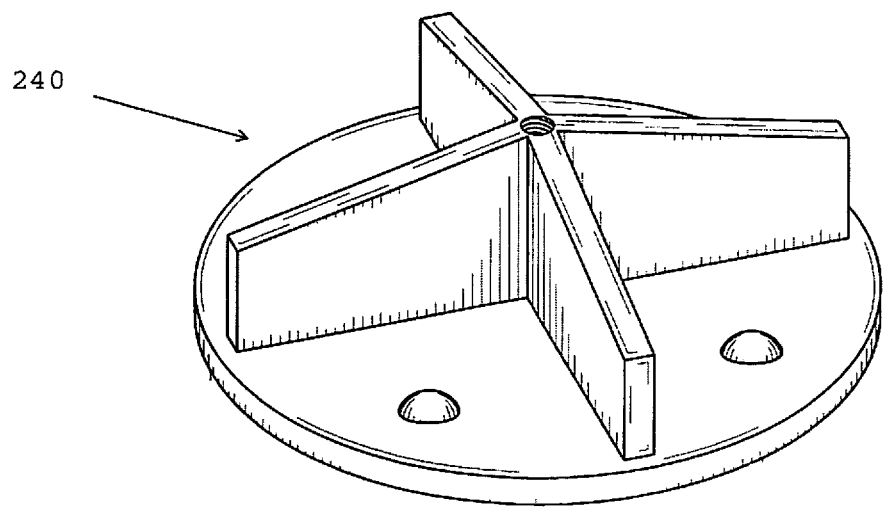
FIGS. 49A through 49C are views of a top surface of a spacer.
Figure 50:
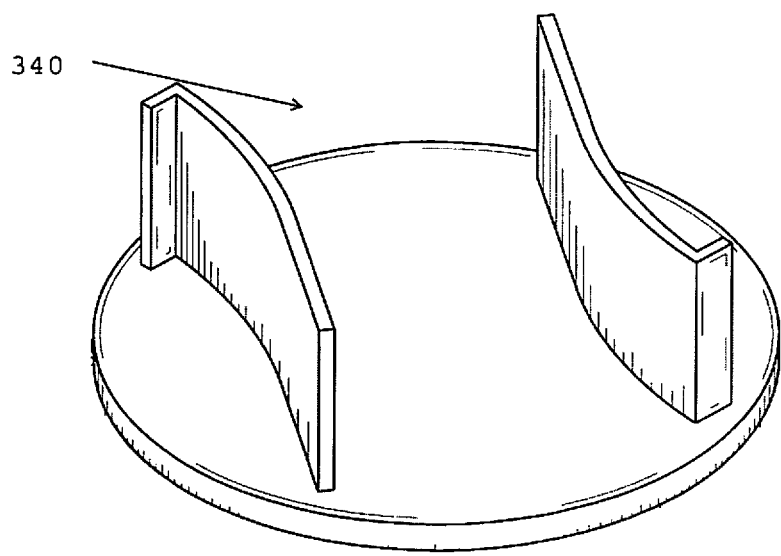
FIG. 50 is a view of a top surface of a spacer.
Figure 49B:
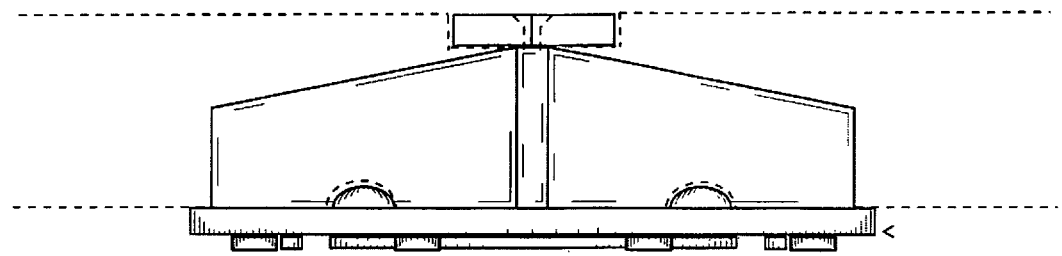
Figure 49C:
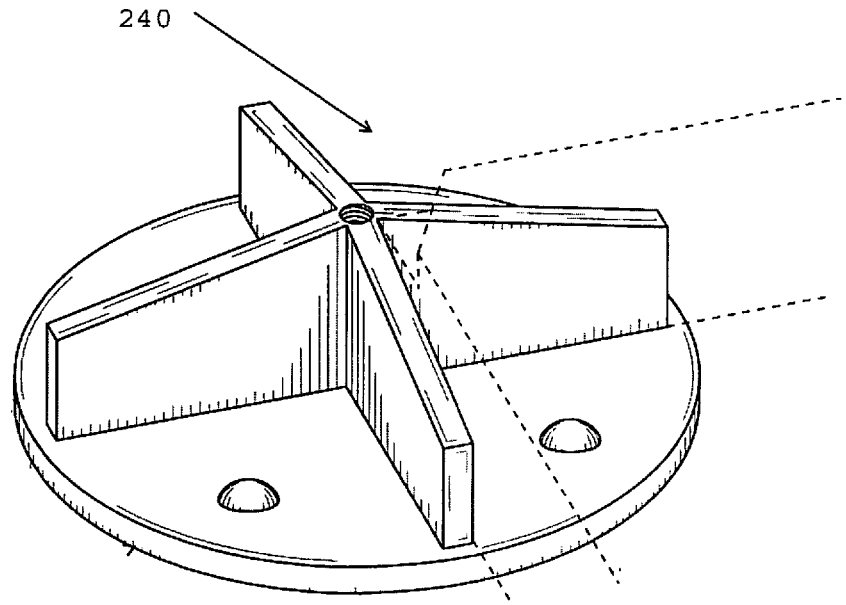
Figure 51A:
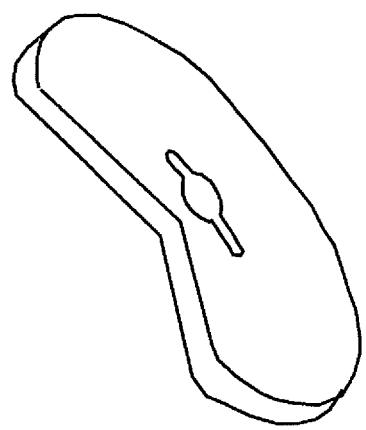
FIGS. 51A and 51B are respectively a view of an anchoring washer for securing wooden tiles and an environmental view of the same.
Figure 51B:
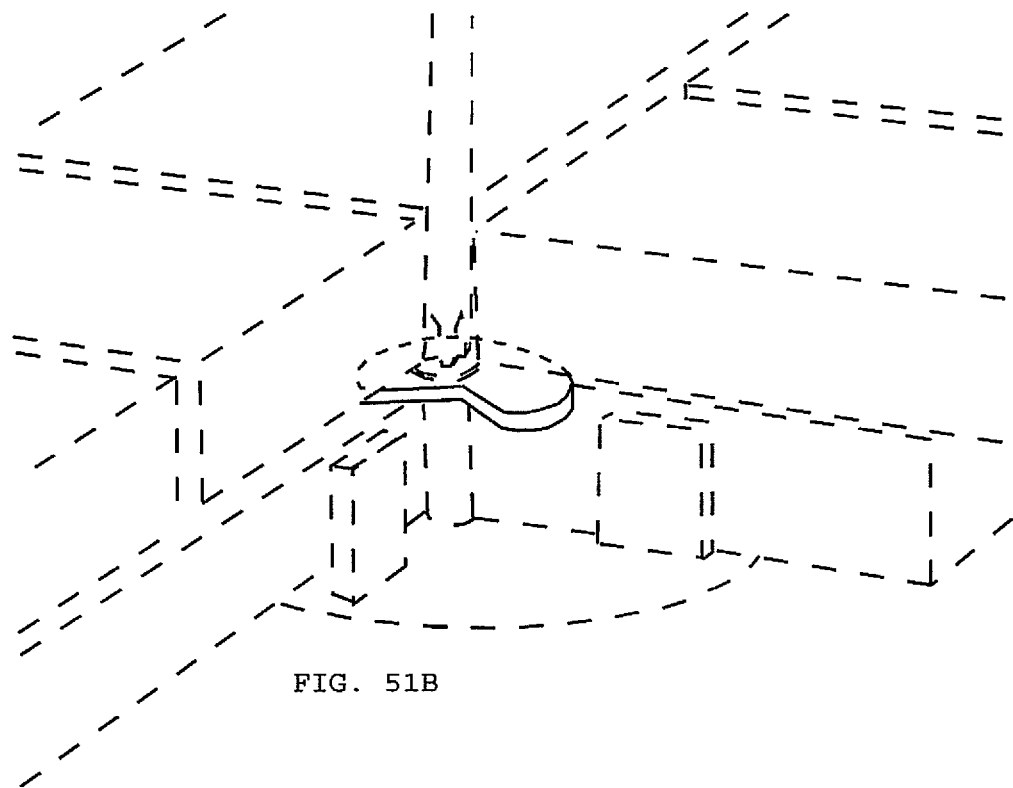
Figure 52A:
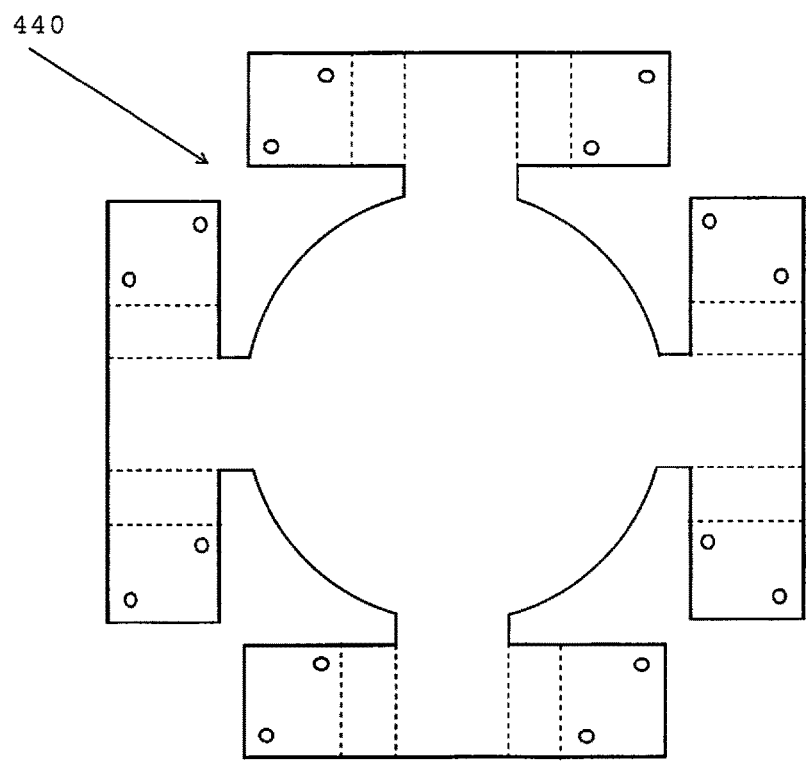
FIGS. 52A and 52B are respectively views of a top surface of a spacer and environmental views of the same.
Figure 52B:
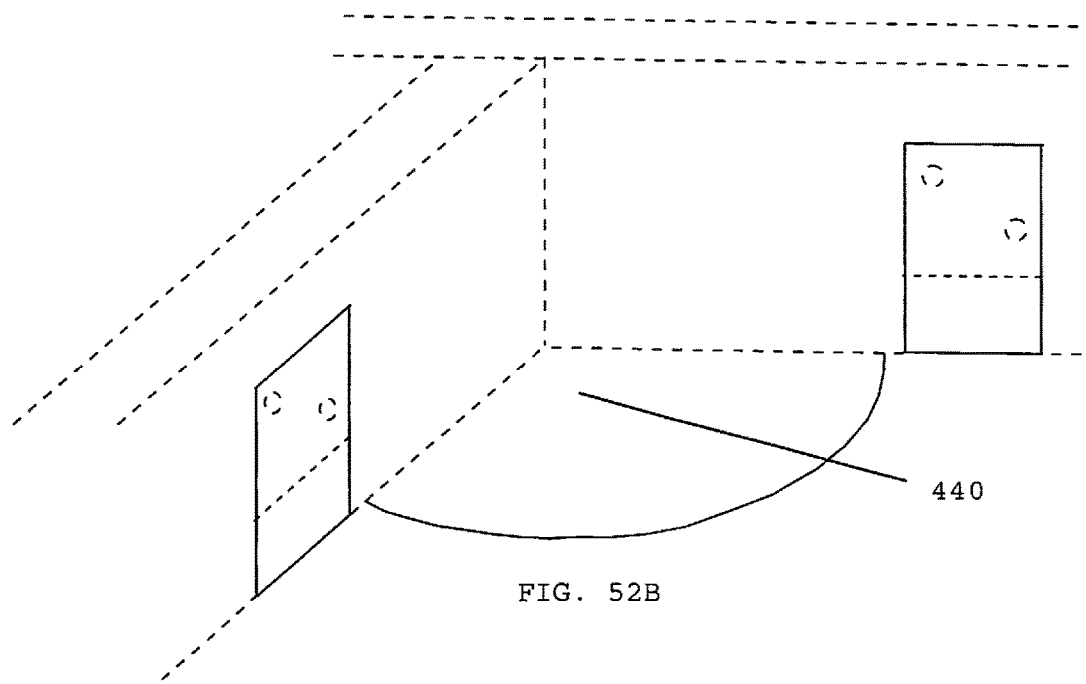
Figure 53A:
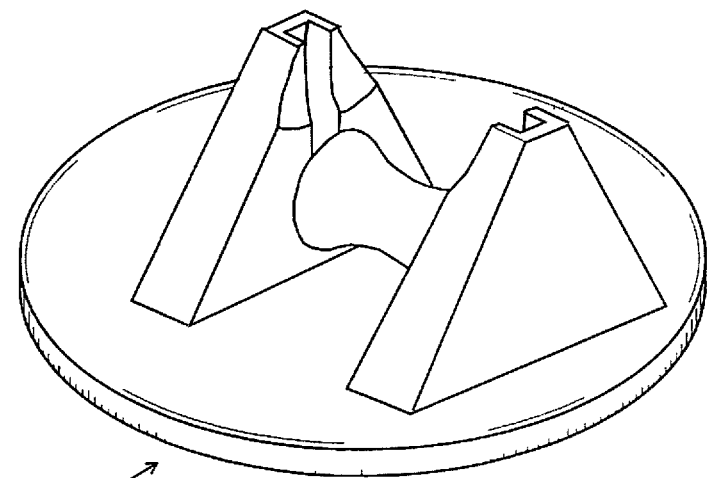
FIGS. 53A and 53B are respectively views of a top surface of a pipe riser spacer.
Figure 53B:
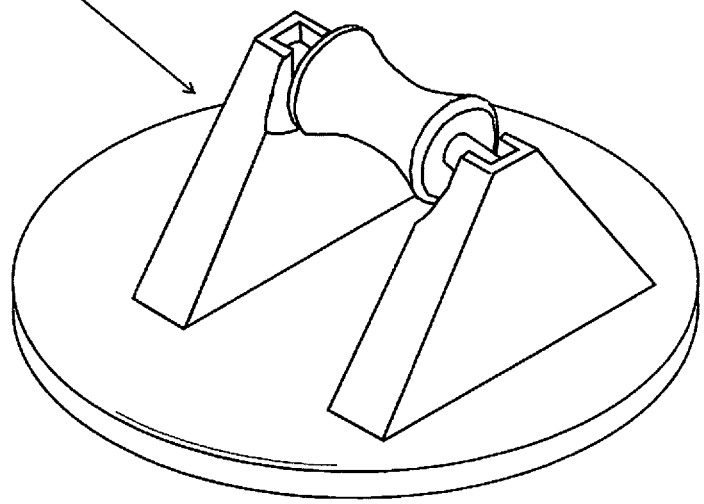
Figure 54:
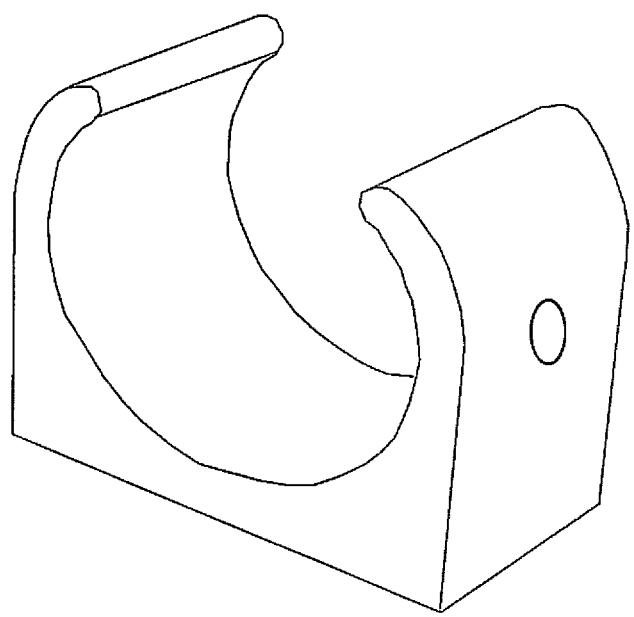
FIG. 54 is a top perspective view of a receptacle for an arm.
Figure 55D:
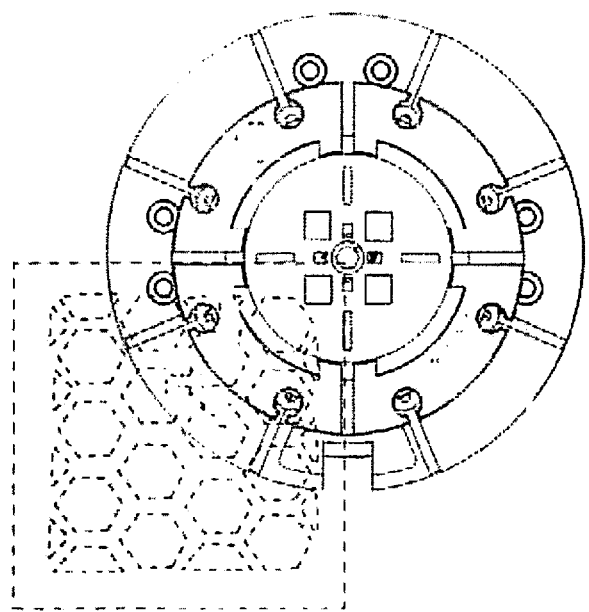
Figure 55C:
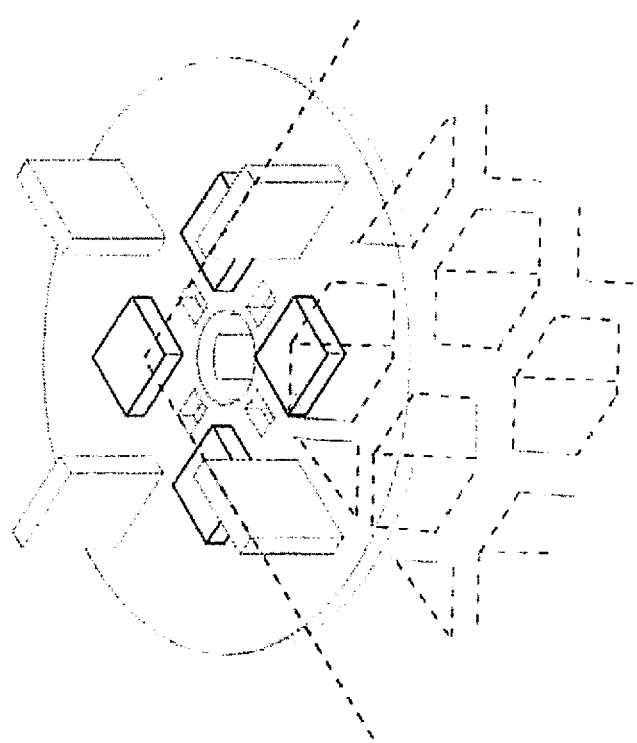

As set forth above, the pavers supported by disclosed pedestal assemblies 100 400 may suitably support pavers of various sizes and shapes. In order to account for such paver variation, multiple embodiments of the top surface of the tile spacer 140 may be provided. FIG. 49A through 49C are views of a top surface of a tile spacer 240, wherein tiles are locked in place via a vise plate. FIG. 50 is a view of a top surface of a spacer 340, wherein a support beam is disposed between two curved walls. FIGS. 51A and 51B are respectively a view of an anchoring washer for securing wooden tiles and an environmental view of the same. FIGS. 52A and 52B are respectively views of a top surface of a spacer 440 and environmental views of the same. FIGS. 53A and 53B are respectively views of a top surface of an adjustable pipe riser spacer 540.

In one embodiment, a plurality of assemblies 300, 400 may be used to support a paver surface. Frequently, the plurality of assemblies 300, 400 must be fixedly positioned at specific locations relative to one another for supporting the paver surface. To facilitate such positioning, an arm may be provided that connects to two pavers whereby their relative positions are so fixed. Such an arm may be a pipe section provided between two pipe receptacles on the foot of a base 310 of an assembly. One embodiment, a pipe receptacle 500 is provided in FIG. 54. Generally referring to the figures, a pipe may be provided between two pipe receptacles to establish an arm. The arm may suitably be fixedly retained within the pipe receptacles via providing a screw through the side of the pipe receptacle and into a retained pipe.

FIGS. 55A through 55D illustrate how the system disclosed by U.S. Pat. No. 8,128,312 (generally disclosed at http://silcasystem.com/ or http://www.pierdex.com/) might be incorporated into the above described system.

The components of the assemblies 100-400, being or composing a paver load bearing apparatus, should preferably be fashioned out of materials that are capable of supporting the weight of a paver. As the weight of a paver may vary from extraordinarily heavy to very light, the materials which may be acceptable for fabricating the components will typically vary according to the applicable paver to be supported thereon the assemblies 100-400. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies 100-400 being or composing a paver load bearing apparatus should preferably be dimensioned to a size that renders the assemblies 100-400 capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure An apparatus comprised of an above disclosed component may be used to compensate for variations in the slope of the undersurface with regard to the leveling of a paver surface. It should be noted that FIGS. 27A through 55D and the associated description are of illustrative importance only. In other words, the depiction and descriptions of the present invention should not be construed as limiting of the subject matter in this application. Additional modifications may become apparent to one skilled in the art after reading this disclosure.

What is claimed is:

1. A planting system, comprising
  a) a plurality of frames, each frame comprising:
    (i) a floor; with an open top;
    (iii) a covered conduit operatively connected to the floor to allow plumbing to pass underneath the floor; and
    (iv) a plurality of holes through which water can be fed into the container, wherein the holes are in fluid communication with the covered conduit so that water released from plumbing in the covered conduit is introduced into the container via the plurality of hole; and
  b) a plurality of pedestals connectable to the plurality of frames to elevate the plurality of frames, wherein each frame comprises four sidewalls, wherein two sidewalls each comprises a cutout, and two sidewalls each comprises a connector protruding away from its respective sidewall to create a lip, wherein the lip is in the shape of the cutout and configured to mate with a cutout of a second frame, thereby allowing two adjacent frames to connect with each other.

2. The planting system of claim 1, wherein each frame comprises a plurality of slots to connect with the plurality of pedestals.

3. The planting system of claim 1, wherein the floor comprises a plurality of separated troughs defined by barriers.

4. A planting system, comprising
  a) a plurality of frames, each frame comprising:
    (i) a floor;
    (ii) at least one sidewall operatively connected to the floor defining a container with an open top;
    (iii) a covered conduit operatively connected to the floor to allow plumbing to pass underneath the floor;
    (iv) a plurality of holes through which water can be fed into the container, wherein the holes are in fluid communication with the covered conduit so that water released from plumbing in the covered conduit is introduced into the container via the plurality of holes;
  b) a plurality of pedestals connectable to the plurality of frames to elevate the plurality of frames, wherein each pedestal, comprises:
    (i) a femininely threaded support cylinder; and
    (ii) an outer cylindrical wall concentrically arranged about and spaced from the femininely threaded support cylinder to define a riser socket around the femininely threaded support cylinder.

5. The planting system of claim 4 further comprising a slope compensation pad supporting said component.

6. The planting system of claim 5 wherein the compensation pad comprises a first compensation disk having a top surface defining a top surface plane; and a bottom surface defining a bottom surface plane, wherein the top surface plane is angled relative to the bottom surface plane; and a second compensation disk having a top surface defining a top surface plane, and a bottom surface defining a bottom surface plane, wherein the top surface plane of the second compensation disk is angled relative the bottom surface of the second compensation disk, wherein the first compensation disk is stackable on top of the second compensation disk in various configurations, wherein in a first configuration, the top surface plane of the first compensation disk is parallel to the bottom surface plane of the second compensation disk, and in a second configuration, the top surface plane of the first compensation disk is angled relative to the bottom surface plane of the second compensation disk.

7. The planting system of claim 4 further comprising a riser having a first end receivable into the riser socket.

8. The planting system of claim 4 further comprising a male threaded insert removably fastenable within the femininely threaded support cylinder or a second end of the riser socket.

9. The planting system of claim 8, wherein the male threaded insert mechanically supports the frames.

10. The planting system of claim 4, further comprising a plurality of lateral braces to interconnect a plurality of pedestals.

11. The planting system of claim 10 wherein each lateral brace comprises two arms to adjust a length of the lateral brace.

* * * * *